United States Patent
Hackenberger et al.

(10) Patent No.: US 12,453,779 B2
(45) Date of Patent: Oct. 28, 2025

(54) CHEMOSELECTIVE THIOL-CONJUGATION WITH ALKENE OR ALKYNE-PHOSPHONOTHIOLATES AND -PHOSPHONATES

(71) Applicants: FORSCHUNGSVERBUND BERLIN E.V., Berlin (DE); LUDWIG-MAXIMILIANS-UNIVERSITÄT MÜNCHEN, Munich (DE)

(72) Inventors: Christian Hackenberger, Berlin (DE); Alice Leonie Baumann, Berlin (DE); Marc-André Kasper, Munich (DE); Stephen Byrne, Sydney (AU); Jonas Helma-Smets, Munich (DE); Heinrich Leonhardt, Munich (DE); Tina Stoscheck, Munich (DE); Marcus Gerlach, Munich (DE); Dominik Schumacher, Munich (DE)

(73) Assignees: FORSCHUNGSVERBUND BERLIN E.V., Berlin (DE); LUDWIG-MAXIMILIANS-UNIVERSITÄT MÜNCHEN, Munich (DE)

(*) Notice: Subject to any disclaimer, the term of this patent is extended or adjusted under 35 U.S.C. 154(b) by 1261 days.

(21) Appl. No.: 16/977,680

(22) PCT Filed: Mar. 6, 2019

(86) PCT No.: PCT/EP2019/055509
§ 371 (c)(1),
(2) Date: Sep. 2, 2020

(87) PCT Pub. No.: WO2019/170710
PCT Pub. Date: Sep. 12, 2019

(65) Prior Publication Data
US 2020/0390901 A1     Dec. 17, 2020

(30) Foreign Application Priority Data

Mar. 7, 2018    (EP) .................................... 18160384

(51) Int. Cl.
A61K 9/00     (2006.01)
A61K 47/68    (2017.01)
C07F 9/40     (2006.01)

(52) U.S. Cl.
CPC .... *A61K 47/6849* (2017.08); *A61K 47/68031* (2023.08); *A61K 47/6889* (2017.08); *C07F 9/4015* (2013.01); *C07F 9/4071* (2013.01)

(58) Field of Classification Search
CPC ............................ A61K 47/6849; C09K 11/06
See application file for complete search history.

(56) References Cited

U.S. PATENT DOCUMENTS

| | | |
|---|---|---|
| 2,918,488 A | 12/1959 | Schrader et al. |
| 3,014,943 A | 12/1961 | Schegk et al. |

(Continued)

FOREIGN PATENT DOCUMENTS

| | | |
|---|---|---|
| DE | 1064512 | 9/1959 |
| DE | 1064512 B | 9/1959 |

(Continued)

OTHER PUBLICATIONS

Synthesis of a Phosphonate-Linked Aminoglycoside-Coenzyme A Bisubstrate and Use of Mechanmistic Studies of an Enzyme Involved in Aminoglycoside Resistance, Chem. Eur. J. 2009, 15, 2064-2070 (Year: 2009).*

(Continued)

*Primary Examiner* — Paul W Dickinson
(74) *Attorney, Agent, or Firm* — Seed Intellectual Property Law Group LLP

(57) ABSTRACT

Disclosed are novel conjugates and processes for the preparation thereof. A process for the preparation of alkene-or (Continued)

alkyne-phosohonothiolates and -phosphonates comprises the step of: reacting a compound of formula (I) with a thiol-containing molecule of formula (II) wherein represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system; resulting in a compound of formula (III).

11 Claims, 18 Drawing Sheets

Specification includes a Sequence Listing.

(56) References Cited

U.S. PATENT DOCUMENTS

| | | | |
|---|---|---|---|
| 3,047,605 | A | 7/1962 | Schrader et al. |
| 3,121,662 | A | 2/1964 | Schrader et al. |
| 3,223,754 | A | 12/1965 | Cölln et al. |
| 3,781,387 | A | 12/1973 | Ford-Moore et al. |

FOREIGN PATENT DOCUMENTS

| | | |
|---|---|---|
| DE | 1136334 B | 9/1962 |
| GB | 863434 | 3/1961 |
| GB | 929216 | 6/1963 |
| JP | 2014-508610 A | 4/2014 |
| WO | 2009/051025 A1 | 4/2009 |
| WO | 2012/123384 A1 | 9/2012 |
| WO | 2018/041985 A1 | 3/2018 |

OTHER PUBLICATIONS

Of Jacobsson, Effects of oxygen-sulfur substitution on glycosaminoglycanpriming Naphthoxylosides, Bioorganic & Medicinal Chemistry 15 (2007) 5283-5299 (Year: 2007).*

Erkhitueva et al., "Regioselectivity of the Reaction of 4H-1,2,4-Triazole-3-thiol Derivatives with Chloroethynylphosphonates and Structure of the Products," *Russian Journal of Organic Chemistry* 49(4):580-589 (2013).

Kang et al., "Phosphonothioate-Based Hydrogen Sulfide Releasing Reagents: Chemistry and Biological Applications," *Frontiers in Pharmacology* 8(457), 10 pages, (2017).

Dang et al., "Fructose-1,6-bisphosphatase Inhibitors. 1. Purine Phosphonic Acids as Novel AMP Mimics," *J. Med. Chem* 52:2880-2898 (2009).

Database Accession No. 1993:124641, 1 page (1993).

Database Registry No. 2002527-58-2, 1 page (Sep. 30, 2016).

Database Registry No. 1997361-25-7, 1 page (Sep. 21, 2016).

Felczak et al., "Cofactor-type inhibitors of inosine monophosphate dehydrogenase via modular approach: Targeting the pyrophosphate binding sub-domain," *Bioorganic & Medicinal Chemistry* 19:1594-1605 (2011).

Khusainova et al., "Reactions of 1,2-ethanedithiol and 2-mercaptoethanol with unsaturated derivatives of four-coordinate phosphorus acids," *Russian Chemical Bulletin, International Edition*, 53(10):2253-2256 (Oct. 2004).

Gao et al., "Synthesis of a Phosphonate-Linked Aminoglycoside-Coenzyme A Bisubstrate and Use in Mechanistic Studies of an Enzyme Involved in Aminoglycoside Resistance" *Chem. Eur. J.* 15:2064-2070 (2009).

Chinese Office Action for related CN Application No. 201980030827.8, with translation, 21 pages, dated Jun. 22, 2024.

* cited by examiner

CHEMOSELECTIVE THIOL-CONJUGATION WITH ALKENE OR ALKYNE-PHOSPHONOTHIOLATES AND -PHOSPHONATES

STATEMENT REGARDING SEQUENCE LISTING

The Sequence Listing associated with this application is provided in text format in lieu of a paper copy, and is hereby incorporated by reference into the specification. The name of the text file containing the Sequence Listing is 350066_402USPC_SEQUENCE_LISTING.txt. The text file is 7.8 KB, was created on Aug. 26, 2020, and is being submitted electronically via EFS-Web.

BACKGROUND

Chemoselective and bioorthogonal reactions have emerged as powerful tools for the site-specific modification of proteins (Hackenberger, C. P. R.; Schwarzer, D. *Angew. Chemie—Int. Ed.* 2008, 47 (52), 10030; Spicer, C. D.; Davis, B. G. *Nat. Commun.* 2014, 5, 4740). With these reactions, various protein- and antibody-conjugates became accessible, which carried functional modules like fluorophores and other spectroscopic labels, polymers, toxins as well as small molecules and proteins that resemble posttranslational protein modifications. Thereby, chemoselective protein modification techniques have greatly contributed to fundamental studies ranging from the investigation of biological functions of proteins and the development of new imaging techniques to promising new medicinal approaches in diagnostics, the design of protein-based pharmaceuticals and the targeted-delivery of drugs.

Over the last years, researchers have mainly concentrated on two different aspects in the engineering of bioorthogonal reactions for the modification of proteins (Sletten, E. M.; Bertozzi, C. R. *Angew. Chemie—Int. Ed.* 2009, 48 (38), 6974). On the one hand, many efforts have been devoted to fast reactions requiring highly reactive starting materials for the transformation of unique functionalities present in protein side-chains (Patterson, D. M.; Nazarova, L. A.; Prescher, J. A. *ACS Chem. Biol.* 2014, 9 (3), 592; Lang, K.; Chin, J. W. *ACS Chem. Biol.* 2014, 9 (1), 16). This approach is complimented by advanced amber suppression techniques to achieve a site-specific labeling, which resulted in a number of genetically encoded, highly reactive bioorthogonal reporters to undergo various types of cycloaddition reactions, including strain-promoted alkyneazide cycloaddition or inverse-demand Diels-Alder reactions (Nikic, I.; Plass, T.; Schraidt, O.; Szymaski, J.; Briggs, J. A. G.; Schultz, C.; Lemke, E. A. *Angew. Chemie—Int. Ed.* 2014, 53 (8), 2245; Agard, N. J.; Prescher, J. A.; Bertozzi, C. R. *J. Am. Chem. Soc.* 2004, 126 (46), 15046). On the other hand, researchers have focused on developing and applying high-yielding protein modification reactions, especially if high amounts of functional protein-conjugates and ideally quantitative conversions are desired to avoid tedious if not impossible purification steps (1). To achieve this, high yields in protein expression are of particular importance. Since amber suppression can result in low amounts of expressed protein, standard and auxotrophic expression systems are often preferred. A common scenario to achieve site-specific labeling in combination with standard protein expression is the placement of a unique Cys residue in a protein of choice by site-directed mutagenesis, followed by Cys-modification strategies (Chalker, J. M.; Bernardes, G. J. L.; Lin, Y. A.; Davis, B. G. *Chem.—An Asian J.* 2009, 4 (5), 630). Alternatively, azide- or alkyne-containing amino acids can be incorporated using auxotrophic expression systems (Hoesl, M. G.; Budisa, N. *Angew. Chemie—Int. Ed.* 2011, 50 (13), 2896), which can be modified using Staudinger ligations and Cu-catalyzed azide-alkyne cycloaddition (CuAAC) (Artner, L. M.; Merkel, L.; Bohlke, N.; Beceren-Braun, F.; Weise, C.; Dernedde, J.; Budisa, N.; Hackenberger, C. P. R. *Chem. Commun.* 2012, 48 (4), 522; van Kasteren, S. I.; Kramer, H. B.; Jensen, H. H.; Campbell, S. J.; Kirkpatrick, J.; Oldham, N. J.; Anthony, D. C.; Davis, B. G. *Nature* 2007, 446 (7139), 1105).

While both of these aspects have seen significant advancements in recent years, a general and modular accessibility of highly reactive and complex functional modules for a metal-free chemoselective modification reaction remains often challenging. This is due to the requirement of additional protecting group manipulations in the synthesis of reactive building blocks, which can be problematic in light of the high reactivity and lability of the employed functional groups. For example, the synthesis of a highly reactive cyclooctyne-containing fluorescent peptide carrying a Xe-cryptophane for molecular imaging, required a sophisticated yet low yielding use of orthogonal protecting groups (Witte, C.; Martos, V.; Rose, H. M.; Reinke, S.; Klippel, S.; Schröder, L.; Hackenberger, C. P. R. *Angew. Chemie—Int. Ed.* 2015, 54 (9), 2806).

Previous techniques for the conjugation of Cys residues rely mainly on maleimide conjugation. However, maleimide conjugates are often unstable, in particular, they often tend to hydrolyze and are prone to thiol exchange under high thiol concentrations. For a recent comprehensive overview on Cys-conjugation techniques see Gunnoo, S. B.; Madder, A.; *ChemBioChem.* 2016, 17, 529-553. As an alternative conjugation method, WO 2015/169784 discloses a process for the preparation of C2-disulfide-bridged peptides and proteins, wherein the bridging is achieved by a thiol-yn-reaction with alkynes. U.S. Pat. No. 2,535,174 describes the alkaline catalyzed addition of saturated aliphatic mercaptans to esters of ethenephosphonic acids. J. Bertran-Vicente et al., *Nature Comm.* 2016, 7, DOI: 10.1038/ncomms12703, describes a sequence, wherein a protected phosphite reacts first with an electrophilic disulfide to generate a phosphothiolate ester, which upon deprotection (e.g. by UV light or base) yields a phosphorylated cysteine. This method has been applied to the synthesis of naturally occurring phosphorylated cysteine peptides.

It is an object of the present invention to provide further processes of preparing conjugates, and to provide further conjugates.

DETAILED DESCRIPTION

Definitions

Figure 1:
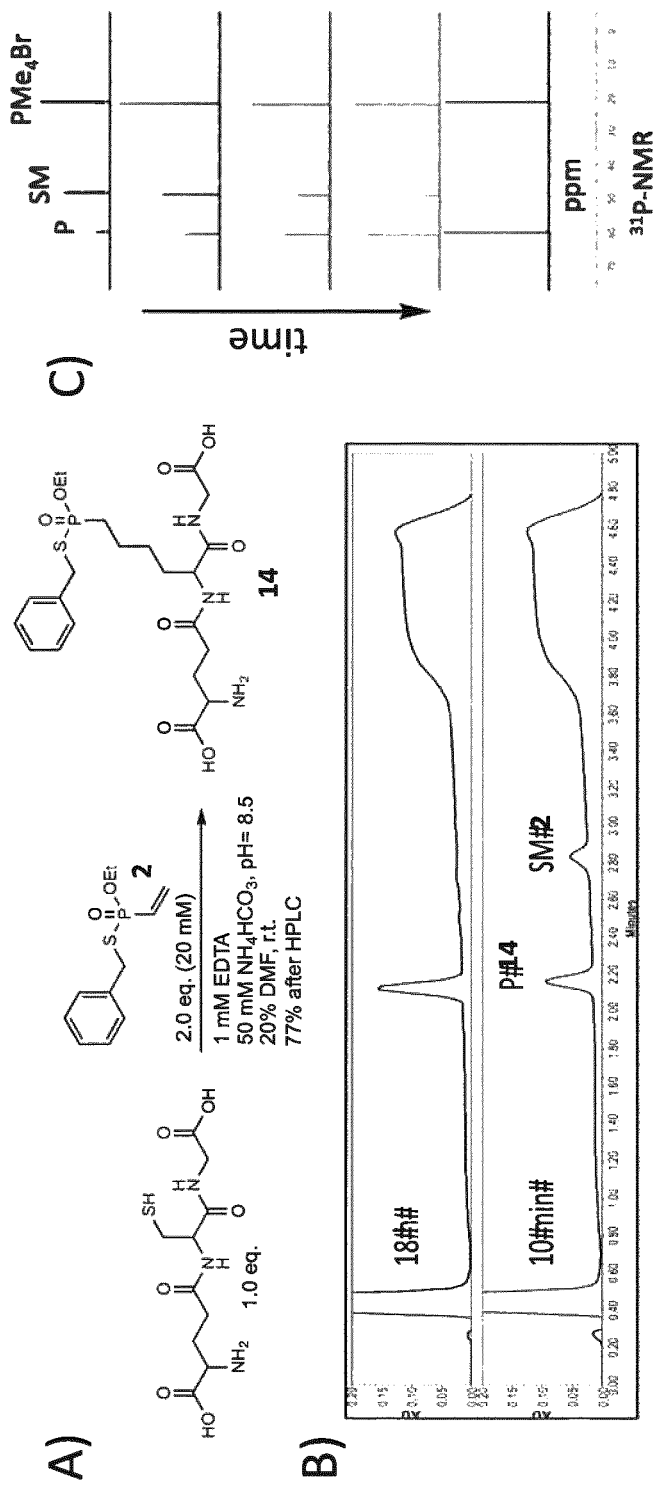
FIG. 1 shows: A) Synthesis of the glutathione-alkene-phosphonothiolate-conjugate 14. The reaction was monitored by B) UV LC-MS and C) $^{31}$P-NMR, indicating the formation of a sole product. P: product 14, SM: starting material =alkene-phosphonothiolate 2, PMe$_4$Br =tetramethylphosphonium bromide, internal standard for $^{31}$P-NMR.

The person skilled in the art is aware that the terms "a" or "an", as used in the present application, may, depending on the situation, mean "one (1)" "one (1) or more" or "at least one (1)".

Halogen, unless defined otherwise: elements of the $7^{th}$ main group, preferably fluorine, chlorine, bromine and iodine, more preferably fluorine, chlorine and bromine and, in combination with Mg even more preferably bromine.

Alkyl, unless defined otherwise elsewhere: saturated straight-chain or branched hydrocarbon radicals having preferably $(C_1-C_8)$-, $(C_1-C_6)$- or $(C_1-C_4)$-carbon atoms. Examples: methyl, ethyl, propyl, 1-methylethyl, butyl, etc.

Alkenyl, unless defined otherwise elsewhere: unsaturated straight-chain or branched hydrocarbon radicals having a double bond. Alkenyl is preferably $(C_2-C_8)$-, $(C_2-C_6)$- or $(C_2-C_4)$-alkenyl. Examples: ethenyl, 1-propenyl, 3-butenyl, etc.

Alkynyl, unless defined otherwise elsewhere: unsaturated straight-chain or branched hydrocarbon radicals having a triple bond. Alkynyl is preferably $(C_2-C_8)$-, $(C_2-C_6)$- or $(C_2-C_4)$-alkynyl. Examples: ethynyl, 1-propynyl, etc.

Alkoxy (alkyl radical —O—), unless defined otherwise elsewhere: an alkyl radical which is attached via an oxygen atom (—O—) to the basic structure. Alkoxy is preferably $(C_1-C_8)$-, $(C_1-C_6)$- or $(C_1-C_4)$-alkoxy. Examples: methoxy, ethoxy, propoxy, 1-methylethoxy, etc.

Analogously, alkenoxy and alkynoxy, unless defined otherwise elsewhere, are alkenyl radicals and alkynyl radicals, respectively, which are attached via —O— to the basic structure. Alkenoxy is preferably $(C_2-C_8)$-, $(C_2-C_6)$- or $(C_2-C_4)$-alkenoxy. Alkynoxy is preferably $(C_3-C_{10})$-, $(C_3-C_6)$- or $(C_3-C_4)$-alkynoxy.

Alkylcarbonyl (alkyl radical —C(=O)—), unless defined otherwise: alkylcarbonyl is preferably $(C_1-C_8)$-, $(C_1-C_6)$- or $(C_1-C_4)$-alkylcarbonyl. Here, the number of carbon atoms refers to the alkyl radical in the alkylcarbonyl group.

Analogously, alkenylcarbonyl and alkynylcarbonyl, are, unless defined otherwise elsewhere: alkenyl radicals and alkynyl radicals, respectively, which are attached via —C(=O)— to the basic structure. Alkenylcarbonyl is preferably $(C_2-C_8)$-, $(C_2-C_6)$- or $(C_2-C_4)$-alkenylcarbonyl. Alkynylcarbonyl is preferably $(C_2-C_8)$-, $(C_2-C_6)$- or $(C_2-C_4)$-alkynylcarbonyl.

Alkoxycarbonyl (alkyl radical —O—C(=O)—), unless defined otherwise elsewhere: alkoxycarbonyl is preferably $(C_1-C_8)$-, $(C_1-C_6)$- or $(C_1-C_4)$-alkoxycarbonyl. Here, the number of carbon atoms refers to the alkyl radical in the alkoxycarbonyl group.

Analogously, alkenoxycarbonyl and alkynoxycarbonyl, unless defined otherwise elsewhere, are: alkenyl radicals and alkynyl radicals, respectively, which are attached via —O—C(=O)— to the basic structure. Alkenoxycarbonyl is preferably $(C_2-C_8)$-, $(C_2-C_6)$- or $(C_2-C_4)$-alkenoxycarbonyl. Alkynoxycarbonyl is preferably $(C_3-C_8)$-, $(C_3-C_6)$- or $(C_3-C_4)$-alkynoxycarbonyl.

alkylcarbonyloxy (alkyl radical —C(=O)—O—), unless defined otherwise elsewhere: an alkyl radical which is attached via carbonyloxy group (—C(=O)—O—) by the oxygen to the basic structure. alkylcarbonyloxy is preferably $(C_1-C_8)$-, $(C_1-C_6)$- or $(C_1-C_4)$-alkylcarbonyloxy.

Analogously, alkenylcarbonyloxy and alkynylcarbonyloxy, unless defined otherwise elsewhere, are: alkenyl radicals and alkynyl radicals, respectively, which are attached via (—C(=O)—O—) to the basic structure. Alkenylcarbonyloxy is preferably ($C_2$-$C_8$)-, ($C_2$-$C_6$)- or ($C_2$-$C_4$)-alkenylcarbonyloxy. Alkynylcarbonyloxy is preferably ($C_2$-$C_8$)-, ($C_2$-$C_6$)- or ($C_2$-$C_4$)-alkynylcarbonyloxy.

Alkylthio, unless defined otherwise elsewhere: an alkyl radical which is attached via —S— to the basic structure. alkylthio is preferably ($C_1$-$C_8$)-, ($C_1$-$C_6$)- or ($C_1$-$C_4$)-alkylthio.

Analogously, alkenylthio and alkynylthio, unless defined otherwise elsewhere, are: alkenyl radicals and alkynyl radicals, respectively, which are attached via —S— to the basic structure. Alkenylthio is preferably ($C_2$-$C_8$)-, ($C_2$-$C_6$)- or ($C_2$-$C_4$)-alkenylthio. Alkynylthio is preferably ($C_3$-$C_8$)-, ($C_3$-$C_6$)- or ($C_3$-$C_4$)-alkynylthio.

The term "substituted", or "optionally substituted", or the like as used unless defined otherwise elsewhere, refers to a very broad substitution pattern. As can be seen from the disclosure of this invention, especially position $R_1$,  and ● allow the substitution with numerous organic (macro)molecules. It is submitted that the structure of these molecules is not relevant for the presently disclosed process and the resulting conjugates. Thus, it would represent an undue limitation to limit the principle of this new and innovative concept to only some molecules. Nevertheless, it is submitted that the term refers to organic substituents or salts thereof, respectively, which may again be substituted several times by further organic substituents or salts thereof, respectively. Examples for such complex substituents were produced and are presented in this application (see, e.g. Schemes 7, 8, FIG. 4 and the synthetic examples). Preferably, the term substituted refers to groups which are substituted with one or more substitutents selected from nitro, cyano, Cl, F, Cl, Br, —NH—R, $NR_2$, COOH, —COOR, —OC(O)R, —$NH_2$, —OH, —$CONH_2$ CONHR, $CON(R)_2$, —S—R, —SH, —C(O)H, —C(O)R, ($C_1$-$C_{20}$)-alkyl, ($C_1$-$C_2$)-alkoxy, ($C_2$-$C_{20}$)-allyl, (hetero)cyclic rings of 3 to 8 ring-members wherein, if present, the heteroatom or atoms are independently selected from N, O and S, (hetero)aromatic systems with 5 to 12 ring atoms (e.g., phenyl, pyridyl, naphtyl etc.), wherein R again can represent any of these substituents and the substitution can be repeated several times, for example, substitution can be repeated for 1, 2, 3, 4, 5, 6, 7, 8, 9 or 10 times; see, e.g. the ● substituent in the following:

wherein # represents the position of Y (sulfur or oxygen in the compounds used herein) if ● is already part of a compound of e.g. formula (I) or (III). However, the skilled person will agree that an alkyl-chain which is substituted e.g. with a polysaccharide of 40 units cannot be simply described by general substitution pattern.

The terms "peptide" as used herein refers to an organic compound comprising two or more amino acids covalently joined by peptide bonds (amide bond). Peptides may be referred to with respect to the number of constituent amino acids, i.e., a dipeptide contains two amino acid residues, a tripeptide contains three, etc. Peptides containing ten or fewer amino acids may be referred to as oligopeptides, while those with more than ten amino acid residues, e.g. with up to about 30 amino acid residues, are polypeptides. The amino acids can form at least one circle or a branched or unbranched chain or mixtures thereof. Proteins and antibodies are peptides and, thus, encompassed by the term, but may be named separately, due to their importance.

The term "amino acid" as used herein refers to an organic compound having a —CH($NH_3$)—COOH group. In one embodiment, the term "amino acid" refers to a natural occurring amino acid arginine, lysine, aspartic acid, glutamic acid, glutamine, asparagine, histidine, serine, threonine, tyrosine, cysteine, methionine, tryptophan, alanine, isoleucine, leicine, phenylalanine, valine, proline and glycine. However, the term in its broader meaning also encompasses non-natural occurring amino acids.

Amino acids and peptides according to the invention can also be modified at functional groups. Non limiting examples are saccharides, e.g., N-Acetylgalactosamine (GalNAc), or protecting groups, e.g., Fluorenylmethoxycarbonyl (Fmoc)-modifications or esters.

The term "protein" refers to peptides which comprise one or more long chains of amino acid residues, e.g. with more than about 30 amino acid residues. Proteins perform a vast array of functions in vivo and in vitro including catalysing metabolic reactions, DNA replication, responding to stimuli, and transporting molecules, catalysing reactions. Proteins are folded into a specific three-dimensional structure. The residues in a protein are often chemically modified, e.g., by post-translational modification, which alters the physical and chemical properties, folding, stability, activity, and ultimately, the function of the proteins. Sometimes proteins have non-peptide groups attached, which can be called prosthetic groups or cofactors. Proteins, including enzymes and coenzymes, can also work together to achieve a particular function, and they often associate to form stable protein complexes. All these forms are encompassed by the term "protein".

The term "protein tags" as used herein refers to peptide sequences which can be attached to proteins or other thiol-comprising compounds via the linker according to the present invention for various purposes. Non limiting examples for protein tags are affinity tags, solubilization tags, chromatography tags epitope tags and reporter enzymes.

Affinity tags are appended to proteins and other thiol-comprising compounds via the linker according to the present invention so that they can be, e.g., purified using an affinity technique. These include for example chitin binding protein (CBP), maltose binding protein (MBP), and glutathione-S-transferase (GST) or the poly(His) tag.

Solubilization tags can be used to assist in the proper folding in proteins and keep them from precipitating. These include thioredoxin (TRX) and poly(NANP). Some affinity tags have a dual role as a solubilization agent, such as MBP, and GST.

Chromatography tags are used to alter chromatographic properties of the protein to afford different resolution across a particular separation technique. Often, these consist of polyanionic amino acids, such as FLAG-tag.

Epitope tags are short peptide sequences which are chosen because high-affinity antibodies can be reliably produced in many different species. These are usually derived from viral genes. Epitope tags include V5-tag, Myc-tag, HA-tag and NE-tag. These tags are particularly useful for western blotting, immunofluorescence and immunoprecipitation experiments, and antibody purification.

The term "reporter enzymes" as used herein refer to any known enzyme which allows an increase of a signal in a biochemical detection. Non limiting examples are, colorant forming enzymes such as alkaline phosphatase (AP), horseradish peroxidase (HRP) or glucose oxidase (GOX); fluorescent proteins, such as green fluorescence protein (GFP), redox sensitive GFP (RoGFP), Azurite or Emerald; luciferase, i.e. a class of oxidative enzymes that produce bioluminescence (e.g. firefly luciferase (EC 1.13.12.7)); chloramphenicol acetyl transferase (CAT); β-galactosidase; or β-glucuronidase.

Non-limiting examples of protein tags are: AviTag, a peptide allowing biotinylation by the enzyme BirA and so the protein can be isolated by streptavidin (GLNDIFEAQK-IEWHE) (SEQ ID NO: 1), Calmodulin-tag, a peptide bound by the protein calmodulin (KRRWKKNFIAVSAANRFK-KISSSGAL) (SEQ ID NO: 2), polyglutamate tag, a peptide binding efficiently to anion-exchange resin such as Mono-Q (EEEEEE) (SEQ ID NO: 3), E-tag, a peptide recognized by an antibody (GAPVPYPDPLEPR) (SEQ ID NO: 4), FLAG-tag, a peptide recognized by an antibody (DYKDDDDK) (SEQ ID NO: 5), HA-tag, a peptide from hemagglutinin recognized by an antibody (YPYDVPDYA) (SEQ ID NO: 6) His-tag, 5-10 histidines bound by a nickel or cobalt chelate (HHHHHH) (SEQ ID NO: 7), Myc-tag, a peptide derived from c-myc recognized by an antibody (EQKLISEEDL) (SEQ ID NO: 8), NE-tag, a novel 18-amino-acid synthetic peptide (TKENPRSNQEESYDDNES) (SEQ ID NO: 9) recognized by a monoclonal IgGI antibody, which is useful in a wide spectrum of applications including Western blotting, ELISA, flow cytometry, immunocytochemistry, immunoprecipitation, and affinity purification of recombinant proteins, S-tag, a peptide derived from Ribonuclease A (KETAAAKFERQHMDS) (SEQ ID NO: 10), SBP-tag, a peptide which binds to streptavidin (MDEKTTGWRGGHVVEGLAGELEQLRAR-LEHHPQGQREP) SEQ ID NO: 11), Softag 1, for mammalian expression (SLAELLNAGLGGS) (SEQ ID NO: 12), Softag 3, for prokaryotic expression (TQDPSRVG) (SEQ ID NO: 13), Strep-tag, a peptide which binds to streptavidin or the modified streptavidin called streptactin (Strep-tag II: WSHPQFEK) (SEQ ID NO: 14), TC tag, a tetracysteine tag that is recognized by FlAsH and ReAsH biarsenical compounds (CCPGCC) (SEQ ID NO: 15), V5 tag, a peptide recognized by an antibody (GKPIPNPLLGLDST) (SEQ ID NO: 16), VSV-tag, a peptide recognized by an antibody (YTDIEMNRLGK) (SEQ ID NO: 17), Xpress tag (DLYDDDDK) (SEQ ID NO: 18), Isopeptag, a peptide which binds covalently to pilin-C (TDKDM-TITFTNKKDAE) (SEQ ID NO: 19), SpyTag, a peptide which binds covalently to SpyCatcher protein (AHIVMV-DAYKPTK) (SEQ ID NO: 20), SnoopTag, a peptide which binds covalently to SnoopCatcher protein (KLGDIEFIKVNK) (SEQ ID NO: 21), BCCP (Biotin Carboxyl Carrier Protein), a protein domain biotinylated by BirA enabling recognition by streptavidin, Glutathione-S-transferase-tag, a protein which binds to immobilized glutathione, Green fluorescent protein-tag, a protein which is spontaneously fluorescent and can be bound by nanobodies, Halo-tag, a mutated hydrolase that covalently attaches to the HaloLink™ Resin (Promega), Maltose binding protein-tag, a protein which binds to amylose agarose, Nus-tag, Thioredoxin-tag, Fc-tag, derived from immunoglobulin Fc domain, allow dimerization and solubilization. Can be used for purification on Protein-A Sepharose, Designed Intrinsically Disordered tags containing disorder promoting amino acids (P, E, S, T, A, Q, G, . . . ), alkaline phosphatase (AP), horseradish peroxidase (HRP) glucose oxidase (GOX), green fluorescence protein (GFP), redox sensitive GFP (RoGFP), Azurite, Emerald, firefly luciferase (EC 1.13.12.7)), chloramphenicol acetyl transferase (CAT), β-galactosidase, β-glucuronidase, tubulin-tyrosine ligase (TTL).

The term "antibody", as used herein, is intended to refer to immunoglobulin molecules, preferably comprised of four polypeptide chains, two heavy (H) chains and two light (L) chains which are typically inter-connected by disulfide bonds. Each heavy chain is comprised of a heavy chain variable region (abbreviated herein as VH) and a heavy chain constant region. The heavy chain constant region can comprise e.g. three domains CH1, CH2 and CH3. Each light chain is comprised of a light chain variable region (abbreviated herein as VL) and a light chain constant region. The light chain constant region is comprised of one domain (CL). The VH and VL regions can be further subdivided into regions of hypervariability, termed complementarity determining regions (CDR), interspersed with regions that are more conserved, termed framework regions (FR). Each VH and VL is typically composed of three CDRs and up to four FRs arranged from amino-terminus to carboxy-terminus e.g. in the following order: FR1, CDR1, FR2, CDR2, FR3, CDR3, FR4.

As used herein, the term "Complementarity Determining Regions" (CDRs; e.g., CDR1, CDR2, and CDR3) refers to the amino acid residues of an antibody variable domain the presence of which are necessary for antigen binding. Each variable domain typically has three CDR regions identified as CDR1, CDR2 and CDR3. Each complementarity determining region may comprise amino acid residues from a "complementarity determining region" as defined by Kabat (e.g. about residues 24-34 (L1), 50-56 (L2) and 89-97 (L3) in the light chain variable domain and 31-35 (H1), 50-65 (H2) and 95-102 (H3) in the heavy chain variable domain; and/or those residues from a "hypervariable loop" (e.g. about residues 26-32 (L1), 50-52 (L2) and 91-96 (L3) in the light chain variable domain and 26-32 (H1), 53-55 (H2) and 96-101 (H3) in the heavy chain variable domain). In some instances, a complementarity determining region can include amino acids from both a CDR region defined according to Kabat and a hypervariable loop.

Depending on the amino acid sequence of the constant domain of their heavy chains, intact antibodies can be assigned to different "classes". There are five major classes of intact antibodies: IgA, IgD, IgE, IgG, and IgM, and several of these maybe further divided into "subclasses" (isotypes), e.g., IgG1, IgG2, IgG3, IgG4, IgA1, and IgA2. A preferred class of immunoglobulins for use in the present invention is IgG.

The heavy-chain constant domains that correspond to the different classes of antibodies are called [alpha], [delta], [epsilon], [gamma], and [mu], respectively. The subunit structures and three-dimensional configurations of different classes of immunoglobulins are well known. As used herein antibodies are conventionally known antibodies and functional fragments thereof.

A "functional fragment" or "antigen-binding antibody fragment" of an antibody/immunoglobulin hereby is defined as a fragment of an antibody/immunoglobulin (e.g., a variable region of an IgG) that retains the antigen-binding region. An "antigen-binding region" of an antibody typically is found in one or more hyper variable region(s) of an antibody, e.g., the CDR1, -2, and/or -3 regions; however, the variable "framework" regions can also play an important role in antigen binding, such as by providing a scaffold for the CDRs. Preferably, the "antigen-binding region" comprises at least amino acid residues 4 to 103 of the variable light (VL) chain and 5 to 109 of the variable heavy (VH)

chain, more preferably amino acid residues 3 to 107 of VL and 4 to 111 of VH, and particularly preferred are the complete VL and VH chains (amino acid positions 1 to 109 of VL and 1 to 113 of VH; numbering according to WO 97/08320).

"Functional fragments", "antigen-binding antibody fragments", or "antibody fragments" of the invention include but are not limited to Fab, Fab', Fab'-SH, F(ab')$_2$, and Fv fragments; diabodies; single domain antibodies (DAbs), linear antibodies; single-chain antibody molecules (scFv); and multispecific, such as bi- and tri-specific, antibodies formed from antibody fragments. An antibody other than a "multi-specific" or "multi-functional" antibody is understood to have each of its binding sites identical. The F(ab')$_2$ or Fab may be engineered to minimize or completely remove the intermolecular disulfide interactions that occur between the CH1 and CL domains.

The term "Fc region" herein is used to define a C-terminal region of an immunoglobulin heavy chain that contains at least a portion of the constant region. The term includes native sequence Fc regions and variant Fc regions. In one embodiment, a human IgG heavy chain Fc region extends from Cys226, or from Pro230, to the carboxyl-terminus of the heavy chain. However, the C-terminal lysine (Lys447) of the Fc region may or may not be present. Unless otherwise specified herein, numbering of amino acid residues in the Fc region or constant region is according to the EU numbering system, also called the EU index.

Variants of the antibodies or antigen-binding antibody fragments contemplated in the invention are molecules in which the binding activity of the antibody or antigen-binding antibody fragment is maintained.

"Binding proteins" contemplated in the invention are for example antibody mimetics, such as Affibodies, Adnectins, Anticalins, DARPins, Avimers, Nanobodies.

A "human" antibody or antigen-binding fragment thereof is hereby defined as one that is not chimeric (e.g., not "humanized") and not from (either in whole or in part) a non-human species. A human antibody or antigen-binding fragment thereof can be derived from a human or can be a synthetic human antibody. A "synthetic human antibody" is defined herein as an antibody having a sequence derived, in whole or in part, in silico from synthetic sequences that are based on the analysis of known human antibody sequences. In silico design of a human antibody sequence or fragment thereof can be achieved, for example, by analyzing a database of human antibody or antibody fragment sequences and devising a polypeptide sequence utilizing the data obtained there from. Another example of a human antibody or antigen-binding fragment thereof is one that is encoded by a nucleic acid isolated from a library of antibody sequences of human origin (e.g., such library being based on antibodies taken from a human natural source).

A "humanized antibody" or humanized antigen-binding fragment thereof is defined herein as one that is (i) derived from a non-human source (e.g., a transgenic mouse which bears a heterologous immune system), which antibody is based on a human germline sequence; (ii) where amino acids of the framework regions of a non-human antibody are partially exchanged to human amino acid sequences by genetic engineering or (iii) CDR-grafted, wherein the CDRs of the variable domain are from a non-human origin, while one or more frameworks of the variable domain are of human origin and the constant domain (if any) is of human origin.

A "chimeric antibody" or antigen-binding fragment thereof is defined herein as one, wherein the variable domains are derived from a non-human origin and some or all constant domains are derived from a human origin.

The term "monoclonal antibody" as used herein refers to an antibody obtained from a population of substantially homogeneous antibodies, i.e., the individual antibodies comprising the population are identical except for possible mutations, e.g., naturally occurring mutations, that may be present in minor amounts. Thus, the term "monoclonal" indicates the character of the antibody as not being a mixture of discrete antibodies. In contrast to polyclonal antibody preparations, which typically include different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins. The term "monoclonal" is not to be construed as to require production of the antibody by any particular method. The term monoclonal antibody specifically includes chimeric, humanized and human antibodies.

An "isolated" antibody is one that has been identified and separated from a component of the cell that expressed it. Contaminant components of the cell are materials that would interfere with diagnostic or therapeutic uses of the antibody, and may include enzymes, hormones, and other proteinaceous or nonproteinaceous solutes.

As used herein, an antibody "binds specifically to", is "specific to/for" or "specifically recognizes" an antigen of interest, e.g. a tumor-associated polypeptide antigen target, is one that binds the antigen with sufficient affinity such that the antibody is useful as a therapeutic agent in targeting a cell or tissue expressing the antigen, and does not significantly cross-react with other proteins or does not significantly cross-react with proteins other than orthologs and variants (e.g. mutant forms, splice variants, or proteolytically truncated forms) of the aforementioned antigen target. The term "specifically recognizes" or "binds specifically to" or is "specific to/for" a particular polypeptide or an epitope on a particular polypeptide target as used herein can be exhibited, for example, by an antibody, or antigen-binding fragment thereof, having a monovalent $K_D$ for the antigen of less than about $10^{-4}$ M, alternatively less than about $10^{-5}$ M, alternatively less than about $10^{-6}$ M, alternatively less than about $10^{-7}$ M, alternatively less than about $10^{-8}$ M, alternatively less than about $10^{-9}$ M, alternatively less than about $10^{-10}$ M, alternatively less than about $10^{-11}$ M, alternatively less than about $10^{-12}$ M, or less. An antibody "binds specifically to," is "specific to/for" or "specifically recognizes" an antigen if such antibody is able to discriminate between such antigen and one or more reference antigen(s). In its most general form, "specific binding", "binds specifically to", is "specific to/for" or "specifically recognizes" is referring to the ability of the antibody to discriminate between the antigen of interest and an unrelated antigen, as determined, for example, in accordance with one of the following methods. Such methods comprise, but are not limited to surface plasmon resonance (SPR), Western blots, ELISA-, RIA-, ECL-, IRMA-tests and peptide scans. For example, a standard ELISA assay can be carried out. The scoring may be carried out by standard color development (e.g. secondary antibody with horseradish peroxidase and tetramethyl benzidine with hydrogen peroxide). The reaction in certain wells is scored by the optical density, for example, at 450 nm. Typical background (=negative reaction) may be 0.1 OD; typical positive reaction may be 1 OD. This means the difference positive/negative is more than 5-fold, 10-fold, 50-fold, and preferably more than 100-fold. Typically, determination of binding specificity is performed by using not a single reference antigen, but a set of about three to five unrelated antigens, such as milk powder, BSA, transferrin or the like.

"Binding affinity" or "affinity" refers to the strength of the total sum of non-covalent interactions between a single binding site of a molecule and its binding partner. Unless indicated otherwise, as used herein, "binding affinity" refers to intrinsic binding affinity which reflects a 1:1 interaction between members of a binding pair (e.g. an antibody and an antigen). The dissociation constant "$K_D$" is commonly used to describe the affinity between a molecule (such as an antibody) and its binding partner (such as an antigen) i.e. how tightly a ligand binds to a particular protein. Ligand-protein affinities are influenced by non-covalent intermolecular interactions between the two molecules. Affinity can be measured by common methods known in the art, including those described herein. In one embodiment, the "$K_D$" or "$K_D$ value" according to this invention is measured by using surface plasmon resonance assays using suitable devices including but not limited to Biacore instruments like Biacore T100, Biacore T200, Biacore 2000, Biacore 4000, a Biacore 3000 (GE Healthcare Biacore, Inc.), or a ProteOn XPR36 instrument (Bio-Rad Laboratories, Inc.).

The terms "nucleoside" and "nucleoside moiety" as use herein reference a nucleic acid subunit including a sugar group and a heterocyclic base, as well as analogs of such subunits, such as a modified or naturally occurring deoxyribonucleoside or ribonucleoside or any chemical modifications thereof. Other groups (e.g., protecting groups) can be attached to any component(s) of a nucleoside. Modifications of the nucleosides include, but are not limited to, 2'-, 3'- and 5'-position sugar modifications, 5- and 6-position pyrimidine modifications, 2-, 6- and 8-position purine modifications, modifications at exocyclic amines, substitution of 5-bromo-uracil, and the like. Nucleosides can be suitably protected and derivatized to enable oligonucleotide synthesis by methods known in the field, such as solid phase automated synthesis using nucleoside phosphoramidite monomers, H-phosphonate coupling or phosphate triester coupling.

A "nucleotide" or "nucleotide moiety" refers to a sub-unit of a nucleic acid which includes a phosphate group, a sugar group and a heterocyclic base, as well as analogs of such subunits. Other groups (e.g., protecting groups) can be attached to any component(s) of a nucleotide. The term "nucleotide", may refer to a modified or naturally occurring deoxyribonucleotide or ribonucleotide. Nucleotides in some cases include purines and pyrimidines, which include thymidine, cytidine, guanosine, adenine and uridine. The term "nucleotide" is intended to include those moieties that contain not only the known purine and pyrimidine bases, e.g. adenine (A), thymine (T), cytosine (C), guanine (G), or uracil (U), but also other heterocyclic bases that have been modified. Such modifications include methylated purines or pyrimidines, acylated purines or pyrimidines, alkylated riboses or other heterocycles. Such modifications include, e.g., diaminopurine and its derivatives, inosine and its derivatives, alkylated purines or pyrimidines, acylated purines or pyrimidines thiolated purines or pyrimidines, and the like, or the addition of a protecting group such as acetyl, difluoroacetyl, trifluoroacetyl, isobutyryl, benzoyl, 9-fluorenylmethoxycarbonyl, phenoxyacetyl, dimethylformamidine, dibutylformamidine, dimethylacetamidine, N,N-diphenyl carbamate, or the like. The purine or pyrimidine base may also be an analog of the foregoing; suitable analogs will be known to those skilled in the art and are described in the pertinent texts and literature. Common analogs include, but are not limited to, 1-methyladenine, 2-methyladenine, N6-methyladenine, N6-isopentyladenine, 2-methylthio-N6-isopentyladenine, N,N-dimethyladenine, 8-bromoadenine, 2-thiocytosine, 3-methylcytosine, 5-methylcytosine, 5-ethylcytosine, 4-acetylcytosine, 1-methylguanine, 2-methylguanine, 7-methylguanine, 2,2-dimethylguanine, 8-bromoguanine, 8-chloroguanine, 8-aminoguanine, 8-methylguanine, 8-thioguanine, 5-fluorouracil, 5-bromouracil, 5-chlorouracil, 5-iodouracil, 5-ethyluracil, 5-propyluracil, 5-methoxyuracil, 5-hydroxymethyluracil, 5-(carboxyhydroxymethyl)uracil, 5-(methylaminomethyl)uracil, 5-(carboxymethylaminomethyl)-uracil, 2-thiouracil, 5-methyl-2-thiouracil, 5-(2-bromovinyl)uracil, uracil-5-oxyacetic acid, uracil-5-oxyacetic acid methyl ester, pseudouracil, 1-methylpseudouracil, queosine, inosine, 1-methylinosine, hypoxanthine, xanthine, 2-aminopurine, 6-hydroxyaminopurine, 6-thiopurine and 2,6-diaminopurine.

The term "oligonucleotide", as used herein, refers to a polynucleotide formed from a plurality of linked nucleotide units as defined above. The nucleotide units each include a nucleoside unit linked together via phosphate linking group, or an analog thereof. The term oligonucleotide also refers to a plurality of nucleotides that are linked together via linkages other than phosphate linkages such as phosphorothioate linkages or squaramide linkages. The oligonucleotide may be naturally occurring or non-naturally occurring. In some cases, the oligonucleotides may include ribonucleotide monomers (i.e., may be oligoribonucleotides) and/or deoxyribonucleotide monomers. As illustrative examples, the oligonucleotides may comprise of from 2 to 50 nucleotide units, e.g. of from 2 to 40 nucleotide units, e.g. of from 5 to 35 nucleotide units, e.g. of from 10 to 35 nucleotide units, e.g of from 15 to 30 nucleotide units.

The term "monosaccharide" as use herein refers to an open chained or cyclic compound of general formula $C_m(H_2O)_n$ wherein m is 3, 4, 5, 6, 7 or 8 and n is 2, 3, 4, 5 6, 7 or 8. However, the term also encompasses derivatives of these basic compounds wherein a OH group is replaced by an $NH_2$ group (such as glucosamine), desoxysaccharides, wherein at least one OH group is replaced by H (e.g. desoxiribose). Preferred examples for monosaccharides are D-(+)-Glycerinaldehyd; D-(-)-Erythrose; D-(-)-Threose; D-(-)-Ribose; D-(-)-Arabinose; D-(+)-Xylose; D-(-)-Lyxose; D-(+)-Allose; D-(+)-Altrose; D-(+)-Glucose; D-(+)-Mannose; D-(-)-Gulose; D-(-)-Idose; D-(+)-Galactose; D-(+)-Talose; Dihydroxyaceton; D-Erythrulose; D-Ribulose; D-Xylulose; D-Psicose; D-Fructose; D-Sorbose; D-Tagatose. The term monosaccharide also encompasses monosaccharides which one, two, three or four hydroxyl-groups are substituted.

The term "polysaccharides" refers to molecules comprising at least 2 (two), preferably at least 5 (five), more preferably at least 10 (ten) monosaccharides which are connected via a glycosidic bond.

A carbohydrate as used herein encompasses a monosaccharide and a polysaccharide and derivatives thereof.

A polymer as used herein refers to macromolecules composed of many repeated organic subunits, however, which are no polysaccharides, oligonucleotides or peptides. Examples for polymers are Polyethylenglycole (PEG), polyoxyethylene (PEO) or polyglycerol (e.g. polyglycerolpolyricinoleate (PGPR).

The term "fluorophore" is well-known to the skilled person and refers to chemical compounds that re-emit light upon light excitation. Non limiting examples are CY$_5$, EDANS, Xanthene derivatives (e.g. fluorescein, Rhodamine, Oregon green, eosin, Texas red), Cyanine derivatives (e.g., indocarbocyanine, oxacarbocyanine, merocyanine), Squaraine derivatives (e.g., Seta, Se Tau, Square dyes), Naphthalene derivatives (e.g., dansyl or prodan derivatives), Coumarin derivatives, Oxadiazole derivatives, Anthracene derivatives (e.g., Anthraquinones such as DRAQ5, DRAQ7, CyTRAK Orange), Pyrene derivatives (e.g., cascade blue), Oxazine derivatives (e.g., Nile red, Nile blue, Cresyl violet), Acridine derivatives (e.g., Proflavin, Acridine Orange, Acridine Yellow), Arylmethine derivatives (e.g., Auramine, Crystal Violet, Malachite Green), or Tetrapyrrole derivatives (e.g., Parphin, Phthal ocyanine, Bilirubin).

The term "aliphatic or aromatic residue" as used herein refers to an aliphatic substituent, e.g. an alkyl residue which, however, can be optionally substituted by further aliphatic and/or aromatic substituents, e.g. an aliphatic residue can be a nucleic acid, a peptide, a protein, an enzyme, a co-enzyme, an antibody, a nucleotide, an oligonucleotide, a monosaccharide, a polysaccharide, a polymer, a fluorophore, optionally substituted benzene, etc. as long as the direct link of such a molecule to the core structure (in case of R$_1$, e.g., to the respective oxygen of a compound of e.g. formula (I), (I*), (III), or (III*)) is aliphatic. An aromatic residue is a substitute, wherein the direct link to the core structure is part of an aromatic system, e.g., an optionally substituted phenyl or pyridyl or peptide, if the direct link of the peptide to the core structure is for example via phenyl-residue.

The term "antibody drug conjugate" or abbreviated ADC is well known to a person skilled in the art, and, as used herein, refers to the linkage of an antibody or an antigen binding fragment thereof with a drug, such as a chemotherapeutic agent, a toxin, an immunotherapeutic agent, an imaging probe, and the like. As used herein, a "linker" is any chemical moiety that links an antibody or an antigen binding fragment thereof covalently to the drug. The linker may be any linker known to a person skilled in the art. As used herein, the term "linker drug conjugate" refers to a molecule or chemical group comprising or consisting of a linker as defined herein before, and a drug. In this regard, the term "linker drug conjugate" in general refers to that part of an antibody drug conjugate which is not the antibody or an antigen binding fragment thereof. In general, in a linker drug conjugate the linker is covalently linked to the drug. As an illustrative example, the linker used in the invention may comprise a self-cleaving peptide, which may be cleaved by an enzyme, e.g. cathepsin B. In particular, the linker comprising a self-cleaving peptide used in the invention may comprise

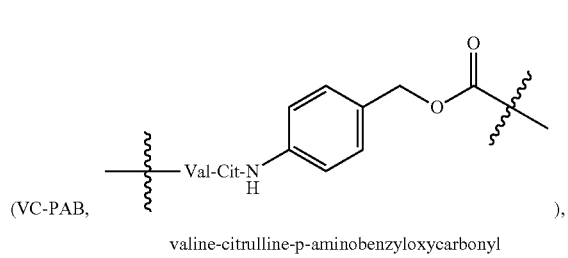

(VC-PAB, ), valine-citrulline-p-aminobenzyloxycarbonyl

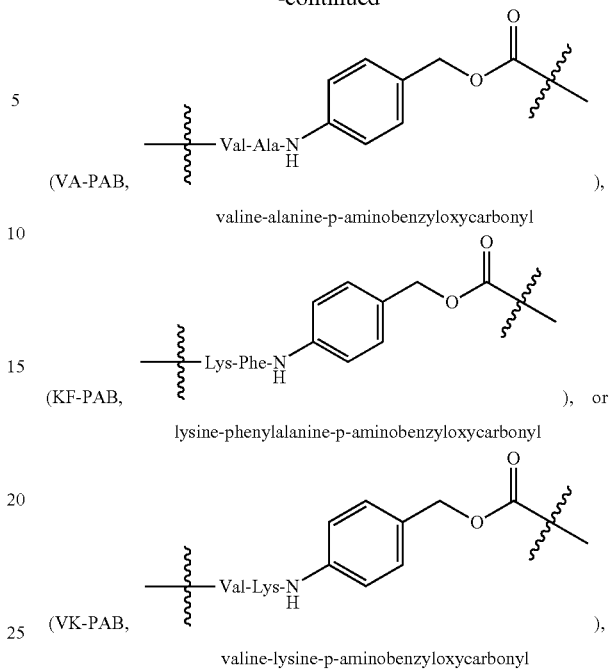

(VA-PAB, ), valine-alanine-p-aminobenzyloxycarbonyl (KF-PAB, ), or lysine-phenylalanine-p-aminobenzyloxycarbonyl (VK-PAB, ), valine-lysine-p-aminobenzyloxycarbonyl For example, the linker comprising a self-cleaving peptide may be

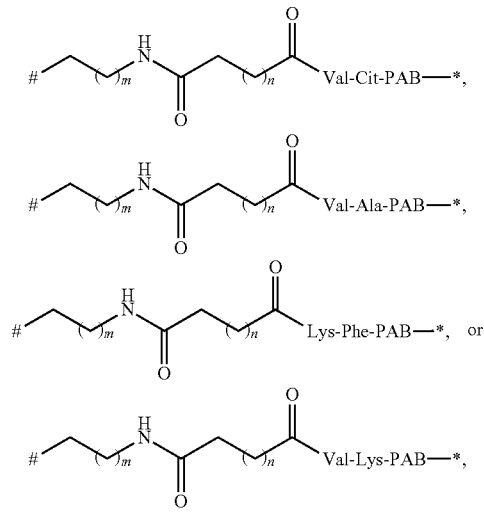

preferably

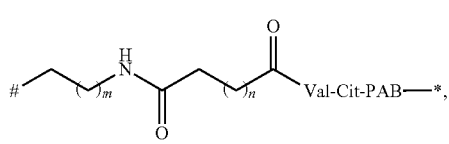

wherein # indicates the position of the Y (O (oxygen) or S (sulfur), preferably S), and * indicates the position of the drug, and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. Linkers with a self-cleaving peptide are, for example, disclosed in U.S.

patent application publication US 2006/0074008, G. M. Dubowchik et al., Bioconjuate Chem. 2002, 13, 855-869, or S. O. Doronina et al., Nature Biotechnology, vol. 21, 778-784 (2003), the whole disclosure of these documents is incorporated herein by reference. The linker-drug conjugate may be

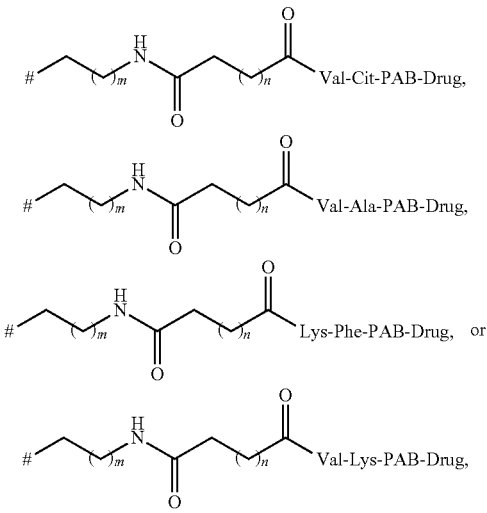

preferably

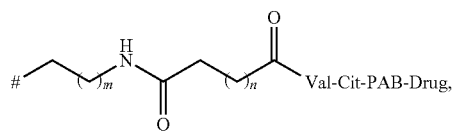

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. As an illustrative example, a drug used in the invention may be an auristatin, preferably monomethyl auristatin E (MMAE) or monomethyl auristatin F (MMAF). Preferably, the auristatin, in particular MMAE or MMAF, may be used in combination with a self-cleaving peptide, such as e.g. VC-PAB, VA-PAB, KF-PAB, or VK-PAB. Accordingly, a linker drug conjugate used herein may comprise VC-PAB-MMAE, VC-PAB-MMAF, VA-PAB-MMAE, VA-PAB-MMAF, KF-PAB-MMAE, KF-PAB-MMAF, VK-PAB-MMAE or VK-PAB-MMAF. In particular, the linker drug conjugate may be

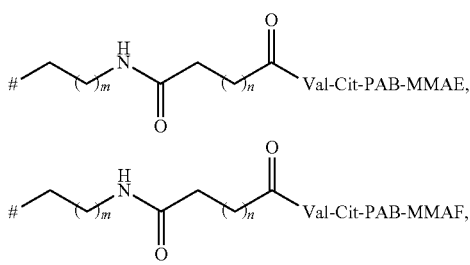

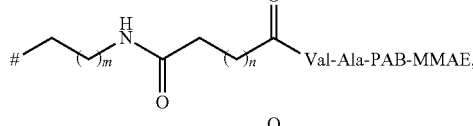

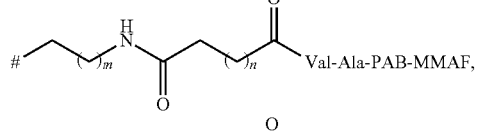

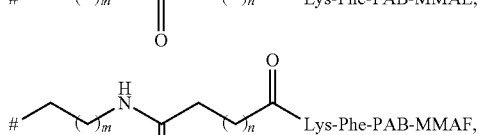

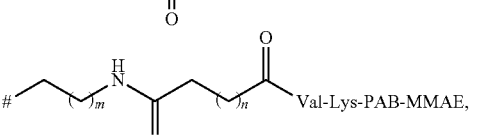

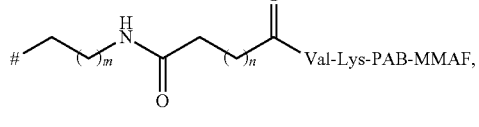

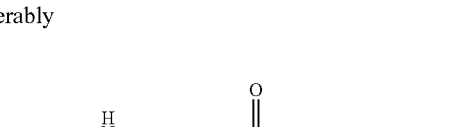

preferably

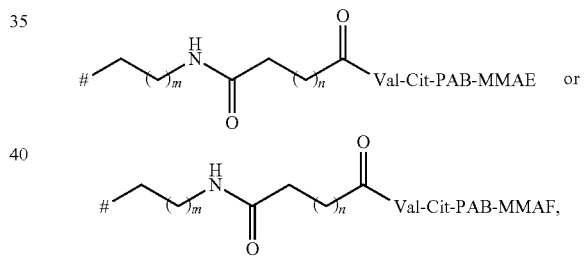

more preferably

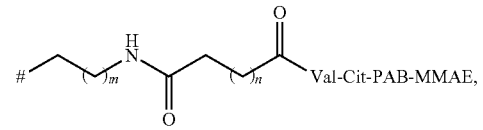

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1.

Also described herein are "antibody fluorophore conjugates" or abbreviated AFC, which refers to the linkage of an antibody or an antigen binding fragment thereof with a fluorophore, such as, for example, Cy5. The fluorophore may be linked to the antibody or antigen-binding fragment thereof through a linker. The linker may be any linker known to a person skilled in the art. The antibody fluorophore conjugate may comprise a "linker fluorophore conjugate". As used herein, the term "linker fluorophore conjugate"

refers to a molecule or chemical group comprising or consisting of a linker as defined herein before, and a fluorophore. In this regard, the term "linker fluorophore conjugate" in general refers to that part of an antibody fluorophore conjugate which is not the antibody or an antigen binding fragment thereof. In general, in a linker fluorophore conjugate the linker is covalently linked to the fluorophore.

The term "small molecule" as used herein denotes an organic molecule comprising at least two carbon atoms, but preferably not more than 7, 12, 15 or 20 rotatable carbon bonds, more preferably not more than 7, 12 or 15 rotatable carbon bonds, even more preferably not more than 7 or 12 rotatable carbon bonds, having a molecular weight in the range between 100 and 2000 Dalton, preferably between 100 and 1000 Dalton, and optionally including one or two metal atoms. As merely illustrative examples for small molecules biotin and the fluorophores EDANS and Cy5 may be mentioned.

Processes

The present invention provides a new reaction of thiol-comprising compounds with alkene or alkyne phosphonothiolates and phosphonates. Scheme 1 describes the general reaction according to the present invention and uses by way of illustrative examples ethenyl and ethynyl phosphonothiolates and phosphonates.

Scheme 1:

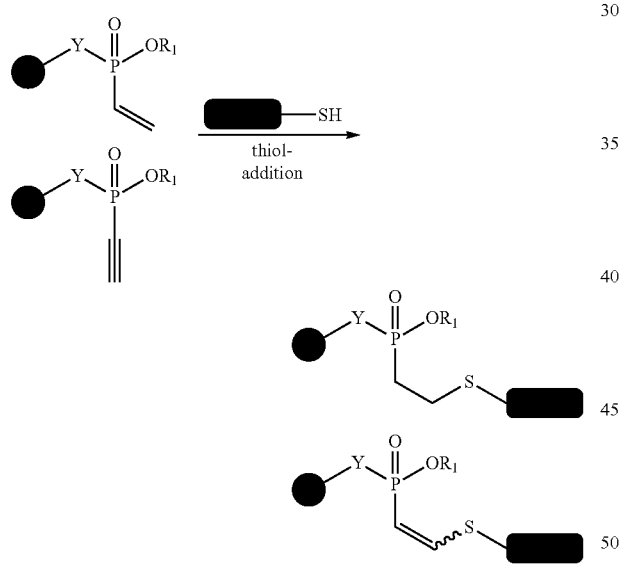

● =aliphatic or aromatic residue: for example, biotin, fluorophore, small molecules, amino acids, peptide, protein, antibody, nucleotide, oligonucleotide ▬ =thiol containing molecule: for example, amino acid, peptide, protein, antibody, nucleotide, oligonucleotide $R_1$=aliphatic or aromatic residue Y=S (sulfur), O (oxygen)

It is submitted that the processes described herein allow to combine a huge amount of different organic residues in positions $R_1$, ● and ▬. In particular, the processes according to the invention are suitable for forming conjugates when ▬ is an amino acid, a peptide, a protein, an antibody, a nucleotide or an oligonucleotide. As an advantage, thiol groups present in such amino acid, peptide, protein or antibody, such as e.g. a thiol group of a cysteine residue, or thiol groups present in a nucleotide or an oligonucleotide, react chemoselectively with the alkene or alkyne phosphonothiolate or phosphonate, thus providing a chemoselective modification method. Due to such chemoselectivity, the thiol containing compound, in particular the amino acid, peptide, protein, antibody, nucleotide or oligonucleotide may be unprotected, which means that protecting groups are not necessary.

The alkene or alkyne phosponothiolates or phosphonates may be electron-deficient alkene or alkyne phosphonothiolates or phosphonates.

Further, the processes according to the invention allow for conjugation of two complex molecules. For example, a protein may be coupled to an antibody or to another protein.

It is demonstrated herein:

Synthesis of electrophilic alkene- and alkyne-phosphonothiolates and -phosphonates Conjugation reactions of electron deficient alkene- and alkyne-phosphonothiolates and -phosphonates with thiol-containing molecules, including amino acids, peptides, proteins and antibodies Stability of these conjugates under physiologically relevant conditions The conjugation works under physiologically relevant conditions, such as e.g. physiological pH The present invention features several innovative aspects, which further ease the accessibility of conjugates such as antibody or protein conjugates, with novel conjugation chemistry:

A reaction for modifying thiols in a variety of compounds, e.g. in small molecules, proteins and antibodies Two complex molecules (e.g. a fluorophore and a protein or an antibody) can be connected by a straightforward conjugation, which is cysteine-selective in case of peptides, proteins and antibodies.

High stability of conjugates as opposed to usual maleimide reagents; fast conjugation reactions In contrast to other methods of modifying or conjugating peptides, proteins and antibodies, due to the cysteine selectivity no need of protecting group manipulations after preparation of the alkene phosphonotiolate or alkyne phosphonothiolate, or after the preparation of the alkene or alkyne phosphonate, and/or after the chemoselective conjugation Unsaturated phosphonothiolates exhibit an important advantage, because they react considerably faster in a thiol addition than the corresponding phosphonates. Fast reaction rates are highly desired for bioconjugation reactions, as thereby the conversion and also the yield can be increased. The resulting thiol-phosphonothiolate-conjugates show good stability profiles under physiologically relevant conditions.

High stability of phosphonothiolates under acidic conditions typically used for cleavage of peptide from solid support after solid phase synthesis.

Few examples of phosphonothiolates and thiol additions to phosphonates have been reported, see e.g. patent documents U.S. Pat. No. 3,904,710A, GB917085, GB863434, DE1064512, and the publications of Gao et al., *Chemistry Eur. J.* 2009, 15(9), 2064-2070; Khusinova et al., *Russian Chemical Bulletin, International Edition,* 2004, vol. 53, no. 10, pp. 2253-2256, and Acheson et al., *Journal of Chemical Research*, Synopses, 1986. However, no thiol addition to phosphonothiolates has been reported in these documents. Further, these documents do not relate to the modification of biomolecules, such as e.g. peptides, proteins, antibodies or oligonucleotides, and they do not make any reference to the issues of reaction rate and stability under physiologically relevant conditions.

Generally, the process according to the present invention can be carried out to conjugate different compounds such as small molecules (e.g. optionally substituted alkyl, phenyl or heterocycles), peptides, proteins, antibodies, oligonucleotides or polysaccharides with tags, proteins oligonucleotides etc. Accordingly, the present invention relates to a process for the preparation of a compound of formula (III), said process comprising the steps of:

reacting a compound of formula (I)

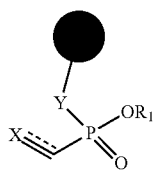

(I)

wherein
⫽ represents a double bond or triple bond;
X represents $R_3$—C when ⫽ is a triple bond;
X represents $(R_3 R_4)$C when ⫽ is a double bond;
Y represents S or O;
$R_1$ represents an optionally substituted aliphatic or aromatic residue;
$R_3$ represents H or $C_1$-$C_8$-alkyl;
$R_4$ represents H or $C_1$-$C_8$-alkyl; and
● represents an aliphatic or aromatic residue;
with a thiol-containing molecule of formula (II)

(II)

wherein ▬ represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system;
resulting in a compound of formula (III)

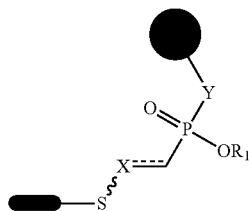

(III)

wherein
╱ represents a bond if ⫽ in a compound of formula (I) represents a double bond; or
╱ represents a double bond if ⫽ in a compound of formula (I) represents a triple bond; and
▬, ●, $R_1$, X and Y are as defined for the compounds of formula (I) and (II).

In some embodiments of any one of the processes of the invention where a compound of formula (I) is reacted with a compound of formula (II) to give a compound of formula (III), ⫽ represents a double bond, X represents $(R_3 R_4)$C, $R_3$ and $R_4$ independently represent H or $C_1$-$C_8$-alkyl and ╱ represents a bond. Preferably, $R_3$ and $R_4$ independently represent H or $C_1$-$C_6$-Alkyl, more preferably H or $C_1$-$C_4$-alkyl, still more preferably H or $C_1$-$C_2$-alkyl. In preferred embodiments $R_3$ and $R_4$ are the same. In preferred embodiments $R_3$ and $R_4$ are both H.

Alternatively, in some embodiments of any one of the processes of the invention where a compound of formula (I) is reacted with a compound of formula (II) to a give a compound of formula (III), ⫽ represents a triple bond, X represents $R_3$—C, $R_3$ represents H or $C_1$-$C_8$-alkyl and ╱ represents a double bond. Preferably, $R_3$ represents H or $C_1$-$C_6$-alkyl, more preferably H or $C_1$-$C_4$-alkyl, still more preferably H or $C_1$-$C_2$-alkyl. In preferred embodiments $R_3$ is H.

In any one of the processes of the invention where a compound of formula (I) is reacted with a compound of formula (II) to give a compound of formula (III), Y may be S (sulfur) or O (oxygen). When Y is S, compounds (I) and (III) represent phosphonothiolates. When Y is O, compounds (I) and (III) represent phosphonates. Accordingly, in some embodiments Y is S. In some embodiments Y is O. In preferred embodiments of any one of the processes where a compound of formula (I) is reacted with a compound of formula (II) to give a compound of formula (III) Y is S. The present inventors have found that the addition of thiols of formula (II) to the triple bond or double bond of a phophonothiolate, i.e. when Y is S, is considerably faster than the addition to the corresponding phosphonates, i.e. when Y is O. Such faster reaction rate is highly desired since thereby the conversion and the yield are increased.

A preparation of a compound of formula (I) may comprise:

reacting a compound of formula (IV)

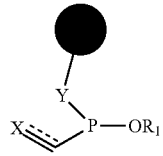

(IV)

wherein $R_1$, X, Y, ⫽ and ● are as defined herein above and below;
with an oxidant to form the compound of formula (I). The oxidant may be selected from the group consisting of tert-butyl hydroperoxide (tBu-OOH), meta-chloroperoxybenzoic acid (mCPBA), hydrogen peroxide ($H_2O_2$), iodine ($I_2$), potassium peroxymonosulphate, or oxygen ($O_2$), e.g. oxygen from air. Preferably, the oxidant is tert-butyl hydroperoxide (tBu-OOH). A preparation of a compound of formula (IV) may comprise:

reacting, in sequential order, a phosphorus trihalide (X), preferably $PCl_3$, with
(i) $R_1$—OH (XI), (ii)

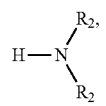

(XII)

wherein $R_2$ independently represents $C_1$-$C_8$-alkyl, (iii)

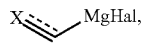 (XIII)

wherein Hal represents a halogen selected from the group consisting of Cl, Br and I, preferably Br, and (IV)

 (XIV)

to form the compound of formula (IV); wherein $R_1$, X, Y, ⚡ and ● are as defined herein above and below. The phosphorus trihalide may be $PCl_3$, $PBr_3$ or $PI_3$, with $PCl_3$ being preferred. $R_2$ in

 (XII)

independently represents $C_1$-$C_8$-alkyl, preferably $C_1$-$C_6$-alkyl, more preferably $C_1$-$C_4$-alkyl, even more preferably $C_1$-$C_3$-alkyl. Preferably both $R_2$ are the same. Even more preferably, both $R_2$ are isopropyl. Preferably, step (iv), where

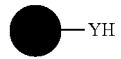 (XIV)

is reacted, is carried out in the presence of a tetrazole. The tetrazole may be unsubstituted tetrazole or a substituted tetrazole.

Alternatively, when Y is S, a preparation of a compound of formula (I) may comprise:

reacting a compound of formula (V)

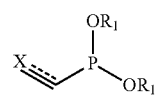 (V)

with a compound of formula (VIa) or (VIb)

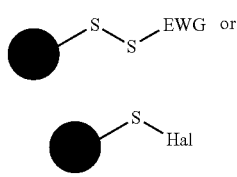 (VIa)

(VIb)

to form a compound of formula (I);
wherein EWG represents an electron withdrawing group, said electron withdrawing group preferably being selected from the group consisting of

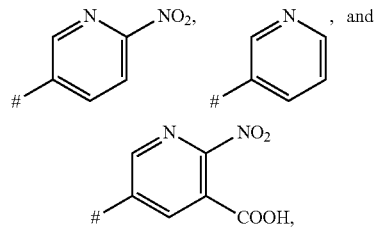

wherein # indicates the position of S; Hal represents a halogen selected from the group consisting of Cl, Br and I, preferably Cl, and wherein $R_1$, X, ⚡ and ● are as defined herein above and below. Preferably, in the compound of formula (V) both $R_1$ are the same. More preferably, when a compound of formula (VIa) is used, EWG is

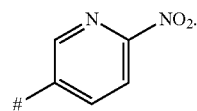

Compounds of formula (V) can be prepared, for example, by a process comprising: reacting

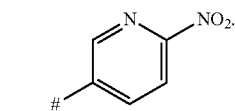 (XX)

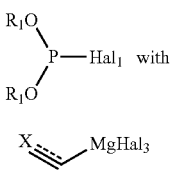 (XXI)

to give a compound of formula (V), wherein $R_1$, X, and ⚡ are as defined herein above and below; and $Hal_1$ is a halogen selected from the group consisting of Cl, Br and I, preferably Cl; and $Hal_2$ is a halogen selected from the group consisting of Cl, Br and I, preferably Br. Compounds of formula (VIa) can be prepared, for example, by reacting a compound

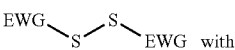 (XXX)

 (XXXI)

to give a compound of formula (VIa), wherein EWG is an electron-withdrawing group, preferably an electron-withdrawing group selected from the group consisting of

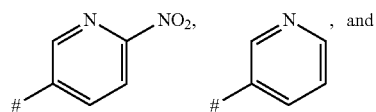

-continued

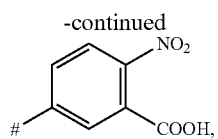

wherein # indicates the position of S, more preferably

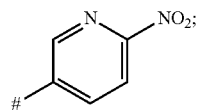

preferably, in the compound of formula (XXX) both EWG are the same; and wherein ● is as defined herein above and below. Compounds of formula VIb can be prepared according to literature known procedures, for example, by reacting a thiol

 (XXXI)

with sulfuryl chloride (see e.g. Allared, F. et al, Synthetic Metals, 120(1-3), 1061-1062; 2001) or thionyl chloride (see e.g. Masaki, Yukio et al, Chemical & Pharmaceutical Bulletin, 33(5), 1930-40; 1985), or by reacting a thiol

 (XXXI)

with N-chlorosuccinimide (NCS) (see e.g. Kawamura, Takamasa et al. European Journal of Organic Chemistry, 2015(4), 719-722; 2015) or chlorine (see e.g. E. Schneider, Chemische Berichte 84, 911-916 (1951), wherein ● is as defined herein above and below.

Preferably, when a compound of formula (I) is prepared by reacting a compound of formula (V) with a compound of formula (VIa) or (VIb), ⇌ in the compound of formula (V) is a double bond and X represents $(R_3 R_4)C$, wherein $R_3$ and $R_4$ are as defined herein above and below.

The present invention also relates to a process for the preparation of a compound of formula (III*) comprising the step of:

Reacting a compound of formula (I*)

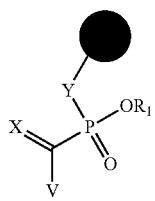 (I*)

wherein

V represents $C_1$-$C_8$-alkyl, preferably methyl, ethyl or propyl, more preferably methyl;

X represents $(R_3 R_4)C$;

Y represents S or O;

$R_1$ represents an optionally substituted aliphatic or aromatic residue;

$R_3$ represents H or $C_1$-$C_8$-alkyl;

$R_4$ represents H or $C_1$-$C_8$-alkyl; and

● represents an aliphatic or aromatic residue;

with a thiol-containing molecule of formula (II)

 (II)

wherein ▬ represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system;

resulting in a compound of formula (III*)

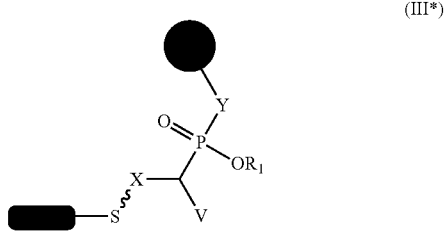 (III*)

wherein ▬, ●, V, $R_1$, X and Y are as defined for the compounds of formula (I*) and (II).

In any one of the processes of the invention where a compound of formula (I*) is reacted with a compound of formula (II) to give a compound of formula (III*), Y may be S (sulfur) or O (oxygen), i.e. when Y is S, compounds (I*) and (III*) represent phosphonothiolates, and when Y is O, compounds (I*) and (III*) represent phosphonates. Accordingly, in some embodiments Y is S. In some embodiments Y is O. In preferred embodiments of any one of the methods where a compound of formula (I*) is reacted with a compound of formula (II) to give a compound of formula (III*) Y is S, since the inventors have found that the addition of thiols to the triple bond or double bond of a phophonothiolate, i.e. when Y is S, is considerably faster than the addition to the corresponding phosphonates, i.e. when Y is O.

A preparation of a compound of formula (I*) may comprise:

reacting a compound of formula (IV*)

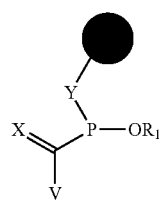 (IV*)

wherein X represents $(R_3 R_4)C$, and Y, $R_1$, $R_3$, $R_4$, V and ● are as defined herein above and below;

with an oxidant to form the compound of formula (I*). The oxidant may be selected from the group consisting of tert-butyl hydroperoxide (tBu-OOH), meta-chloroperoxybenzoic acid (mCPBA), hydrogen peroxide ($H_2O_2$), iodine ($I_2$), potassium peroxymonosulphate, or oxygen ($O_2$), e.g. oxygen from air. Preferably, the oxidant is tert-butyl hydroperoxide (tBu-OOH). A preparation of a compound of formula (IV*) may comprise:

reacting, in sequential order, a phosphorus trihalide (X), preferably $PCl_3$, with (i) $R_1$—OH (XI), (ii)

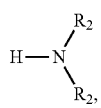

(XII)

wherein $R_2$ independently represents $C_1$-$C_8$-alkyl, (iii)

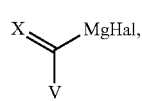

(XIII*)

wherein Hal represents a halogen selected from the group consisting of Cl, Br and I, preferably Br, and X represents ($R_3$ $R_4$)C, and (iv)

(XIV)

to form the compound of formula (IV*);

wherein $R_1$, $R_3$, $R_4$, V, Y and ● are as defined herein above and below. The phosphorus trihalide may be $PCl_3$, $PBr_3$ or $PI_3$, with $PCl_3$ being preferred. $R_2$ in

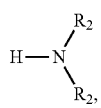

(XII)

independently represents $C_1$-$C_8$-alkyl, preferably $C_1$-$C_6$-alkyl, more preferably $C_1$-$C_4$-alkyl, even more preferably $C_1$-$C_3$-alkyl. Preferably both $R_2$ are the same. Even more preferably, both $R_2$ are isopropyl. Preferably, step (iv), where

(XIV)

is reacted, is carried out in the presence of a tetrazole. The tetrazole may be unsubstituted tetrazole or a substituted tetrazole.

Alternatively, when Y is S, a preparation of a compound of formula (I*) may comprise:

reacting a compound of formula (V*)

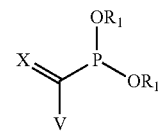

(V*)

with a compound of formula (VIa) or (VIb)

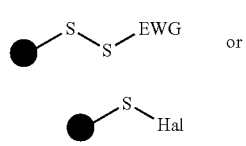

(VIa)

or (VIb)

to form a compound of formula (I*);

wherein EWG represents an electron withdrawing group, said electron withdrawing group preferably being selected from the group consisting of

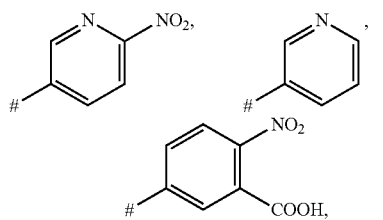

and wherein # indicates the position of S; Hal represents a halogen selected from the group consisting of Cl, Br and I, preferably Cl, and wherein X represents ($R_3$ $R_4$)C, and $R_1$, $R_3$, $R_4$, V and ● are as defined herein above and below. Preferably, in the compound of formula (V*) both $R_1$ are the same. More preferably, when a compound of formula (VIa) is used, EWG is

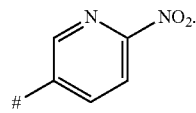

Compounds of formula (V*) can be prepared, for example, by a process comprising:

reacting

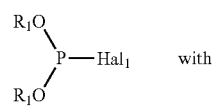

(XX)

with

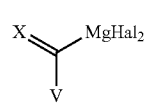

(XXI*)

to give a compound of formula (V*), wherein X represents $(R_3 R_4)C$, and $R_1$, $R_3$, $R_4$ and V are as defined herein above and below; and $Hal_1$ is a halogen selected from the group consisting of Cl, Br and I, preferably Cl; and $Hal_2$ is a halogen selected from the group consisting of Cl, Br and I, preferably Br. Compounds of formula (VIa) and (VIb) can be prepared, for example, as described herein above and below.

In some embodiments of any one of the processes of the invention, $R_1$ represents $C_1$-$C_8$-alkyl optionally substituted with at least one of $(C_1$-$C_8$-alkoxy$)_n$ wherein n is 1, 2, 3, 4, 5 or 6, F, Cl, Br, I, —$NO_2$, —$N(C_1$-$C_8$-alkyl)H, —$NH_2$, —$N_3$, —$N(C_1$-$C_8$-alkyl)$_2$, =O, $C_3$-$C_8$-cycloalkyl, —S—S—($C_1$-$C_8$-alkyl), hydroxy-$(C_1$-$C_8$-alkoxy$)_n$ wherein n is 1, 2, 3, 4, 5 or 6, $C_2$-$C_8$-alkenyl or $C_2$-$C_8$-alkynyl.

In some embodiments of any one of the processes of the invention, $R_1$ represents optionally substituted phenyl such as

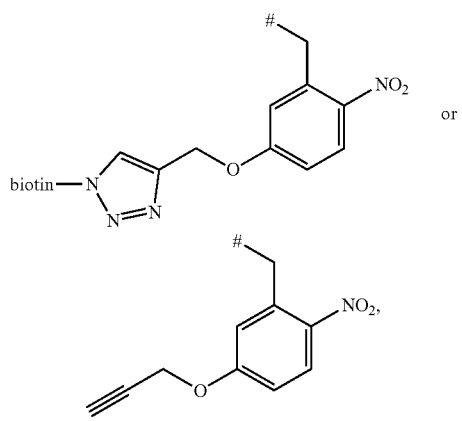

wherein # represents the position of O.

In some embodiments of any one of the processes of the invention, $R_1$ represents phenyl optionally independently substituted with at least one of $C_1$-$C_8$-alkyl, $(C_1$-$C_8$-alkoxy$)_n$ wherein n is 1, 2, 3, 4, 5 or 6, F, Cl, I, Br, —$NO_2$, —$N(C_1$-$C_8$-alkyl)H, —$NH_2$ or —$N(C_1$-$C_8$-alkyl)$_2$.

In some embodiments of any one of the processes of the invention, $R_1$ represents a 5- or 6-membered heteroaromatic system such as pyridyl.

In some embodiments of any one of the processes of the invention, $R_1$ represents $C_1$-$C_8$-alkyl, $C_1$-$C_8$-alkyl substituted with —S—S—($C_1$-$C_8$-alkyl), $C_1$-$C_8$-alkyl substituted with $(C_1$-$C_8$-alkoxy$)_n$ wherein n is 1, 2, 3, 4, 5 or 6, $C_1$-$C_8$-alkyl substituted with optionally substituted phenyl; or phenyl; or phenyl substituted with —$NO_2$.

In some embodiments of any one of the processes of the invention, $R_1$ represents methyl, ethyl, propyl or butyl, preferably methyl or ethyl.

In some embodiments of any one of the processes of the invention, $R_1$ represents an aliphatic or aromatic residue which is optionally substituted with —S—S—($C_1$-$C_8$-alkyl). In a preferred embodiment, $R_1$ represents

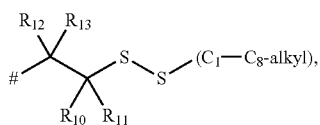

wherein $R_{10}$, $R_{11}$, $R_{12}$ and $R_{13}$ each independently represent hydrogen or $C_1$-$C_8$-alkyl; and # represents the position of O. In a more preferred embodiment $R_{10}$, $R_{11}$, $R_{12}$, and $R_{13}$ each independently represent hydrogen, methyl or ethyl. In a preferred embodiment $R_1$ represents

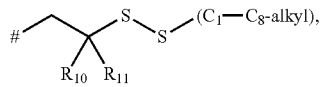

wherein $R_{10}$ and $R_{11}$ independently represent hydrogen or $C_1$-$C_8$-alkyl; and # represents the position of O. In a more preferred embodiment $R_{10}$ and $R_{11}$ independently represent hydrogen, methyl or ethyl. In a still more preferred embodiment, $R_1$ represents

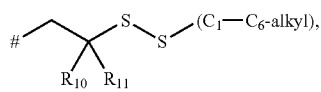

wherein $R_{10}$ and $R_{11}$ independently represent hydrogen, methyl or ethyl; and # represents the position of O. In some of these embodiments $R_{10}$ and $R_{11}$ are both hydrogen. In some of these embodiments $R_{10}$ is hydrogen and $R_{11}$ is $C_1$-$C_6$-alkyl. In some of these embodiments $R_{10}$ is hydrogen and $R_{11}$ is methyl or ethyl. In some of these embodiments $R_{10}$ and $R_{11}$ are the same. In a preferred embodiment, $R_1$ represents

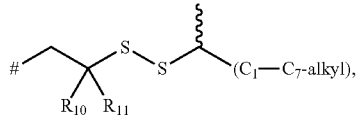

more preferably

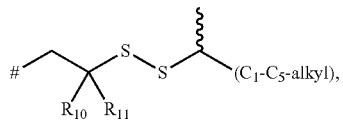

wherein $R_{10}$ and $R_{11}$ are as defined herein before. In another preferred embodiment $R_1$ represents,

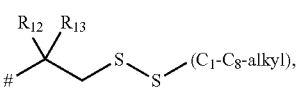

wherein $R_{12}$ and $R_{13}$ independently represent hydrogen or $C_1$-$C_8$-alkyl; and # represents the position of O. In a more preferred embodiment $R_{12}$ and $R_{13}$ independently represent hydrogen, methyl or ethyl. In a still more preferred embodiment, $R_1$ represents

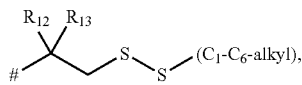

wherein $R_{12}$ and $R_{13}$ independently represent hydrogen, methyl or ethyl; and # represents the position of O. In some of these embodiments $R_{12}$ and $R_{13}$ are both hydrogen. In some of these embodiments $R_{12}$ is hydrogen and $R_{13}$ is $C_1$-$C_6$-alkyl. In some of these embodiments $R_{12}$ is hydrogen and $R_{13}$ is methyl or ethyl. In some of these embodiments $R_{12}$ and $R_{13}$ are the same.

In some embodiments of any one of the processes of the invention, $R_1$ represents $C_1$-$C_8$-alkyl substituted with phenyl, said phenyl being further substituted with

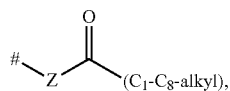

wherein Z is O or NH, and wherein # represents the position of said phenyl. In some embodiments Z is O. In some embodiments Z is NH. The $C_1$-$C_8$-alkyl in the

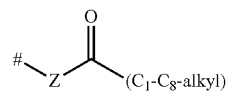

may be, for example, methyl, ethyl, propyl or butyl; preferably methyl, ethyl or propyl; more preferably methyl or ethyl; most preferably methyl. In a preferred embodiment $R_1$ represents

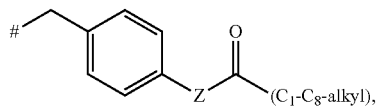

wherein the $C_1$-$C_8$-alkyl may be, for example, methyl, ethyl, propyl or butyl; preferably methyl, ethyl or propyl; more preferably methyl or ethyl; most preferably methyl; wherein Z is O or NH, and wherein # represents the position of O. In another preferred embodiment $R_1$ represents

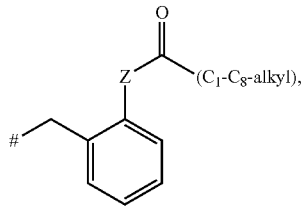

wherein the $C_1$-$C_8$-alkyl may be, for example, methyl, ethyl, propyl or butyl; preferably methyl, ethyl or propyl; more preferably methyl or ethyl; most preferably methyl; wherein Z is O or NH, and wherein # represents the position of O.

In some embodiments of any one of the processes of the invention, $R_1$ represents $C_1$-$C_8$-alkyl substituted with phenyl, said phenyl being further substituted with

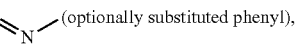

and wherein # represents the position of said phenyl. In some embodiments $R_1$ represents $C_1$-$C_8$-alkyl substituted with phenyl, said phenyl being further substituted with

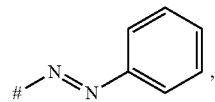

wherein # represents the position of said phenyl. In a preferred embodiment $R_1$ represents

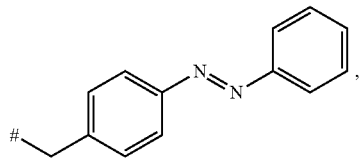

wherein # represents the position of O. In another preferred embodiment $R_1$ represents

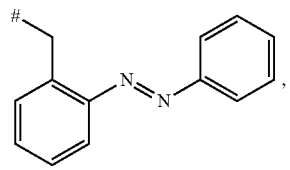

wherein # represents the position of O.

In some embodiments of any one of the processes of the invention, $R_1$ represents

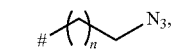

where # represents the position of O, and with n=0, 1, 2, 3, 4, 5, 6, 7, 8, 9 or 10, preferably with n=0, 1, 2, 3, 4, 5, 6; more preferably with n=0, 1, 2, 3, 4; even more preferably with n=0, 1, 2, 3, even further preferably with n=0, 1, 2, even still further preferably with n=0, 1; and most preferably with n=1.

In some embodiments of any one of the processes of the invention, $R_1$ represents an aliphatic or aromatic residue which is optionally substituted with $C_2$-$C_8$-alkynyl. In a preferred embodiment $R_1$ is homopropargyl.

In some embodiments of any one of the processes of the invention, $R_1$ represents

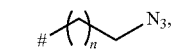

wherein # represents the position of O, with n=0, 1, 2, 3, 4, 5, 6, 7, 8, 9 or 10, preferably with n=0, 1, 2, 3, 4, 5, 6; more preferably with n=0, 1, 2, 3, 4; even more preferably with n=0, 1, 2, 3, even further preferably with n=0, 1, 2, even still further preferably with n=0, 1; and most preferably with n=1, i.e. when n is 1, $R_1$ represents

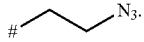

In some embodiments of any one of the processes of the invention, ● represents a small molecule; wherein optionally the ● further comprises a linker that is bound to the Y.

In some embodiments of any one of the processes of the invention, ● represents a small molecule such as, for example, an optionally substituted $C_1$-$C_8$-alkyl, —$CH_2$-phenyl,

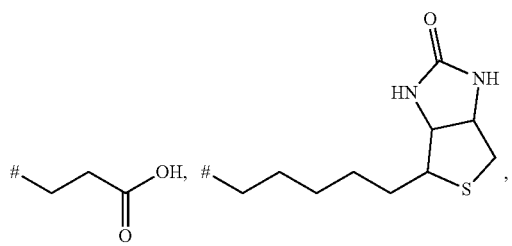

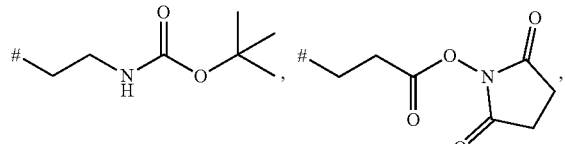

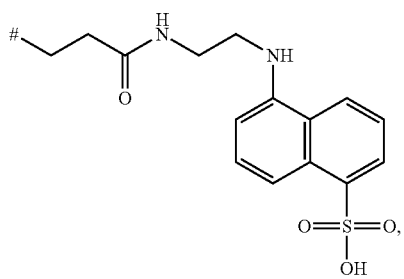

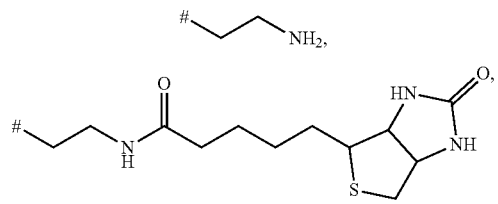

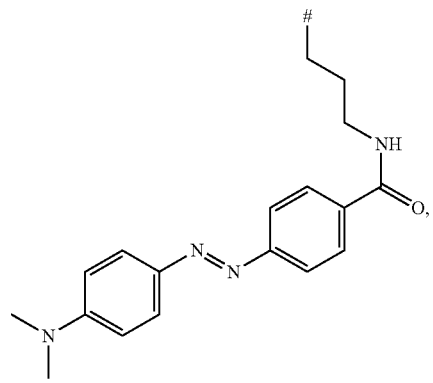

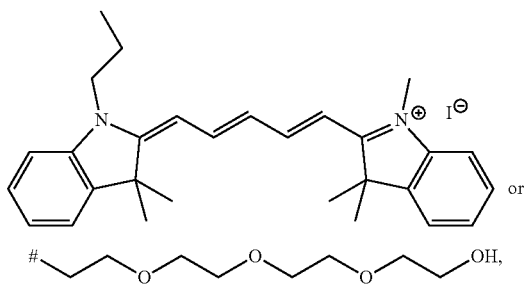

wherein # indicates the position of the Y. In preferred embodiments ● represents an optionally substituted $C_1$-$C_8$-alkyl, preferably an optionally substituted $C_1$-$C_6$-alkyl, more preferably an optionally substituted $C_1$-$C_4$-alkyl, even more preferably $C_1$-$C_2$-alkyl. In some embodiments ● represents —$CH_2$-phenyl, i.e. benzyl. In preferred embodiments ● represents

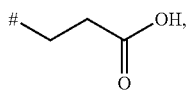

indicates the position of the Y. In preferred embodiments ● represents

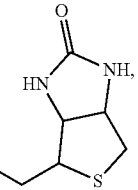

wherein # indicates the position of the Y. In preferred embodiments ● represents

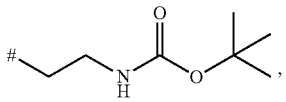

wherein # indicates the position of the Y. In preferred embodiments ● represents

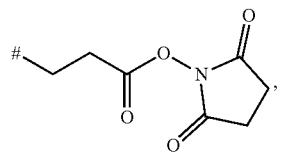

wherein # indicates the position of the Y. In preferred embodiments ● represents

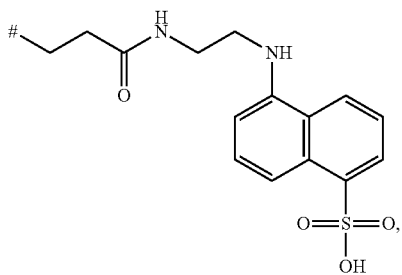

wherein # indicates the position of the Y. In preferred embodiments ● represents

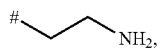

wherein # indicates the position of the Y. In preferred embodiments ● represents

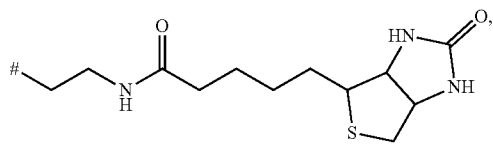

wherein # indicates the position of the Y. In some embodiments ● represents

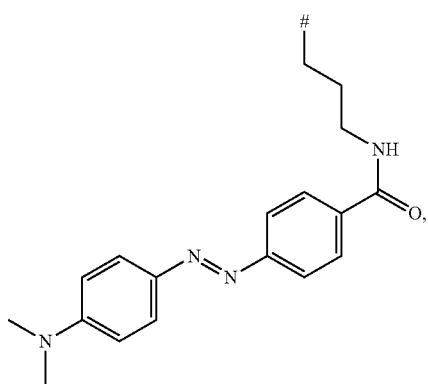

wherein # indicates the position of the Y. In some embodiments ● represents

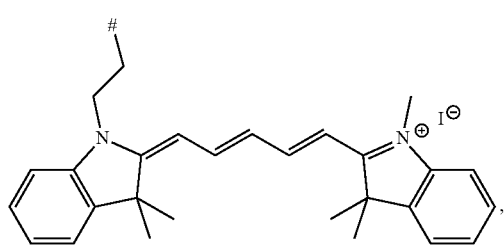

wherein # indicates the position of the Y. In some embodiments ● represents

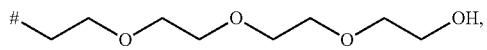

wherein # indicates the position of the Y.

In some embodiments of any one of the processes of the invention, ● represents an optionally substituted phenyl, preferably

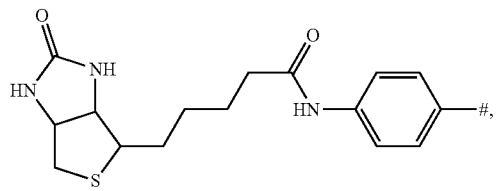

wherein # indicates the position of Y.

In some embodiments of any one of the processes of the invention, ● represents a radioactive or non-radioactive nuclide, biotin, a reporter enzyme, a nucleotide, an oligonucleotide, a fluorophore such as $CY_5$ or EDANS, an amino acid, a peptide, an optionally substituted 5- or 6-membered heteroaromatic system; wherein optionally the ● further comprises a linker that is bound to the Y. Accordingly, in some embodiments ● represents a radioactive or non-radioactive nuclide. In preferred embodiments ● represents biotin. In some embodiments ● represents a reporter enzyme. In preferred embodiments ● represents a nucleotide. In preferred embodiments ● represents an oligonucleotide. In preferred embodiments ● represents a fluorophore such as $CY_5$ or EDANS. In preferred embodiments ● represents an amino acid. In preferred embodiments ● represents a peptide. In preferred embodiments ● represents an optionally substituted 5- or 6-membered heteroaromatic system. Optionally, in any one of these embodiments the ● further comprises a linker that is bound to the Y.

Throughout this specification, wherever it is indicated with regard to any process or any compound that "optionally the ● further comprises a linker that is bound to the Y", or the like, the ● can further comprise virtually any linker, and the linker is bound to the Y, said Y being, e.g. as set out herein with regard to a compound of formula (I), (I*), (III) or (III*), S (sulfur) or O (oxygen), preferably S. The linker may be any linker known to a person skilled in the art, for example, a peptidic linker or a straight or branched hydrocarbon-based moiety. The linker can also comprise cyclic moieties. A peptidic linker may comprise, for example, 1 to 50, 1 to 40, 1 to 30, 1 to 20, 1 to 10, 1 to 5, 1 to 3, or 2, or 1 amino acid(s). If the linker is a hydrocarbon-based moiety, the main chain of the linker may comprise only carbon atoms but can also contain heteroatoms such as oxygen (O), nitrogen (N) or sulfur (S) atoms, and/or can contain carbonyl groups (C=O). The linker may be, for example, a $C_1$-$C_{20}$ carbon atom chain or a polyether based chain such as a polyethylene glycol-based chain with —(O—$CH_2$—$CH_2$)— repeating units. In typical embodiments of hydrocarbon-based linkers, the linking moiety comprises between 1 to about 150, 1 to about 100, 1 to about 75, 1 to about 50, or 1 to about 40, or 1 to about 30, or 1 to about 20, including 2, 3, 4, 5, 6, 7, 8, 9, 10, 11, 12, 13, 14, 15, 16, 17, 18 and 19 main chain atoms. As an illustrative example, the linker may be

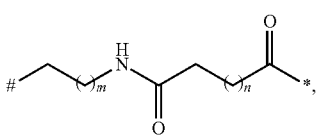

wherein # indicates the position of the Y, and * indicates the position of another part of the ●, wherein said another part may be, as non-limiting examples, amino acid, peptide, antibody, protein, nucleotide, oligonucleotide, or small molecule; and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. The aforementioned exemplary linkers may be also used, for example, when the present specification refers to a "linker" as such, or to a "linker-drug conjugate", for example in the context of an antibody drug conjugate, or to a "linker-fluorophore conjugate", for example in the context of an antibody fluorophore conjugate. A person skilled in the art knows to select suitable linkers.

In some embodiments of any one of the processes of the invention, ● represents a cyclic RGD peptide of structure (VII) (c(RDGfK))

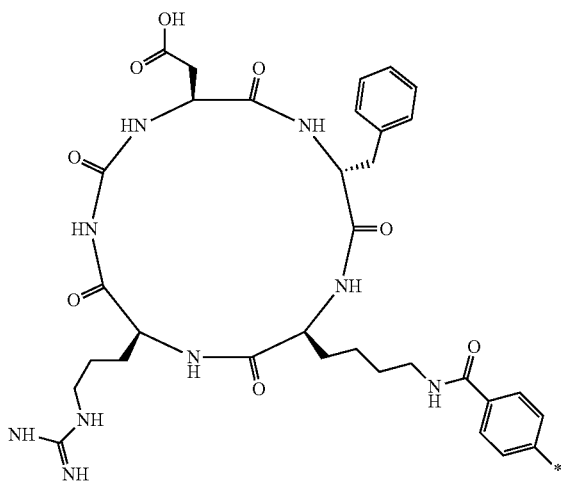

(VII)

wherein * represents the position of the Y.

In some embodiments of any one of the processes of the invention, ● represents phenyl, optionally substituted with one, two, three, four or five substituents independently selected from the group consisting of $C_1$-$C_8$-alkyl, $C_1$-$C_8$-alkoxy, halogen, —CN, —$NO_2$, —$NH_2$, —N($C_1$-$C_8$-alkyl), —N($C_1$-$C_8$-alkyl)$_2$-COOH, —COO($C_1$-$C_8$-alkyl), —O—C(O)—($C_1$-$C_8$-alkyl), —C(O)N—($C_1$-$C_8$-alkyl), —N(H)—C(O)—($C_1$-$C_8$-alkyl) preferably optionally substituted with one substituent selected from the group consisting of $C_1$-$C_8$-alkoxy, —COOH, —COO($C_1$-$C_8$-alkyl and $NO_2$.

In some embodiments of any one of the processes of the invention, ● represents $C_1$-$C_8$-alkyl, optionally substituted with at least one substituent selected from the group consisting of $C_3$-$C_8$-cycloalkyl; heterocyclyl with 3 to 8 ring members wherein the heteroatom(s) are selected from N, O, S; $C_1$-$C_8$-alkoxy; halogen; —CN; —$NO_2$; —$NH_2$; —N($C_1$-$C_8$-alkyl); —N($C_1$-$C_8$-alkyl)$_2$; —COOH; —COO($C_1$-$C_8$-alkyl); —O—C(O)—($C_1$-$C_8$-alkyl); —$CONH_2$; —C(O)N($C_1$-$C_8$-alkyl)$_2$; —C(O)NH—($C_1$-$C_8$-alkyl); —N(H)—C(O)—($C_1$-$C_8$-alkyl), preferably $C_1$-$C_8$-alkoxy, —COOH, —COO ($C_1$-$C_8$-alkyl and $NO_2$, phenyl or a heteroaromatic system, a monosaccharide, a polysaccharide, a peptide, a protein, an antibody, a nucleotide, an oligonucleotide, a polymer, an amino acid, a fluorophor, a protein tag (substituent $1^{st}$ generation), wherein a substituent $1^{st}$ generation may again optionally be substituted with $C_3$-$C_8$-cycloalkyl; heterocyclyl with 3 to 8 ring members wherein the heteroatom(s) are selected from N, O, S; $C_1$-$C_8$-alkoxy; halogen; —CN; —$NO_2$; —$NH_2$; —N($C_1$-$C_8$-alkyl); —N($C_1$-$C_8$-alkyl)$_2$; —COOH; —COO($C_1$-$C_8$-alkyl); —O—C(O)—($C_1$-$C_8$-alkyl); —$CONH_2$; —C(O)N($C_1$-$C_8$-alkyl)$_2$; —C(O)NH—($C_1$-$C_8$-alkyl); —N(H)—C(O)—($C_1$-$C_8$-alkyl), preferably $C_1$-$C_8$-alkoxy, —COOH, —COO($C_1$-$C_8$-alkyl and $NO_2$, phenyl or a heteroaromatic system (substituents $2^{nd}$ generation) and wherein a substituent $2^{nd}$ generation may be substituted again by at least one substituent selected from the same group and wherein such substitution may go until generation 3, 4, 5, 6, 7, 8, 9 or 10.

In some embodiments of any one of the processes of the invention, ● represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system; wherein optionally the ● further comprises a linker that is bound to the Y. Accordingly, in preferred embodiments ● represents an amino acid. In preferred embodiments ● represents a peptide. In preferred embodiments ● represents a protein. In preferred embodiments ● represents an antibody. In preferred embodiments ● represents a nucleotide. In preferred embodiments ● represents an oligonucleotide. In some embodiments ● represents a saccharide. In some embodiments ● represents a polysaccharide. In some embodiments ● represents a polymer. In some embodiments ● represents an optionally substituted $C_1$-$C_8$-alkyl, preferably an optionally substituted $C_1$-$C_6$-alkyl, more preferably an optionally substituted $C_1$-$C_4$-alkyl, still more preferably an optionally substituted $C_1$-$C_2$-alkyl. In some embodiments ● represents an optionally substituted phenyl. In some embodiments ● represents an optionally substituted aromatic 5- or 6-membered heterocyclic system. Optionally, in any one of these embodiments the ● further comprises a linker that is bound to the Y.

In preferred embodiments of any one of the processes of the invention, ● represents an amino acid, a peptide, a protein, an antibody, a nucleotide, or an oligonucleotide; wherein optionally the ● further comprises a linker that is bound to the Y. In more preferred embodiments ● represents a peptide, a protein, an antibody, or an oligonucleotide; wherein optionally the ● further comprises a linker that is bound to the Y. In preferred embodiments ● represents an amino acid. In preferred embodiments ● represents a peptide. In preferred embodiments ● represents a protein. In preferred embodiments ● represents an antibody. In preferred embodiments ● represents a nucleotide. In preferred embodiments ● represents an oligonucleotide. Optionally, in any one of these embodiments the ● further comprises a linker that is bound to the Y.

In preferred embodiments of any one of the processes of the invention, ● represents a drug, a protein tag, or a fluorophore such as $CY_5$ or EDANS, biotin, a protein, a peptide, an antibody or an oligonucleotide; wherein optionally the ● further comprises a linker that is bound to the Y. Accordingly, in preferred embodiments ● represents a drug. In preferred embodiments ● represents a protein tag.

In preferred embodiments ● represents a linker-drug conjugate. In preferred embodiments ● represents a fluorophore such as CY$_5$ or EDANS. In preferred embodiments ● represents biotin. In preferred embodiments ● represents a protein. In preferred embodiments ● represents a peptide. In preferred embodiments ● represents an antibody. In preferred embodiments ● represents an oligonucleotide. Optionally, in any one of these embodiments the ● further comprises a linker that is bound to the Y.

In preferred embodiments of any one of the processes of the invention ● represents a linker or a linker-drug conjugate. In preferred embodiments ● represents a linker, such as e.g. a linker comprising VC-PAB, VA-PAB, KF-PAB, or VK-PAB, preferably a linker comprising VC-PAB. In preferred embodiments ● represents a linker-drug conjugate, such as e.g.

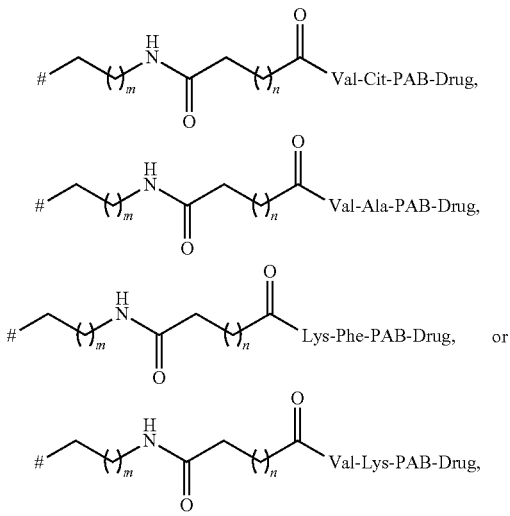

preferably

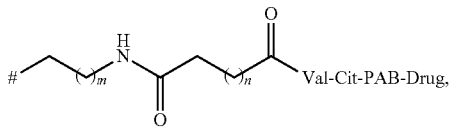

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. More preferably, the linker drug conjugate is

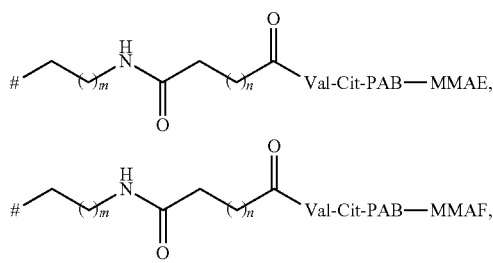

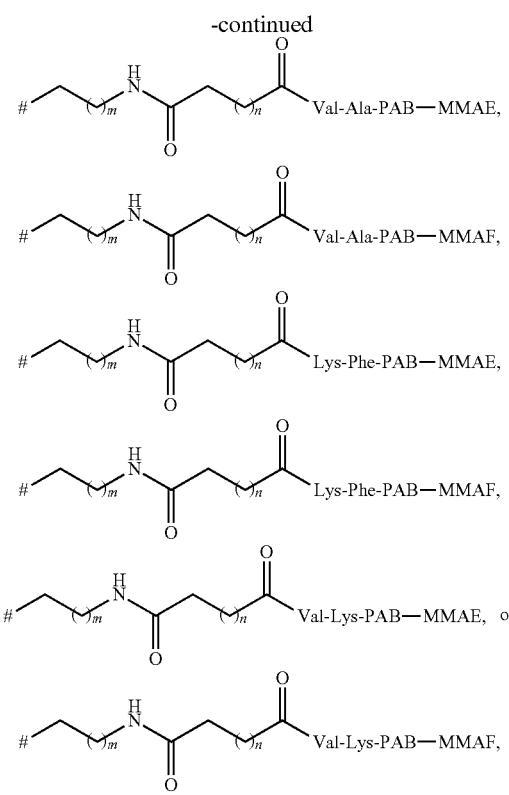

still more preferably

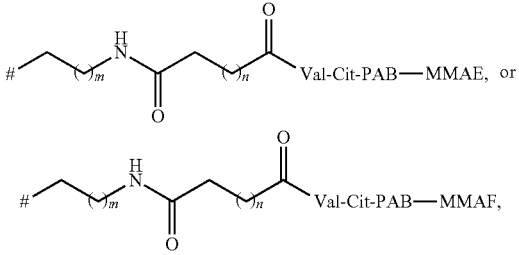

most preferably

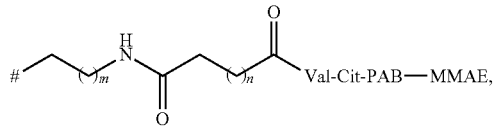

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1.

According to any one of the processes of the invention, ■■ may represent an amino acid, a peptide, a protein, an antibody, a nucleotide, an oligonucleotide, a saccharide, a polysaccharide, a polymer, an optionally substituted C$_1$-C$_8$-alkyl, an optionally substituted phenyl, or an optionally substituted aromatic 5- or 6-membered heterocyclic system. In preferred embodiments ■■ represents an amino acid, a peptide, a protein, an antibody, a nucleotide or an oligonucleotide. In more preferred embodiments ⬛ represents a peptide, a protein, an antibody or an oligonucleotide. In preferred embodiments ⬛ represents an amino acid. In preferred embodiments ⬛ represents a peptide. In preferred embodiments ⬛ represents a protein. In preferred embodiments ⬛ represents an antibody. In preferred embodiments ⬛ represents a nucleotide. In preferred embodiments ⬛ represents an oligonucleotide. In some embodiments ⬛ represents a saccharide. In some embodiments ⬛ represents a polysaccharide. In some embodiments ⬛ represents a polymer. In some embodiments ⬛ represents an optionally substituted $C_1$-$C_8$-alkyl, preferably an optionally substituted $C_1$-$C_6$-alkyl, more preferably an optionally substituted $C_1$-$C_4$-alkyl, still more preferably an optionally substituted $C_1$-$C_2$-alkyl. In some embodiments ⬛ represents an optionally substituted $C_3$-$C_8$-alkyl, preferably an optionally substituted $C_3$-$C_6$-alkyl, more preferably an optionally substituted $C_3$-$C_4$-alkyl. In some embodiments ⬛ represents an optionally substituted $C_5$-$C_8$-alkyl, preferably an optionally substituted $C_6$-$C_7$-alkyl. In some embodiments ⬛ represents an optionally substituted phenyl. In some embodiments ⬛ represents an optionally substituted aromatic 5- or 6-membered heterocyclic system.

In preferred embodiments of any one of the processes of the invention, ⬛ represents an antibody, preferably an IgG antibody, more preferably a Cetuximab or a Trastuzumab or a Brentuximab; a protein, preferably a GFP protein or eGFP-protein, an albumin, a tripeptide, preferably a peptide of formula (VIII)

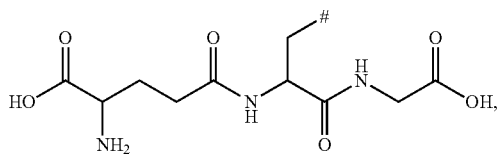

(VIII)

or of formula (IX)

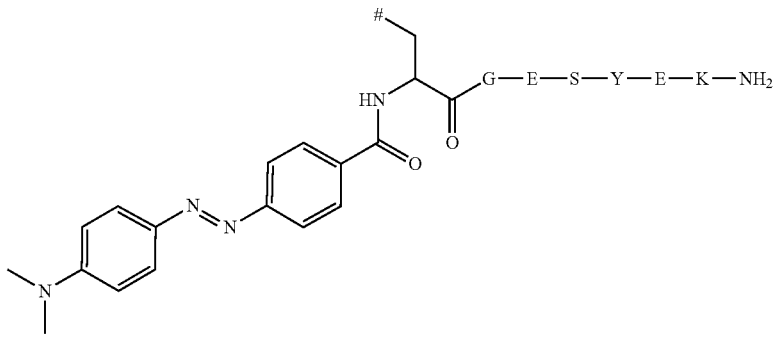

(IX)

wherein # represents the position of S. Accordingly, in preferred embodiments ⬛ represents an antibody. In more preferred embodiments the antibody is an IgG antibody, even more preferably a Cetuximab or a Trastuzumab or a Brentuximab. In preferred embodiments ⬛ represents a protein, more preferably a GFP protein or eGFP-protein. In preferred embodiments ⬛ represents an albumin. In preferred embodiments ⬛ represents a tripeptide. In preferred embodiments ⬛ represents a peptide of formula (VII)

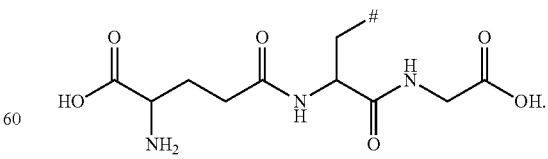

(VIII)

In preferred embodiments ⬛ represents a peptide of formula (IX)

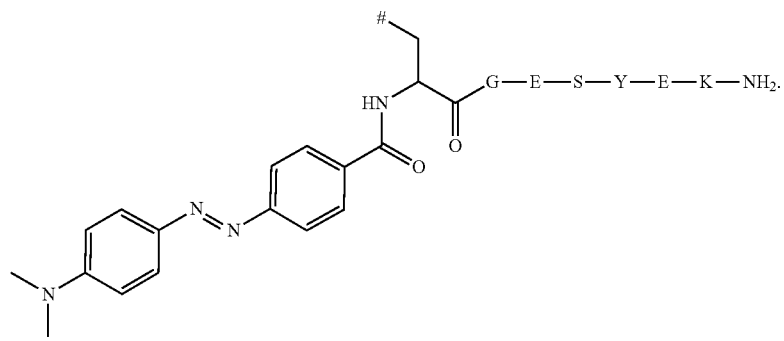

(IX)

In preferred embodiments of any one of the processes of the invention, ▬ represents an antibody (e.g. a Cetuximab, Trastuzumab, or Brentuximab) and ● represents a protein tag, or a fluorophore such as $CY_5$ or EDANS, biotin, a peptide, a protein, an oligonucleotide, or a small molecule; wherein optionally the ● further comprises a linker that is bound to the Y. Accordingly, in preferred embodiments ▬ represents an antibody and ● represents a protein tag. In preferred embodiments ▬ represents an antibody and ● represents a fluorophore such as $CY_5$ or EDANS. In preferred embodiments ▬ represents an antibody and ● represents biotin. In preferred embodiments ▬ represents an antibody and ● represents a peptide. In preferred embodiments ▬ represents an antibody and ● represents a protein. In preferred embodiments ▬ represents an antibody and ● represents an oligonucleotide. In preferred embodiments ▬ represents an antibody and ● represents a small molecule. Optionally, in any one of these embodiments the ● further comprises a linker that is bound to the Y.

In preferred embodiments of any one of the processes of the invention, ▬ represents a protein (e.g. a GFP protein or eGFP protein) and ● represents a protein tag, or a fluorophore such as $CY_5$ or EDANS, biotin, a peptide, an antibody, a protein, an oligonucleotide, or a small molecule; wherein optionally the ● further comprises a linker that is bound to the Y. Accordingly, in preferred embodiments ▬ represents a protein and ● represents a protein tag. In preferred embodiments ▬ represents a protein and ● represents a fluorophore such as $CY_5$ or EDANS. In preferred embodiments ▬ represents a protein and ● represents biotin. In preferred embodiments ▬ represents a protein and ● represents a peptide. In preferred embodiments ▬ represents a protein and ● represents an antibody. In preferred embodiments ▬ represents a protein and ● represents a protein. In preferred embodiments ▬ represents a protein and ● represents an oligonucleotide. In preferred embodiments ▬ represents a protein and ● represents a small molecule. Optionally, in any one of these embodiments the ● further comprises a linker that is bound to the Y.

In preferred embodiments of any one of the processes of the invention, ▬ represents a peptide and ● represents a protein tag, or a fluorophore such as $CY_5$ or EDANS, biotin, a peptide, a protein, an oligonucleotide, or a small molecule; wherein optionally the ● further comprises a linker that is bound to the Y. Accordingly, in preferred embodiments ▬ represents a peptide and ● represents a protein tag. In preferred embodiments ▬ represents a peptide and ● represents a fluorophore such as $CY_5$ or EDANS. In preferred embodiments ▬ represents a peptide and ● represents biotin. In preferred embodiments ▬ represents a peptide and ● represents a peptide. In preferred embodiments ▬ represents a peptide and ● represents a protein. In preferred embodiments ▬ represents a peptide and ● represents an oligonucleotide. In preferred embodiments ▬ represents a peptide and ● represents a small molecule. Optionally, in any one of these embodiments the ● further comprises a linker that is bound to the Y.

In preferred embodiments of any one of the processes of the invention, ▬ represents an amino acid and ● represents a protein tag, or a fluorophore such as $CY_5$ or EDANS, biotin, a peptide, a protein, an oligonucleotide, or a small molecule; wherein optionally the ● further comprises a linker that is bound to the Y. Accordingly, in preferred embodiments ▬ represents an amino acid and ● represents a protein tag. In preferred embodiments ▬ represents an amino acid and ● represents a fluorophore such as $CY_5$ or EDANS. In preferred embodiments ▬ represents an amino acid and ● represents biotin. In preferred embodiments ▬ represents an amino acid and ● represents a peptide. In preferred embodiments ▬ represents an amino acid and ● represents a protein. In preferred embodiments ▬ represents an amino acid and ● represents an oligonucleotide. In preferred embodiments ▬ represents an amino acid and ● represents a small molecule. Optionally, in any one of these embodiments the ● further comprises a linker that is bound to the Y.

In preferred embodiments of any one of the processes of the invention, ▬ represents an antibody (e.g. a Cetuximab, a Trastuzumab, or a Brentuximab) and ● represents a linker, a drug, or a linker-drug conjugate. Accordingly, in preferred embodiments ▬ represents an antibody and ● represents a linker, such as e.g. a linker comprising VC-PAB, VA-PAB, KF-PAB, or VK-PAB, preferably a linker comprising VC-PAB. In preferred embodiments ▬ represents an antibody and ● represents a drug. In preferred embodiments ▬ represents an antibody and ● represents a linker-drug conjugate, such as e.g.

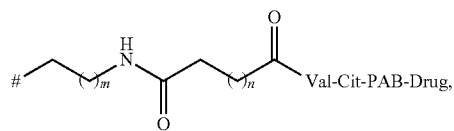

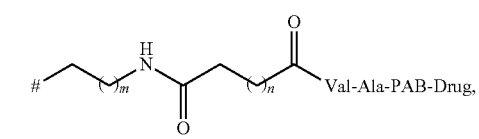
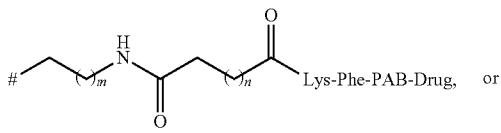
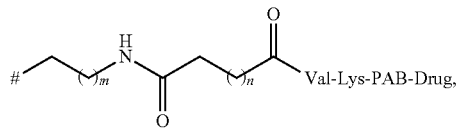

preferably

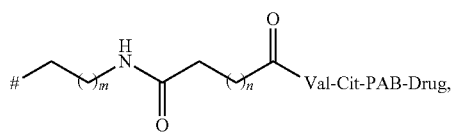

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. In more preferred embodiments ▬ represents an antibody and ● represents a linker-drug conjugate such as e.g.

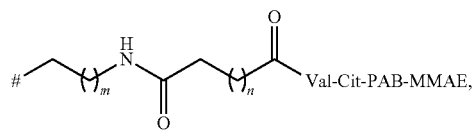
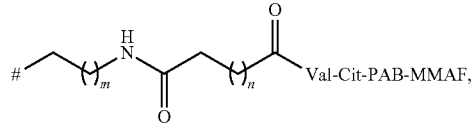
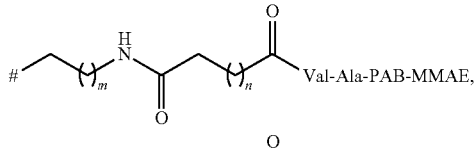
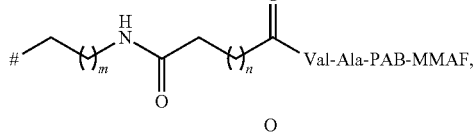
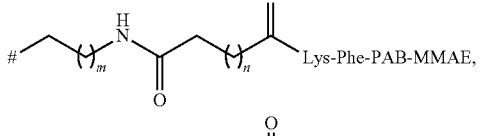
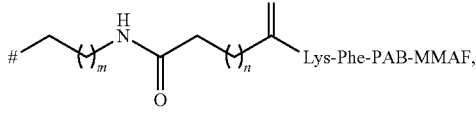

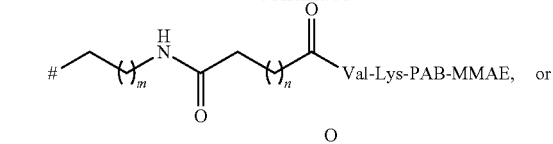
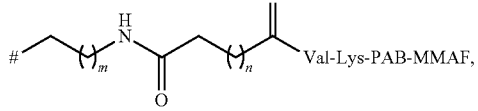

still more preferably

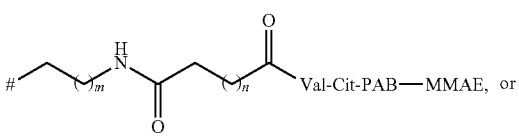
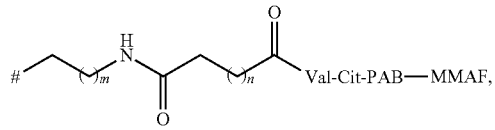

most preferably

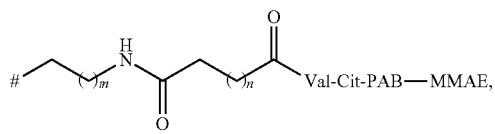

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. In any one of these embodiments the antibody may be a Cetuximab, a Trastuzumab or a Brentuximab, preferably a Brentuximab.

In preferred embodiments of any one of the processes of the invention, ▬ represents a nucleotide and ● represents a peptide, a protein, a protein tag, an antibody, an oligonucleotide, a fluorophore such as $CY_5$ or EDANS, biotin, or a small molecule; wherein optionally the ● further comprises a linker that is bound to the Y. In preferred embodiments ▬ represents a nucleotide and ● represents a peptide. In preferred embodiments ▬ represents a nucleotide and ● represents a protein. In preferred embodiments ▬ represents a nucleotide and ● represents a protein tag. In preferred embodiments ▬ represents a nucleotide and ● represents an antibody. In preferred embodiments ▬ represents a nucleotide and ● represents an oligonucleotide. In preferred embodiments ▬ represents a nucleotide and ● represents a fluorophore such as $CY_5$ or EDANS. In preferred embodiments ▬ represents a nucleotide and ● represents biotin. In preferred embodiments ▬ represents a nucleotide and ● represents a small molecule. Optionally, in any one of these embodiments the ● further comprises a linker that is bound to the Y.

In preferred embodiments of any one of the processes of the invention, ▬ represents a nucleotide and ● represents a linker.

In preferred embodiments of any one of the processes of the invention, ▬ represents an oligonucleotide and ● represents a peptide, a protein, a protein tag, an antibody, an oligonucleotide, a fluorophore such as $CY_5$ or EDANS, biotin, or a small molecule; wherein optionally the ● further comprises a linker that is bound to the Y. In preferred embodiments ▬ represents an oligonucleotide and ● represents a peptide. In preferred embodiments ▬ represents an oligonucleotide and ● represents a protein. In preferred embodiments ▬ represents an oligonucleotide and ● represents a protein tag. In preferred embodiments ▬ represents an oligonucleotide and ● represents an antibody. In preferred embodiments ▬ represents an oligonucleotide and ● represents an oligonucleotide. In preferred embodiments ▬ represents an oligonucleotide and ● represents a fluorophore such as $CY_5$ or EDANS. In preferred embodiments ▬ represents an oligonucleotide and ● represents biotin. In preferred embodiments ▬ represents an oligonucleotide and ● represents a small molecule. Optionally, in any one of these embodiments the ● further comprises a linker that is bound to the Y.

In preferred embodiments of any one of the processes of the invention, ▬ represents an oligonucleotide and ● represents a linker.

In preferred embodiments of any one of the processes of the invention, ● represents an amino acid, a peptide, a nucleotide or an oligonucleotide, wherein the amino acid, peptide, nucleotide or oligonucleotide is bound to a solid support. In some embodiments ● represents an amino acid or a peptide bound to a solid support. In some embodiments ● represents a nucleotide or an oligonucleotide bound to a solid support. In preferred embodiments ● represents a peptide bound to a solid support. As an advantage, the inventors have found that phosphonothiolates of the present invention are highly stable under acidic conditions which are typically used for cleavage of the peptide from the solid support, e.g. 90% trifluoroacetic acid (TFA). The solid support may be any solid support known to a person skilled in the art which is suitable for solid phase peptide synthesis, or any solid support which is suitable for solid phase oligonucleotide synthesis. Such solid supports are also known as resins. Illustrative examples for a solid support suitable for solid phase peptide synthesis include organic and inorganic supports such as a Merrifield polystyrene resin (copolymer from styrene and 1-2% divinylbenzene), polyacrylamide resins, TentaGel (a graft polymer where polythyleneglycol is grafted to polystyrene), Wang resin (typically based on crosslinked polystyrene, such as in a Merrifield resin), or porous glass having defined pore size as an example for an inorganic solid support. Illustrative examples for commercially available solid supports for solid phase peptide synthesis are Rink amide resins or NovaSyn®TGR resins supplied by Merck Millipore. Illustrative examples for a solid support suitable for solid phase oligonucleotide synthesis include glass having defined pore size (controlled pore glass, CPG) and polystyrene, such as macroporous polystyrene (MPPS). Optionally, in the foregoing embodiments where the amino acid, peptide, nucleotide or oligonucleotide is bound to a solid support, the ● further comprises a linker that is bound to the Y of the formulae disclosed herein, in particular of compounds (I), (III), (I*) and (III*). In addition, the linker is bound to the amino acid, peptide, nucleotide or oligonucleotide. Accordingly, the ● may have a structure of Linker-Amino Acid-Solid Support, Linker-Peptide-Solid Support, Linker-Nucleotide-Solid Support, or Linker-Oligonucleotide-Solid Support.

The "Linker" can be virtually any linker, and the linker is bound to the Y, said Y being, e.g. as set out herein with regard to a compound of formula (I), (I*), (III) or (III*), S (sulfur) or O (oxygen), preferably S. The Linker may be any linker known to a person skilled in the art, for example, a peptidic linker or a straight or branched hydrocarbon-based moiety. The linker can also comprise cyclic moieties. A peptidic linker may comprise, for example, 1 to 50, 1 to 40, 1 to 30, 1 to 20, 1 to 10, 1 to 5, 1 to 3, or 2, or 1 amino acid(s). If the linker is a hydrocarbon-based moiety, the main chain of the linker may comprise only carbon atoms but can also contain heteroatoms such as oxygen (O), nitrogen (N) or sulfur (S) atoms, and/or contain carbonyl groups (C=O). The linker may be, for example, a $C_1$-$C_{20}$ carbon atom chain or a polyether based chain such as a polyethylene glycol-based chain with —(O—$CH_2$—$CH_2$)-repeating units. In typical embodiments of hydrocarbon-based linkers, the linking moiety comprises between 1 to about 150, 1 to about 100, 1 to about 75, 1 to about 50, or 1 to about 40, or 1 to about 30, or 1 to about 20, including 2, 3, 4, 5, 6, 7, 8, 9, 10, 11, 12, 13, 14, 15, 16, 17, 18 and 19 main chain atoms. A person skilled in the art knows to select suitable linkers. For example, in some embodiments the linker may be

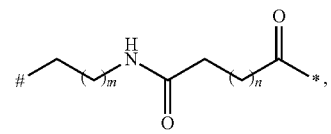

wherein # indicates the position of the Y, and * indicates the position of the amino acid, peptide, nucleotide or oligonucleotide, and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. The amino acid, peptide, nucleotide or oligonucleotide can be bound to the linker through an N (nitrogen) atom.

In preferred embodiments of any one of the processes of the invention, ▬ represents an amino acid, a peptide, a nucleotide or an oligonucleotide, wherein the amino acid, peptide, nucleotide or oligonucleotide is bound to a solid support. In some embodiments ▬ represents an amino acid or a peptide bound to a solid support. In some embodiments ▬ represents a nucleotide or an oligonucleotide bound to a solid support. In preferred embodiments ▬ represents a peptide bound to a solid support.

The present invention also relates to a process for the preparation of a compound of formula (I) or formula (I*), said method comprising:

(1) reacting a compound of formula (Ia)

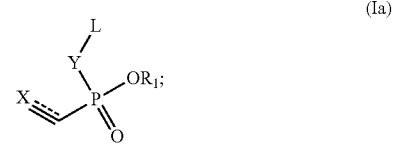

or
of formula (I*a)

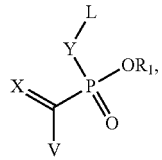
(I*a)

wherein
L represents a linker suitable for binding to an amino acid, a peptide, a nucleotide or an oligonucleotide; and
⫽, X, Y, V and R1 are as defined herein above and below,
with an amino acid, a peptide, a nucleotide or an oligonucleotide, wherein the amino acid, the peptide, the nucleotide or the oligonucleotide is bound to a solid support,
resulting in a compound of formula (Ib) or (I*b),

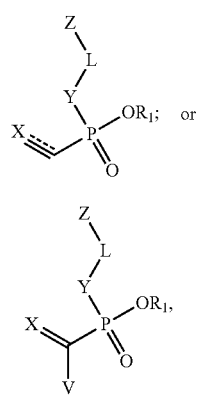
(Ib)

(I*b)

wherein Z represents the amino acid, the peptide, the nucleotide or the oligonucleotide, wherein the amino acid, the peptide, the nucleotide or the oligonucleotide is bound to the solid support; and
(II) cleaving the compound of formula (Ib) or formula (I*b) from the solid support to give the compound of formula (I) or formula (I*):

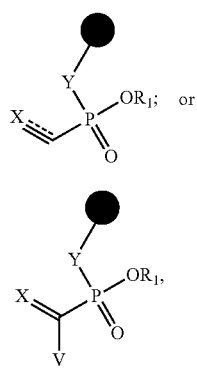
(I)

(I*)

wherein ● represents the amino acid, the peptide, the nucleotide or the oligonucleotide bound to the Y through the linker L, and
⫽, X, Y, V and R1 are as defined above in step (I). In some embodiments the linker L is

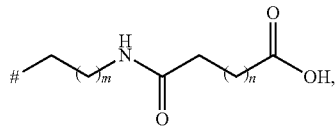

wherein # indicates the position of the Y, and m and n are each, independently, an integer of from 0 to 20, 0 to 15, 1 to 10, 1 to 8, 1 to 6, 1 to 4, 1 to 3, 1 to 2, or 1, preferably m is 1 and n is 1. The amino acid, peptide, nucleotide or oligonucleotide is bound to such linker through the carboxyl group. In some embodiments the compound of formula (Ia) or (I*a) is reacted with a peptide bound to a solid support or an oligonucleotide bound to a solid support, preferably the compound of formula (Ia) or (I*a) is reacted with a peptide bound to a solid support. In some embodiments the cleaving of step (II) is carried out under acidic conditions, e.g. using aqueous trifluoroacetic acid (e.g. 90% TFA). In this regard, the inventors have found that phosphonothiolates (Y=S) of the present invention are highly stable under acidic conditions, which are in particular used for cleavage of a peptide from a solid support. Optionally, in any one of these embodiments the process may further comprise reacting the compound of formula (I) or formula (I*) with a compound of formula (II) as defined herein above and below.

In an embodiment of a process according to the invention the

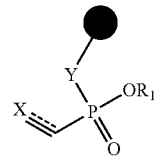

and the

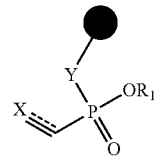

are in the same molecule. Accordingly, the present invention also relates to a process wherein a compound of formula (L)

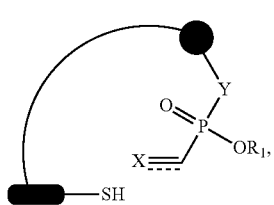
(L)

wherein the

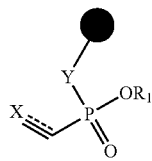

and the

are in the same molecule as indicated by the arc connecting the ● and the ⬛, is reacted to give a compound of formula (IIIa):

(IIIa)

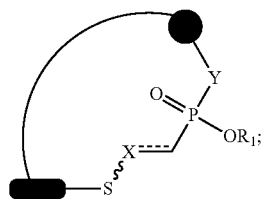

wherein ⫽ represents a bond if ⫽ in a compound of formula (XX) represents a double bond, and X represents $(R_3 R_4)C$; or ⫽ represents a double bond if ⫽ in a compound of formula (XX) represents a triple bond, and X represents $R_3$—C; and ⬛, ●, $R_1$, $R_3$, $R_4$ and Y are as defined herein above and below.

The present invention also relates to a process wherein a compound of formula (L*)

(XX*)

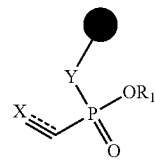

wherein the

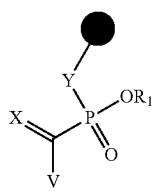

and the

are in the same molecule as indicated by the arc connecting the ● and the ⬛, is reacted to give a compound of formula (III*a):

(III*a)

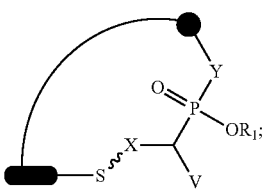

wherein X is $(R_3 R_4)C$, and ⬛, ●, V, $R_1$, $R_3$, $R_4$ and Y are as defined herein above and below.

In some embodiments the compound (L) having the

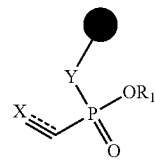

and the

in the same molecule is a peptide, such as for example the BCL9 peptide. Accordingly, the compound of formula (IIIa) obtained by the process may be a cyclic peptide, such as for example a cyclic peptide derived from the BCL9 peptide. In some embodiments the compound (L*) having the

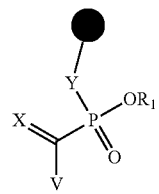

and the

in the same molecule is a peptide, such as for example the BCL9 peptide. Accordingly, the compound of formula (III*a) obtained by the process may be a cyclic peptide, such as for example a cyclic peptide derived from the BCL9 peptide.

All processes described herein for compounds of formula (I), (I*), (II), (III) and (III*) can be carried out analogously for compounds of formula (L), (L*), (IIIa) and (III*a).

Compounds

The present invention also relates to compounds obtainable or being obtained by any one of the processes described herein. Also, the present invention relates to compounds which are used in any one of the processes described herein, e.g. as starting materials or intermediates. In particular, the present invention also relates to compounds of formula (I), (I*), (III), (III*), (L), (L*), (IIIa) and (III*a).

Accordingly, the present invention also relates to a compound of formula (I)

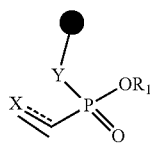

(I)

wherein
⫽ represents a double bond or triple bond;
X represents $R_3$—C when ⫽ is a triple bond;
X represents ($R_3$ $R_4$)C when ⫽ is a double bond;
Y represents S or O;
$R_1$ represents an optionally substituted aliphatic or aromatic residue;
$R_3$ represents H or $C_1$-$C_8$-alkyl;
$R_4$ represents H or $C_1$-$C_8$-alkyl; and
● represents an aliphatic or aromatic residue;

In some embodiments of the compound of formula (I) ⫽ represents a double bond, X represents ($R_3$ $R_4$)C, and $R_3$ and $R_4$ independently represent H or $C_1$-$C_8$-alkyl. Preferably, $R_3$ and $R_4$ independently represent H or $C_1$-$C_8$-alkyl, more preferably H or $C_1$-$C_6$-alkyl, even more preferably H or $C_1$-$C_4$-alkyl, and still more preferably H or $C_1$-$C_2$-alkyl. In preferred embodiments $R_3$ and R4 are the same. In preferred embodiments $R_3$ and $R_4$ are both H.

Alternatively, in some embodiments of the compound of formula (I) ⫽ represents a triple bond, X represents $R_3$—C, and $R_3$ represents H or $C_1$-$C_8$-alkyl. Preferably, $R_3$ represents H or $C_1$-$C_8$-alkyl, more preferably H or $C_1$-$C_6$-alkyl, even more preferably H or $C_1$-$C_4$-alkyl, and still more preferably H or $C_1$-$C_2$-alkyl. In preferred embodiments $R_3$ is H.

The present invention also relates to a compound of formula (I*)

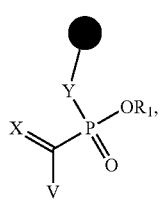

(I*)

wherein
V represents $C_1$-$C_8$-alkyl, preferably methyl, ethyl or propyl, more preferably methyl;
X represents ($R_3$ $R_4$)C;
Y represents S or O;
$R_1$ represents an optionally substituted aliphatic or aromatic residue;
$R_3$ represents H or $C_1$-$C_8$-alkyl;
$R_4$ represents H or $C_1$-$C_8$-alkyl; and
● represents an aliphatic or aromatic residue.

The present invention also relates to a compound of formula (III)

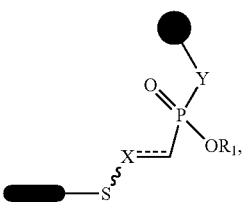

(III)

wherein
⫽ represents a bond and X represents ($R_3$ $R_4$)C; or
⫽ represents a double bond and X represents $R_3$—C;
Y represents S or O;
$R_1$ represents an optionally substituted aliphatic or aromatic residue;
$R_3$ represents H or $C_1$-$C_8$-alkyl;
$R_4$ represents H or $C_1$-$C_8$-alkyl; and
● represents an aliphatic or aromatic residue;
▬ represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system.

In some embodiments of the compound of formula (III), ⫽ represents a bond, X represents ($R_3$ $R_4$)C, and $R_3$ and $R_4$ independently represent H or $C_1$-$C_8$-alkyl. Preferably, $R_3$ and $R_4$ independently represent H or $C_1$-$C_6$-alkyl, more preferably H or $C_1$-$C_4$-alkyl, still more preferably H or $C_1$-$C_2$-alkyl. In preferred embodiments $R_3$ and $R_4$ are the same. In preferred embodiments $R_3$ and $R_4$ are both H.

Alternatively, in some embodiments of the compound of formula (III), ⫽ represents a double bond, X represents $R_3$—C, and $R_3$ represents H or $C_1$-$C_8$-alkyl. Preferably, $R_3$ represents H or $C_1$-$C_6$-alkyl, more preferably H or $C_1$-$C_4$-alkyl, still more preferably H or $C_1$-$C_2$-alkyl. In preferred embodiments $R_3$ is H.

The present invention also relates to a compound of formula (III*)

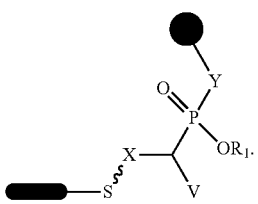

(III*)

wherein
X represents ($R_3$ $R_4$)C
Y represents S or O;
$R_1$ represents an optionally substituted aliphatic or aromatic residue;
$R_3$ represents H or $C_1$-$C_8$-alkyl;
$R_4$ represents H or $C_1$-$C_8$-alkyl;
V represents $C_1$-$C_8$-alkyl, preferably methyl, ethyl or propyl, more preferably methyl;
● represents an aliphatic or aromatic residue; and represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system.

In some embodiments of the compound of formula (III*), $R_3$ and $R_4$ independently represent H or $C_1$-$C_8$-alkyl. Preferably, $R_3$ and $R_4$ independently represent H or $C_1$-$C_6$-alkyl, more preferably H or $C_1$-$C_4$-alkyl, still more preferably H or $C_1$-$C_2$-alkyl. In preferred embodiments $R_3$ and $R_4$ are the same. In preferred embodiments $R_3$ and $R_4$ are both H.

In any one of a compound of formula (I), (I*), (III) or (III*) Y may be S (sulfur) or O (oxygen), i.e. when Y is S, compounds (I), (I*), (III) or (III*) represent phosphonothiolates, and when Y is O, compounds (I), (I*), (III) or (III*) represent phosphonates. Accordingly, in some embodiments Y is S. In some embodiments Y is O. As advantage, the inventors have shown that both phosphonothiolates and phosphonates are stable under physiologically relevant conditions. In preferred embodiments of any one of compounds (I), (I*), (III), or (III*) Y is S. It has been found that phosphonothiolates of formula (III) and (III*), wherein Y is S, are accessible by a faster thiol addition than the corresponding phosphonates. Such faster reaction rate is highly desired since thereby the conversion and the yield of the phosphonothiolate are increased.

In some embodiments of any one of compounds (I), (I*), (III) or (III*), $R_1$ represents $C_1$-$C_8$-alkyl optionally substituted with at least one of $(C_1$-$C_8$-alkoxy$)_n$ wherein n is 1, 2, 3, 4, 5 or 6, F, Cl, Br, I, —$NO_2$, —$N(C_1$-$C_8$-alkyl)H, —$NH_2$, —$N_3$, —$N(C_1$-$C_8$-alkyl)$_2$, =O, $C_3$-$C_8$-cycloalkyl, —S—S—($C_1$-$C_8$-alkyl), hydroxy-$(C_1$-$C_8$-alkoxy$)_n$ wherein n is 1, 2, 3, 4, 5 or 6, $C_2$-$C_8$-alkenyl or $C_2$-$C_8$-alkynyl.

In some embodiments of any one of compounds (I), (I*), (III) or (III*), $R_1$ represents optionally substituted phenyl such as

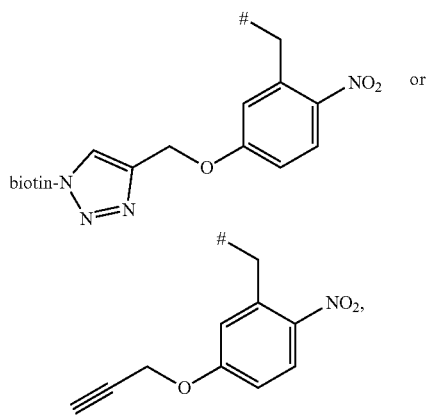

wherein # represents the position of O.

In some embodiments of any one of compounds (I), (I*), (III) or (III*), $R_1$ represents phenyl optionally independently substituted with at least one of $C_1$-$C_8$-alkyl, $(C_1$-$C_8$-alkoxy$)_n$ wherein n is 1, 2, 3, 4, 5 or 6, F, Cl, I, Br, —$NO_2$, —$N(C_1$-$C_8$-alkyl)H, —$NH_2$ or —$N(C_1$-$C_8$-alkyl)$_2$.

In some embodiments of any one of compounds (I), (I*), (III) or (III*), $R_1$ represents a 5- or 6-membered heteroaromatic system such as pyridyl.

In some embodiments of any one of compounds (I), (I*), (III) or (III*), $R_1$ represents $C_1$-$C_8$-alkyl, $C_1$-$C_8$-alkyl substituted with —S—S—($C_1$-$C_8$-alkyl), $C_1$-$C_8$-alkyl substituted with $(C_1$-$C_8$-alkoxy$)_n$ wherein n is 1, 2, 3, 4, 5 or 6, $C_1$-$C_8$-alkyl substituted with optionally substituted phenyl, or phenyl, or phenyl substituted with —$NO_2$.

In some embodiments of any one of compounds (I), (I*), (III) or (III*), $R_1$ represents methyl, ethyl, propyl or butyl, preferably methyl or ethyl.

In some embodiments of any one of compounds (I), (I*), (III) or (III*), $R_1$ represents an aliphatic or aromatic residue which is optionally substituted with —S—S—($C_1$-$C_8$-alkyl). In a preferred embodiment, $R_1$ represents

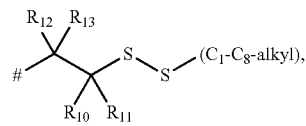

wherein $R_{10}$, $R_{11}$, $R_{12}$ and $R_{13}$ each independently represent hydrogen or $C_1$-$C_8$-alkyl; and # represents the position of O. In a more preferred embodiment $R_{10}$, $R_{11}$, $R_{12}$, and $R_{13}$ each independently represent hydrogen, methyl or ethyl. In a preferred embodiment $R_1$ represents

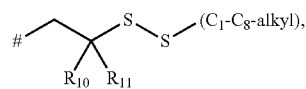

wherein $R_{10}$ and $R_{11}$ independently represent hydrogen or $C_1$-$C_8$-alkyl; and # represents the position of O. In a more preferred embodiment $R_{10}$ and $R_{11}$ independently represent hydrogen, methyl or ethyl. In a still more preferred embodiment, $R_1$ represents

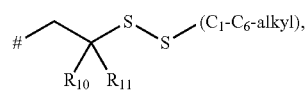

wherein $R_{10}$ and $R_{11}$ independently represent hydrogen, methyl or ethyl; and # represents the position of O. In some of these embodiments $R_{10}$ and $R_{11}$ are both hydrogen. In some of these embodiments $R_{10}$ is hydrogen and $R_{11}$ is $C_1$-$C_6$-alkyl. In some of these embodiments $R_{10}$ is hydrogen and $R_{11}$ is methyl or ethyl. In some of these embodiments $R_{10}$ and $R_{11}$ are the same. In a preferred embodiment, $R_1$ represents

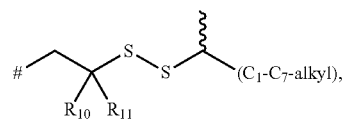

more preferably

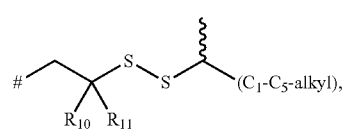

wherein $R_{10}$ and $R_{11}$ are as defined herein before. In a preferred embodiment $R_1$ represents

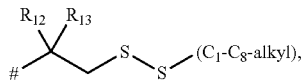

wherein $R_{12}$ and $R_{13}$ independently represent hydrogen or $C_1$-$C_8$-alkyl; and # represents the position of O. In a more preferred embodiment $R_{12}$ and $R_{13}$ independently represent hydrogen, methyl or ethyl. In a still more preferred embodiment, $R_1$ represents

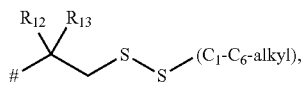

wherein $R_{12}$ and $R_{13}$ independently represent hydrogen, methyl or ethyl; and # represents the position of O. In some of these embodiments $R_{12}$ and $R_{13}$ are both hydrogen. In some of these embodiments $R_{12}$ is hydrogen and $R_{13}$ is $C_1$-$C_6$-alkyl. In some of these embodiments $R_{12}$ is hydrogen and $R_{13}$ is methyl or ethyl. In some of these embodiments $R_{12}$ and $R_{13}$ are the same.

In some embodiments of any one of compounds (I), (I*), (III) or (III*), $R_1$ represents $C_1$-$C_8$-alkyl substituted with phenyl, said phenyl being further substituted with

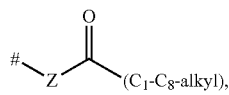

wherein Z is O or NH, and wherein # represents the position of said phenyl. In some embodiments Z is O. In some embodiments Z is NH. The $C_1$-$C_8$-alkyl in the

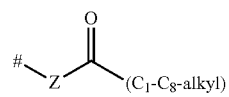

may be, for example, methyl, ethyl, propyl or butyl; preferably methyl, ethyl or propyl; more preferably methyl or ethyl; most preferably methyl. In a preferred embodiment $R_1$ represents

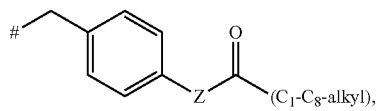

wherein the $C_1$-$C_8$-alkyl may be, for example, methyl, ethyl, propyl or butyl; preferably methyl, ethyl or propyl; more preferably methyl or ethyl; most preferably methyl; wherein Z is O or NH, and wherein # represents the position of O. In another preferred embodiment $R_1$ represents

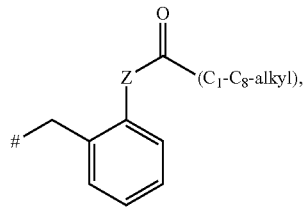

wherein the $C_1$-$C_8$-alkyl may be, for example, methyl, ethyl, propyl or butyl; preferably methyl, ethyl or propyl; more preferably methyl or ethyl; most preferably methyl; wherein Z is O or NH, and wherein # represents the position of O.

In some embodiments of any one of compounds (I), (I*), (III) or (III*), $R_1$ represents $C_1$-$C_8$-alkyl substituted with phenyl, said phenyl being further substituted with

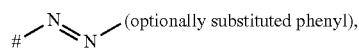

and wherein # represents the position of said phenyl. In some embodiments $R_1$ represents $C_1$-$C_8$-alkyl substituted with phenyl, said phenyl being further substituted with

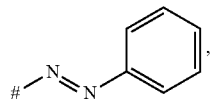

wherein # represents the position of said phenyl. In a preferred embodiment $R_1$ represents

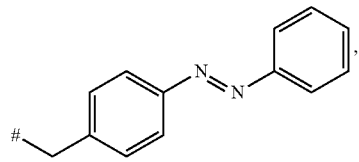

wherein # represents the position of O. In another preferred embodiment $R_1$ represents

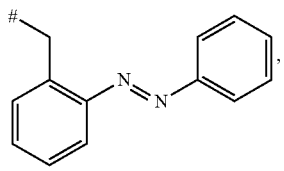

wherein # represents the position of O.

In some embodiments of any one of compounds (I), (I*), (III) or (III*), $R_1$ represents

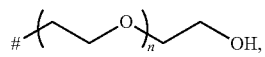

where # represents the position of O, with n=0, 1, 2, 3, 4, 5, 6, 7, 8, 9 or 10, preferably with n=0, 1, 2, 3, 4, 5, 6; more preferably with n=0, 1, 2, 3, 4; even more preferably with n=0, 1, 2, 3, even further preferably with n=0, 1, 2, even still further preferably with n=0, 1; and most preferably with n=1.

In some embodiments of any one of compounds (I), (I*), (III) or (III*), $R_1$ represents an aliphatic or aromatic residue which is optionally substituted with $C_2$-$C_8$-alkynyl. In a preferred embodiment $R_1$ is homopropargyl.

In some embodiments of any one of compounds (I), (I*), (III) or (III*), $R_1$ represents

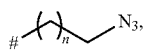

wherein # represents the position of O, with n=0, 1, 2, 3, 4, 5, 6, 7, 8, 9 or 10, preferably with n=0, 1, 2, 3, 4, 5, 6; more preferably with n=0, 1, 2, 3, 4; even more preferably with n=0, 1, 2, 3, even further preferably with n=0, 1, 2, even still further preferably with n=0, 1; and most preferably with n=1, i.e. when n is 1, $R_1$ represents

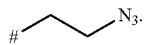

In some embodiments of any one of compounds (I), (I*), (III) or (III*), ● represents a small molecule; wherein optionally the ● further comprises a linker that is bound to the Y.

In some embodiments of any one of compounds (I), (I*), (III) or (III*), ● represents a small molecule such as, for example, an optionally substituted $C_1$-$C_8$-alkyl, —$CH_2$-phenyl,

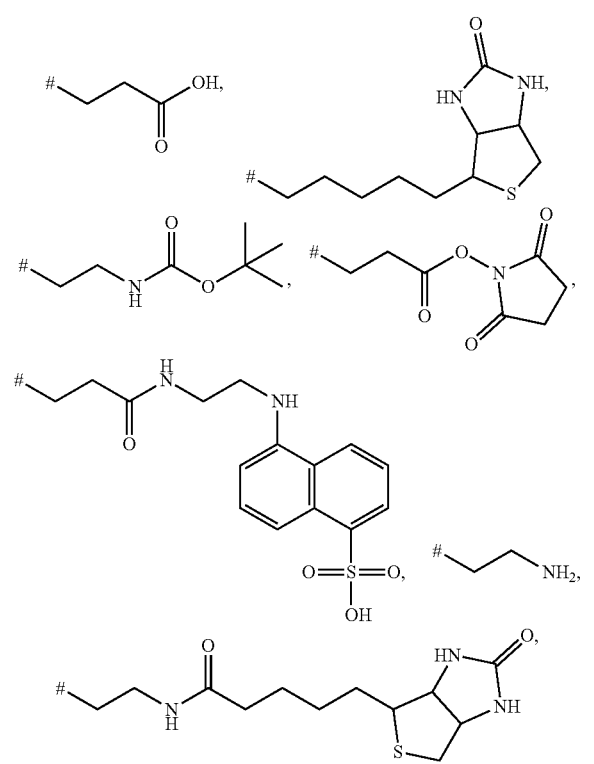

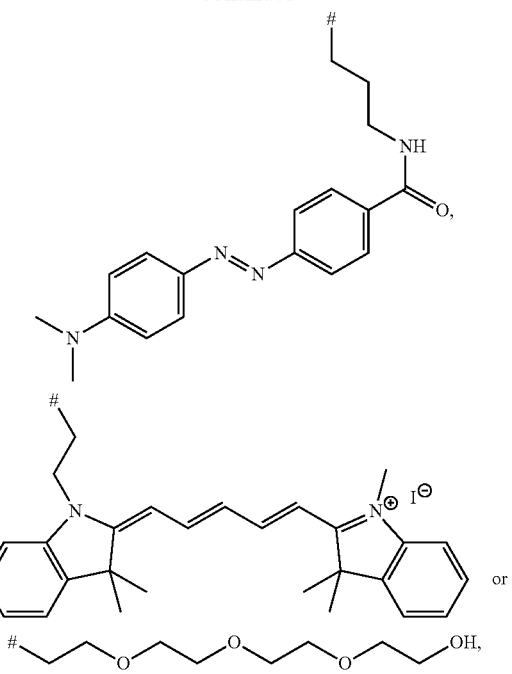

wherein # indicates the position of the Y. In preferred embodiments ● represents an optionally substituted $C_1$-$C_8$-alkyl, preferably an optionally substituted $C_1$-$C_6$-alkyl, more preferably an optionally substituted $C_1$-$C_4$-alkyl, even more preferably $C_1$-$C_2$-alkyl. In some embodiments ● represents —$CH_2$-phenyl, i.e. benzyl. In preferred embodiments ● represents

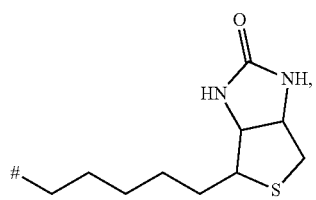

wherein # indicates the position of the Y. In preferred embodiments ● represents

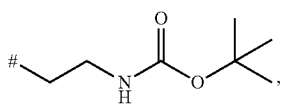

wherein # indicates the position of the Y. In preferred embodiments ● represents

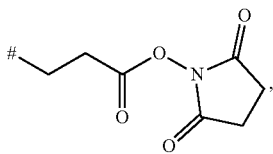

wherein # indicates the position of the Y. In preferred embodiments ● represents

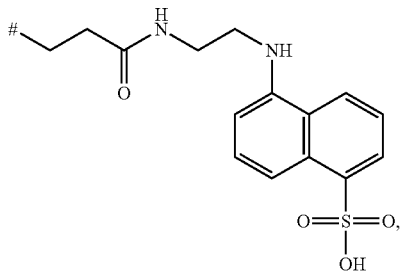

wherein # indicates the position of the Y. In preferred embodiments ● represents

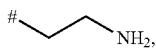

wherein # indicates the position of the Y. In preferred embodiments ● represents

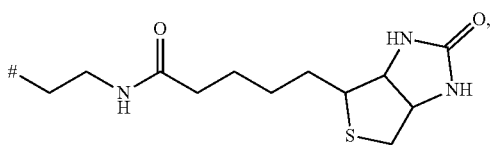

wherein # indicates the position of the Y. In some embodiments ● represents

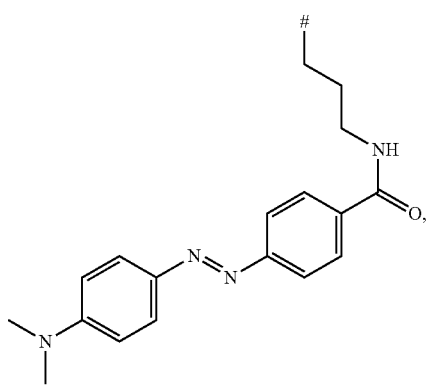

wherein # indicates the position of the Y. In some embodiments ● represents

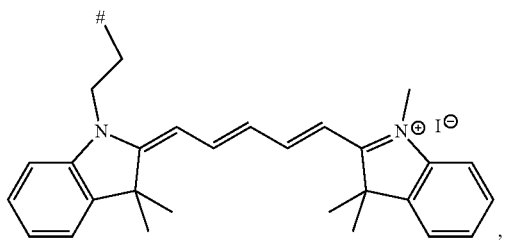

wherein # indicates the position of the Y. In some embodiments ● represents

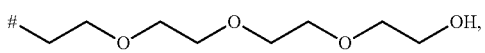

wherein # indicates the position of the Y.

In some embodiments of any one of compounds (I), (I*), (III) or (III*), ● represents an optionally substituted phenyl, preferably

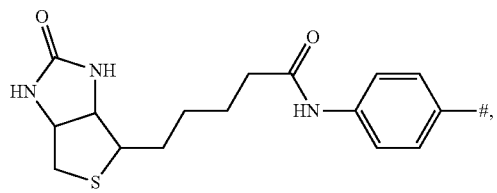

wherein # indicates the position of Y.

In some embodiments of any one of compounds (I), (I*), (III) or (III*), ● represents a radioactive or non-radioactive nuclide, biotin, a reporter enzyme, a nucleotide, an oligonucleotide, a fluorophore such as $CY_5$ or EDANS, an amino acid, a peptide, an optionally substituted 5- or 6-membered heteroaromatic system; wherein optionally the ● further comprises a linker that is bound to the Y. Accordingly, in some embodiments ● represents a radioactive or non-radioactive nuclide. In some preferred embodiments ● represents biotin. In some embodiments ● represents a reporter enzyme. In some preferred embodiments ● represents a nucleotide. In some preferred embodiments ● represents an oligonucleotide. In some preferred embodiments ● represents a fluorophore such as $CY_5$ or EDANS. In some preferred embodiments ● represents an amino acid. In some preferred embodiments ● represents a peptide. In some preferred embodiments ● represents an optionally substituted 5- or 6-membered heteroaromatic system. Optionally, in any one of these embodiments the ● further comprises a linker that is bound to the Y.

In some embodiments of any one of compounds (I), (I*), (III) or (III*), ● represents a cyclic RGD peptide of structure (VII) (c(RDGfK))

(VII)

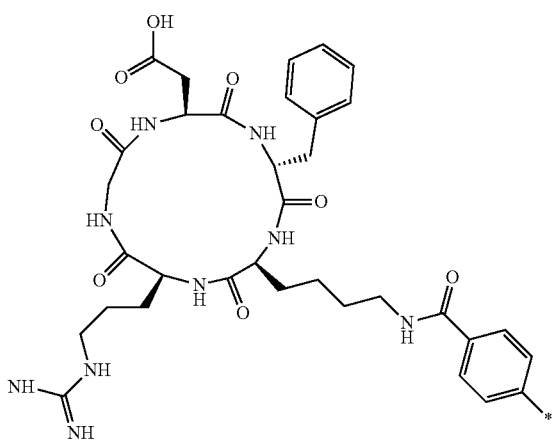

wherein * represents the position of the Y.

In some embodiments of any one of compounds (I), (I*), (III) or (III*), ● represents phenyl, optionally substituted with one, two, three, four or five substituents independently selected from the group consisting of $C_1$-$C_8$-alkyl, $C_1$-$C_8$-alkoxy, halogen, —CN, —$NO_2$, —$NH_2$, —N($C_1$-$C_8$-alkyl), —N($C_1$-$C_8$-alkyl)$_2$-COOH, —COO($C_1$-$C_8$-alkyl), —O—C(O)—($C_1$-$C_8$-alkyl), —C(O)N—($C_1$-$C_8$-alkyl), —N(H)—C(O)—($C_1$-$C_8$-alkyl) preferably optionally substituted with one substituent selected from the group consisting of $C_1$-$C_8$-alkoxy, —COOH, —COO($C_1$-$C_8$-alkyl and $NO_2$.

In some embodiments of any one of compounds (I), (I*), (III) or (III*), ● represents $C_1$-$C_8$-alkyl, optionally substituted with at least one substituent selected from the group consisting of $C_3$-$C_8$-cycloalkyl; heterocyclyl with 3 to 8 ring members wherein the heteroatom(s) are selected from N, O, S; $C_1$-$C_8$-alkoxy; halogen; —CN; —$NO_2$; —$NH_2$; —N($C_1$-$C_8$-alkyl); —N($C_1$-$C_8$-alkyl)$_2$; —COOH; —COO($C_1$-$C_8$-alkyl); —O—C(O)—($C_1$-$C_8$-alkyl); —$CONH_2$; —C(O)N($C_1$-$C_8$-alkyl)$_2$; —C(O)NH—($C_1$-$C_8$-alkyl); —N(H)—C(O)—($C_1$-$C_8$-alkyl), preferably $C_1$-$C_8$-alkoxy, —COOH, —COO($C_1$-$C_8$-alkyl and $NO_2$, phenyl or a heteroaromatic system, a monosaccharide, a polysaccharide, a peptide, a protein, an antibody, a nucleotide, an oligonucleotide, a polymer, an amino acid, a fluorophor, a protein tag (substituent $1^{st}$ generation), wherein a substituent $1^{st}$ generation may again optionally be substituted with $C_3$-$C_8$-cycloalkyl; heterocyclyl with 3 to 8 ring members wherein the heteroatom(s) are selected from N, O, S; $C_1$-$C_8$-alkoxy; halogen; —CN; —$NO_2$; —$NH_2$; —N($C_1$-$C_8$-alkyl); —N($C_1$-$C_8$-alkyl)$_2$; —COOH; —COO($C_1$-$C_8$-alkyl); —O—C(O)—($C_1$-$C_8$-alkyl); —$CONH_2$; —C(O)N($C_1$-$C_8$-alkyl)$_2$; —C(O)NH—($C_1$-$C_8$-alkyl); —N(H)—C(O)—($C_1$-$C_8$-alkyl), preferably $C_1$-$C_8$-alkoxy, —COOH, —COO($C_1$-$C_8$-alkyl and $NO_2$, phenyl or a heteroaromatic system (substituents $2^{nd}$ generation) and wherein a substituent $2^{nd}$ generation may be substituted again by at least one substituent selected from the same group and wherein such substitution may go until generation 3, 4, 5, 6, 7, 8, 9 or 10

In some embodiments of any one of compounds (I), (I*), (III) or (III*), ● represents an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system; wherein optionally the ● further comprises a linker that is bound to the Y. Accordingly, in preferred embodiments ● represents an amino acid. In preferred embodiments ● represents a peptide. In preferred embodiments ● represents a protein. In preferred embodiments ● represents an antibody. In preferred embodiments ● represents a nucleotide. In preferred embodiments ● represents an oligonucleotide. In some embodiments ● represents a saccharide. In some embodiments ● represents a polysaccharide. In some embodiments ● represents a polymer. In some embodiments ● represents an optionally substituted $C_1$-$C_8$-alkyl, preferably an optionally substituted $C_1$-$C_6$-alkyl, more preferably an optionally substituted $C_1$-$C_4$-alkyl, still more preferably an optionally substituted $C_1$-$C_2$-alkyl. In some embodiments ● represents an optionally substituted phenyl. In some embodiments ● represents an optionally substituted aromatic 5- or 6-membered heterocyclic system. Optionally, in any one of these embodiments the ● further comprises a linker that is bound to the Y.

In preferred embodiments of any one of compounds (I), (I*), (III) or (III*), ● represents an amino acid, a peptide, a protein, an antibody, a nucleotide, or an oligonucleotide; wherein optionally the ● further comprises a linker that is bound to the Y. In more preferred embodiments ● represents a peptide, a protein, an antibody, or an oligonucleotide; wherein optionally the ● further comprises a linker that is bound to the Y. In preferred embodiments ● represents an amino acid. In preferred embodiments ● represents a peptide. In preferred embodiments ● represents a protein. In preferred embodiments ● represents an antibody. In preferred embodiments ● represents a nucleotide. In preferred embodiments ● represents an oligonucleotide. Optionally, in any one of these embodiments the ● further comprises a linker that is bound to the Y.

In preferred embodiments of any one of compounds (I), (I*), (III) or (III*), ● represents a drug, a protein tag, or a fluorophore such as $CY_5$ or EDANS, biotin, a protein, a peptide, an antibody or an oligonucleotide; wherein optionally the ● further comprises a linker that is bound to the Y. Accordingly, in preferred embodiments ● represents a drug. In preferred embodiments ● represents a protein tag. In preferred embodiments ● represents a linker-drug conjugate. In preferred embodiments ● represents a fluorophore such as $CY_5$ or EDANS. In preferred embodiments ● represents biotin. In preferred embodiments ● represents a protein. In preferred embodiments ● represents a peptide. In preferred embodiments ● represents an antibody. In preferred embodiments ● represents an oligonucleotide. Optionally, in any one of these embodiments the ● further comprises a linker that is bound to the Y.

In preferred embodiments of any one of compounds (I), (I*), (III) or (III*), ● represents a linker or a linker-drug conjugate. In preferred embodiments ● represents a linker, such as e.g. a linker comprising VC-PAB, VA-PAB, KF-PAB, or VK-PAB, preferably a linker comprising VC-PAB. In preferred embodiments ● represents a linker-drug conjugate, such as e.g.

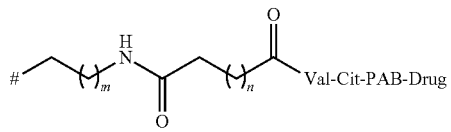

,

-continued

[Structure: # —(CH₂)ₘ—NH—C(=O)—(CH₂)ₙ—C(=O)—Val-Ala-PAB-Drug]

,

[Structure: # —(CH₂)ₘ—NH—C(=O)—(CH₂)ₙ—C(=O)—Lys-Cit-PAB-Drug]

, or

[Structure: # —(CH₂)ₘ—NH—C(=O)—(CH₂)ₙ—C(=O)—Val-Lys-PAB-Drug]

, preferably

[Structure: # —(CH₂)ₘ—NH—C(=O)—(CH₂)ₙ—C(=O)—Val-Cit-PAB-Drug], wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1.

More preferably, the linker drug conjugate is

[Structure: # —(CH₂)ₘ—NH—C(=O)—(CH₂)ₙ—C(=O)—Val-Cit-PAB-MMAE],

[Structure: # —(CH₂)ₘ—NH—C(=O)—(CH₂)ₙ—C(=O)—Val-Cit-PAB-MMAF],

[Structure: # —(CH₂)ₘ—NH—C(=O)—(CH₂)ₙ—C(=O)—Val-Ala-PAB-MMAE],

[Structure: # —(CH₂)ₘ—NH—C(=O)—(CH₂)ₙ—C(=O)—Val-Ala-PAB-MMAF],

[Structure: # —(CH₂)ₘ—NH—C(=O)—(CH₂)ₙ—C(=O)—Lys-Phe-PAB-MMAE],

[Structure: # —(CH₂)ₘ—NH—C(=O)—(CH₂)ₙ—C(=O)—Lys-Phe-PAB-MMAF],

[Structure: # —(CH₂)ₘ—NH—C(=O)—(CH₂)ₙ—C(=O)—Val-Lys-PAB-MMAE], or

[Structure: # —(CH₂)ₘ—NH—C(=O)—(CH₂)ₙ—C(=O)—Val-Lys-PAB-MMAF], still more preferably

[Structure: # —(CH₂)ₘ—NH—C(=O)—(CH₂)ₙ—C(=O)—Val-Cit-PAB-MMAE] or

[Structure: # —(CH₂)ₘ—NH—C(=O)—(CH₂)ₙ—C(=O)—Val-Cit-PAB-MMAF], most preferably

[Structure: # —(CH₂)ₘ—NH—C(=O)—(CH₂)ₙ—C(=O)—Val-Cit-PAB-MMAE], wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1.

According to any one of compounds (III) or (III*), ▬ may represent an amino acid, a peptide, a protein, an antibody, a nucleotide, an oligonucleotide, a saccharide, a polysaccharide, a polymer, an optionally substituted $C_1$-$C_8$-alkyl, an optionally substituted phenyl, or an optionally substituted aromatic 5- or 6-membered heterocyclic system. In preferred embodiments ▬ represents an amino acid, a peptide, a protein, an antibody, a nucleotide or an oligonucleotide. In more preferred embodiments ▬ represents a peptide, a protein, an antibody or an oligonucleotide. In preferred embodiments ▬ represents an amino acid. In preferred embodiments ▬ represents a peptide. In preferred embodiments ▬ represents a protein. In preferred embodiments ▬ represents an antibody. In preferred embodiments ▬ represents a nucleotide. In preferred embodiments ▬ represents an oligonucleotide. In some embodiments ▬ represents a saccharide. In some embodiments ▬ represents a polysaccharide. In some embodiments ▬ represents a polymer. In some embodiments ▬ represents an optionally substituted $C_1$-$C_8$-alkyl, preferably an optionally substituted $C_1$-$C_6$-alkyl, more preferably an optionally substituted $C_1$-$C_4$-alkyl, still more preferably an optionally substituted $C_1$-$C_2$-alkyl. In some embodiments ▬ represents an optionally substituted $C_3$-$C_8$-alkyl, preferably an optionally substituted $C_3$-$C_6$-alkyl, more preferably an optionally substituted $C_3$-$C_4$-alkyl. In some embodiments ▬ represents an optionally substituted $C_5$-$C_8$-alkyl, preferably an optionally substituted $C_6$-$C_7$-alkyl. In some embodiments ▬ represents an optionally substituted phenyl. In some embodiments ⬛ represents an optionally substituted aromatic 5- or 6-membered heterocyclic system.

In preferred embodiments of any one of compounds (III) or (III*), ⬛ represents an antibody, preferably an IgG antibody, more preferably a Cetuximab or a Trastuzumab or a Brentuximab; a protein, preferably a GFP protein or eGFP-protein, an albumin, a tripeptide, preferably a peptide of formula (VIII)

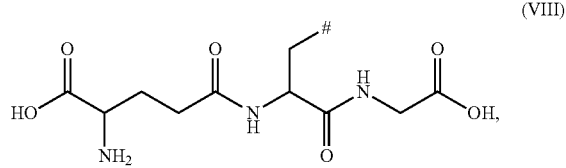

or of formula (IX)

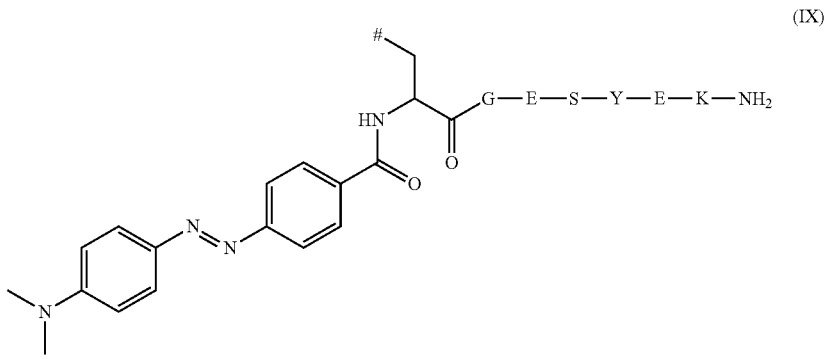

wherein # represents the position of S. Accordingly, in preferred embodiments ⬛ represents an antibody. In more preferred embodiments the antibody is an IgG antibody, even more preferably a Cetuximab or a Trastuzumab or a Brentuximab. In preferred embodiments ⬛ represents a protein, more preferably a GFP protein or eGFP-protein. In preferred embodiments ⬛ represents an albumin. In preferred embodiments ⬛ represents a tripeptide. In preferred embodiments ⬛ represents a peptide of formula (VIII)

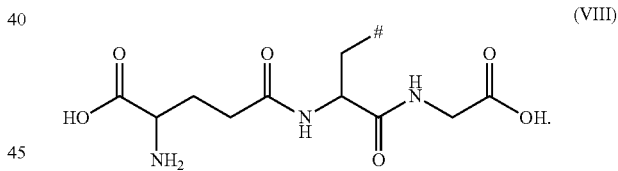

In preferred embodiments ⬛ represents a peptide of formula (IX)

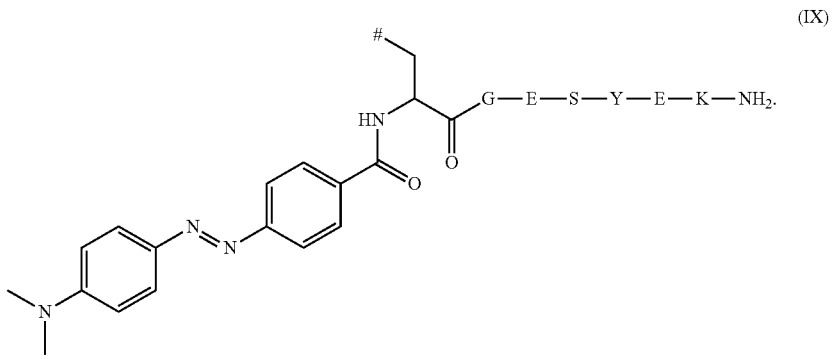

In preferred embodiments of any one of compounds (III) or (III*), ▬ represents an antibody (e.g. a Cetuximab, a trastuzumab, or a Brentuximab) and ● represents a protein tag, or a fluorophore such as $CY_5$ or EDANS, biotin, a peptide, a protein, an oligonucleotide, or a small molecule; wherein optionally the ● further comprises a linker that is bound to the Y. Accordingly, in preferred embodiments ▬ represents an antibody and ● represents a protein tag. In preferred embodiments ▬ represents an antibody and ● represents a fluorophore such as $CY_5$ or EDANS. In preferred embodiments ▬ represents an antibody and ● represents biotin. In preferred embodiments ▬ represents an antibody and ● represents a peptide. In preferred embodiments ▬ represents an antibody and ● represents a protein. In preferred embodiments ▬ represents an antibody and ● represents an oligonucleotide. In preferred embodiments ▬ represents an antibody and ● represents a small molecule. Optionally, in any one of these embodiments the ● further comprises a linker that is bound to the Y.

In preferred embodiments of any one of compounds (III) or (III*), ▬ represents a protein (e.g. a GFP protein or eGFP protein) and ● represents a protein tag, or a fluorophore such as $CY_5$ or EDANS, biotin, a peptide, an antibody, a protein, an oligonucleotide, or a small molecule; wherein optionally the ● further comprises a linker that is bound to the Y. Accordingly, in preferred embodiments ▬ represents a protein and ● represents a protein tag. In preferred embodiments ▬ represents a protein and ● represents a fluorophore such as $CY_5$ or EDANS. In preferred embodiments ▬ represents a protein and ● represents biotin. In preferred embodiments ▬ represents a protein and ● represents a peptide. In preferred embodiments ▬ represents a protein and ● represents an antibody. In preferred embodiments ▬ represents a protein and ● represents a protein. In preferred embodiments ▬ represents a protein and ● represents an oligonucleotide. In preferred embodiments ▬ represents a protein and ● represents a small molecule. Optionally, in any one of these embodiments the ● further comprises a linker that is bound to the Y.

In preferred embodiments of any one of compounds (III) or (III*), ▬ represents a peptide and ● represents a protein tag, or a fluorophore such as $CY_5$ or EDANS, biotin, a peptide, an antibody, a protein, an oligonucleotide, or a small molecule; wherein optionally the ● further comprises a linker that is bound to the Y. Accordingly, in preferred embodiments ▬ represents a peptide and ● represents a protein tag. In preferred embodiments ▬ represents a peptide and ● represents a fluorophore such as $CY_5$ or EDANS. In preferred embodiments ▬ represents a peptide and ● represents biotin. In preferred embodiments ▬ represents a peptide and ● represents a peptide. In preferred embodiments ▬ represents a peptide and ● represents an antibody. In preferred embodiments ▬ represents a peptide and ● represents a protein. In preferred embodiments ▬ represents a peptide and ● represents an oligonucleotide. In preferred embodiments ▬ represents a peptide and ● represents a small molecule. Optionally, in any one of these embodiments the ● further comprises a linker that is bound to the Y.

In preferred embodiments of any one of compounds (III) or (III*), ▬ represents an amino acid and ● represents a protein tag, or a fluorophore such as $CY_5$ or EDANS, biotin, a peptide, a protein, an oligonucleotide, or a small molecule; wherein optionally the ● further comprises a linker that is bound to the Y. Accordingly, in preferred embodiments ▬ represents an amino acid and ● represents a protein tag. In preferred embodiments ▬ represents an amino acid and ● represents a fluorophore such as $CY_5$ or EDANS. In preferred embodiments ▬ represents an amino acid and ● represents biotin. In preferred embodiments ▬ represents an amino acid and ● represents a peptide. In preferred embodiments ▬ represents an amino acid and ● represents a protein. In preferred embodiments ▬ represents an amino acid and ● represents an oligonucleotide. In preferred embodiments ▬ represents an amino acid and ● represents a small molecule. Optionally, in any one of these embodiments the ● further comprises a linker that is bound to the Y.

In preferred embodiments of any one of compounds (III) or (III*), ▬ represents an antibody (e.g. a Cetuximab, a Trastuzumab, or a Brentuximab) and ● represents a linker, a drug, or a linker-drug conjugate. Accordingly, in preferred embodiments ▬ represents an antibody and ● represents a linker, such as e.g. a linker comprising VC-PAB, VA-PAB, KF-PAB, or VK-PAB, preferably a linker comprising VC-PAB. In preferred embodiments ▬ represents an antibody and ● represents a drug. In preferred embodiments ▬ represents an antibody and ● represents a linker-drug conjugate, such as e.g.

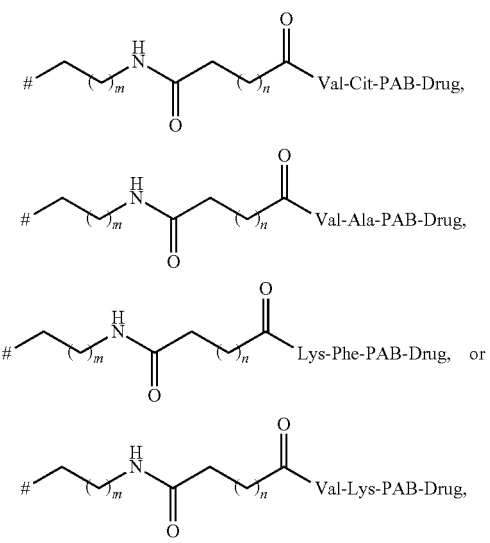

preferably

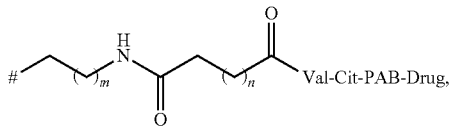

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. In more preferred embodiments ▬ represents an antibody and ● represents a linker-drug conjugate such as e.g.

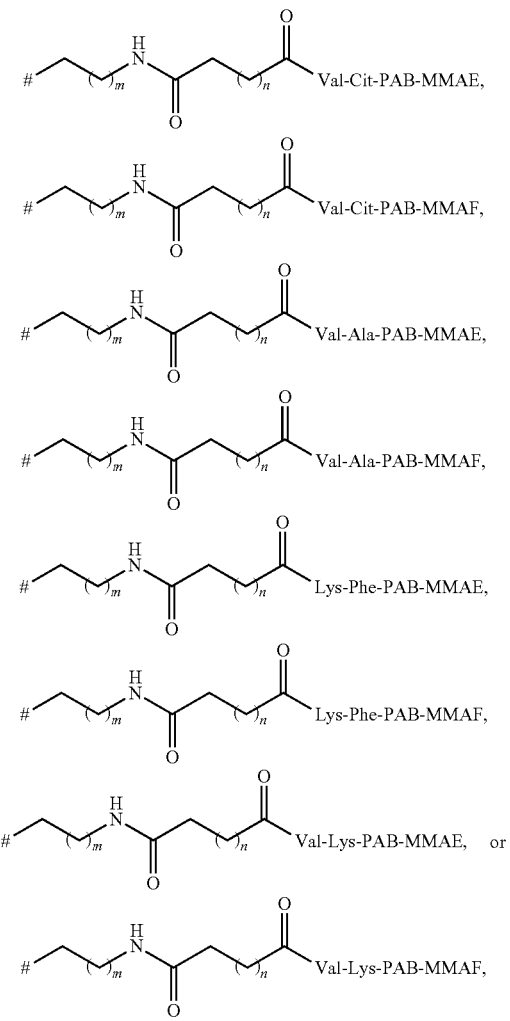

still more preferably

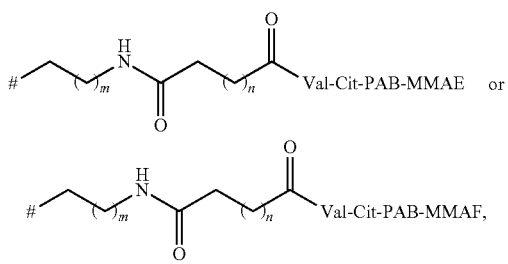

most preferably

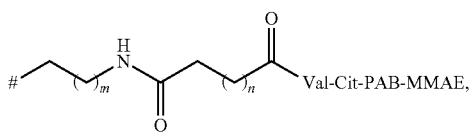

wherein # indicates the position of the Y (O (oxygen) or S (sulfur), preferably S), and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. In any one of these embodiments the antibody may be a Cetuximab, a Trastuzumab or a Brentuximab, preferably a Brentuximab.

In preferred embodiments of any one of compounds (III) or (III*), ▬ represents a nucleotide and ● represents a peptide, a protein, a protein tag, an antibody, an oligonucleotide, a fluorophore such as $CY_5$ or EDANS, biotin, or a small molecule; wherein optionally the ● further comprises a linker that is bound to the Y. In preferred embodiments ▬ represents a nucleotide and ● represents a peptide. In preferred embodiments ▬ represents a nucleotide and ● represents a protein. In preferred embodiments ▬ represents a nucleotide and ● represents a protein tag. In preferred embodiments ▬ represents a nucleotide and ● represents an antibody. In preferred embodiments ▬ represents a nucleotide and ● represents an oligonucleotide. In preferred embodiments ▬ represents a nucleotide and ● represents a fluorophore such as $CY_5$ or EDANS. In preferred embodiments ▬ represents a nucleotide and ● represents biotin. In preferred embodiments ▬ represents a nucleotide and ● represents a small molecule. Optionally, in any one of these embodiments the ● further comprises a linker that is bound to the Y.

In preferred embodiments of any one of compounds (III) or (III*) ▬ represents a nucleotide and ● represents a linker.

In preferred embodiments of any one of compounds (III) or (III*), ▬ represents an oligonucleotide and ● represents a peptide, a protein, a protein tag, an antibody, an oligonucleotide, a fluorophore such as $CY_5$ or EDANS, biotin, or a small molecule; wherein optionally the ● further comprises a linker that is bound to the Y. Accordingly, in preferred embodiments ▬ represents an oligonucleotide and ● represents a peptide. In preferred embodiments ▬ represents an oligonucleotide and ● represents a protein. In preferred embodiments ▬ represents an oligonucleotide and ● represents a protein tag. In preferred embodiments ▬ represents an oligonucleotide and ● represents an antibody. In preferred embodiments ▬ represents an oligonucleotide and ● represents an oligonucleotide. In preferred embodiments ▬ represents an oligonucleotide and ● represents a fluorophore such as $CY_5$ or EDANS. In preferred embodiments ▬ represents an oligonucleotide and ● represents biotin. In preferred embodiments ▬ represents an oligonucleotide and ● represents a small molecule. Optionally, in any one of these embodiments the ● further comprises a linker that is bound to the Y.

In preferred embodiments of any one of compounds (III) or (III*) ▬ represents an oligonucleotide and ● represents a linker.

In preferred embodiments of any one of compounds (I), (I*), (III) or (III*), ● represents an amino acid, a peptide, a nucleotide or an oligonucleotide, wherein the amino acid, peptide, nucleotide or oligonucleotide is bound to a solid support. In some embodiments the compound is a compound of formula (I) or a compound of formula (I*). In some embodiments ● represents an amino acid or a peptide bound to a solid support. In some embodiments ● represents a nucleotide or an oligonucleotide bound to a solid support. In preferred embodiments ● represents a peptide bound to a solid support. As an advantage, the inventors have found that phosphonothiolates (Y=S) of the present invention are highly stable under acidic conditions which are typically used for cleavage of the peptide from the solid support, e.g. 90% trifluoroacetic acid (TFA). The solid support may be any solid support known to a person skilled in the art which is suitable for solid phase peptide synthesis, or any solid support which is suitable for solid phase oligonucleotide synthesis, as e.g. described herein above in the context of the process. Optionally, in the foregoing embodiments where the amino acid, peptide, nucleotide or oligonucleotide is bound to a solid support, the ● further comprises a linker that is bound to the Y of the formulae disclosed herein, in particular of compounds (I), (III), (I*) and (III*). In addition, the linker is bound to the amino acid, peptide, nucleotide or oligonucleotide. Accordingly, the ● may have a structure of Linker-Amino Acid-Solid Support, Linker-Peptide-Solid Support, Linker-Nucleotide-Solid Support, or Linker-Oligonucleotide-Solid Support. The "Linker" can be virtually any linker, and the linker is bound to the Y, said Y being, e.g. as set out herein with regard to a compound of formula (I), (I*), (III) or (III*), S (sulfur) or O (oxygen), preferably S. The Linker may be any linker known to a person skilled in the art, for example, a peptidic linker or a straight or branched hydrocarbon-based moiety. The linker can also comprise cyclic moieties. A peptidic linker may comprise, for example, 1 to 50, 1 to 40, 1 to 30, 1 to 20, 1 to 10, 1 to 5, 1 to 3, or 2, or 1 amino acid(s). If the linker is a hydrocarbon-based moiety, the main chain of the linker may comprise only carbon atoms but can also contain heteroatoms such as oxygen (O), nitrogen (N) or sulfur (S) atoms, and/or contain carbonyl groups (C=O). The linker may be, for example, a $C_1$-$C_{20}$ carbon atom chain or a polyether based chain such as a polyethylene glycol-based chain with —(O—$CH_2$—$CH_2$)— repeating units. In typical embodiments of hydrocarbon-based linkers, the linking moiety comprises between 1 to about 150, 1 to about 100, 1 to about 75, 1 to about 50, or 1 to about 40, or 1 to about 30, or 1 to about 20, including 2, 3, 4, 5, 6, 7, 8, 9, 10, 11, 12, 13, 14, 15, 16, 17, 18 and 19 main chain atoms. A person skilled in the art knows to select suitable linkers. For example, in some embodiments the linker may be

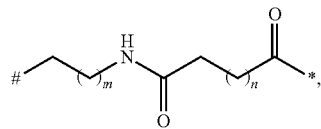

wherein # indicates the position of the Y, and * indicates the position of the amino acid, peptide, nucleotide or oligonucleotide, and m and n are each, independently, an integer of e.g. from 0 to 20, 0 to 15, 1 to 10, 1 to 8, 1 to 6, 1 to 4, 1 to 3, 1 to 2, or 1, preferably m is 1 and n is 1. The amino acid, peptide, nucleotide or oligonucleotide can be bound to the linker through an N (nitrogen) atom.

In preferred embodiments of any one of compounds (I), (I*), (III) or (III*), ● represents an amino acid, a peptide, a nucleotide or an oligonucleotide, wherein the amino acid, peptide, nucleotide or oligonucleotide is bound to a solid support. In some embodiments ● represents an amino acid or a peptide bound to a solid support. In some embodiments ● represents a nucleotide or an oligonucleotide bound to a solid support. In preferred embodiments ● represents a peptide bound to a solid support.

The present invention also relates to a kit comprising a solid support, and a compound of formula (I)

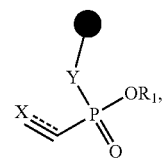

and/or a compound of formula (I*)

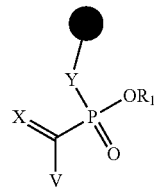

wherein ● is a linker suitable for binding to an amino acid, a peptide, a nucleotide or an oligonucleotide; and wherein ⌇, $R_1$, X, Y, and V are as defined herein above and below. Such kit is suitable for solid phase peptide synthesis and/or solid phase oligonucleotide synthesis. Preferably, the kit may be used for solid phase peptide synthesis, since the inventors have found that phosphonothiolates (Y=S) of the present invention are highly stable under acidic conditions which are typically used for cleavage of the peptide from the solid support, e.g. 90% trifluoroacetic acid (TFA). During the solid phase synthesis, the amino acid, peptide, nucleotide or oligonucleotide is bound to the solid support, and the linker of the compound of formula (I) or formula (I*) is bound to the amino acid, peptide, nucleotide or oligonucleotide.

In preferred embodiments of the kit the linker is

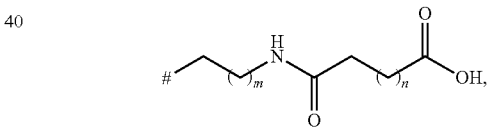

wherein # indicates the position of the Y, and m and n are each, independently, an integer of from 0 to 20, 0 to 15, 1 to 10, 1 to 8, 1 to 6, 1 to 4, 1 to 3, 1 to 2, or 1, preferably m is 1 and n is 1. The amino acid, peptide, nucleotide or oligonucleotide is bound to such linker through the carboxyl group. In some embodiments the compound of formula (I) has the structure

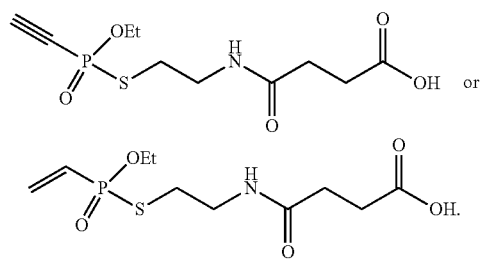

The kit may further comprise one or more of an amino acid, one or more of a peptide, one or more of a nucleotide, and/or one or more of an oligonucleotide, which can be used in solid phase synthesis. In particular, as solid phase peptide synthesis is preferred, the kit may comprise one or more of an amino acid.

The invention also relates to compounds of formula (IIIa)

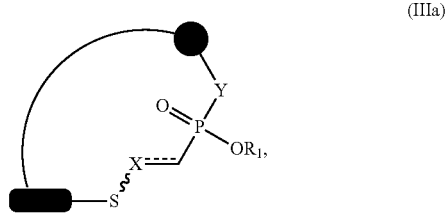

(IIIa)

wherein ● and ■ are in the same molecule as indicated by the arc connecting the ● and the ●, and wherein ●, ■, ⁄, X, Y and $R_1$ are as defined herein above and below, in particular as defined with regard to compound (III*). Preferably, the compound (III*a) is a cyclic peptide, such as for example a cyclic peptide derived from the BCL9 peptide.

The invention also related to compounds of formula (III*a)

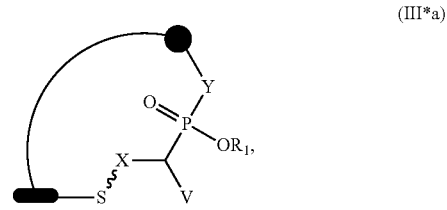

(III*a)

wherein ● and ■ are in the same molecule as indicated by the arc connecting the ● and the ■, and wherein ●, ■, V, X, Y, and $R_1$ are as defined herein above and below, in particular as defined with regard to compound (III*). Preferably, the compound (III*a) is a cyclic peptide, such as for example a cyclic peptide derived from the BCL9 peptide.

Moreover, also compounds provided herein as examples in the example section for compounds of formula (I), (I*), (III), (III*), (IIIa) or (III*a) are preferred.

The skilled person understands that embodiments according to the invention can be combined with each other with the proviso that a combination which would contravene any natural law is excluded.

Any embodiment, feature, definition, or the like described herein with reference to any process also applies to any compound described herein mutatis mutandis. In the same manner, any embodiment, feature, definition or the like described herein with reference to any compound applies to any process described herein mutatis mutandis.

Synthesis of Compounds of Formulae (IV), (IV*), (I) and (I*) Starting from Phosphorus Trihalides The following section provides some general features of the synthesis of compounds of formulae (IV), (IV*), (I) and (I*) starting from phosphorus trihalides. In general, a person skilled in the art knows to select suitable reaction conditions for carrying out such synthesis. Further details are given in the Example section below.

As indicated herein above and below, compounds of formula (IV) or (IV*) can be prepared via sequence comprising steps (i) to (iv). Accordingly, compounds of formula (IV) or (IV*) may be synthesized by (i) reacting a phosphorus trihalide (X), preferably $PCl_3$, with an alcohol (XI) comprising the $R_1$ residue, (ii) reacting the product obtained in step (i) with an amine (XII), (iii) reacting the product obtained in step (ii) with an alkenyl magnesium halide or an alkynyl magnesium halide (XIII), or with an alkenyl magnesium halide (XIII*), and (iv) reacting the product obtained in step (iv) with an alcohol or a thiol (XIV) comprising the ● residue to provide the compounds of formula (IV) or (IV*). Compounds of formula (I) or (I*) can be obtained from compounds of formula (IV) or (IV*) by oxidation.

Step (i)

Step (i), for example, can be carried out by reacting the phosphorus trihalide (X), preferably $PCl_3$, with the alcohol (XI) in a suitable solvent, such as e.g. diethyl ether or tetrahydrofuran, at a low temperature below −10° C., and then warming the reaction mixture; for example, the temperature range may be between −50° C. and +50° C.; more specifically, the reaction may be carried out at about −40° C. or −30° C. and then warming to room temperature. Preferably, the reaction of the phosphorus trihalide with the alcohol is carried out in presence of a weak base, such as e.g. an amine base like triethylamine. The molar ratio of the alcohol to the phosphorus trihalide should be in a range of from 5:1 to 1:5, preferably in a range of from 2:1 to 1:2, more preferably the molar ratio is 1:1. When a weak base, such as an amine base like triethylamine is used, the molar ratio of the base to the phosphorus trihalide may be in a range of from 5:1 to 1:5, for example in a range of from 2:1 to 1:2, preferably about 1:1. Of course, the reaction time depends on the reaction volume and amount of substance. As a guideline, the reaction time at low temperature before warming may be 2 minutes to 2 hours, such as e.g. about 10 minutes, and the reaction time after warming may be 15 minutes to 6 hours, such as e.g. about 1 hour. Preferably, the reaction is carried out under an inert gas such as argon. "Inert" in this context refers to a gas which will not react with any of the starting materials or products of the reaction under the given reaction conditions. The mixture obtained after the reaction of step (i) is preferably used in step (ii) without isolating the product. Optionally, after step (i) and before step (ii) the mixture may be purified, e.g. by celite filtration.

Step (ii)

Step (ii), for example, can be carried out by reacting the product obtained in step (i) with amine (XII), preferably diisopropylamine, in a suitable solvent, such as e.g. diethyl ether or tetrahydrofuran. In this regard, the solvent may be the same as in step (i). The reaction of step (ii) may be carried out at a low temperature below −10° C., and then warming the reaction; for example, the temperature range may be between −50° C. and +50° C.; more specifically, the reaction may be carried out at about −40° C. or −30° C. and then warming to room temperature. The molar ratio of the amine (XII) may be based on the molar amount of the phosphorus trihalide (X) employed in step (i). Thus, the molar ratio of the amine (XII) to the phosphorus trihalide (X) should be in a range of from 5:1 to 1:5, preferably the molar ratio of the amine (XII) to the phosphorus trihalide (X) should be about 2:1. As a guideline, the reaction time at low temperature before warming may be 2 minutes to 2 hours, such as e.g. about 10 minutes, and the reaction time after warming may be 15 minutes to 6 hours, such as e.g. about 1 hour. Preferably, the reaction is carried out under an inert gas such as argon. The mixture obtained after the reaction of step (ii) is preferably used in step (iii) without isolating the product. Optionally, after step (ii) and before step (iii) the mixture may be purified, e.g. by celite filtration. In step (ii) a product having the general structure

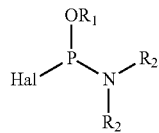

may be obtained, wherein Hal is a halide such as Cl, Br or I, depending on the phosphorus trihalide used in step 1, e.g. Hal is C when $PCl_3$ is used; and wherein $R_1$ and $R_2$ are as defined herein above and below.

Step (iii)

Step (iii), for example, can be carried out by reacting the product obtained in step (ii) with an alkenyl magnesium halide or an alkynyl magnesium halide (XIII), or an alkenyl magnesium halide (XIII*) in a suitable solvent, such as e.g. diethyl ether or tetrahydrofuran. In this regard, the solvent may be the same as in step (ii). The reaction of step (ii) may be carried out at a low temperature below −50° C., and then warming the reaction; for example, the temperature range may be between −100° C. and +50° C.; more specifically, the reaction may be carried out at about −78° C. and then warming to room temperature. The molar ratio of the alkenyl magnesium halide or alkynyl magnesium halide (XIII), or the alkenyl magnesium halide (XIII*) may be based on the molar amount of the phosphorus trihalide (X) employed in step (i). Thus, the ratio of the alkenyl magnesium halide or alkynyl magnesium halide (XIII), or the alkenyl magnesium halide (XIII*) to the phosphorus trihalide (X) should be in a range of from 5:1 to 1:5, preferably in a ratio of from 2:1 to 1:2, more preferably the molar ratio of the alkenyl magnesium halide or alkynyl magnesium halide (XIII) to the phosphorus trihalide (X) should be about 1:1. As a guideline, the reaction time at low temperature before warming may be 2 minutes to 1 hour, such as e.g. about 10 minutes, and the reaction time after warming may be 15 minutes to 6 hours, such as e.g. about 1 hour. Preferably, the reaction is carried out under an inert gas such as argon. The mixture obtained by the reaction of step (iii) may be worked-up, and the product may be isolated by methods generally known to a person skilled in the art, e.g. silica gel chromatography or vacuum distillation. In step (iii) a product having the general structure

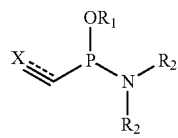

may be obtained when an alkenyl magnesium halide or alkynyl magnesium halide (XIII) is used, or a product having the general structure

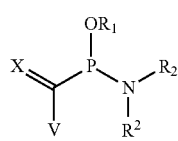

may be obtained when an alkenyl magnesium halide (XIII*) is used, wherein in any one these structures ⌇, $R_1$, $R_2$, X and V are as defined herein above and below.

Step (iv)

Step (iv), for example, can be carried out by reacting the product obtained in step (iii) with an alcohol or thiol (XIV) comprising the ● residue in a suitable solvent, such as e.g. acetonitrile. The reaction of step (ii) may be carried out at a low temperature below −20° C., and then warming the reaction; for example, the temperature range may be between −50° C. and +50° C.; more specifically, the reaction may be carried out at about −40° C. and then warming to room temperature. Preferably, the reaction of the product obtained in step (iii) with an alcohol or thiol (XIV) is carried out in the presence of a tetrazole. The tetrazole may be unsubstituted tetrazole or a substituted tetrazole. The molar ratio of the alcohol or thiol (XIV) to the product obtained in step (iii) should be in a range of from 5:1 to 1:5, preferably in a ratio of from 2:1 to 1:2, more preferably the molar ratio is about 1:1. When a tetrazole is used, the molar ratio of the tetrazole to the product obtained in step (iii) may be in a range of from 5:1 to 1:5, preferably the molar ratio of the tetrazole to the product obtained in step (iii) should be about 2:1. As a guideline, the reaction time at low temperature before warming may be 2 minutes to 2 hours, such as e.g. about 10 minutes, and the reaction time after warming may be 15 minutes to 6 hours, such as e.g. about 30 minutes or about 1 hour. The reaction may be carried out under an inert gas such as argon.

Oxidation for the Synthesis of Compounds of Formula (I) or (I*)

Step (iv) results in a compound of formula (IV) or (IV*). A compound of formula (I) or (I*) is then obtained by oxidizing the compound of formula (IV) or (IV*) at the phosphorus. The mixture obtained after the reaction of step (iv) may be used in such oxidation without further work-up or purification, i.e. the oxidant may be directly added to the mixture obtained after the reaction of step (iv). Various suitable oxidants may be used, such as e.g. tert-butyl hydroperoxide (tBu-OOH), meta-chloroperoxybenzoic acid (mCPBA), hydrogen peroxide ($H_2O_2$), iodine ($I_2$), potassium peroxymonosulphate, or oxygen ($O_2$), e.g. oxygen from air. The skilled person will readily determine a suitable oxidant. Preferably, tert-butyl hydroperoxide (tBu-OOH) may be used as the oxidant. The reaction may be carried out at a temperature between 0 and 60° C., e.g. at room temperature. The molar ratio of the oxidant may be based on the molar amount of the product obtained in step (iii). Thus, the molar ratio of the oxidant to the product obtained in step (iii) should be in a range of from 2:1 to 1:2, preferably the molar ratio of the oxidant to the product obtained in step (iii) should be 1:1. As a guideline, the reaction time for the oxidation may be 2 minutes to 2 hours, such as e.g. about 10 minutes. The reaction may be carried out under an inert gas such as argon. The mixture obtained by the oxidation may be worked-up, and the obtained compound of formula (V) or (V*) may be isolated by methods generally known to a person skilled in the art, e.g. by silica gel chromatography.

Synthesis of Compounds of Formula (I) or (I*) Starting from Electrophilic Disulfides The following section provides some general features of the synthesis of compounds of formulae (I) and (I*), wherein Y is S (sulfur), starting from electrophilic disulfides. In general, a person skilled in the art knows to select suitable reaction conditions for carrying out such synthesis. Further details are given in the Example section below.

As indicated herein above and below, compounds of formulae (I) or (I*), wherein Y is S, can be prepared by reacting an electrophilic disulfide (XXX) with a thiol (XXXI) comprising the ● residue to give a compound of formula (VIa). Compounds of formula (VIb) can be prepared according to literature known procedures. Then the compound of formula (VIa) or (VIb) is reacted with a phosphorus (III) compound of formula (V) or (V*) comprising the $R_1$ residue to give a compound of formula (I) or (I*). Compounds of formula (V) can be prepared by reacting a halogenophosphite of formula (XX) carrying the $R_1$ residue with a Grignard compound of formula (XXI), and compounds of formula (V*) can be prepared by reacting a halogenophosphite of formula (XX) with a Grignard compound of formula (XXI*).

Synthesis of Compounds of Formula (V) or (V*)

Compounds of formula (V) or formula (V*), can be prepared, for example, by reacting an alkenyl magnesium halide or alkynyl magnesium halide of formula (XXI)—preferably an alkenyl magnesium halide of formula (XXI)— or an alkenyl magnesium halide of formula (XXI*) with a halogenophophite of formula (XX) comprising the $R_1$ residue. Preferably, the alkenyl magnesium halide or alkynyl magnesium halide of formula (XXI), or the alkenyl magnesium halide of formula (XXI*), is an alkenyl magnesium bromide or an alkynyl magnesium bromide. Preferably, the halogenophophite of formula (XX) is a chlorophosphite. As a suitable solvent, for example, diethyl ether or tetrahydrofuran may be used. Preferably, the reaction is carried out at a temperature below −20° C., e.g. between −100° C. and −40° C., preferably between −90° C. and −50° C. (e.g. around −78° C.). Preferably, the reaction is carried out under inert gas such as argon. As a guideline, the reaction time should be in a range of from 2 minutes to 4 hours, such as e.g. 2 hours. The ratio of the alkenyl magnesium halide or alkynyl magnesium halide of formula (XXI), or the alkenyl magnesium halide of formula (XXI*) to the halogenophosphite of formula (XXI) should be in a range of from 5:1 to 1:5, e.g. of from 2:1 to 1:2, e.g. around 1:1, such as e.g. a ratio of the alkenyl magnesium halide or alkynyl magnesium halide of formula (XXI), or the alkenyl magnesium halide of formula (XXI*) to the halogenophosphite of formula (XXI) of about 1:1.2. More details are given, for example, in M. R. J. Vallée, Angewandte Chemie Int. Ed., 2013, 52 (36), 9504.

Synthesis of Compounds of Formula (VIa) or (VIb)

Compounds of formula (VIa) or (VIb) can be prepared, for example, by reacting an electrophilic disulfide of formula (XXX) with thiol (XXXI) comprising the ● residue. The reaction may be carried out in a suitable solvent, such as, for example, tetrahydrofuran or N,N-dimethylformamide (DMF). Preferably, the reaction of the electrophilic disulfide of formula (XXX) with thiol (XXXI) is carried out in presence of a weak base, such as e.g. an amine base like triethylamine. The reaction can be carried out at a temperature between 0° C. and 60° C., such as for example at room temperature. The molar ratio of the electrophilic disulfide of formula (XXX) and thiol (XXXI) should be in a range of from 5:1 to 1:5, preferably in a range of from 2:1 to 1:2, more preferably around 1:1, such as e.g. a ratio of the electrophilic disulfide of formula (XXX) to thiol (XXXI) of 1.2:1. When a weak base, such as an amine base like triethylamine is used, the molar ratio of the base to the thiol of formula (XXXI) may be in a range of from 5:1 to 1:5, preferably the molar ratio of the base to the thiol of formula (XXXI) is around 3:1. The reaction time may be, for example, between 2 minutes and 6 hours, such as e.g. about 1 hour, or about 20 minutes or about 10 minutes. The reaction may be monitored using an appropriate method, such as e.g. thin layer chromatography. The reaction may be carried out under an inert gas such as argon. The compound of formula (VIa) comprising the ● residue may be isolated by methods generally known to a person skilled in the art, e.g. by silica gel chromatography. Compounds of formula VIb can be prepared according to literature known procedures, for example, by reacting a thiol

(XXXI)

with sulfuryl chloride (see e.g. Allared, F. et al, Synthetic Metals, 120(1-3), 1061-1062; 2001) or thionyl chloride (see e.g. Masaki, Yukio et al, Chemical & Pharmaceutical Bulletin, 33(5), 1930-40; 1985), or by reacting a thiol

(XXXI)

with N-chlorosuccinimide (NCS) (see e.g. Kawamura, Takamasa et al. European Journal of Organic Chemistry, 2015(4), 719-722; 2015) or chlorine (see e.g. E. Schneider, Chemische Berichte 84, 911-916 (1951), wherein ● is as defined herein above and below.

Synthesis of Compounds of Formula (I) or (I*)

A compound of formula (I) or (I*), wherein Y is S, can be prepared by reacting a compound of formula (V) or (V*) with a compound of formula (VIa) or (VIb). Preferably, the compound of formula (V) or (V*) is an alkene phosphonite, i.e. the ⫽ in a compound of formula (V) or (V*) is a double bond. The reaction is carried out in a suitable organic solvent, such as e.g. in tetrahydrofuran or in N,N-dimethylformamide (DMF), or in a solvent mixture, such as e.g. in a mixture of tetrahydrofuran and toluene. The reaction may be carried out at a temperature between 0° C. and 60° C., e.g. at room temperature. Preferably, the reaction may be carried out under an inert gas such as argon. The molar ratio of the compound of formula (V) or (V*) to the compound of formula (VIa) or (VIb) should be in a range of from 5:1 to 1:5, preferably in a range of from 2:1 to 1:1, more preferably around 1:1, such as e.g. a molar ratio of the compounds of formula (V) or (V*) to the compound of formula (VIa) or (VIb) around 1.2:1. As a guideline, the reaction time may be, for example, between 2 minutes and 6 hours, such as e.g. about 2 hours, about 1 hour, about 30 minutes or about 10 minutes. The compound of formula (I) or (I*) can be isolated by methods generally known to a person skilled in the art, e.g. by silica gel chromatography.

Hydrothiolations of Compounds (I) or (I*) with Compounds of Formula (II)

Phosphonothiolates or phosphonates of formula (I) or (I*) may be subjected to hydrothiolation reaction with a thiol of formula (II) in a suitable solvent. The solvent system can be chosen from a wide range of solvents. The solvent can be a polar aprotic solvent system such as tetrahydrofuran (THF), dimethylformamide (DMF), acetonitrile (MeCN), acetone, dimethyl sulfoxide (DMSO), ethyl acetate (EtOAc), N-ethylpyrrolidone or mixtures thereof, preferably THF, DMF, DMSO; nonpolar solvents such as hexane, toluene, benzene, 1,4-dioxane, chloroform, diethyl ether or dichloromethane (DCM), preferably DCM; polar protic solvents such as water, ethanol, isopropanol, methanol, n-butanol, preferably ethanol; or mixtures thereof. For example, the hydrothiolation may be carried out in DMF or a DMF/water mixture. In particular, the hydrothiolation may be carried out in DMF or a DMF/water mixture when a biomolecule, such as e.g. a protein, an antibody, a peptide, a nucleotide or an oligonucleotide, is reacted. The solvent may be also an aqueous medium, such as e.g. water or an aqueous buffer, such as e.g.

phosphate-buffered saline (PBS), tris(hydroxymethyl)-aminomethane (TRIS), bicarbonate, EDTA/NH$_4$HCO$_3$ buffer, EDTA/NH$_4$HCO$_3$ in phosphate buffered saline (PBS), or borate-containing phosphate-buffered saline. Carrying out the reaction in a buffer is preferred in case a biomolecule, such as e.g. a protein, an antibody, a peptide, a nucleotide or an oligonucleotide, is employed in the hydrothiolation reaction. The hydrothiolation may be also carried out in a mixture of any one of the aforementioned aqueous buffers and DMF. Suitable solvents and buffers will be readily selected by a person skilled in the art.

Preferably, the hydrothiolation reaction of a phosphonothiolate or a phosphonate is carried out under basic conditions, in particular under slightly basic conditions, e.g. at a pH of e.g. between 7.2 and 9, such as e.g. at a pH of 8 or 8.5. Such basic conditions may be established by using a suitable buffer system, such as e.g. by using any one of the buffers mentioned above. In addition or alternatively, basic conditions for the hydrothiolation reaction may be established by using a weak base. Suitable bases are e.g. carbonates such as (NH$_4$)$_2$CO$_3$, Na$_2$CO$_3$, Rb$_2$CO$_3$, K$_2$CO$_3$ or Cs$_2$CO$_3$ or correlating hydrogencarbonates thereof (e.g. NaHCO$_3$ etc.); and weak nitrogen-containing bases such as trimethylamine Et$_3$N (pKa 10.76 at 25° C.). Preferably, a base with a pK$_a$ value within the range of 7.5 to 11.5 is used. Suitable bases will be readily selected by a person skilled in the art.

The reaction temperature of the hydrothiolation is not particularly limited. For example, the hydrothiolation may be carried out at temperatures in a range of from 0° C. to 60° C., of from 0° C. to 50° C., of from 0° C. to 40° C., of from 0° C. to 30° C., e.g. at room temperature, i.e. around 25° C., e.g. at around 5° C., or e.g. at physiologically relevant conditions at around 37° C. The reaction time depends on the temperature, the reaction volume and the amount of substance. As a guideline, the reaction could be e.g. carried out in a time frame from 1 minute to 24 hours, e.g. in a time frame of from 1 minute to 20 hours, of from 1 minute to 10 hours, of from 1 minute to 3 hours, or even within a time frame between 1 minute and 1 hour. Suitable reaction temperatures and reaction times will be readily determined by a person skilled in the art.

Further details on the hydrothiolation reaction are given in the Examples section herein below.

EXAMPLES

Example 1: Synthesis of Alkene-Phosphonothiolates

The inventors developed two different synthesis routes to access alkene-phosphonothiolates: either in a one-step reaction from electrophilic disulfides or alternatively starting from phosphorous trihalides, such as phosphorus trichloride (PCl$_3$). Both routes, as well as isolated compounds, are described herein (refer to Example 10 herein below for synthesis details and characterization) and depicted in Scheme 2. As merely illustrative examples, the synthesis of derivatives is demonstrated wherein R$^1$ is methyl or ethyl, (O-ethyl and O-methyl derivatives (R$^1$=methyl, ethyl); refer to Scheme 2). However, both synthesis routes are not limited to this scope. As used in the Examples section, "R$^2$" or in some instances just simply "R", i.e. the residue bound to the S, corresponds to ● as used throughout this specification.

Scheme 2: Synthesis of Alkene-Phosphonothiolates.

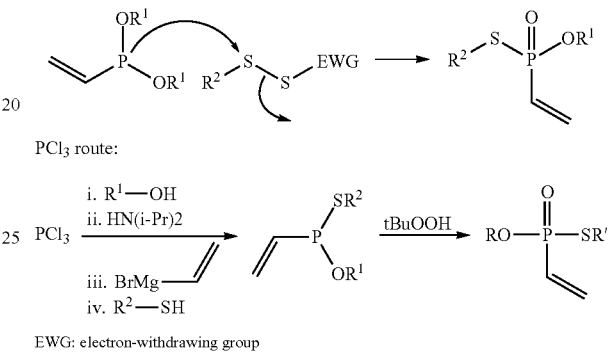

EWG: electron-withdrawing group

Electrophilic Disulfide Route

Alkene-phosphonothiolates can be obtained in a one-step reaction from an electrophilic disulphide and an alkenephosphonite. Without wishing to the bound by any theory, it is assumed that the free lone pair of the phosphorous atom of the phosphonite attacks the electrophilic sulphur of the disulphide, generating thereby a highly reactive intermediate, which quickly oxidizes to the phosphonothiolate.

The diethyl alkenephosphonite was synthesized according to published protocols (M. R. J. Vallée, *Angewandte Chemie Int. Ed.*, 2013, 52 (36), 9504) and reacted with different aliphatic electrophilic disulfides, see Scheme 3. The electrophilic disulfides were obtained from the reaction of the respective thiol with 2,2'-dithiobis(5-nitropyridine) (PNP). O-ethyl alkene-phosphonothiolates were isolated by silica gel column chromatography. The yields are given in Table 1.

Scheme 3: Synthesis of O-ethyl alkene-phosphonothiolates from the reaction of diethyl alkenephosphonite with electrophilic disulfides.

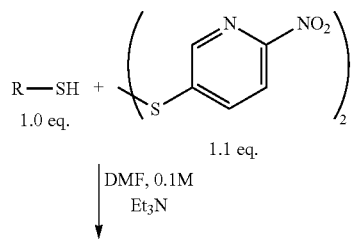

-continued

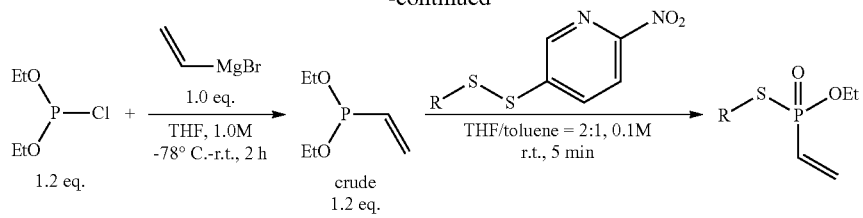

TABLE 1

O-ethyl alkene-phosphonothiolates with isolated yields synthesized via the disulphide route.

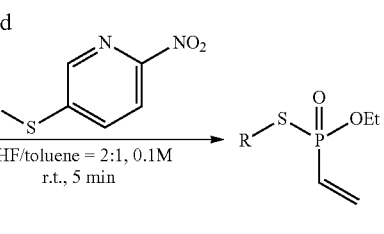

| Entry | R = | compound | isolated yield (%) |
|---|---|---|---|
| 1 | (ethyl/propyl group) | 1 | 53 |
| 2 | (benzyl group) | 2 | 63 |
| 3 | (propanoic acid group) | 3 | 27 |
| 4 | (biotin group) | 4 | 58 |

PCl3 Route

Alternatively, $PCl_3$ can be converted into alkene-phosphonothiolates in several substitution reactions, followed by oxidation with an oxidant, e.g. tBuOOH (Scheme 4).

Scheme 4: Synthesis of alkene-phosphonothiolates from $PCl_3$.

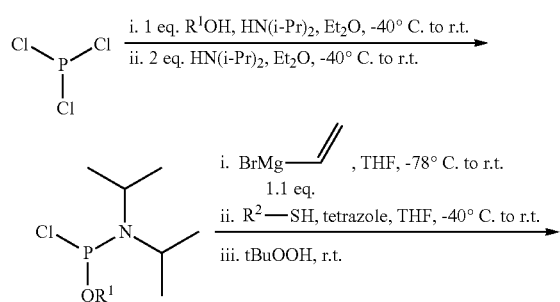

-continued

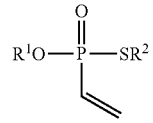

Using this route, a benzyl and a Boc-protected amine derivative were generated and isolated by silica gel chromatography (see Table 2 for structures and yields).

TABLE 2

O-ethyl alkene-phosphonothiolates and isolated yields synthesized via the $PCl_3$ route.

| Entry | R = | compound | isolated yield (%) |
|---|---|---|---|
| 1 | (benzyl group) | 5 | 37 |
| 2 | (Boc-protected aminopropyl) | 6 | 36 |

Example 2: Synthesis of Alkyne-Phosphonothiolates

Alkyne-phosphonothiolates can be obtained starting from $PCl_3$ analogously to alkene-phosphonothiolates (see above Example 1 and below Scheme 5).

Scheme 5: Synthesis of alkyne-phosphonothiolates via the $PCl_3$ route.

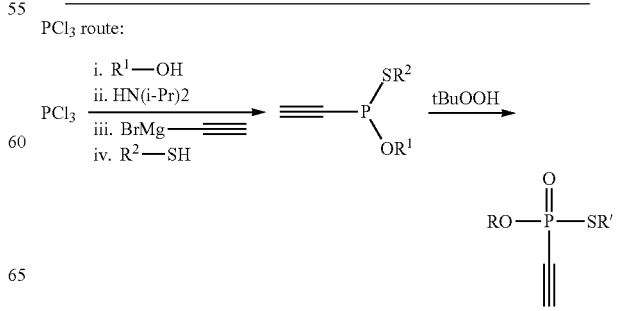

-continued

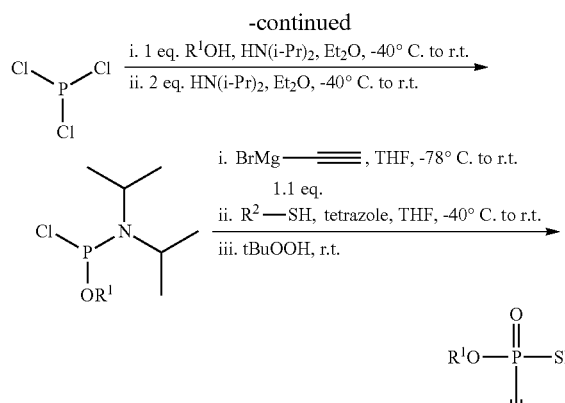

Using the PCl₃ route, the inventors could isolate the desired products by silica gel chromatography (see Scheme 6, and Table 3 for structures and yields).

Scheme 6: Synthesis of alkyne-phosphonothiolates

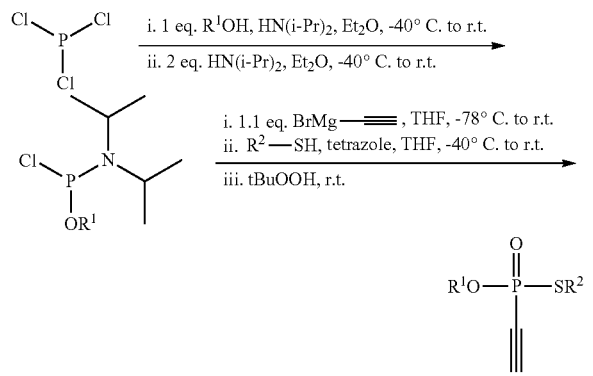

TABLE 3

Synthesized O-methyl alkyne-PT with isolated yields.

$R^1O-\overset{O}{\underset{\underset{\text{\textbar\textbar\textbar}}{\text{P}}}{\text{—}}}SR^2$

| Entry | compound | | isolated yield (%) |
|---|---|---|---|
| 1 | $R^1$ = Methyl, $R^2$ = Benzyl | 7 | 18* |
| 2 | $R^1$ = Ethyl, $R^2$ = Benzyl | 8 | 34 |
| 3 | $R^1$ = Ethyl, $R^2$ = [structure] | 9 | 32 |

*(starting from N,N-Diisopropylmethyl phosphonamidic chloride)

Example 3: Further Functionalization of Generic Phosphonothiolate Building Blocks Generic carbocylic acid or amine phosphonothiolate derivatives can further be modified with functional building blocks, e.g. with the fluorophore EDANS or with biotin, e.g. by means of an amide coupling. Two illustrative examples are shown in scheme 7 (for more compounds and also alkyne derivatives see Example 14 herein below).

Scheme 7: Examples for the functionalization of generic phosphonothiolate building blocks. A) Carboxylic acid derivatives can be activated to the NHS ester and further reacted with an amine e.g. the fluorophore EDANS. B) Alternatively, the reactivates can be swapped by coupling amine PTs to carboxylic acids, e.g. biotin.

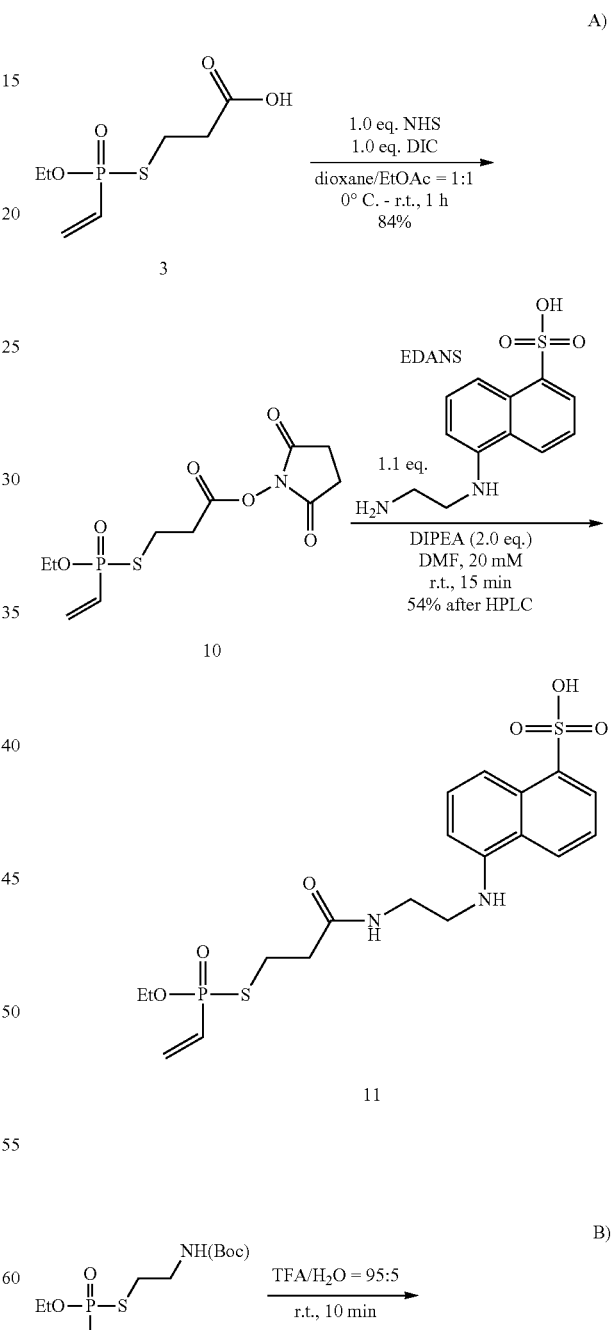

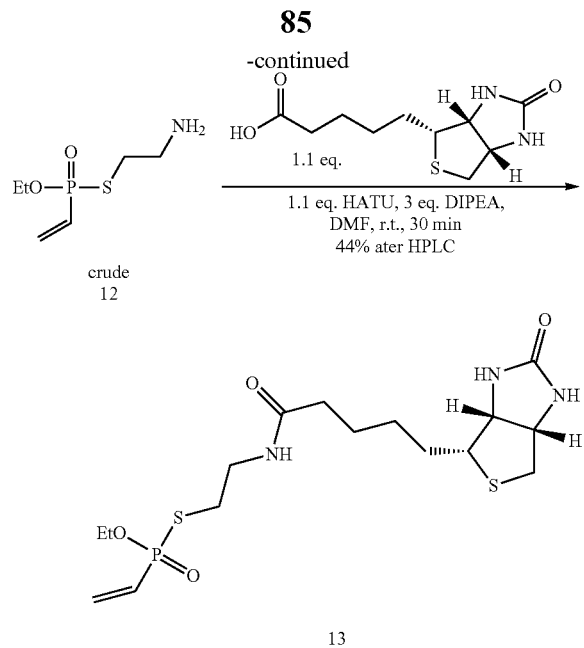

basic aqueous buffer to give a water-soluble phosphonothiolate-conjugate. The reaction was monitored by UV LC-MS and $^{31}$P-NMR (see FIG. 1 for alkene-phosphonothiolates).

FIG. 1 shows: A) Synthesis of the glutathione-alkene-phosphonothiolate-conjugate 14. The reaction was monitored by B) UV LC-MS and C) $^{31}$P-NMR, indicating the formation of a sole product. P: product 14, SM: starting material=alkene-phosphonothiolate 2, PMe$_4$Br=tetramethylphosphonium bromide, internal standard for $^{31}$P-NMR.

The reaction was monitored by $^{31}$P-NMR and UPLC-MS, indicating a clean reaction with a sole product (P) formed.

Similarly as above, the inventors performed a conjugation with glutathione to an alkynederivative, namely to S-benzyl O-methyl alkyne-PT 7 from below Example 11 (Table 3, entry 1) (see FIG. 2A). The reaction is considerably faster than with alkene-phosphonothiolates (compare also kinetic studies, see Example 5 herein below). Under the indicated conditions the inventors observed full conversion of the alkyne-phosphonothiolate after ca. 1 min. Two double bond isomers are formed in a ratio of about 3:1.

Figure 2:
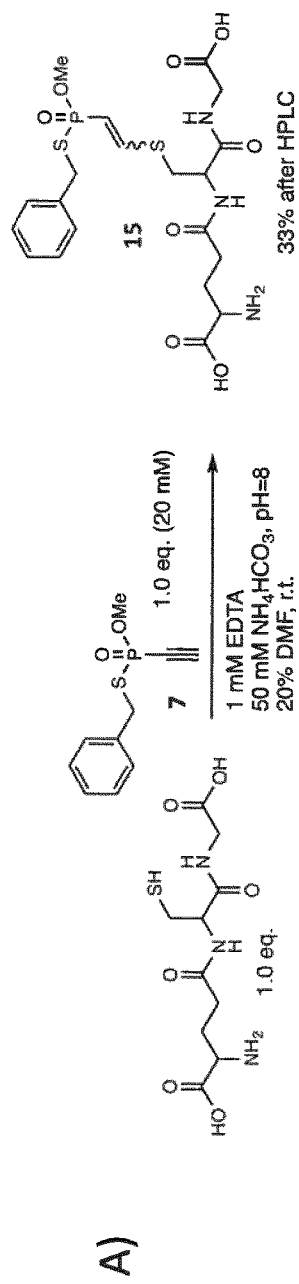
FIG. 2 shows: A) Synthesis of the glutathione-alkyne-PT-conjugate 15. The reaction was monitored by B) UV LC-MS, indicating the formation of two double isomers in a ratio of ca. 3:1. Inosine was used as an internal standard.
Figure 2:
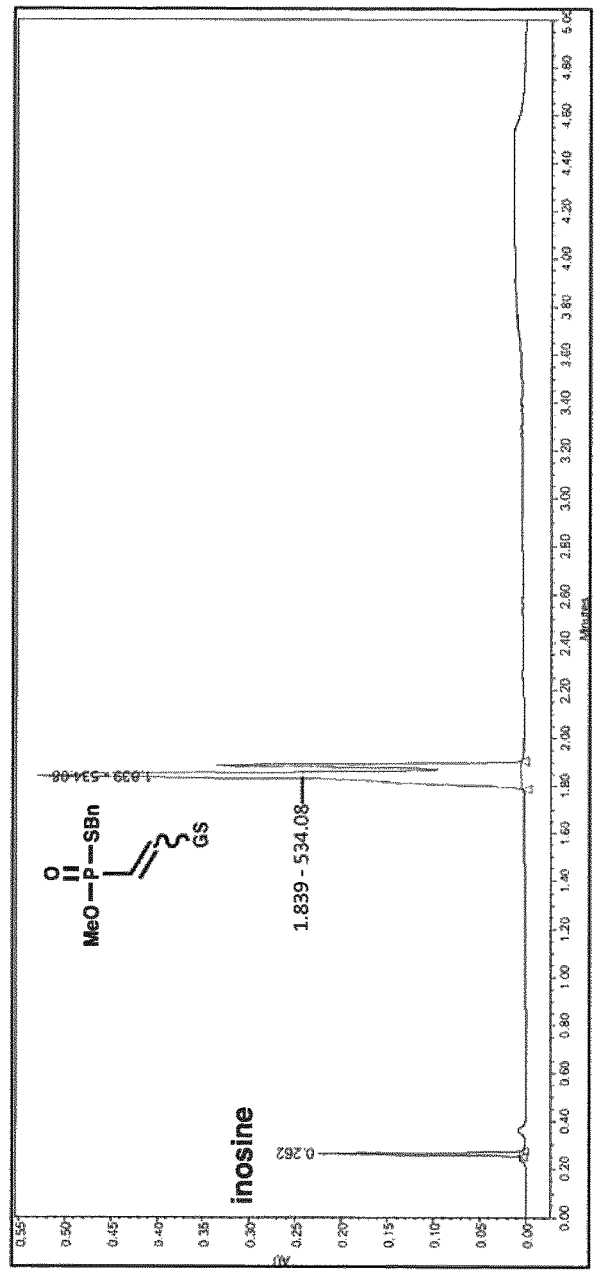

FIG. 2 shows: A) Synthesis of the glutathione-alkyne-PT-conjugate 15. The reaction was monitored by B) UV LC-MS, indicating the formation of two double isomers in a ratio of ca. 3:1. Inosine was used as an internal standard.

Example 4A: Thiol Addition of Glutathione to Phosphonothiolates

As a proof of principle to demonstrate that unsaturated phosphonothiolates react with thiols, the inventors performed a conjugation with the model thiol glutathione in Example 4B: Thiol Addition of Glutathione to Alkene Phosphonates The inventors performed a conjugation of diethyl alkene-phosphonate with glutathione by means of a thiol addition, to give a water-soluble conjugate (see scheme 1).

Scheme 1: Synthesis of glutathione-phosphonate conjugate.

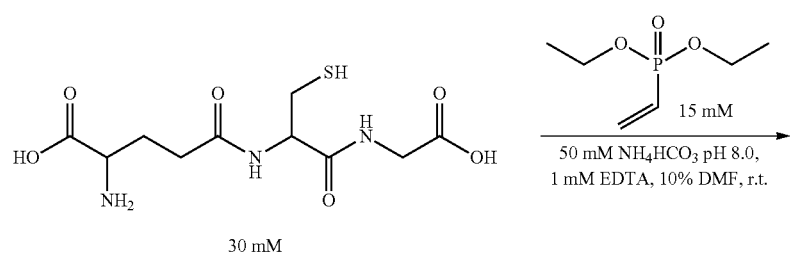

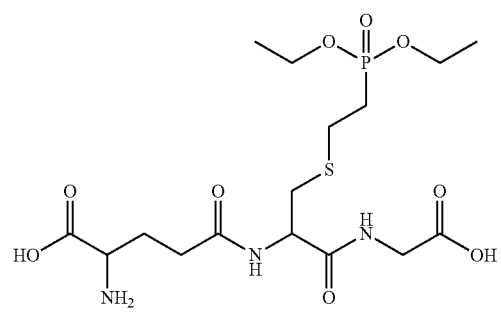

60% after HPLC

The reaction was monitored by $^{31}$P-NMR and UPLC-MS, indicating a clean reaction with a sole product formed. The conjugate could be isolated by semipreparative HPLC (acidic conditions) in 60% yield.

Example 5: Kinetic Study of Thiol Addition to Phosphonothiolates and Phosphonates In a next step the inventors set out to investigate the kinetics of the thiol addition to unsaturated phophonothiolates in order to obtain kinetic data. For this the inventors performed the addition reaction with fluorescent EDANS derivatives for both alkene- and alkyne-phosphonothiolates in the presence of 1 equivalent reduced glutathione at room temperature (about 25° C.) (Scheme 8). The inventors performed the same study also with the corresponding phosphonate derivatives. For the preparation of these compounds refer to Example 14 herein below.

Figure 3:
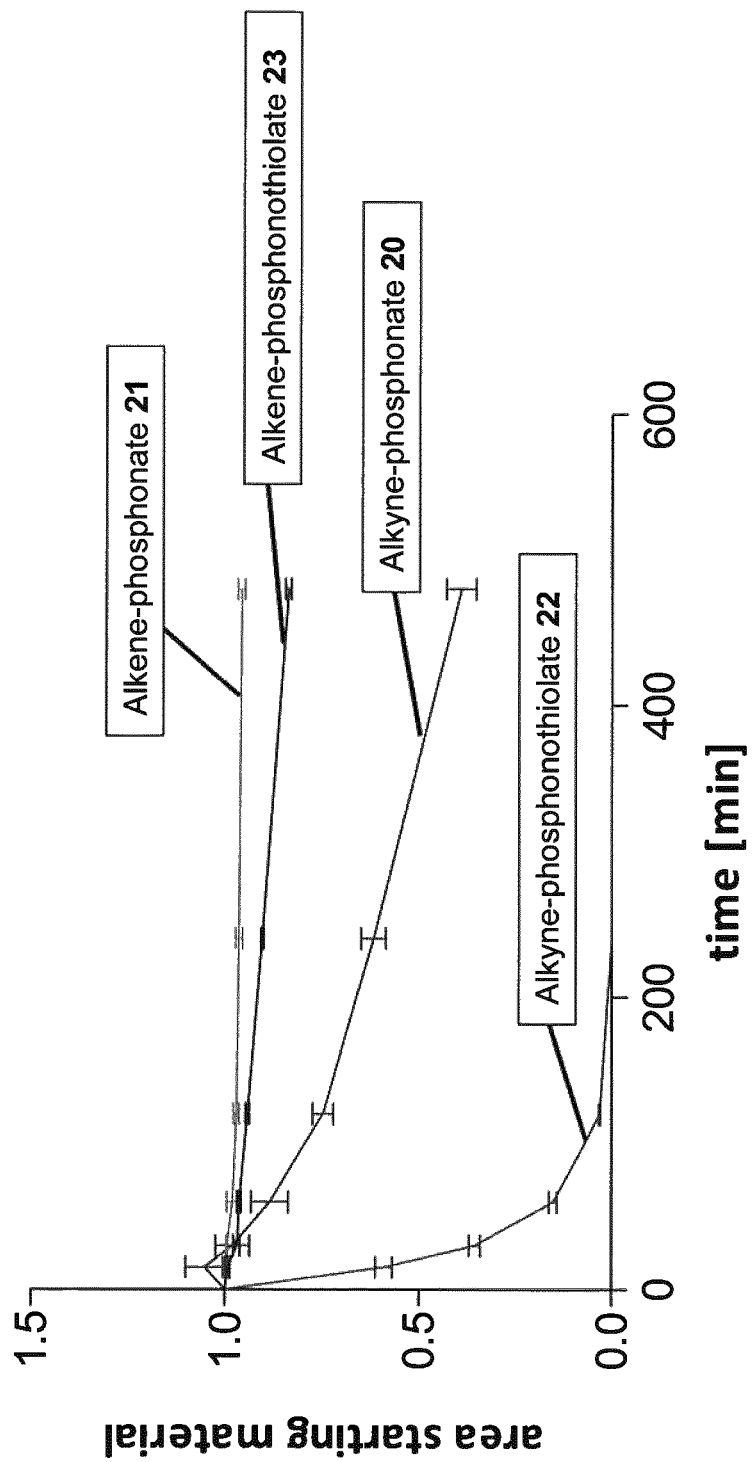
FIG. 3 shows: Kinetic study for the addition of glutathione to alkene and alkyne phosphonothiolates and phosphonates at pH 8.5. Shown are the decays of the starting materials over time. The fluorescent intensity of remaining starting material in relation to an internal standard was measured using a HPLC with a fluorescent detector. Each reaction was performed in triplicates. Shown are mean values with standard deviation. Area starting material of 1.0 refers to 100% starting material.

The decays of the starting materials were monitored over the course of 8 h by means of HPLC using a fluorescent detector. The results of this study are shown in FIG. 3 below. Two trends become clear: First, alkyne derivatives react much faster in the thiol addition than alkene derivatives. Secondly, phosphonothiolates react faster than phosphonates. This is an important advantage of phosphonothiolates because it will allow the user to perform the reaction at lower concentration and get higher conversion in shorter time, eventually also increasing the yield of the reaction. This is crucial for instance in the generation of antibody-drug conjugates, where a high drug to antibody ratio is usually desired.

FIG. 3 shows: Kinetic study for the addition of glutathione to alkene and alkyne phosphonothiolates and phosphonates at pH 8.5. Shown are the decays of the starting materials over time. The fluorescent intensity of remaining starting material in relation to an internal standard was

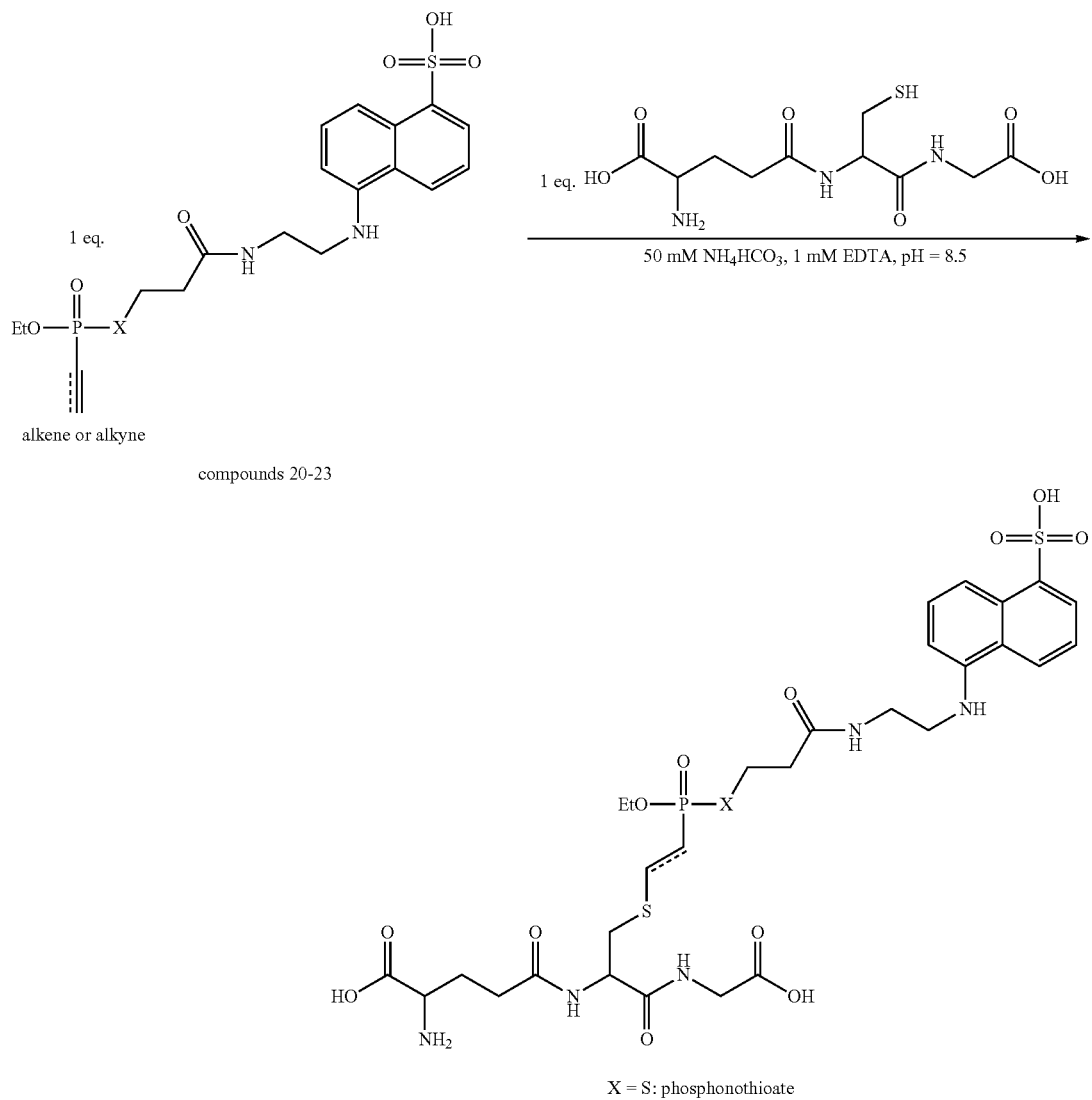

Scheme 8: Conjugation of glutathione to fluorescent alkene- and alkyne phosphonothiolates and phosphonates.

X = S: phosphonothioate
X = O: phosphonate measured using a HPLC with a fluorescent detector. Each reaction was performed in triplicates. Shown are mean values with standard deviation. Area starting material of 1.0 refers to 100% starting material.

Example 6: Stability Study of Phosphonothiolate Conjugates

Figure 4:
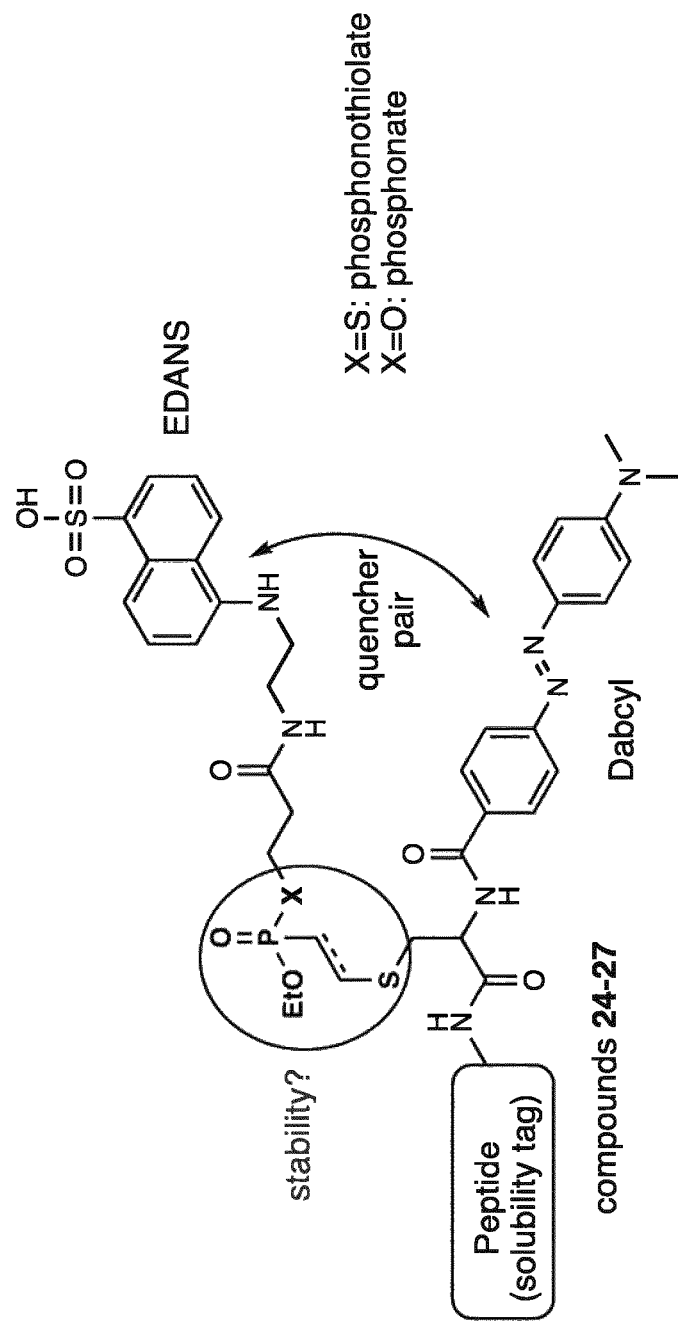
FIG. 4 shows: Design of EDANS-Dabcyl quencher pairs. which are connected via the phosphonothiolate or phosphonate conjugation chemistry. If the encircled moiety gets cleaved apart. the fluorescence of EDANS will no longer be quenched since it loses its proximity to Dabcyl.

An important consideration when using unsaturated phosphonothiolates as bioconjugation handles is whether the resulting thiol-addition products are stable under physiologically relevant conditions. In order to address this question the inventors made use of the Dabcyl-EDANS quencher pair and synthesized the respective alkene- and alkyne-phosphonothiolate conjugates as well as the respective alkene- and alkyne phosphonate conjugates (FIG. 4). These compounds allow us to monitor the stability of the conjugates in complex matrices such as cell lysate or serum.

When the conjugate is intact, Dabcyl and EDANS are in close proximity and the fluorescence of EDANS is quenched. Upon cleavage of the conjugate EDANS is released and its fluorescence can be detected and quantified.

These quencher pair compounds not only allow for monitoring the stability of the P—S bond but also for the stability of the thiol conjugate. This is important because potential retro-thiol addition or exchange with other thiols could thereby also be detected.

FIG. 4 shows: Design of EDANS-Dabcyl quencher pairs, which are connected via the phosphonothiolate or phosphonate conjugation chemistry. If the encircled moiety gets cleaved apart, the fluorescence of EDANS will no longer be quenched since it looses its proximity to Dabcyl.

Figure 5:
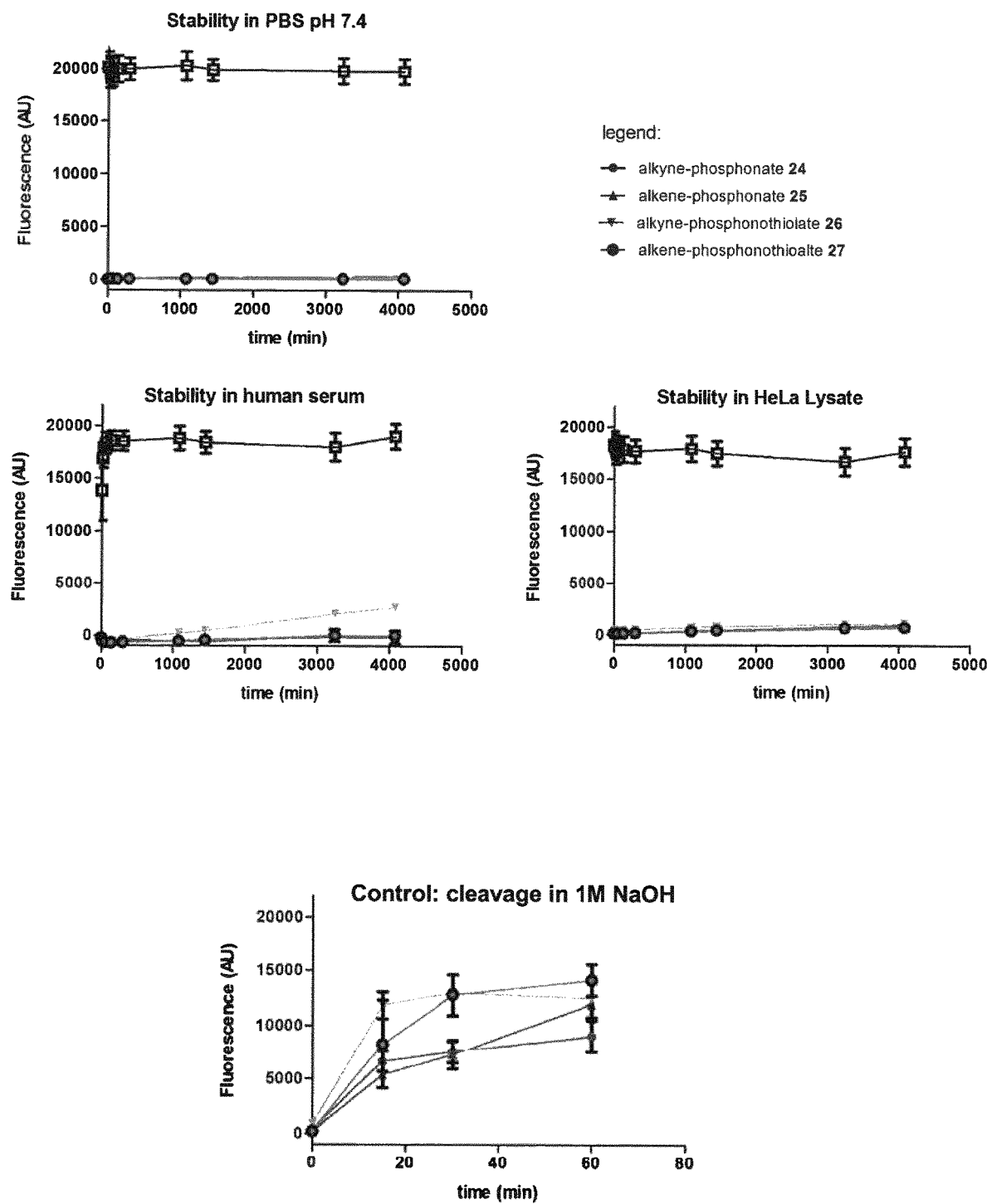
FIG. 5 shows: Stability of phosphonothiolate conjugates and phosphonate conjugates under the indicated conditions. Increasing fluorescence implies cleavage of the conjugate.

The inventors monitored the stability of the alkene- and alkyne phosphonothiolates as well as of the alkene- and alkyne phosphonates under the following conditions: PBS (phosphate-buffered saline) pH=7.4, Hela cell lysate, human serum. The temperature was room temperature (about 25° C.). The fluorescence was monitored over the course of ca. 3 days. As a positive control, unconjugated EDANS and free Dabcyl-peptide (1:1) were measured under the same conditions. The results are shown in FIG. 5. The right column shows a zoom of the same data set as in the left column. Also, as a control the phosphonothiolates and phosphonates were treated with 1M NaOH, which resulted in a rapid cleavage of the phosphonothiolates and phosphonates. This confirms that in the assays using PBS at pH=7.4, HeLa cell lysate or human serum cleavage occurs only to a very low extent, if any.

In phosphate buffer (PBS, pH 7.4) all derivatives show good stability. In lysate of Hela cells and in serum they show also good stability, indicating thereby that phosphonothiolate-based bioconjugates and phosphonate-based bioconjugates are stable under physiologically relevant conditions.

FIG. 5 shows: Stability of phosphonothiolate conjugates and phosphonate conjugates under the indicated conditions. Increasing fluorescence implies cleavage of the conjugate.

Example 7: Protein Conjugation to Phosphonothiolates

Next, the inventors conjugated alkene- and alkyne-phosphonothiolates to both the model protein bovine serum albumin (BSA) and the monoclonal antibody Cetuximab.

Example 7A1: Conjugation of Bovine Serum Albumin to Phosphonothiolates

As model protein the inventors chose bovine serum albumin (BSA) to conjugate to alkene- and alkyne-phosphonothiolates. With this experiment it is demonstrated that alkene- and alkyne-phosphonothiolates are suitable bioconjugatoin handles for the cysteine-selective modification of protein level. BSA has one reduced cysteine residue (Cys58), which is accessible for alkylation by PTs. The other cysteines are theoretically not reactive towards the phosphonothiolates, since they are present in disulfide bridges.

For the modification, a solution of BSA was reacted for 18 h at 4° C. with an excess of PTs at pH=7.4-8.5 (s. Scheme 9).

Scheme 9: Modification of BSA with PTs.

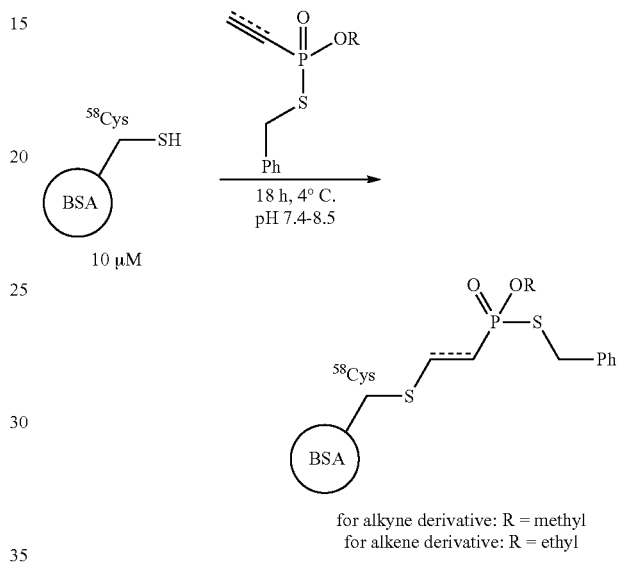

for alkyne derivative: R = methyl
for alkene derivative: R = ethyl

After the reaction, an SDS-PAGE of the modified protein was run, followed by an in-gel tryptic digest, and the obtained peptides were subsequently subjected to MS/MS analysis.

The results of the MS/MS analysis are summarized in table 4. Good sequence coverage of BSA was obtained for both derivatives. Also, the degree of modification is high (>50% for alkene-phosphonothiolates and >90% for alkyne-phosphonothiolates). For the alkene-phosphonolate derivative, also other amino acids (His, Ser, Thr, Arg) were modified to some low extent. However, using fewer equivalents and/or lowering the pH to 7.4 led to less reaction with these amino acids. Alkyne-phosphonothiolates were observed to react more selective with cysteines than alkene-phosphonothiolates.

TABLE 4

Results of MS/MS analysis of phosphonothiolate-modified BSA protein.

| Conditions | | |
|---|---|---|
| pH | eq. PT | Results |
| Alkene-phosphonothiolate 2 | | |
| 8.5 | 100 eq. | BSA could be detected with high sequence coverage using the enzyme chymotrypsin for digestion. Several C58-containing peptides could be reliably detected: $^{55}$LQQCPFDEHVKL$^{66}$, $^{55}$LQQCPFDEHVKLVNELTEF$^{73}$, |

TABLE 4-continued

Results of MS/MS analysis of phosphonothiolate-modified BSA protein.

| Conditions | | |
|---|---|---|
| pH | eq. PT | Results |
| 8.5 & 50 eq. or 7.4 & 100 eq. | | [56]QQCPFDEHVKL[66] and [56]QQCPFDEHVKLVNELTEF[73] could be reliably identified (score > 20) both with and without the phosphonothiolate modification. The degree of modification is high (>50%). Also other peptides could be detected, which are modified by the phosphonothiolate. The modification was thereby not solely found on cysteines but also on histidines and other amino acids. However, the estimated degree of modification is significantly lower for these peptides: (H42 ca. 5-10%, H91/S89/T92 ca. 10-20%, H169/ R168 smaller than 1%, H361/R360 ca. 5-10%, all values are estimated from signal intensity ratios.) BSA could be detected with high sequence coverage using a chymotrypsin for digestion. Several C58-containing peptides could be reliably detected (score > 20). The degree of modification is high (>50%). Also other peptides could be detected, which are modified by the phosphonothiolate. The modification was thereby not solely found on cysteines but also on histidines and other amino acids. However, the estimated degree of modification is much lower for these peptides: (H42 ca. 2-5%, H91 ca. 5-10%, H169/ Y171/R168 ca. 1-5%, H361/R360 ca. 1-5%, all values are estimated from signal intensity ratios). The probes pH 8.5 / 50 eq. and pH 7.4 / 100 eq. did not show significant differences in the degrees of modifications. |
| Alkyne-phosphonothiolate 7 | | |
| pH = 7.4/8.0/ 8.5 & 100 eq. | | At all pH values the single free cysteine (C58) of BSA was clearly detected and found to be ca. 90% modified by the alkyne-phosphonothiolate. Modifications at other amino acids were estimated to be < 10%, but more often < 1%. |

In conclusion, the results show a cysteine selectivity, i.e., as desired, the cysteine of BSA was selectively modified with an alkene or alkyne phosphonothiolate.

Example 7A2: Conjugation of Bovine Serum Albumin to Phosphonates

The inventors could further demonstrate that the diethyl alkenephosphonate can be conjugated to the model protein bovine serum albumin (BSA) (scheme 10) in a cysteine-selective way as indicated by MS/MS analysis of the conjugate (s. table 5). BSA has one reduced cysteine residue (Cys58), which is accessible for alkylation.

Scheme 10: Modification of BSA with diethyl alkenephosphonate.

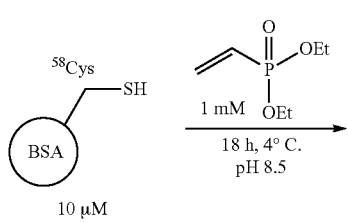

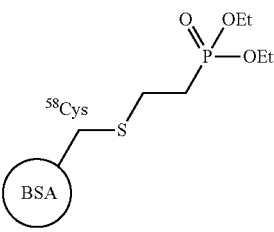

TABLE 5

Results of MS/MS analysis of the phosphonate-modified BSA protein.

| Conditions | | |
|---|---|---|
| pH | Eq. phosphonate | Results |
| 8.5 | 100 eq. | BSA could be detected with high sequence coverage using the enzyme chymotrypsin for digestion. Several C58- containing peptides could be detected: [55]LQQCPFDEHVKL[66], [55]LQQCPFDEHVKLVNELTEF[73], and [56]QQCPFDEHVKL[66] could be reliably identified (score > 20) both with and without the phosphonate modification. The degree of modification is high (>50%). Also other peptides could be detected, which are modified by the phosphonate. The modification was thereby not solely found on cysteines but also on histidines, lysine and threonine. However, the estimated degree of modification is significantly lower for these peptides: (K44 und H361 kess 1%, T255/K256 and K297/299 and or C301/302 1-3%, all values are estimated from signal intensity ratios.) |

In conclusion, also these results show a cysteine selectivity, i.e., as desired, the cysteine of BSA was selectively modified with an alkene or alkyne phosphonate.

Example 7B: Antibody Conjugation to Phosphonothiolates

Finally, the inventors applied this new cysteine-selective reaction sequence for the conjugation of IgG-antibodies (scheme 11). The modification strategy relies on a two-step reduction-alkylation approach, previously applied to maleimide conjugation (S. O. Doronina, B. E. Toki, M. Y. Torgov, B. A. Mendelsohn, C. G. Cerveny, D. F. Chace, R. L. DeBlanc, R. P. Gearing, T. D. Bovee, C. B. Siegall, J. A. Francisco, A. F. Wahl, D. L. Meyer, P. D. Senter, *Nat Biotech* 2003, 21, 778-784). In the first step the interchain disulphide bridges that hold the antibody together are reduced upon treatment with dithiothreitol (DTT). The free thiols can then react with the phosphonothiolates in a thiol addition reaction. First experiments were conducted with Cetuximab, a monoclonal IgG1 antibody against human epidermal growth factor.

Scheme 11:
Two-step reduction and alkylation approach for cysteine selective antibody modification with a biotin modified alkene-phosphonothiolate 4.

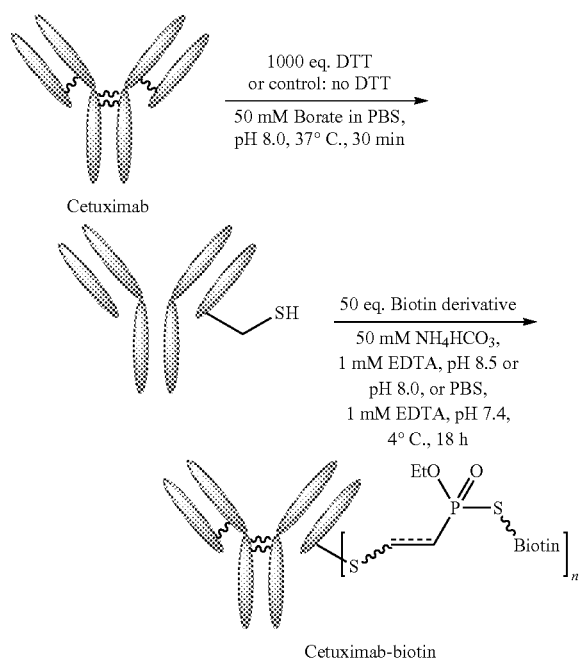

As a proof of principle the antibody was modified with biotin alkene-derivative 4 and analysed by SDS-PAGE, followed by an anti-biotin western blotting.

Figure 6:
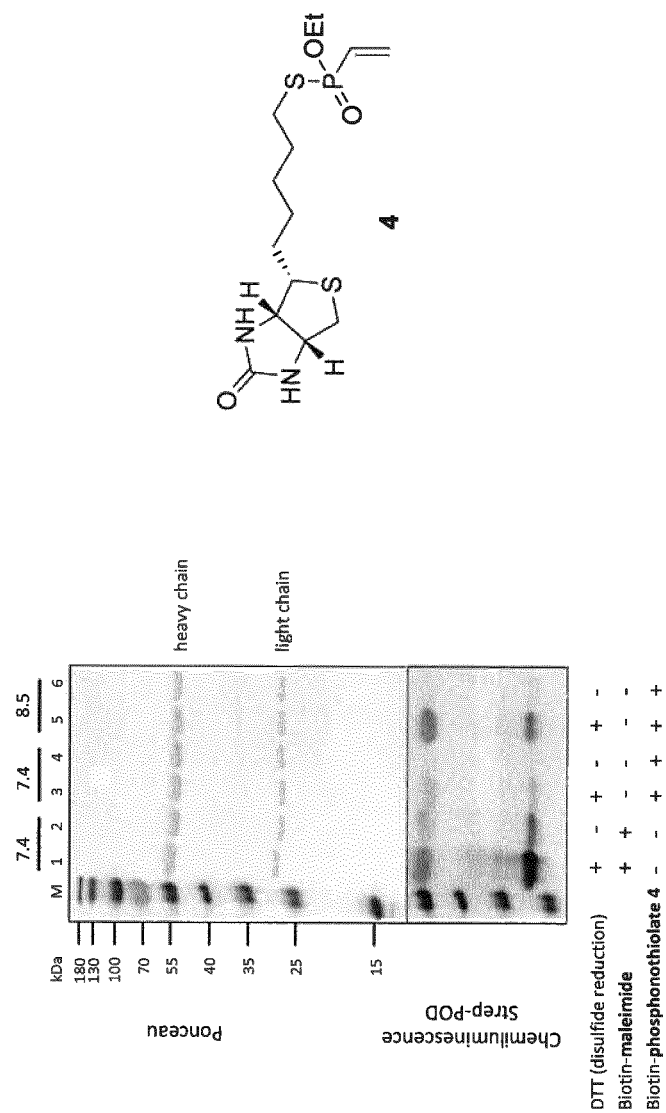
FIG. 6 shows: Western blot analysis of Cetuximab conjugation after reducing SDS-gel. Left: Ponceau S stain of the membrane after blotting shows equal amounts of blotted antibody. Right: Chemiluminescence detection (Strep-HRP) of biotin-modified antibody fragments. Reaction of reduced antibody with the biotin compounds were either performed at pH=7.4 (lanes 1-4) or at pH=8.5 (lanes 5-6). M=marker (protein ladder).

The results of the anti-biotin Western blot analysis are shown in FIG. 6. The modification of the antibody fragments (heavy and light chain) with biotin phosphonothiolate derivative 4 at both pH=7.4 (lane 3) and pH=8.5 (lane 5) could be confirmed. The yield is higher for higher pH=8.5 (compare lane 3 and 5). Note that no modification could be detected without prior reduction of the disulfide bonds with DTT (lanes 4 and 6). For comparison, the antibody was also labelled with biotin-maleimide at pH=7.4 using the same protocol. Although the degree of modification in case of the maleimide is higher compared to the PT (compare lane 1 and 3), the reaction is apparently not chemoselective for cysteine, since there is also modification detected for the non-reduced antibody (lane 2).

FIG. 6 shows: Western blot analysis of Cetuximab conjugation after reducing SDS-gel. Left: Ponceau S stain of the membrane after blotting shows equal amounts of blotted antibody. Right: Chemiluminescence detection (Strep-HRP) of biotin-modified antibody fragments. Reaction of reduced antibody with the biotin compounds were either performed at pH=7.4 (lanes 1-4) or at pH=8.5 (lanes 5-6). M=marker (protein ladder).

Additionally, the inventors also performed the conjugation of Cetuximab with the biotin-phosphonothiolate derivatives 28 (alkyne) and 13 (alkene) at pH 8.5 (FIG. 7A) and the conjugation of Cetuximab with 28 at pH 7.4, 8.0 and 8.5 as comparison (FIG. 7B). Alkyne-phosphonothiolates are more effective in labelling the antibody than alkene-phosphonothilates (FIG. 7A). Similarly as for the alkene-phosphonothiolate 4 (FIG. 6), also for the alkyne-phosphonothiolate 28, more labelling of the antibody is obtained with the alkyne-phosphonothiolate with increasing pH.

Figure 7:
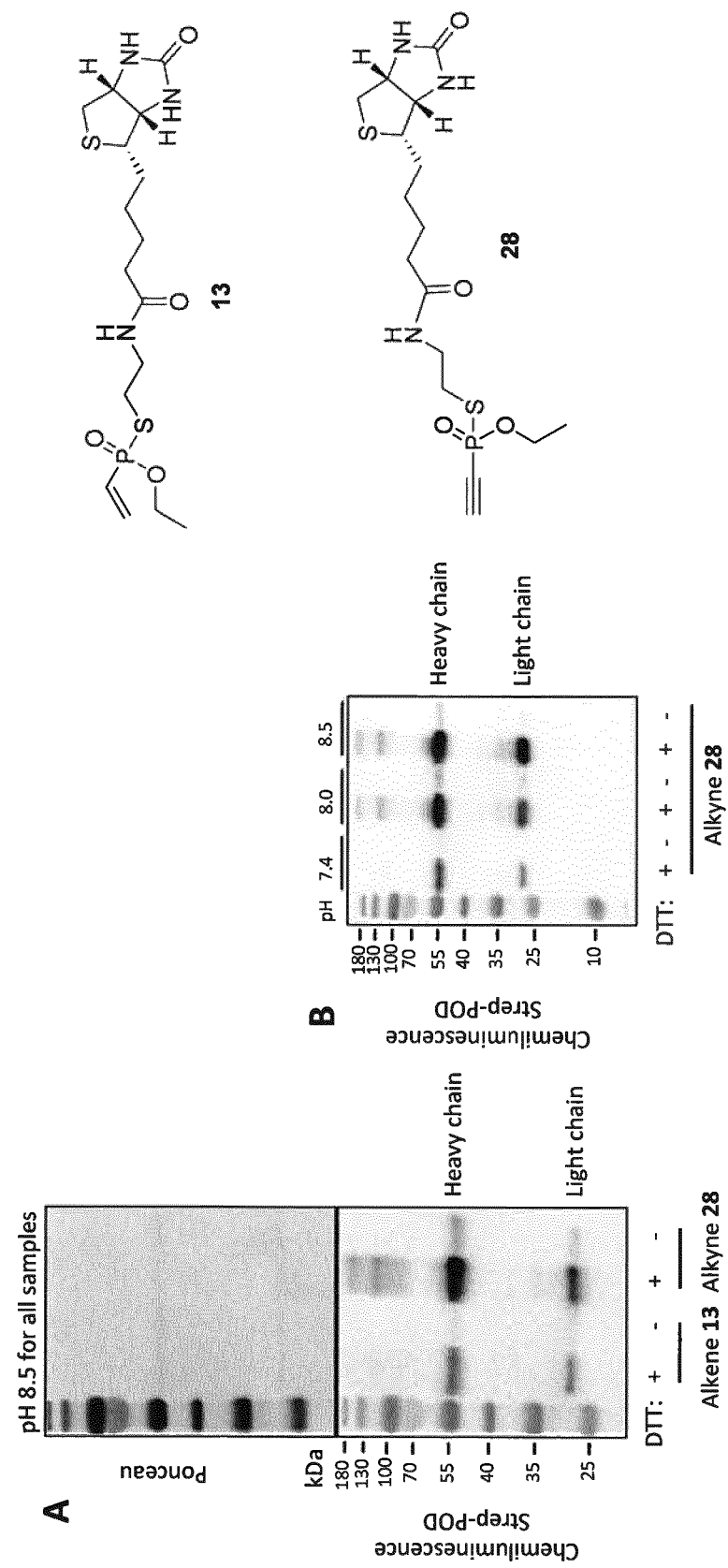
FIG. 7 shows: Western blot analysis of Cetuximab conjugation after reducing SDS-gel. A) Modification at pH 8.5 with compounds 13 and 28. B) Modification at pH 7.4-8.5 with compound 28.

FIG. 7 shows: Western blot analysis of Cetuximab conjugation after reducing SDS-gel. A) Modification at pH 8.5 with compounds 13 and 28. B) Modification at pH 7.4-8.5 with compound 28.

In conclusion, the results show a cysteine selectivity, i.e., as desired, the cysteines of the antibody were selectively modified with an alkene or alkyne phosphonothiolate.

Example 8: Procedures for the Synthesis of Electrophilic Disulfides

General Procedure A: Synthesis of Mixed Disulfides from 2,2'-Dithiobis(5-Nitropyridine)

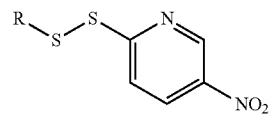

A flame-dried round-bottom flask was charged with 1.0 mmol (1.0 eq.) of thiol in 10 ml (c=0.1 M) THF. 3.0 mmol (3.0 eq.) triethylamine and 1.2 mmol (1.2 eq.) disulfide 2,2'-Dithiobis(5-nitropyridine) were subsequently added and the reaction mixture was stirred for 10 min at room temperature. The reaction was monitored by means of TLC. When full conversion was achieved (approximately 10 min), the volatiles were evaporated under reduced pressure and the residue was purified by flash column chromatography on silica gel.

2-(ethyldisulfaneyl)-5-nitropyridine

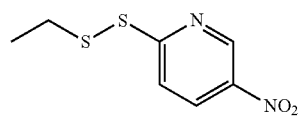

2-(ethyldisulfaneyl)-5-nitropyridine was prepared according to general procedure A from ethanethiol (103 µl, 1.34 mmol). The crude product was purified by flash column chromatography (hexanes/EtOAc=10:1) to yield the title compound as a yellow oil (228 mg, 1.05 mmol, 78%).

$^1$H NMR (300 MHz, Chloroform-d) δ=9.24 (d, J=2.6, 1H), 8.39 (dd, J=8.9, 2.6, 1H), 7.92 (d, J=8.9, 1H), 2.85 (q, J=7.3, 2H), 1.34 (t, J=7.3, 3H) ppm.

$^{13}$C NMR (75 M, Chloroform-d) δ=169.42, 145.15, 141.99, 131.67, 119.18, 33.01, 14.36 ppm.

HRMS (ESI): calcd for $C_7H9N_2O_2S_2$ [M+H+]: 217.0100; found: 217.0106.

2-(benzyldisulfaneyl)-5-nitropyridine

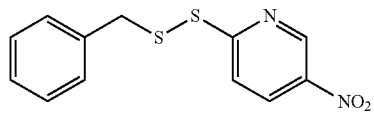 [SMILES: O=[N+]([O-])c1ccc(SSCc2ccccc2)nc1]

2-(benzyldisulfaneyl)-5-nitropyridine was prepared according to general procedure A from benzyl mercaptan (48

μl, 0.41 mmol). The crude product was purified by flash column chromatography (hexanes/EtOAc=10:1) to yield the title compound as a colorless solid (91 mg, 0.33 mmol, 80%).

$^1$H NMR (300 MHz, Chloroform-d) δ=9.18 (d, J=2.6, 1H), 8.15 (dd, J=8.9, 2.6, 1H), 7.49 (d, J=8.9, 1H), 7.30-7.24 (m, 2H), 7.24-7.17 (m, 3H), 4.04 (s, 2H) ppm.

$^{13}$C NMR (75 MHz, Chloroform-d) δ=168.90, 144.86, 141.81, 136.10, 131.17, 129.50 (2C), 128.83 (2C), 128.04, 119.03, 77.36, 43.86 ppm.

HRMS (ESI): calcd for $C_{12}H_{11}N_2O_2S_2$ [M+H$^+$]: 279.0256; found: 279.0271.

3-((5-nitropyridin-2-yl)disulfaneyl)propanoic acid

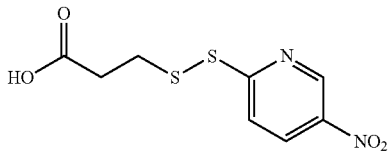 [SMILES: O=C(O)CCSSc1ccc([N+](=O)[O-])cn1]

3-((5-nitropyridin-2-yl)disulfaneyl)propanoic acid was prepared according to general procedure A from mercaptopropionic acid (250 μl, 2.85 mmol). The crude product was purified by flash column chromatography (hexanes/EtOAc=1:1+0.1% formic acid) to yield the title compound as a yellow oil (80 mg, 1.54 mmol, 54%).

$^1$H NMR (300 MHz, Chloroform-d) δ=9.26 (d, J=2.6 Hz, 1H), 8.40 (dd, J=8.8, 2.7 Hz, 1H), 7.87 (d, J=8.8 Hz, 1H), 3.09 (t, J=6.8 Hz, 2H), 2.82 (t, J=6.8 Hz, 2H) ppm.

$^{13}$C NMR (75 MHz, Chloroform-d) δ=177.25, 168.05, 145.34, 142.35, 131.91, 119.68, 33.69, 33.33.

HRMS: n.d.

2-(biotinyldisulfaneyl)-5-nitropyridine

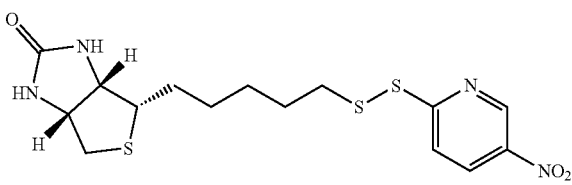 [SMILES: O=C1N[C@H]2[C@H](CS[C@H]2CCCCCSSc2ccc([N+](=O)[O-])cn2)N1]

2-(biotinyldisulfaneyl)-5-nitropyridine was prepared according to general procedure A from biotinthiol (44 mg, 0.179 mmol). The crude product was purified by flash column chromatography (DCM/MeOH=20:1 to 10:1) to yield the title compound as a yellow solid (53 mg, 0.134 mmol, 75%).

$^1$H NMR (300 MHz, Chloroform-d) δ=9.27 (d, J=2.6 Hz, 1H), 8.42 (dd, J=8.9, 2.6 Hz, 1H), 7.91 (d, J=8.9 Hz, 1H), 4.51 (s, 1H), 4.37-4.24 (m, 1H), 3.14 (d, J=6.4 Hz, 1H), 2.97-2.68 (m, 4H), 1.76-1.61 (m, 4H), 1.44 (d, J=3.5 Hz, 4H) ppm.

HRMS (ESI): calcd for $C_{15}H_{21}N_4O_3S_3$ [M+H$^+$]: 401.0770; found: 401.0791.

Example 9: Procedures for the Synthesis of Phosphorus (III) Precursors 1-ethoxy-1-ethynyl-N,N-diisopropylphosphanamine

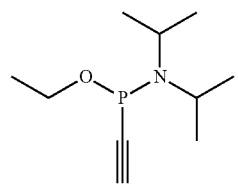

A flame-dried round bottom Schlenk flask was charged with phosphorous trichloride (12.5 mmol, 1090 μl) and dry ether (50 ml) under an argon atmosphere and cooled to −30° C. in a dry ice bath. Ethanol (12.5 mmol, 728 μl) and triethylamine (12.5 mmol, 1.733 ml) were added and the solution was stirred at −30° C. for 10 min before warming to r.t. and stirred for another hour. The resulting white suspension was filtered over celite. The filtrate was collected in a flame-dried round bottom Schlenk flask and cooled again to −30° C. under an argon atmosphere. Diisopropylamine (25 mmol, 3.528 ml) was added and the reaction mixture was stirred at −30° C. for 10 min before warming up to r.t. and stirred for another hour. The resulting suspension was filtered over celite again. The clear filtrate was cooled to −78° C. under an argon atmosphere and a solution of ethinylmagnesium bromide (0.5 M in THF, 13.75 mmol, 27.5 ml) was added, stirred for 10 min at −78° C. and then at r.t. for another hour. The reaction mixture was then concentrated to roughly 20 ml under reduced pressure, diluted with saturated aqueous NaHCO$_3$ (60 ml) and extracted with EtOAc (3×120 ml). The combined organic layers were dried over NaSO$_4$, filtered and the solvents were removed under reduced pressure. The resulting oily residue was purified by silica gel chromatography to yield the entitled compound as a yellow oil (1.236 g, 6.14 mmol, 49%) in ca. 80% purity judged by $^1$H and $^{31}$P NMR. The compound was used in next steps without further purification.

$^1$H-NMR (300 MHz, Acetonitrile-d$_3$) δ$_H$=3.84-3.57 (m, 4H), 3.35 (d, J=1.8 Hz, 1H), 1.20 (m, 15H) ppm.

$^{13}$C-NMR (75 MHz, Acetonitrile-d$_3$) δ$_C$=91.78 (d, J=7.4 Hz), 85.72 (d, J=17.8 Hz), 61.9 (d, J=16.2 Hz), 47.4, 23.5, 16.5 (d, J=16.5) ppm.

$^{31}$P-NMR (122 MHz, Acetonitrile-d$_3$) δ$_P$=92.25 ppm.

HRMS (ESI): calcd for NaC$_{10}$H$_{20}$NOP [M+Na$^+$]: 224.1180; found: 224.1270.

1-ethoxy-N,N-diisopropyl-1-vinylphosphanamine

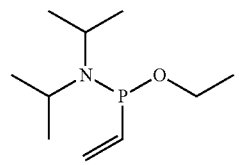

A flame-dried round bottom Schlenk flask was charged with phosphorous trichloride (12.5 mmol, 1090 μl) and dry ether (50 ml) under an argon atmosphere and cooled to −30°

C. in a dry ice bath. Ethanol (12.5 mmol, 728 µl) and triethylamine (12.5 mmol, 1.733 ml) were added and the solution was stirred at −30° C. for 10 min before warming to r.t. and stirred for another hour. The resulting white suspension was filtered over celite. The filtrate was collected in a flame-dried round bottom Schlenk flask and cooled again to −30° C. under an argon atmosphere. Diisopropylamine (25 mmol, 3.528 ml) was added and the reaction mixture was stirred at −30° C. for 10 min before warming up to r.t. and stirred for another hour. The resulting suspension was filtered over celite again. The clear filtrate was cooled to −78° C. under an argon atmosphere and a solution of vinylmagnesium bromide (1.0 M in THF, 13.75 mmol, 13.75 ml) was added, stirred for 10 min at −78° C. and then at r.t. for another hour. The reaction mixture was then concentrated to roughly 20 ml under reduced pressure, diluted with saturated aqueous NaHCO$_3$ (60 ml) and extracted with EtOAc (3×120 ml). The combined organic layers were dried over NaSO$_4$, filtered and the solvents were removed under reduced pressure. The resulting oily residue was purified by silica gel chromatography to yield the entitled compound as a colorless oil (852 mg, 4.19 mmol, 34%) in >95% purity judged by $^1$H and $^{31}$P NMR.

$^1$H-NMR (300 MHz, Acetonitrile-d$_3$) δ$_H$=6.36-6.14 (m, 1H), 5.77-5.53 (m, 2H), 3.81-3.61 (m, 2H), 3.47 (dt, J=9.8, 6.7 Hz, 2H), 1.23-1.04 (m, 15H) ppm.

$^{13}$C-NMR (75 MHz, Acetonitrile-d$_3$) δ$_C$=142.30 (d, J=6.9 Hz), 124.41 (d, J=19.6 Hz), 62.1 (d, J=20.7 Hz), 45.5 (d, J=9.50 Hz), 23.90 (m), 16.66 (d, J=7.7 Hz) ppm.

$^{31}$P-NMR (122 MHz, Acetonitrile-d$_3$) δ$_P$=113.79 ppm.

HRMS (ESI): calcd for C$_{10}$H$_{23}$NOP [M+H$^+$]: 204.1517; found: 204.1596.

Example 10: Procedures for the Synthesis of Alkene Phosphonothiolates

General Procedure B: Synthesis of Alkene-PTs Via the Disulphide Route

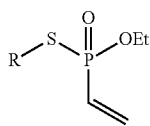

0.5 mmol (1.0 eq.) of mixed disulfide was placed in a flame-dried Schlenk tube and dissolved in a mixture of dry THF/toluene (2:1, 5 ml) under an argon atmosphere. To the stirred mixture a solution of diethyl alkenephosphonite (ca. 0.6 M in THF, 0.6 mmol, 0.6 ml, 1.2 eq.) was added drop wise at room temperature and stirred for 10 min. The reaction mixture was then dry-packed on silica gel and purified by flash column chromatography.

O,S-diethyl alkene-PT (Compound 1)

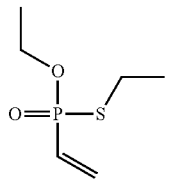

O,S-diethyl alkene-PT was prepared according to general procedure B from mixed disulfide 2-(ethyldisulfaneyl)-5-nitropyridine (100 mg, 0.462 mmol). The crude product was purified by flash column chromatography (hexanes/EtOAc=4:1 to 1:1 gradient) to yield the title compound as a colorless oil (44 mg, 0.244 mmol, 53%).

$^1$H NMR (300 MHz, Chloroform-d) δ=6.40-5.98 (m, 3H), 4.30-4.06 (m, 2H), 2.89-2.72 (m, 2H), 1.41-1.30 (m, 6H) ppm.

$^{13}$C NMR (75 MHz, Chloroform-d) δ=133.92, 131.82, 129.90, 61.83, 24.98, 16.51 ppm. $^{31}$P NMR (122 MHz, Chloroform-d) δ=42.12 ppm.

HRMS (ESI): calcd for C$_6$H$_{14}$O$_2$PS [M+H$^+$]: 181.0447; found: 181.0460.

S-benzyl O-ethyl alkene-PT (Compound 2)

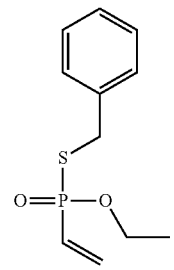

S-benzyl O-ethyl alkene-PT was prepared according to general procedure B from mixed disulfide 2-(benzyldisulfaneyl)-5-nitropyridine (100 mg, 0.359 mmol). The crude product was purified by flash column chromatography (hexanes/EtOAc=4:1 to 1:1 gradient) to yield the described compound 2 as a yellow oil (55 mg, 0.227 mmol, 63%).

$^1$H NMR (300 MHz, Chloroform-d) δ=7.42-7.19 (m, 5H), 6.40-5.91 (m, 3H), 4.28-3.39 (m, 4H), 1.31 (t, J=7.1 Hz, 3H) ppm.

$^{13}$C (75 MHz, Chloroform-d) δ=162.92, 137.01, 134.54, 130.53, 128.87, 128.59, 128.57, 127.56, 62.23, 34.37, 16.08 ppm.

$^{31}$P NMR (122 MHz, Chloroform-d) δ=42.69 ppm.

HRMS (ESI): calcd for C$_{11}$H$_{15}$O$_2$PS [M+H$^+$]: 242.0525; found: 242.0551.

O-ethyl S-biotin alkene-PT (Compound 4)

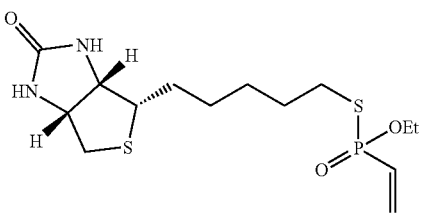 [SMILES: C=CP(=O)(OCC)SCCCCC[C@@H]1SC[C@@H]2NC(=O)N[C@@H]21]

O-ethyl S-biotin alkene-PT was prepared according to general procedure B from mixed disulfide 2-(biotinyldisulfaneyl)-5-nitropyridine (40 mg, 0.100 mmol) in a solvent mixture THF/DMF=5:1. The crude product was purified by flash column chromatography (100% DCM to DCM/MeOH=9:1 gradient) to yield the described compound 4 as a yellow solid (21 mg, 0.0576 mmol, 58%).

¹H NMR (600 MHz, Chloroform-d) δ=6.35-6.05 (m, 3H), 5.83 (d, J=24.7 Hz, 1H), 5.24 (s, 1H), 4.52 (dd, J=7.8, 4.9 Hz, 1H), 4.32 (dd, J=7.8, 4.6 Hz, 1H), 4.26-4.11 (m, 2H), 3.17-3.12 (m, 1H), 2.92 (dd, J=12.8, 5.0 Hz, 1H), 2.87-2.72 (m, 3H), 2.15 (s, 2H), 1.75-1.60 (m, 4H), 1.49-1.39 (m, 4H), 1.36 (td, J=7.1, 1.5 Hz, 3H) ppm.

¹³C NMR (151 MHz, Chloroform-d) δ=163.43, 133.85, 130.75 (dd, J=145.2, 9.9 Hz), 62.10-61.69 (m, 2C), 60.17, 55.52, 40.53, 30.59 (t, J=5.2 Hz), 30.12, 28.51 (d, J=8.7 Hz), 28.30 (d, J=25.5 Hz, 2C), 16.32 (d, J=6.8 Hz) ppm.

³¹P NMR (122 MHz, Chloroform-d) δ=42.57 ppm.

HRMS (ESI): calcd for $C_{14}H_{26}N_2O_3PS_2$ [M+H⁺]: 365.1117; found: 365.1141.

3-((ethoxy(alkene)phosphoryl)thio)propanoic acid (Compound 3)

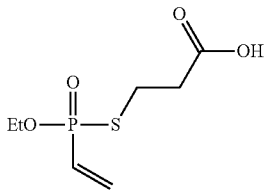

3-((ethoxy(alkene)phosphoryl)thio)propanoic acid was prepared according to general procedure B from mixed disulfide 3-((5-nitropyridin-2-yl)disulfaneyl)propanoic acid (146 mg, 0.561 mmol). The crude product was purified by flash column chromatography (hexanes/EtOAc=4:1 without acid to EtOAc+0.1% formic acid) to yield compound 3 as a colorless oil (33.7 mg, 0.150 mmol, 27%). An analytically pure sample* was obtained by subsequent HPLC purification (5-40% MeCN in 30 min).

¹H NMR (600 MHz, Chloroform-d) δ=9.25 (s, 1H), 6.38-6.08 (m, 3H), 4.26-4.13 (m, 2H), 3.09-2.96 (m, 2H), 2.74 (t, J=7.2, 2H), 1.35 (t, J=7.1, 3H) ppm.

¹³C NMR (151 MHz, Chloroform-d) δ=174.98, 134.92, 130.18 (d, J=145.9 Hz), 62.52 (d, J=6.9 Hz), 35.73 (d, J=3.5 Hz), 25.02 (d, J=2.8 Hz), 16.38 (d, J=6.9 Hz) ppm.

³¹P NMR (122 MHz, Chloroform-d) δ=43.17 ppm.

HRMS (ESI): calcd for $C_7H_{14}O_4PS_2$ [M+H⁺]: 225.0345; found: 225.0358.

2,5-dioxopyrrolidin-1-yl 3-((ethoxy(alkene)phosphoryl)thio)propanoate (Compound 10)

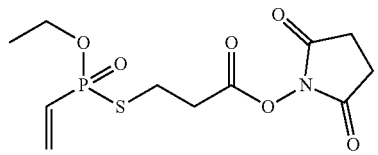 [SMILES: C=CP(=O)(OCC)SCCC(=O)ON1C(=O)CCC1=O]

10 mg of carboxylic acid 3-((ethoxy(alkene)phosphoryl)thio)propanoic acid 3 (0.0446 mmol, 1.0 eq) and N-hydroxysuccinimide (5.1 mg, 0.0446 mg, 1.0 eq.) were dissolved in 400 µl of a dioxane/EtOAc=1:1 mixture and cooled to 0° C. 9.2 mg of dicyclohexylcarbodiimide (0.0446 mmol, 1.0 eq.) was added to the stirred solution and the mixture was allowed to warm to room temperature. After 1 hour, the suspension was filtered and the clear residue was dried under reduced pressure to yield 12 mg of the described product 10 (0.0374 mmol, 84%).

¹H NMR (600 MHz, Chloroform-d) δ=6.39-6.09 (m, 3H), 4.29-4.13 (m, 2H), 3.19-2.99 (m, 4H), 1.37 (t, J=7.1 Hz, 3H) ppm.

¹³C NMR (151 MHz, Chloroform-d) δ=168.92, 166.85, 134.76, 130.50 (d, J=146.2 Hz), 62.41 (d, J=6.8 Hz), 33.03 (d, J=3.0 Hz), 25.71, 24.57 (d, J=2.9 Hz), 16.40 (d, J=6.9 Hz) ppm.

³¹P NMR (122 MHz, Chloroform-d) δ=41.44 ppm.

HRMS (ESI): calcd for $C_{11}H_{17}NO_6PS$ [M+H⁺]: 322.0509; found: 322.0540.

5-((2-(3-((ethoxy(alkene)phosphoryl)thio)propanamido)ethyl)amino)naphthalene-1-sulfonic acid (Compound 11)

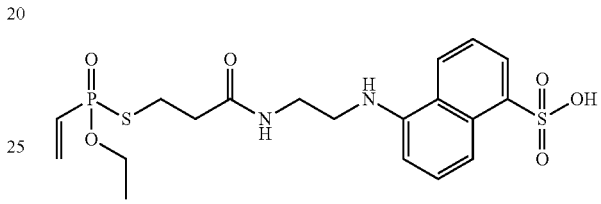

30 mg of NHS ester 2,5-dioxopyrrolidin-1-yl 3-((ethoxy(alkene)phosphoryl)thio)propanoate 10 (0.0934 mmol, 1.0 eq.) and 30 mg of EDANS (0.103 mmol, 1.1 eq.) were dissolved in 470 µl DMF in an Eppendorf tube. 33 µl (0.189 mmol, 2.0 eq.) of DIPEA was added and the suspension was stirred at room temperature for 15 minutes. The volatiles were evaporated under reduced pressure and the crude product was purified by preparative HPLC (5-60% MeCN in 40 min, flow 16 ml/min) to yield 24 mg the described compound 11 (0.0508 mmol, 54%) as a white powder after lyophilisation.

¹H NMR (600 MHz, DMSO-d₆) δ=8.32 (d, J=8.6 Hz, 1H), 8.22 (t, J=5.8 Hz, 1H), 8.07 (d, J=8.5 Hz, 1H), 7.96 (d, J=7.0 Hz, 1H), 7.40 (dd, J=8.5, 7.1 Hz, 1H), 7.34 (t, J=8.1 Hz, 1H), 6.81 (d, J=7.3 Hz, 1H), 6.38 (ddd, J=28.0, 18.4, 12.4 Hz, 1H), 6.25-6.11 (m, 2H), 4.14-3.98 (m, 2H), 3.41 (t, J=6.2 Hz, 2H), 3.32 (t, J=6.5 Hz, 2H), 2.93 (ddt, J=18.0, 12.9, 6.6 Hz, 2H), 1.26 (t, J=7.0 Hz, 3H) ppm.

¹³C NMR (151 MHz, DMSO-d₆) δ=170.42, 144.21, 134.28, 130.60 (d, J=142 Hz), 130.09, 125.92, 124.59, 124.07, 123.23, 122.62, 61.37 (d, J=6.7 Hz), 44.79, 37.23, 36.23 (d, J=4.0 Hz), 25.42 (d, J=2.8 Hz), 16.10 (d, J=6.5 Hz) ppm.

³¹P NMR (243 MHz, DMSO-d₆) δ=41.29 ppm.

HRMS (ESI): calcd for $C_{19}H_{26}N_2O_6PS_2$ [M+H⁺]: 473.0964; found: 473.0984.

General Procedure C: Synthesis of Alkene-PTs Via the PCl₃ Route

A round bottom flask was charged with 1-ethoxy-N,N-diisopropyl-1-vinylphosphanamine (e.g. 0.3 mmol), dissolved in dry acetonitrile (3 ml) and cooled to −40° C. Separately a solution of the thiol (0.3 mmol) in tetrazole (0.45 M in MeCN, 0.6 mmol, 1.33 ml) was prepared and added to the stirred mixture at −40° C. The reaction mixture was stirred at −40° C. for 10 min and then warmed to r.t. and stirred for another 30 min. To this mixture a tert-butyl hydroperoxide solution (70 wt. % in H₂O, 0.3 mmol, 86 µl)

was added at r.t. and stirred for 10 min. The reaction mixture was then diluted with H$_2$O (10 ml) and extracted with DCM (3×30 ml). The combined organic layers were dried over Na$_2$SO$_4$, filtered and the solvents were removed under reduced pressure. The crude product was purified by silica gel chromatography.

tert-butyl (2-((ethoxy(vinyl)phosphoryl)thio)ethyl) carbamate (Compound 6)

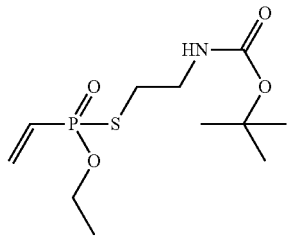 [SMILES: C=CP(=O)(OCC)SCCNC(=O)OC(C)(C)C]

Compound 6 was prepared according to general procedure C starting from 1-ethoxy-N,N-diisopropyl-1-vinylphosphanamine (93 mg, 0.465 mmol) and tert-butyl (2-mercaptoethyl)carbamate (82 mg, 0.465 mmol). Purification by silica gel chromatography (100% ethylacetate) gave the desired compound as a colorless oil (30 mg, 0.10 mmol, 22%).

Example 11: Procedures for the Synthesis of Alkyne Phosphonothiolates

S-benzyl O-methyl ethynyl-PT (Compound 7)

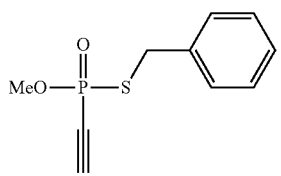

To a flame dried Schlenk tube equipped with a stir bar under an argon atmosphere, dry THF (17 mL) was added, followed by ethynylmagnesium bromide in THF (0.5 M, 4 mL, 2 mmol). This solution was then cooled to −78° C., charged with 1-chloro-N,N-diisopropyl-1-methoxyphosphanamine (0.39 mL, 2 mmol), and stirred for 10 min, before warming to 0° C. for 35 min, and then r.t. (0.5 mL of the reaction mixture was then taken for $^{31}$P-NMR). The reaction mixture was then transferred to a flame dried RBF under argon, the solvent removed in vacuo to leave a solid, and the flask back filled with argon. The solid was cooled to −40° C., dry tetrazole in MeCN (11 mL, 5 mmol) added, charged with dry benzyl thiol (0.6 mL, 1.7 mmol), and stirred overnight to give a solid suspension. To this mixture 70% tert-butyl hydroperoxide in H$_2$O (1.6 mL, 12 mmol) was added, and stirred for 30 min. The solvent was then removed in vacuo, diluted with water, extracted with DCM, washed with brine, and dried over MgSO$_4$. The solvent was removed in vacuo to give a brown oil, which was loaded onto a silica gel column with hexane/ethyl acetate (1:0 to 1:1) as eluent to give the pure product as a yellow oil (82 mg, 0.362 mmol, 18%).

$^1$H-NMR (300 MHz, CDCl$_3$) $\delta_H$=7.40-7.28 (5H, m, 5×aromatic C(sp$^2$)-H), 4.17 (1H, d, $^3J_{HP}$=3.2 Hz, S—CH$_a$), 4.11 (1H, d, $^3J_{HP}$=1.8 Hz, S—CH$_b$), 3.71 (3H, d, $^3J_{HP}$=14.0 Hz, 0-CH$_3$), 3.20 (1H, d, $^3J_{HP}$=12.6 Hz, CCH) ppm.

$^{13}$C-NMR (76 MHz, CDCl$_3$) $\delta_C$=135.39 (d, $^3J_{CP}$=6.1 Hz, IPSO aromatic C(sp$^2$)), 129.07 (s, meta aromatic C(sp$^2$)), 128.76 (s, ortho aromatic C(sp$^2$)), 127.88 (s, para aromatic C(sp$^2$), 89.76 (d, $^2J_{CP}$=43.2 Hz, C(sp)-H), 76.66 (d, $^1J_{CP}$=239.2 Hz, C(sp)), 52.93 (d, $^2J_{CP}$=6.2 Hz, O—CH$_3$), 34.96 (d, $^2J_{CP}$=3.5 Hz).

$^{31}$P-NMR (122 MHz, CDCl$_3$) $\delta_P$=17.59 (m) ppm.

HRMS (ESI): calcd for C$_{10}$H$_{11}$O$_2$PS [M+H$^+$]: 227.0290; found: 227.0293.

General Procedure D: Synthesis of Alkyne-Phosphonothiolates Via the PCl$_3$ Route A round bottom flask was charged with 1-ethoxy-N,N-diisopropyl-1-ethynylphosphanamine (e.g. 0.3 mmol), dissolved in dry acetonitrile (3 ml) and cooled to −40° C. Separately a solution of the thiol (0.3 mmol) in tetrazole (0.45 M in MeCN, 0.6 mmol, 1.33 ml) was prepared and added to the stirred mixture at −40° C. The reaction mixture was stirred at −40° C. for 10 min and then warmed to r.t. and stirred for another 30 min. To this mixture a tert-butyl hydroperoxide solution (70 wt. % in H$_2$O, 0.3 mmol, 86 µl) was added at r.t. and stirred for 10 min. The reaction mixture was then diluted with H$_2$O (10 ml) and extracted with DCM (3×30 ml). The combined organic layers were dried over Na$_2$SO$_4$, filtered and the solvents were removed under reduced pressure. The crude product was purified by silica gel chromatography.

S-benzyl O-ethyl ethynylphosphonothioate (Compound 8)

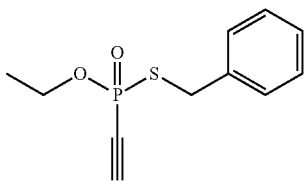

Compound 8 was prepared according to general procedure C starting from 1-ethoxy-N,N-diisopropyl-1-ethinylphosphanamine (25 mg, 0.123 mmol) and mercaptobenzyl (14.4 µl, 0.123 mmol). Purification by silica gel chromatography (100% ethylacetate) gave the desired compound as a colorless oil (10 mg, 0.042 mmol, 34%).

$^1$H-NMR (300 MHz, CDCl$_3$) $\delta_H$=7.45-7.25 (m, 5H), 4.28-4.02 (m, 4H), 3.12 (d, J=12.5 Hz, 1H), 1.35 (t, J=7.1 Hz, 3H) ppm.

$^{13}$C-NMR (76 MHz, CDCl$_3$) $\delta_C$=136.47 (d, J=6.4 Hz), 129.09, 128.91, 127.84, 88.90 (d, J=43.0 Hz), 63.50 (d, J=3.3 Hz), 35.04 (d, J=3.3 Hz), 28.27, 16.05 (d, J=7.7 Hz) ppm.

$^{31}$P-NMR (122 MHz, CDCl$_3$) $\delta_P$=15.36 ppm.

HRMS: n.d.

103
tert-butyl (2-((ethoxy(ethynyl)phosphoryl)thio)ethyl) carbamate (Compound 9)

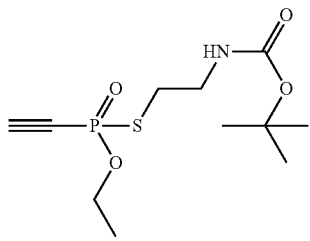 [SMILES: C#CP(=O)(OCC)SCCNC(=O)OC(C)(C)C]

Compound 9 was prepared according to general procedure D starting from 1-ethoxy-N,N-diisopropyl-1-ethinylphosphanamine (93 mg, 0.465 mmol) and tert-butyl (2-mercaptoethyl)carbamate (82 mg, 0.465 mmol). Purification by silica gel chromatography (100% ethylacetate) gave the desired compound as a colorless oil (50 mg, 0.17 mmol, 37%).

Example 12: Procedures for the Synthesis of Alkene-Phosphonates

General Procedure E: Synthesis of Alkene-Phosphonates Via the PCl₃ Route

A round bottom flask was charged with 1-ethoxy-N,N-diisopropyl-1-vinylphosphanamine (e.g. 0.3 mmol), dissolved in dry acetonitrile (3 ml) and cooled to −40° C. Separately a solution of the alcohol (0.3 mmol) in tetrazole (0.45 M in MeCN, 0.6 mmol, 1.33 ml) was prepared and added to the stirred mixture at −40° C. The reaction mixture was stirred at −40° C. for 10 min and then warmed to r.t. and stirred for another 30 min. To this mixture a tert-butyl hydroperoxide solution (70 wt. % in H₂O, 0.3 mmol, 86 μl) was added at r.t. and stirred for 10 min. The reaction mixture was then diluted with H₂O (10 ml) and extracted with DCM (3×30 ml). The combined organic layers were dried over Na₂SO₄, filtered and the solvents were removed under reduced pressure. The crude product was purified by silica gel chromatography.

benzyl ethyl vinylphosphonate

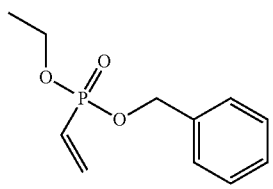

Benzyl ethyl vinylphosphonate was prepared according to general procedure E starting from 1-ethoxy-N,N-diisopropyl-1-vinylphosphanamine (25 mg, 0.123 mmol) and benzylalcohol (12.3 μl, 0.123 mmol). Purification by silica gel chromatography (100% ethylacetate) gave the desired compound as a colorless oil (2 mg, 0.0088 mmol, 7%). (The low yield can be explained by loss of the product from a handling step during purification.)

104
tert-butyl (2-((ethoxy(vinyl)phosphoryl)oxy)ethyl)carbamate

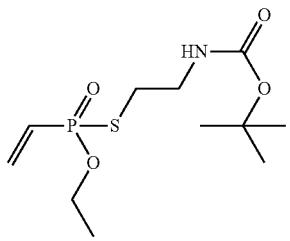 [SMILES: C=CP(=O)(OCC)SCCNC(=O)OC(C)(C)C]

The entitled compound was prepared according to general procedure E starting from 1-ethoxy-N,N-diisopropyl-1-vinylphosphanamine (201 mg, 1.00 mmol) and tert-butyl (2-hydroxyethyl)carbamate (161 mg, 1.00 mmol). Purification by silica gel chromatography (100% ethylacetate) gave the desired compound as a colorless oil (100 mg, 0.358 mmol, 36%).

HRMS (ESI): calcd for $NaC_{11}H_{22}NO_5P$ [M+Na⁺]: 302.1133; found: 302.1120.

Example 13: Procedures for the Synthesis of Alkyne-Phosphonates

General Procedure F: Synthesis of Alkyne-Phosphonates Via the PCl₃ Route

A round bottom flask was charged with 1-ethoxy-N,N-diisopropyl-1-ethinylphosphanamine (e.g. 0.3 mmol), dissolved in dry acetonitrile (3 ml) and cooled to −40° C. Separately a solution of the alcohol (0.3 mmol) in tetrazole (0.45 M in MeCN, 0.6 mmol, 1.33 ml) was prepared and added to the stirred mixture at −40° C. The reaction mixture was stirred at −40° C. for 10 min and then warmed to r.t. and stirred for another 30 min. To this mixture a tert-butyl hydroperoxide solution (70 wt. % in H₂O, 0.3 mmol, 86 μl) was added at r.t. and stirred for 10 min. The reaction mixture was then diluted with H₂O (10 ml) and extracted with DCM (3×30 ml). The combined organic layers were dried over Na₂SO₄, filtered and the solvents were removed under reduced pressure. The crude product was purified by silica gel chromatography.

Benzyl ethyl ethynylphosphonate

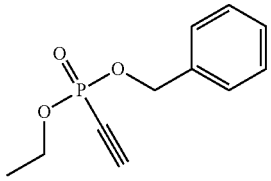

Benzyl ethyl ethinylphosphonate was prepared according to general procedure F starting from 1-ethoxy-N,N-diisopropyl-1-ethinylphosphanamine (25 mg, 0.123 mmol) and benzylalcohol (12.3 μl, 0.123 mmol). Purification by silica gel chromatography (100% ethylacetate) gave the desired compound as a colorless oil (27 mg, 0.120 mmol, 49%).

tert-butyl
(2-((ethoxy(ethynyl)phosphoryl)oxy)ethyl)carbamate

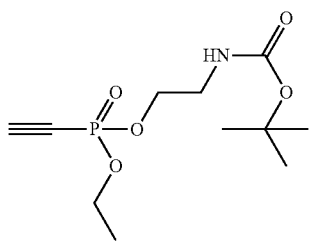 [SMILES: C#CP(=O)(OCC)OCCNC(=O)OC(C)(C)C]

The entitled compound was prepared according to general procedure F starting from 1-ethoxy-N,N-diisopropyl-1-ethinylphosphanamine (201 mg, 1.00 mmol) and tert-butyl (2-hydroxyethyl)carbamate (161 mg, 1.00 mmol). Purification by silica gel chromatography (100% ethylacetate) gave the desired compound as a colorless oil (168 mg, 0.601 mmol, 60%).

HRMS (ESI): calcd for $C_{11}H_{21}NO_5P$ [M+H$^+$]: 278.1157; found: 278.1149.

Example 14: Procedures for the Coupling of Carboxylic Acids to Alkene- and Alkyne Phosphonothiolates and Phosphonates General Procedure G: Preparation of Functionalized Phosphonothiolates and Phosphonates Via Amide Bond Formation

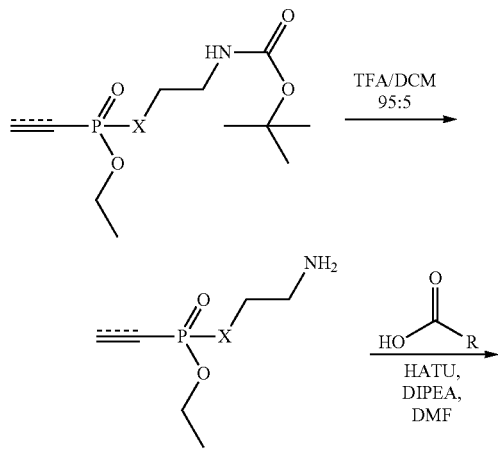

X = O, S

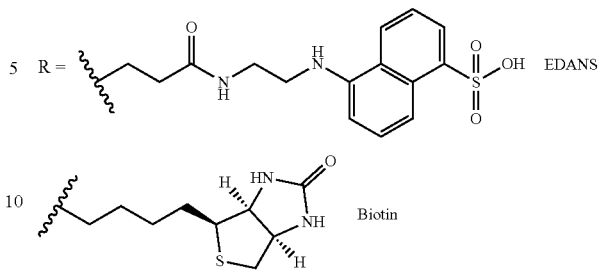

Boc-protected amine derivatives of alkene- and alkyne phosphonothiolates (X=S) or phosphonates (X=O) (s. scheme above) (e.g. 0.2 mmol) were dissolved in a mixture of TFA/H$_2$O (95:5, xx ml) and the resulting clear solution stirred at r.t. for 15 min. The solvents were then removed by bubbling nitrogen through the solution. The residue was redissolved in H$_2$O and subjected to lyophilization, yielding a colorless oil. The products were used for the next step without further purification. To the deprotected amine (e.g. 0.05 mmol) was added a solution of HATU (0.055 mmol), carboxylic acid (0.055 mmol) and DIPEA (0.15 mmol) in DMF (250 µl). The resulting mixture was stirred for 30 min at r.t. in an Eppendorf tube and then concentrated under reduced pressure. The residue was redissolved in H$_2$O/MeCN (9:1, 5 ml) and purified by preparative HPLC.

5-((2-(4-((2-((ethoxy(ethynyl)phosphoryl)oxy)ethyl)amino)-4-oxobutanamido)ethyl)amino) naphthalene-1-sulfonic acid (Compound 20)

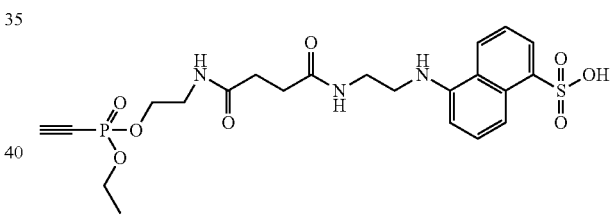

Compound 20 was generated according to general protocol G from deprotected amine (14 mg, 0.079 mmol). The pure product was obtained after purification by HPLC ( ) and lyophilization as a colorless powder (18 mg, 0.0342 mmol, 43%).

HRMS (ESI): calcd for $C_{22}H_{29}N_3O_8PS$ [M+H$^+$]: 526.1413; found: 526.1387.

Figure 8:
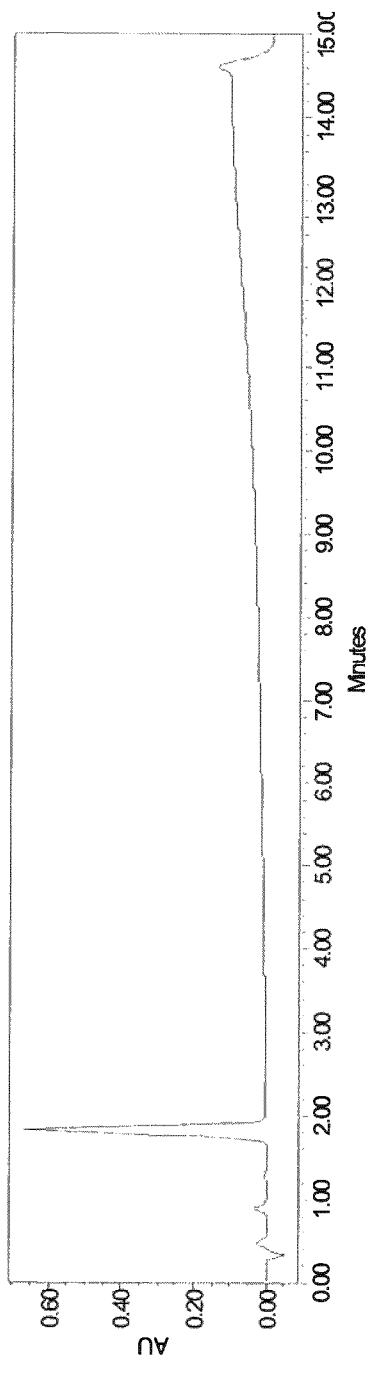
FIG. 8 shows a UV-LC trace of purified compound 20.

FIG. 8 shows a UV-LC trace of purified compound 20.

5-((2-(4-((2-((ethoxy(vinyl)phosphoryl)oxy)ethyl)amino)-4-oxobutanamido)ethyl)amino)naphthalene-1-sulfonic acid (Compound 21)

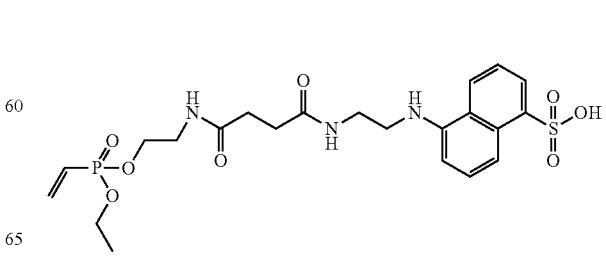

Compound 21 was generated according to general protocol G from deprotected amine (12.9 mg, 0.072 mmol). The pure product was obtained after purification by HPLC ( ) and lyophilization as a colorless powder (10 mg, 0.0190 mmol, 26%).

HRMS (ESI): calcd for $C_{22}H_{31}N_3O_8PS$ [M+H$^+$]: 528.1570; found: 528.1543.

Figure 9:
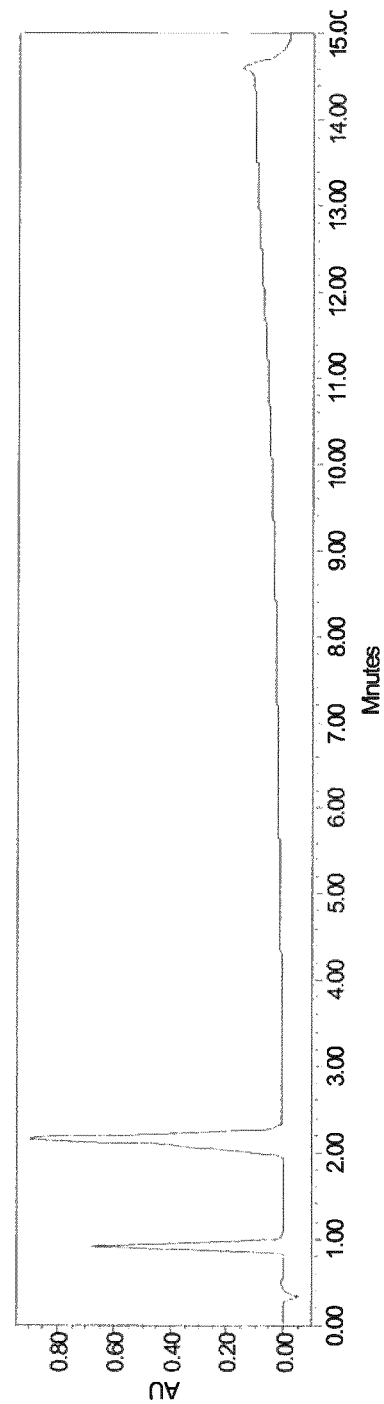
FIG. 9 shows a UV-LC trace of purified compound 21.

FIG. 9 shows a UV-LC trace of purified compound 21

5-((2-(4-((2-((ethoxy(ethynyl)phosphoryl)thio)ethyl) amino)-4-oxobutanamido)ethyl)amino)naphthalene-1-sulfonic acid (Compound 22)

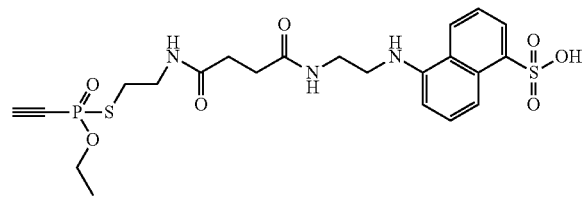 [SMILES: C#CP(=O)(OCC)SCCNC(=O)CCC(=O)NCCNc1cccc2c(S(=O)(=O)O)cccc12]

Compound 22 was generated according to general protocol G from deprotected amine (11.2 mg, 0.058 mmol). The pure product was obtained after purification by HPLC ( ) and lyophilization as a colorless powder (10 mg, 0.0185 mmol, 32%).

HRMS (ESI): calcd for $C_{22}H_{29}N_3O_7PS_2$ [M+H$^+$]: 542.1184; found: 542.1156.

Figure 10:
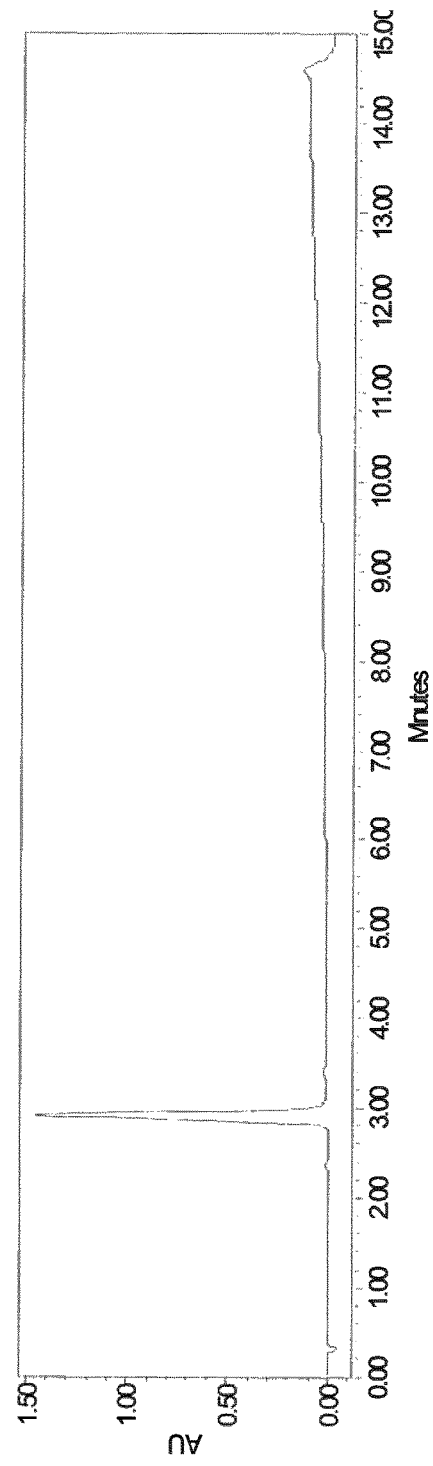
FIG. 10 shows a UV-LC trace of purified compound 22.

FIG. 10 shows a UV-LC trace of purified compound 22

5-((2-(4-((2-((ethoxy(vinyl)phosphoryl)thio)ethyl) amino)-4-oxobutanamido)ethyl)amino)naphthalene-1-sulfonic acid (Compound 23)

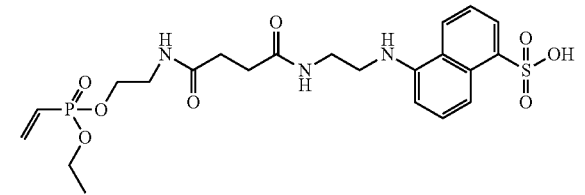 [SMILES: C=CP(=O)(OCC)OCCNC(=O)CCC(=O)NCCNc1cccc2c(S(=O)(=O)O)cccc12]

Compound 23 was generated according to general protocol G from deprotected amine (9.6 mg, 0.049 mmol). The pure product was obtained after purification by HPLC ( ) and lyophilization as a colorless powder (11 mg, 0.0202 mmol, 41%).

HRMS (ESI): calcd for $C_{22}H_{31}N_3O_7PS_2$ [M+H$^+$]: 544.1341; found: 544.1316.

Figure 11:
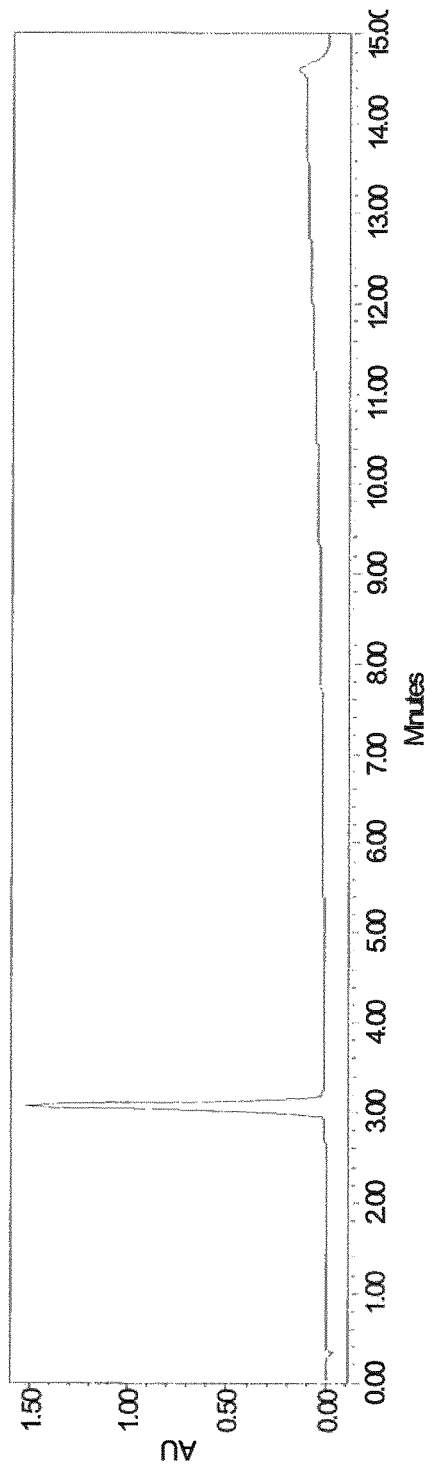
FIG. 11 shows a UV-LC trace of purified compound 23.

FIG. 11 shows a UV-LC trace of purified compound 23

O-ethyl S-(2-(5-((3aS,4S,6aR)-2-oxohexahydro-1H-thieno[3,4-d]imidazol-4-yl)pentanamido)ethyl) vinylphosphonothioate (Compound 13)

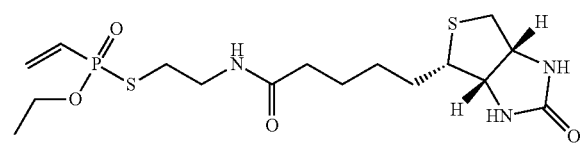 [SMILES: C=CP(=O)(OCC)SCCNC(=O)CCCC[C@@H]1SC[C@@H]2NC(=O)N[C@@H]21]

Compound 13 was generated according to general protocol G from deprotected amine (14.8 mg, 0.076 mmol). The pure product was obtained after purification by HPLC ( ) and lyophilization as a colorless powder (14 mg, 0.033 mmol, 44%).

O-ethyl S-(2-(5-((3aS,4S,6aR)-2-oxohexahydro-1H-thieno[3,4-d]imidazol-4-yl)pentanamido)ethyl) ethynylphosphonothioate (Compound 28)

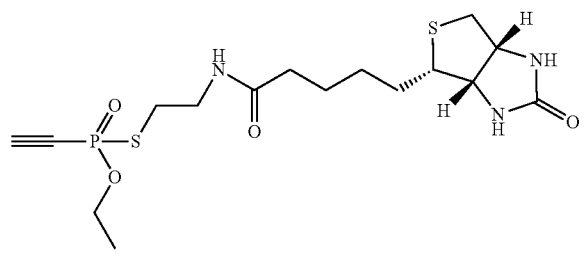 [SMILES: C#CP(=O)(OCC)SCCNC(=O)CCCC[C@@H]1SC[C@@H]2NC(=O)N[C@@H]21]

The entitled compound was generated according to general protocol G from deprotected amine (20 mg, 0.104 mmol). The pure product was obtained after purification by HPLC ( ) and lyophilization as a colorless powder (7 mg, 0.0167 mmol, 16%).

Example 15A: Procedure for the Hydrothiolation of Alkene-Phosphonothiolate with Glutathione (Ethyl-S-benzyl-P-ethyl-phosphonothiolate)-S-glutathione conjugate (Compound 14)

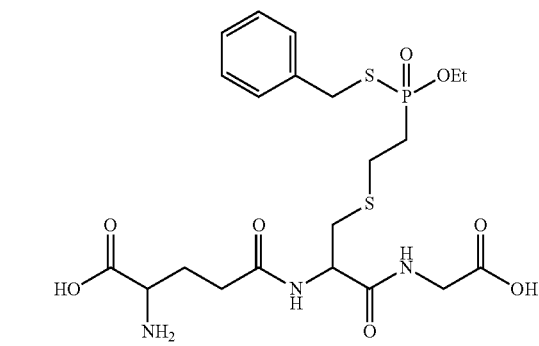 [SMILES: CCOP(=O)(CCSCC(NC(=O)CCC(N)C(=O)O)C(=O)NCC(=O)O)SCc1ccccc1]

Reduced glutathione (20.3 mg, 0.066 mmol, 2.0 eq.) was dissolved in 1.32 ml aqueous buffer (1 mM EDTA, 50 mM NH$_4$HCO$_3$, pH 8.0) and added to a solution of S-benzyl O-ethyl alkene-PT 2 (8 mg, 0.033 mmol, 1.0 eq.) in 0.33 ml DMF and the mixture was stirred at r.t. for 90 min. The reaction was monitored by UPLC-MS (gradient: 3-60% MeCN in 5 min), indicating full conversion after 90 min. The solvents were then removed under reduced pressure and the residue was re-dissolved in 5 ml H$_2$O and purified via semipreparative HPLC (acidic conditions, gradient: 20-60% MeCN in 40 min, product elutes at 35% MeCN, flow: 16 ml/min). After lyophilization the described compound 14 was obtained as a white powder (14 mg, 0.026 mmol, 77%).

$^1$H NMR (300 MHz, Deuterium Oxide) δ=7.46-7.28 (m, 5H), 4.50 (dd, J=8.4, 5.3 Hz, 1H), 4.19-3.93 (m, 7H), 2.90

(dd, J=14.1, 5.3 Hz, 1H), 2.76 (ddd, J=14.1, 8.4, 1.9 Hz, 1H), 2.69-2.47 (m, 4H), 2.25-2.01 (m, 4H), 1.26 (t, J=7.1 Hz, 3H) ppm.

$^{13}$C NMR (75 MHz, Deuterium Oxide) δ=174.29, 172.82, 172.51, 172.08, 137.34, 128.95, 128.84, 127.95, 63.30, 63.20, 52.79, 52.60, 41.06, 33.90, 32.66, 31.37, 30.93, 25.58, 23.95, 15.38 (d, J=6.5 Hz) ppm.

$^{31}$P NMR (122 MHz, Deuterium Oxide) δ 60.51 (d, J=1.9 Hz) ppm.

HRMS (ESI): calcd for $C_{21}H_{33}N_3O_8PS$ [M+H$^+$]: 550.1441; found: 550.1451.

Example 15B: Procedure for the Hydrothiolation of Alkene-Phosphonate with Glutathione (Diethyl-phosphonate)-S-glutathione conjugate

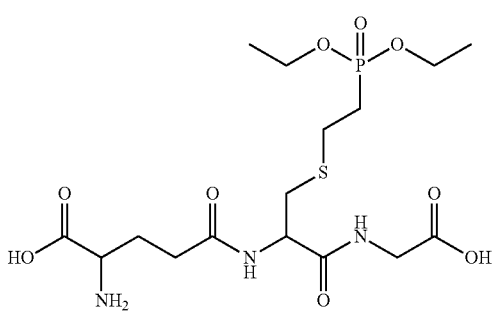 [SMILES: CCOP(=O)(CCSCC(NC(=O)CCC(N)C(=O)O)C(=O)NCC(=O)O)OCC]

Diethyl alkenephosphonate (20 mg, 0.147 mmol, 1.0 eq.) was dissolved in 1 ml buffer (50 mM NH$_4$HCO$_3$, 1 mM EDTA, pH 8.0) and 1 ml DMF. To this, a solution of glutathione (90.3 mg, 0.294 mmol, 2.0 eq.) in 9 ml of the same buffer (pH adjusted to pH 8.0 after dissolving GSH) was added and the mixture was stirred at r.t. When full conversion was achieved (judged by $^{31}$P-NMR), the reaction mixture was frozen in liquid nitrogen and subsequently lyophilized. The residue was purified by semipreparative HPLC to yield the title compound as a colorless powder (41.6 mg, 0.0882 mmol, 60%).

$^1$H NMR (300 MHz, DMSO-d$_6$) δ=8.48 (t, J=5.9 Hz, 1H), 8.38-8.25 (m, 4H), 4.49 (td, J=8.9, 4.8 Hz, 1H), 4.07-3.90 (m, 5H), 3.76 (d, J=5.8 Hz, 2H), 2.91 (dd, J=13.8, 4.8 Hz, 1H), 2.71-2.55 (m, 3H), 2.45-2.23 (m, 2H), 2.12-1.89 (m, 4H), 1.23 (t, J=7.0 Hz, 6H) ppm.

$^{13}$C NMR (75 MHz, DMSO-d$_6$) δ=171.45, 171.39, 171.27, 171.01, 61.70, 61.62, 52.27, 52.07, 34.13, 31.09, 26.95, 26.50, 25.17, 24.82, 16.76, 16.69 ppm.

$^{31}$P NMR (122 MHz, DMSO-d$_6$) δ=28.58 ppm.

HRMS: ESI-MS (positive mode) m/z 472.1496 [(M+H)+; calcd for $C_{16}H_{31}N_3O_9PS^+$: 472.1513].

Example 16: Procedure for Hydrothiolation of Alkyne-Phosphonothiolate with Glutathion (Methyl-S-Benzyl-P-Ethyl-Phosphonothiolate)-S-Glutathione Conjugate (Compound 15)

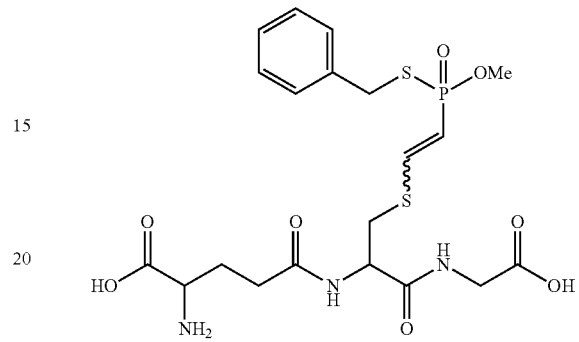

To a mixture of glutathione (0.15 mmol, 23 mg) in buffered aqueous solution (1 mM EDTA, 50 mM NH$_4$HCO$_3$, pH=8.5), was added compound 7 in DMF (0.75 mL, 100 mM), and the mixture vortexed for 4 min. The mixture was then lyophilized, the remaining residue dissolved in MeCN/H$_2$O and purified via HPLC (5-45% MeCN in 50 min). Lyophilization of the product-containing fractions gave the entitled compound 15 as a colorless powder (16.4 mg, ca. 33%).

1H-NMR (600 MHz, DMSO-d$^6$) δ=8.47-8.45 (1H, m), 8.39-8.37 (1H, m), 7.62-7.51 (1H, ddd, J=49.9 Hz, J=12.3 Hz, J=4.8 Hz), 7.37-7.25 (5H, m), 5.83-5.78 (1H, ddd, J=21.3 Hz, J=12.2 Hz, J=6.4 Hz), 4.56-4.54 (1H, m), 4.01-3.91 (3H, m), 3.78-3.77 (2H, m), 3.77-3.53 (3H, m), 3.22-3.19 (1H, m), 2.96-2.92 (1H, m), 2.38-2.31 (2H, m), 2.07-1.98 (2H, m) ppm.

$^{13}$C-NMR (151 MHz, DMSO-d$^6$) δ=171.07, 170.87, 170.75, 170.02, 137.80, 137.76, 128.87, 128.50, 127.32, 118.07, 116.09, 113.62, 112.63, 52.89, 51.63, 51.20, 51.17, 51.13, 40.77, 36.81, 33.37, 30.66, 30.62, 25.88 ppm.

$^{31}$P-NMR (122 MHz, DMSO-d$^6$) δ=41.6 ppm.

Example 17: Procedures for the Synthesis of Dabcyl-EDANS Quencher Pairs for Stability Study General Procedure H for the Synthesis of Dabcyl-EDANS Quencher Pair

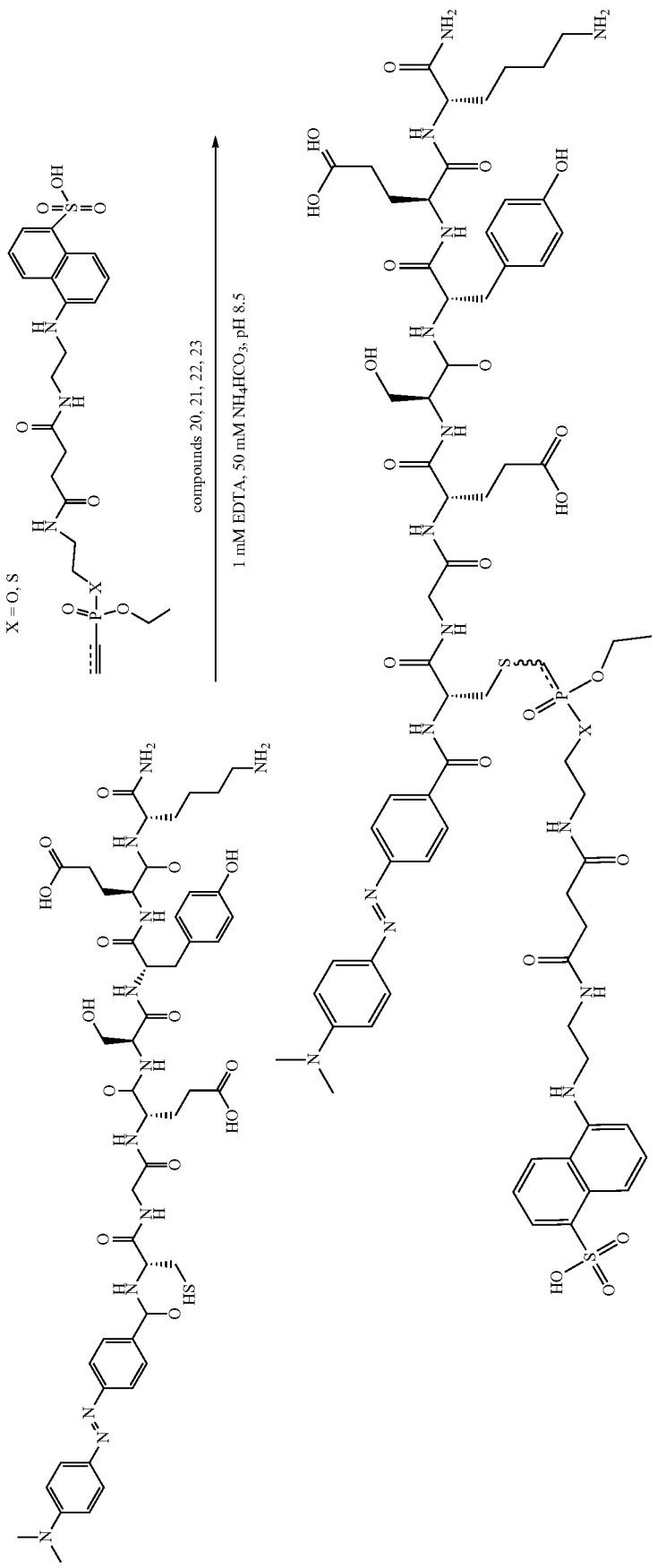

The DABCYL-containing peptide was synthesized from a Rink-amide resin under standard solid phase peptide synthesis conditions (Fmoc strategy). Dabcyl (as carboxylic acid) was coupled to the free N-terminus on resin using HATU as coupling reagent. This peptide was cleaved from resin using a TFA/TIS/H$_2$O/DTT=95/2/2/1 mixture. The peptide was purified via semipreparative HPLC.

The purified Dabcyl peptide (e.g. 2.35 μmol) was dissolved in aqueous buffer (50 mM NH$_4$HCO$_3$, 1 mM EDTA, pH 8.5) and mixed with the EDANS compound 20-23 (2.82 μmol), dissolved in DMF (280 μl) in an Eppendorf tube. The reaction mixture was stirred at r.t. and the reaction was monitored by UV-LC-MS. The reaction mixture was then diluted with water (4.7 ml) and before purified via semipreparative HPLC (10-50% MeCN over 45 min, 0.1% TFA, flow: 16 ml/min) and pure product-containing fractions were combined and lyophilized.

EDANS-Dabcyl FRET Pair (Alkyne Phosphonate Derivative) (Compound 24)

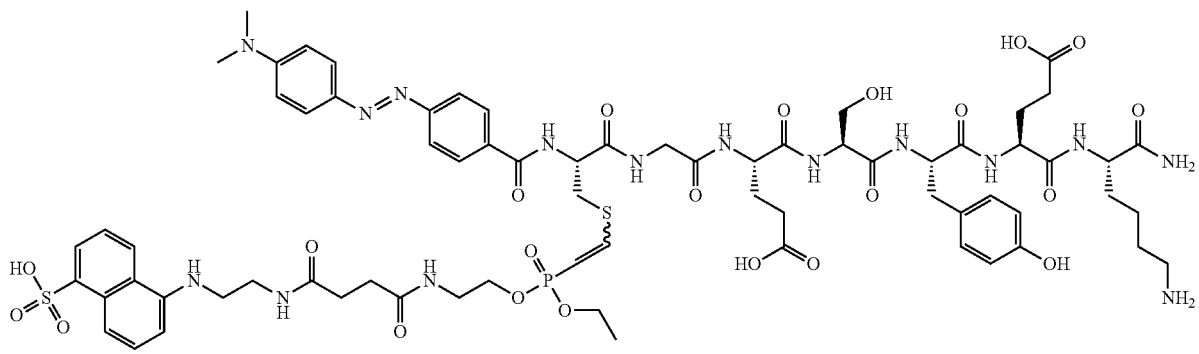 [SMILES: CCOP(=O)(C=CSC[C@H](NC(=O)c1ccc(/N=N/c2ccc(N(C)C)cc2)cc1)C(=O)NCC(=O)N[C@@H](CCC(=O)O)C(=O)N[C@@H](CO)C(=O)N[C@@H](Cc1ccc(O)cc1)C(=O)N[C@@H](CCC(=O)O)C(=O)N[C@@H](CCCCN)C(N)=O)OCCNC(=O)CCC(=O)NCCNc1cccc2c(S(=O)(=O)O)cccc12]

Compound 24 was generated according to general procedure H from Edans compound 20 (1.48 mg, 2.82 μmol) and Dabcyl peptide (2.5 mg, 2.35 μmol). The product was obtained after purification by semipreparative HPLC (10-50% MeCN, 0.1% TFA, 16 ml/min) and lyophilization as a red powder (3 mg, 2.01 μmol, 86%).

Figure 12:
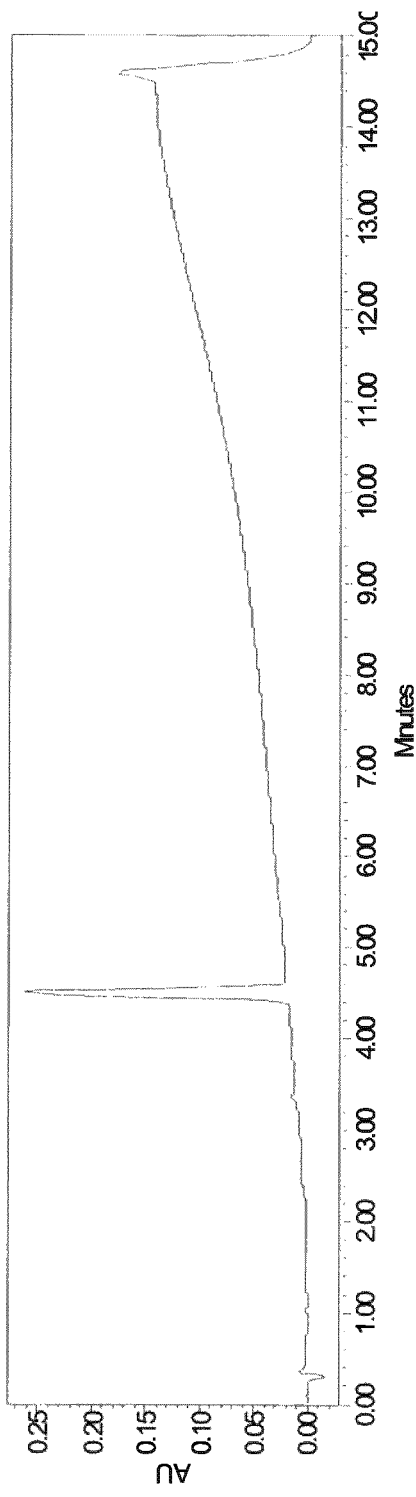
FIG. 12 shows a UV LC trace of purified compound 24.

FIG. 12 shows a UV LC trace of purified compound 24 EDANS-Dabcyl FRET Pair (Alkene Phosphonate Derivative) (Compound 25)

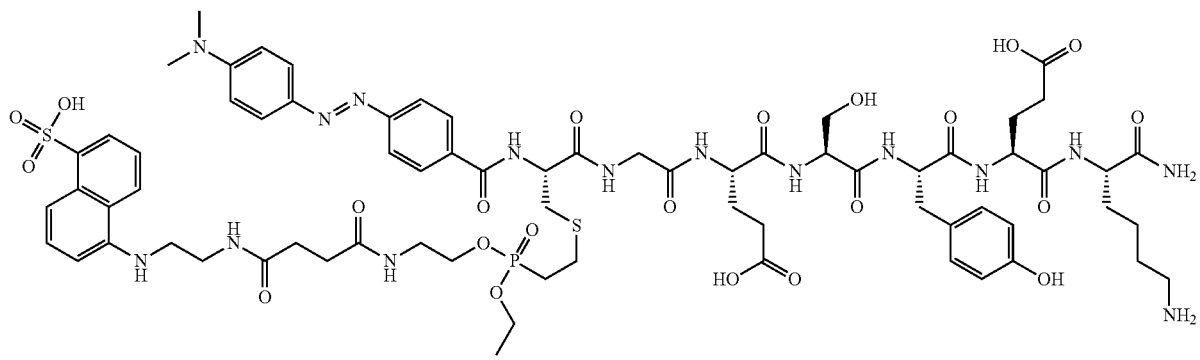 [SMILES: CCOP(=O)(CCSC[C@H](NC(=O)c1ccc(/N=N/c2ccc(N(C)C)cc2)cc1)C(=O)NCC(=O)N[C@@H](CCC(=O)O)C(=O)N[C@@H](CO)C(=O)N[C@@H](Cc1ccc(O)cc1)C(=O)N[C@@H](CCC(=O)O)C(=O)N[C@@H](CCCCN)C(N)=O)OCCNC(=O)CCC(=O)NCCNc1cccc2c(S(=O)(=O)O)cccc12]

Compound 25 was generated according to general procedure H from Edans compound 21 (1.49 mg, 2.82 μmol) and Dabcyl peptide (2.5 mg, 2.35 μmol). The product was obtained after purification by semipreparative HPLC (10-50% MeCN, 0.1% TFA, 16 ml/min) and lyophilization as a red powder (3 mg, 2.01 μmol, 86%).

Figure 13:
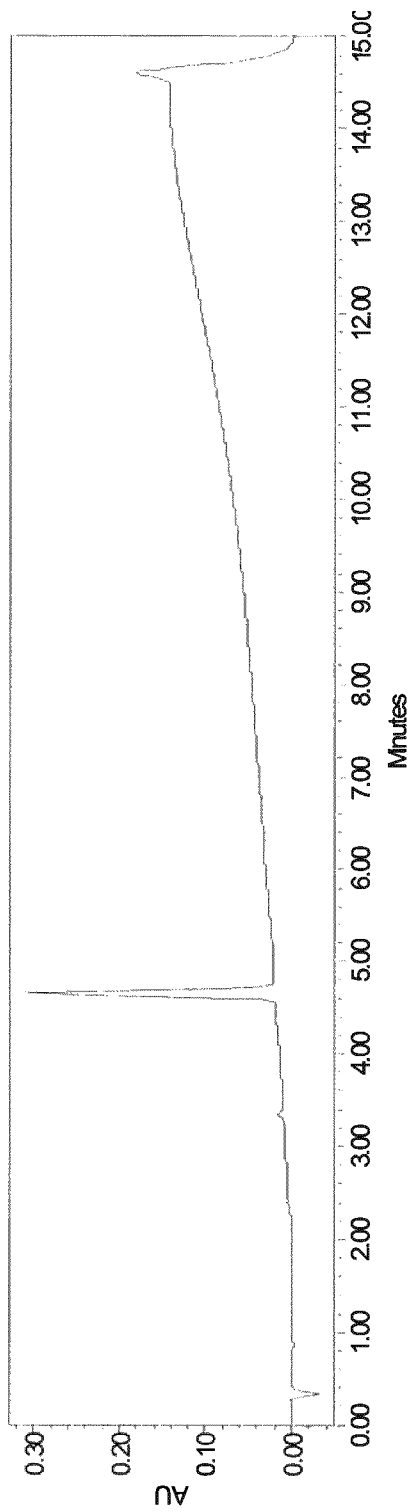
FIG. 13 shows a UV LC trace of purified compound 25.

FIG. 13 shows a UV LC trace of purified compound 25
EDANS-Dabcyl FRET Pair (Alkyne Phosphonothiolate Derivative) (Compound 26)

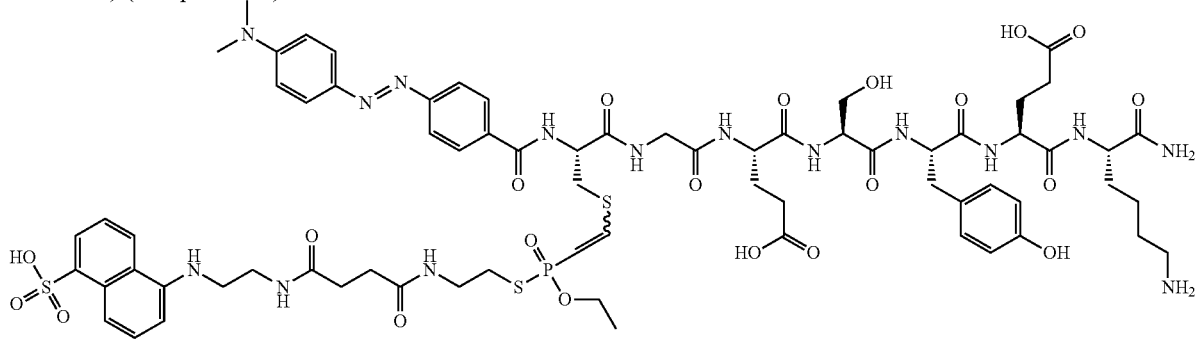

Compound 26 was generated according to general procedure H from Edans compound 22 (1.53 mg, 2.82 μmol) and Dabcyl peptide (2.5 mg, 2.35 μmol). The product was obtained after purification by semipreparative HPLC (10-50% MeCN, 0.1% TFA, 16 ml/min) and lyophilization as a red powder (3 mg, 1.87 μmol, 80%).

Figure 14:
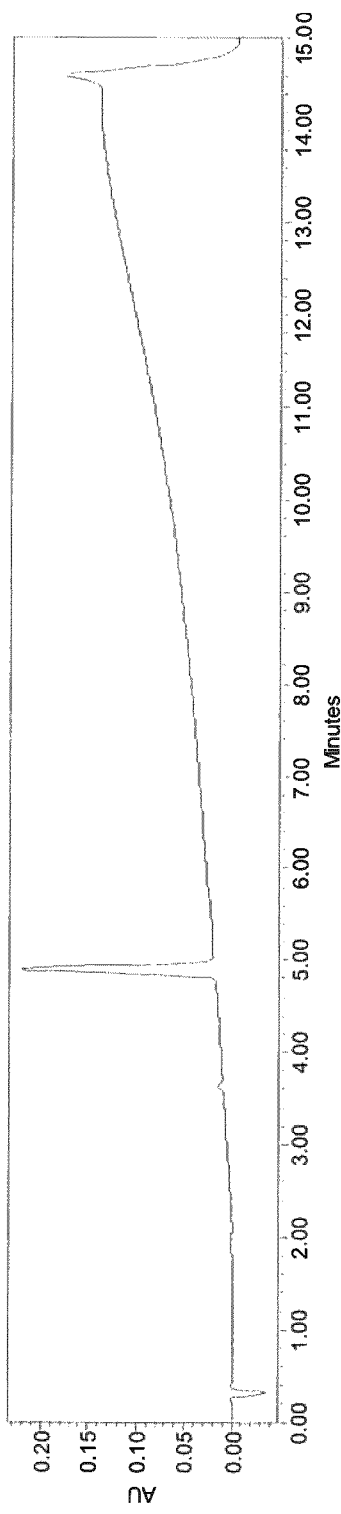
FIG. 14 shows a UV LC trace of purified compound 26.

FIG. 14 shows a UV LC trace of purified compound 26 EDANS-Dabcyl FRET Pair (Alkene Phosphonothiolate Derivative) (Compound 27)

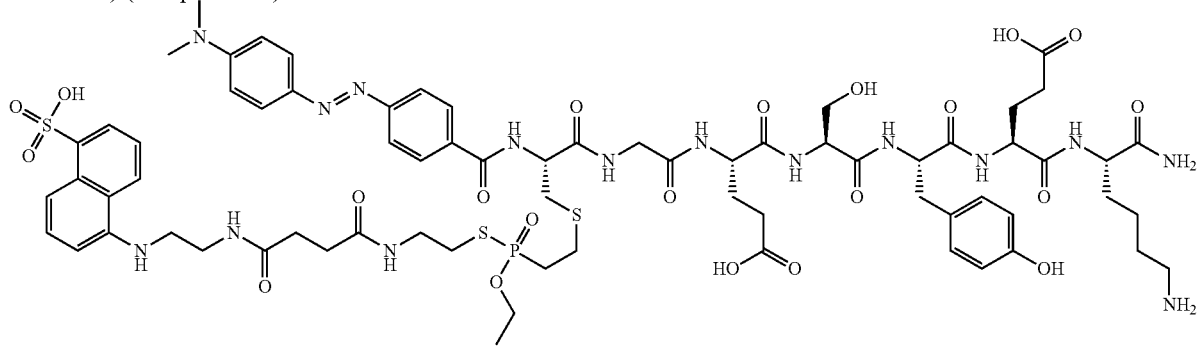 [SMILES: CCOP(=O)(CCSC[C@H](NC(=O)c1ccc(/N=N/c2ccc(N(C)C)cc2)cc1)C(=O)NCC(=O)N[C@@H](CCC(=O)O)C(=O)N[C@@H](CO)C(=O)N[C@@H](Cc1ccc(O)cc1)C(=O)N[C@@H](CCC(=O)O)C(=O)N[C@@H](CCCCN)C(N)=O)SCCNC(=O)CCC(=O)NCCNc1cccc2c(S(=O)(=O)O)cccc12]

Compound 27 was generated according to general procedure H from Edans compound 23 (1.53 mg, 2.82 μmol) and Dabcyl peptide (2.5 mg, 2.35 μmol). The product was obtained after purification by semipreparative HPLC (10-50% MeCN, 0.1% TFA, 16 ml/min) and lyophilization as a red powder (3 mg, 1.87 μmol, 80%).

Figure 15:
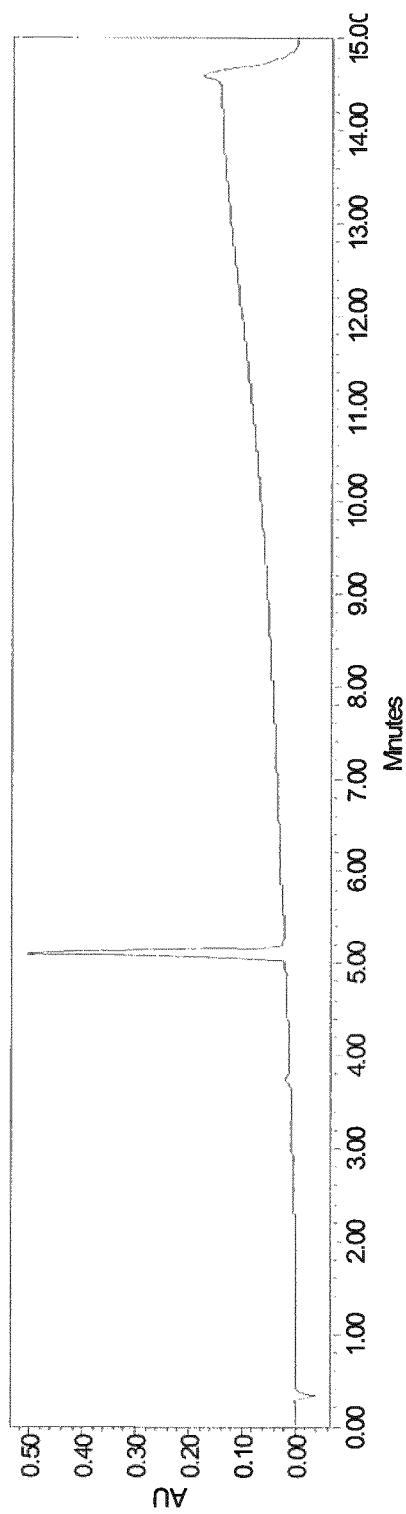
FIG. 15 shows a UV LC trace of purified compound 27.

FIG. 15 shows a UV LC trace of purified compound 27

Example 18: Procedure for the Stability Study of Example 6

A 0.20 mM stock solution of the EDANS-DABCYL conjugate 24-27 was prepared each (PBS pH 7.4). From this stock solution 5 μl were mixed with 95 μl of respective matrix to test (PBS pH 7.4, freshly prepared lysate from HeLa cells (1 mg/ml), human serum) in a 96-well plate (Corning, N° 3615) at room temperature (about 25° C.). For the experiments in NaOH, the compounds (150 μL of a 200 μM stock solution in PBS) were mixed with 150 μL of a 1M naOH solution in an Eppendorf tube at room temperature (about 25° C.). At a given time point, 3 μl of this solution was mixed with 5.6 μl of a 1 M HCl solution and 91 μl PBS for neutralization in a 96 well plate. Fluorescence was monitored over the course of 3 days (for all condition except NaOH) using a Safire/Tecan instrument (EDANS: $\lambda_{ex}$=360 nm, $\lambda_{em}$=508 nm). Fluorescence intensities were corrected by the background measurement (matrix alone) and mean values and standard deviations of three independent experiments were calculated (n=3).

Example 19: Procedure for the Kinetic Study of Example 5

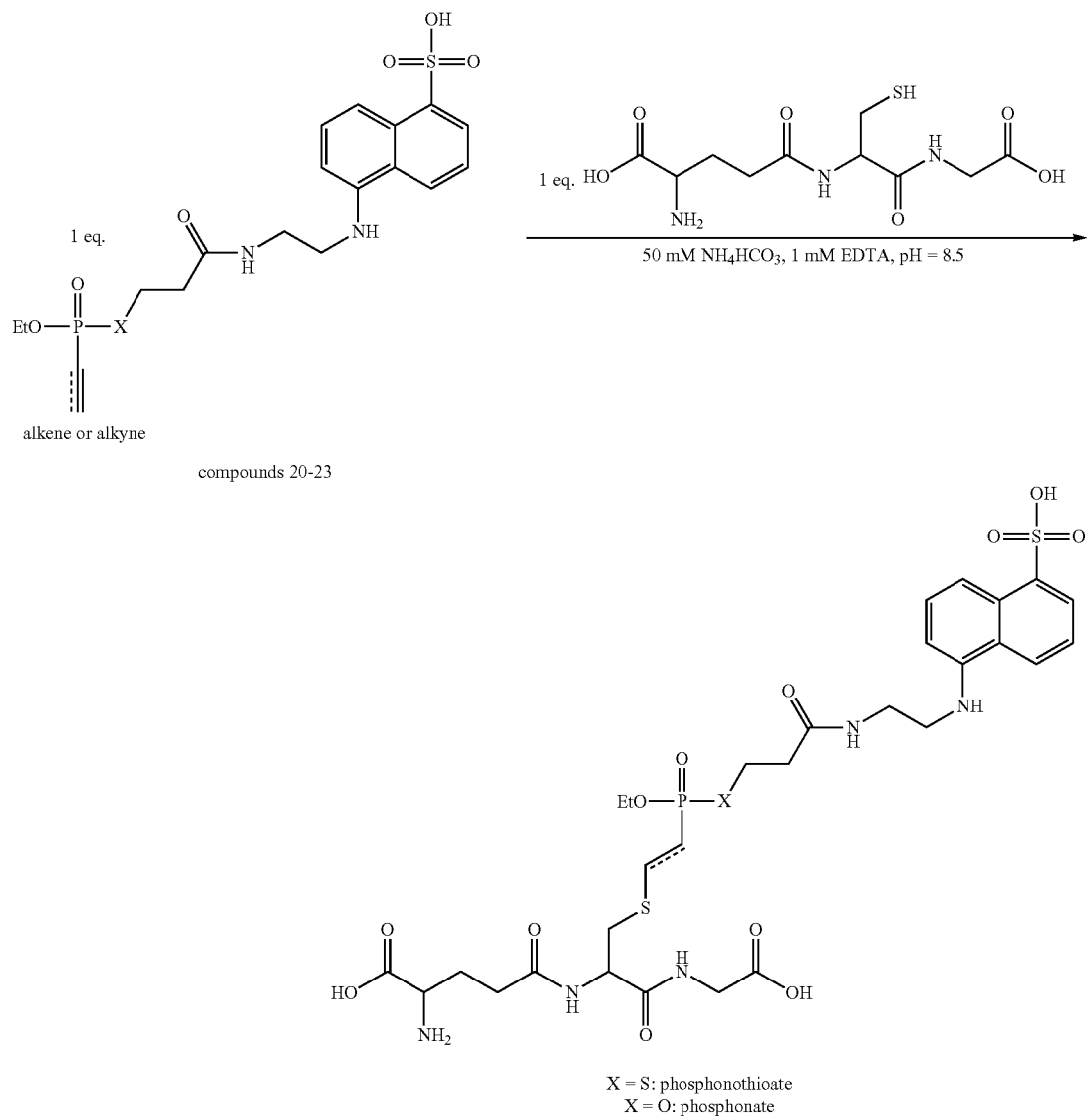

2.5 µl of a 20 mM solution of the corresponding phosphorous compound 20-23 in DMF and 5 µl of a 1 mM solution of unconjugated EDANS in DMF/Buffer (1:1) as an internal standard was added to 488 µl conjugation buffer (50 mM NH$_4$HCO$_3$ and 1 mM EDTA in ultrapure water, adjusted to pH 8.5 with aqueous ammonia solution). 5 µl of a 10 mM glutathione solution in buffer was added to start the reaction. The reaction was carried out at room temperature (about 25° C.). The first sample (t=0) was drawn before the addition of glutathione. Following samples were taken after 15, 30, 60, 120, 240 and 480 minutes. Sample were drawn in a volume of 20 µl and immediately diluted into 80 µl of 50 mM NaOAc buffer at pH 3.5 to stop the reaction. Those samples were subjected to HPLC analyses with a fluorescence detector, injecting 20 µl each. (The results of this study are shown in FIG. 3.)

Example 20A: Procedure for the BSA Conjugation to Phosphonothiolates

A 10 µM solution (100 µl) of bovine serum albumin (BSA) in buffer (PBS, 1 mM EDTA, pH 7.4 or 50 mM NH$_4$HCO$_3$, 100 mM NaCl, 1 mM EDTA, pH 8.5) was mixed with 1 µl of a 100 mM (corresponds to 100 eq.) or 1 µl of a solution of compound 2 or 7 (50 mM in DMF) at 4° C. The reaction mixture was stirred for 18 h at 4° C. Excess compound was then removed via spin filtration (7 kDa MWCO), thereby changing the buffer to PBS pH 7.4. 3 µl of this protein solution (10 µM) in PBS was mixed with 27 µl of mercaptoethanol-containing Laemmli buffer, heated at 95° C. for 10 min and run on a SDS-Gel (12% acrylamide, 250 V, 40 min). The protein was then subjected to an in-gel digest with chymotrypsin and analyzed by MS/MS. (The results of the MS/MS analysis are summarized in table 6.)

Example 20B: Procedure for the BSA Conjugation to Phosphonates

A 10 µM solution (100 µl) of bovine serum albumin (BSA) in buffer (50 mM $NH_4HCO_3$, 100 mM NaCl, 1 mM EDTA, pH 8.5) was mixed with 1 µl of a 100 mM solution of diethyl alkene phosphonate in DMF at 4° C. The reaction mixture was stirred for 18 h at 4° C. Excess phosphonate compound was then removed via spin filtration (7 kDa MWCO), thereby changing the buffer to PBS pH 7.4. Subsequently, 3 µl of this protein solution (10 µM) in PBS was mixed with 27 µl of mercaptoethanol-containing Laemmli buffer, heated at 95° C. for 10 min and run on a SDS-Gel (12% acrylamide, 250 V, 40 min). The protein was then subjected to an in-gel digest with chymotrypsin and analyzed by MS/MS. (The results of the MS/MS analysis are summarized in table 1.)

Example 20: Procedure for the Antibody Conjugation to Phosphonothiolates 1.25 µl of a 100 µM solution of Cetuximab antibody (in PBS) was mixed with 10 µl borate containing PBS (50 mM borate, pH 8.0) and 1.25 µl of a DTT solution (100 mM DTT in same borate buffer, pH 8.0). Control samples were prepared similarly, without adding DTT. These mixtures were incubated on a thermo-shaker for 30 min at 37° C. Excess DTT was then removed using size exclusion column (Thermo Scientific, Zeba™ Micro Spin Desalting Columns, 7 K MWCO, Product N° 89877). The size exclusion columns were first equilibrated (3×50 µl for 1 min at 1000 g) with the alkylation buffer (50 mM $NH_4HCO_3$, 1 mM EDTA, pH=8.5/8.0 or PBS, 1 mM EDTA, pH 7.4). The antibody-DTT mixture (12.5 µl) was then applied on the equilibrated column and the antibody was collected by means of centrifugation (2 min, 1000 g) into a fresh Eppendorf tube. To this solution, there was immediately added 0.25 µl of a solution of biotin-PT (alkene or alkyne phosphonothiolate) (25 mM in DMSO) and the mixtures were incubated at 4° C. overnight on a thermoshaker.

3 µl of this mixture was mixed with 27 µl of mercaptoethanol-containing Laemmli buffer and heated at 95° C. for 10 min. Thereof, 10 µl were loaded on 12% acrylamide SDS-gel and run at 250 V for 35 min. The gel was then subjected to a Western-blot, using the commercially available Streptavidin-HRP conjugate for hybridization to the biotin-modified antibodies and indirect detection of biotin via chemiluminescence.

Example 21: Modification of eGFP with Alkynephosphonothiolates

In a proof of principle experiment the inventors used an eGFP variant bearing one solvent-accessible cysteine and reacted it with a small molecule fluorescent alkyne phosphonothiolate NA1 (corresponding to compound 22 of Example 14 above) (FIG. 16A) at physiological pH. The reaction was followed by ESI-MS and when checked after 14 h, full conversion was observed without any detectable side product formation (FIG. 16B). This result demonstrates that alkynephosphonothiolates are suitable for the modification of proteins under mild conditions at physiological pH.

Figure 16:
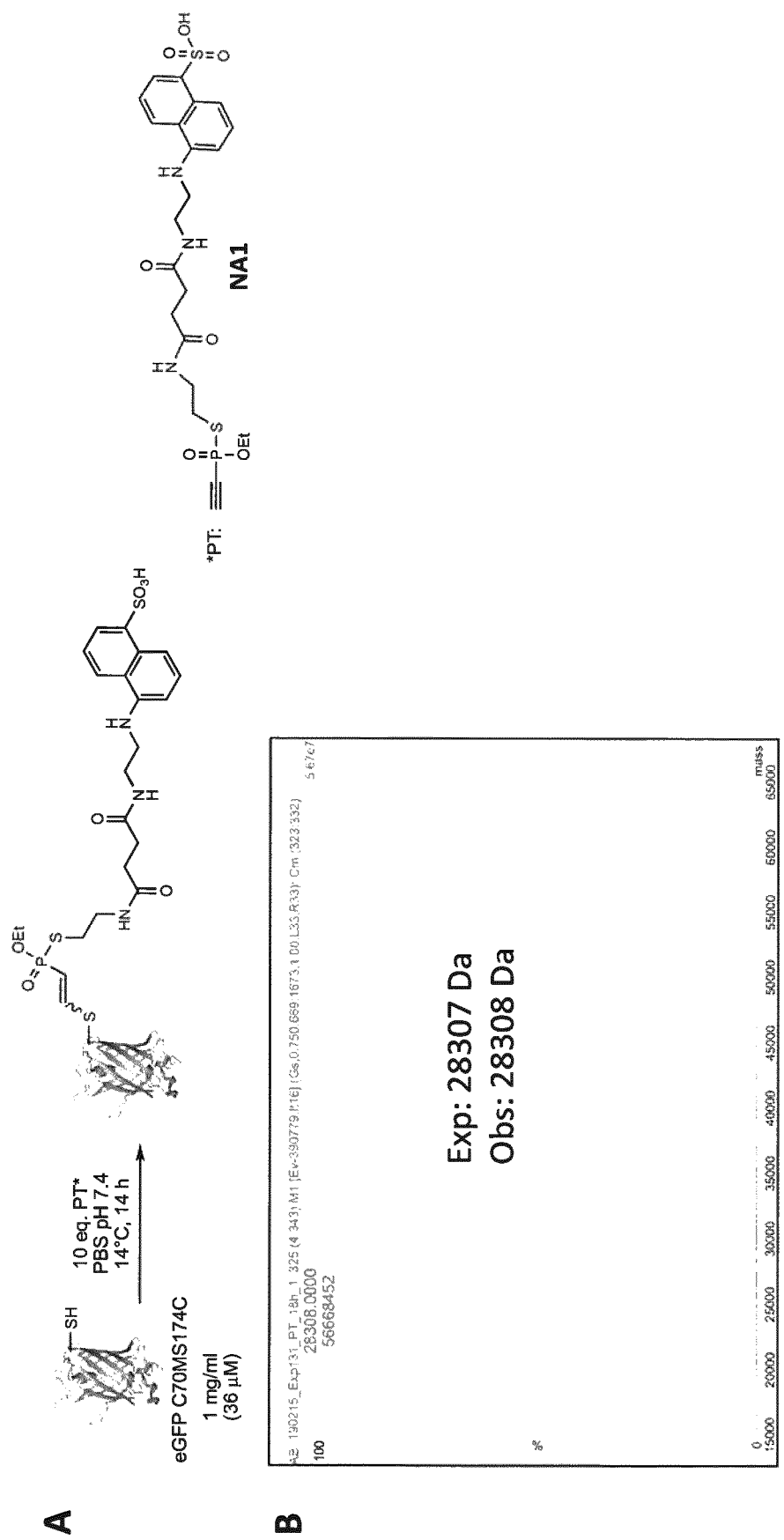
FIG. 16 shows: Modification of eGFP with alkynephosphonothiolate-Edans derivative NA1. A) Synthesis scheme, B) Full conversion of GFP to the desired product was observed by ESI-MS. The spectrum shown here is directly taken from the reaction mixture without any purification. PT=phosphonothiolate NA1.

FIG. 16 shows: Modification of eGFP with alkynephosphonothiolate-Edans derivative NA1. A) Synthesis scheme, B) Full conversion of GFP to the desired product was observed by ESI-MS. The spectrum shown here is directly taken from the reaction mixture without any purification. PT=phosphonothiolate NA1.

Example 22: Synthesis of Antibody Drug Conjugates (ADCs) with Alkyne-Phosphonothiolates The inventors also developed a synthesis of a phosphonothiolate-linked antibody drug conjugate (ADC) from the very efficient antimitotic, tubulin binding cytotoxin monomethyl auristatin E (MMAE) and the CD30-addressing antibody Brentuximab. To facilitate release of the toxic payload, ADCs with a cathepsin B cleavage side (Valine-Citruline linker VC) were prepared between the antibody and the toxin to generate a direct analogue to the marketed ADC Adcetris® (Brentuximab vedotin) (M. A. Stephen, Blood 2014, 124, 3197-3200). A phosphonothiolate-VC-PAB-MMAE construct NA3 was synthesized from alkyne phosphonothiolate carboxylic acid NA2 and VC-PAB-MMAE via an amide coupling, as depicted in Scheme 12.

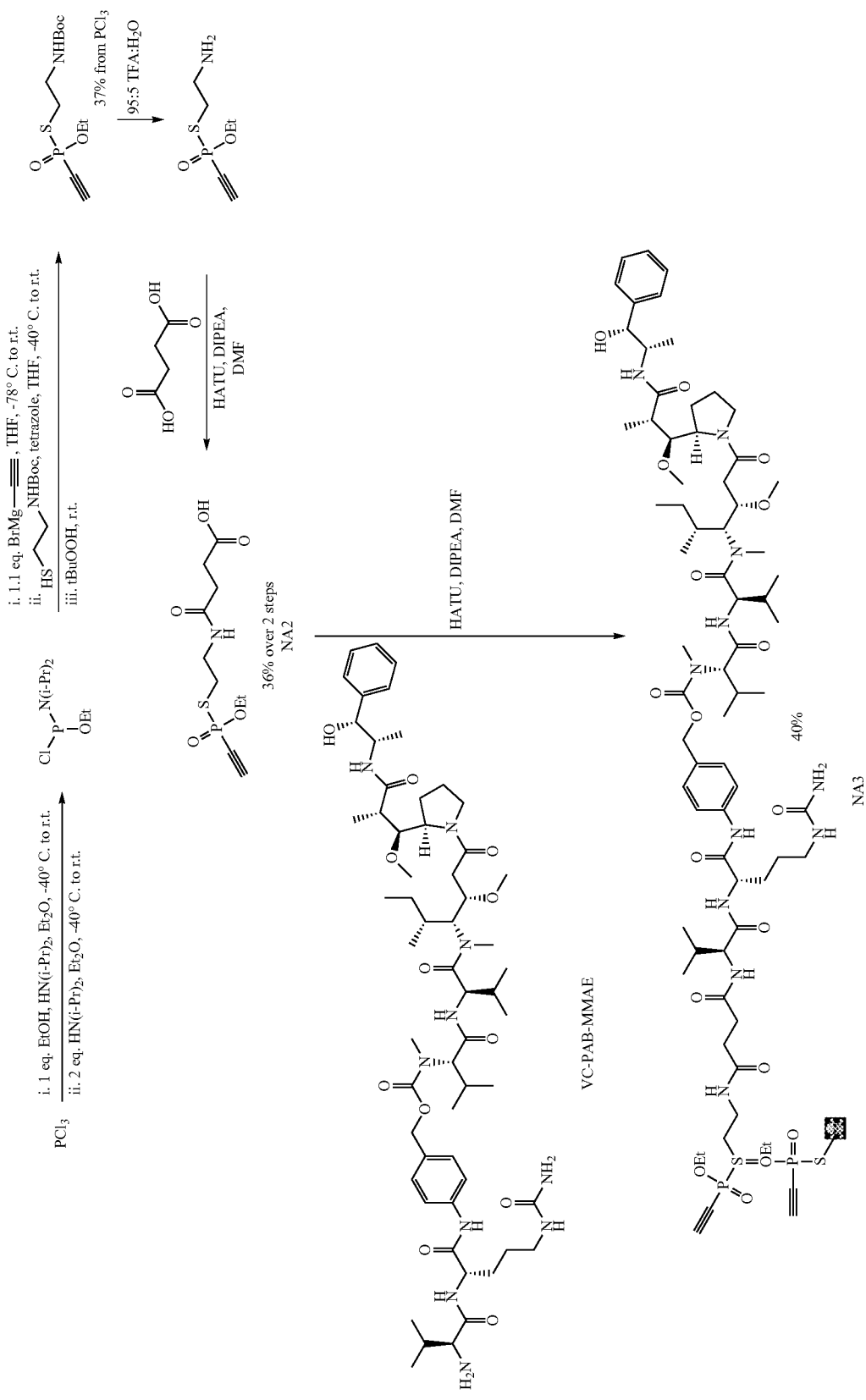
Scheme 12: Synthetic route for the construction of phosphonothiolate linked, cathepsin B cleavable monomethyl auristatin E conjugate NA3.
VC: Valine-citrullin dipeptide, PAB: p-aminobenzyl.

Next, an antibody drug conjugate was synthesized by conjugating NA3 to Brentuximab. The inventors first performed a screen to find reaction conditions to generate an ADC with a drug to antibody ratio (DAR) between 3-4 in order to be able comparing the activity of an ADC comprising the phosphonothiolate linked ADC with the FDA-approved ADC Adcetris®. In the case of Adcetris, VC-PAB-MMAE is conjugated via maleimide to cysteines of Brentuximab with a DAR=4 (M. A. Stephen, Blood 2014, 124, 3197-3200). The inventors first reduced the interchain-disulfide bonds of Brentuximab with DTT in order to generate free sulfhydryl groups, which can then react with the alkynephosphonothiolate NA3 (see FIG. 17A). Excess DTT was removed by Zeba™ Spin desalting columns. For the screen, the inventors varied the concentration of Brentuximab antibody (1 vs. 5 mg/ml), the pH in the conjugation (pH 8.5 vs. 7.4) and the number of equivalents of the phosphonothiolate-drug compound NA3 (8.8-100 eq.) and analysed the resulting ADCs by ESI-MS after deglycosylation with the enzyme PNGase-F and reduction. The DAR was estimated with the mass signal intensities of the heavy- and light-chain species bearing different degrees of modification. The results of this screen are depicted in FIG. 17B. Higher antibody concentrations and more equivalents of phosphonothiolate gave higher DARs. The conjugation with alkynephosphonothiolates also worked efficiently at physiological pH 7.4. This can be an advantage of alkynephosphonothiolates for the conjugation of proteins or antibodies that require handling at physiological pH, e.g. for stability reasons.

Figure 17:
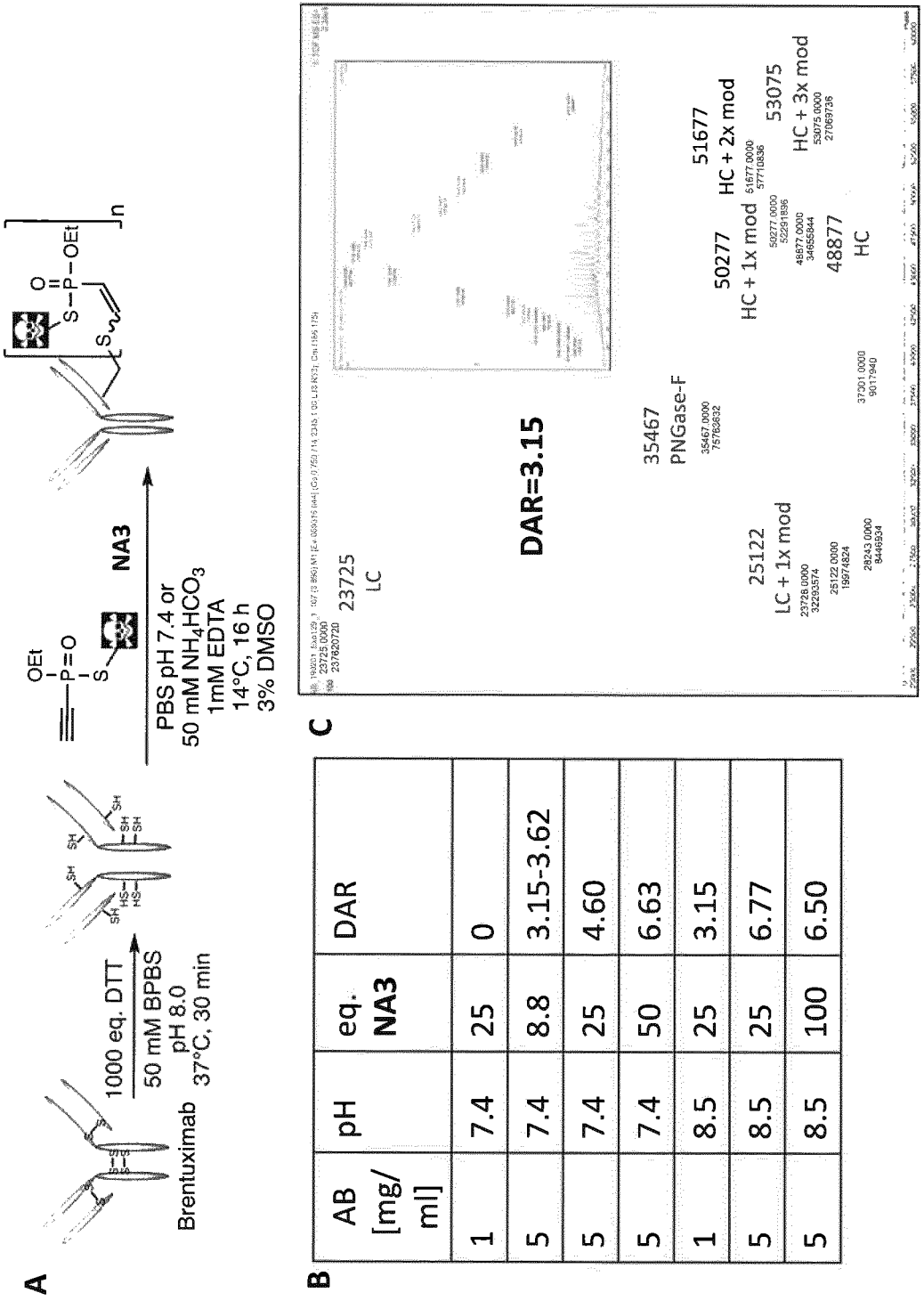
FIG. 17 shows: Brentuximab modification with NA3 (Phosphonothiolate-VC-PAB-MMAE). A) Reaction scheme reduction and alkylation of interchain disulfides. B) Screen of reaction conditions. C) Exemplaric MS spectrum of the antibody fragments after deglycosylation with PNGase-F and reduction with DTT. Shown is the deconvoluted spectrum, the insert shows the raw data. LC: Light chain; HC: Heavy chain; mod: Phosphonothiolate-VC-PAB-MMAE NA3.

FIG. 17 shows: Brentuximab modification with NA3 (Phosphonothiolate-VC-PAB-MMAE). A) Reaction scheme reduction and alkylation of interchain disulfides. B) Screen of reaction conditions. C) Exemplaric MS spectrum of the antibody fragments after deglycosylation with PNGase-F and reduction with DTT. Shown is the deconvoluted spectrum, the insert shows the raw data. LC: Light chain; HC: Heavy chain; mod: Phosphonothiolate-VC-PAB-MMAE NA3.

Figure 21:
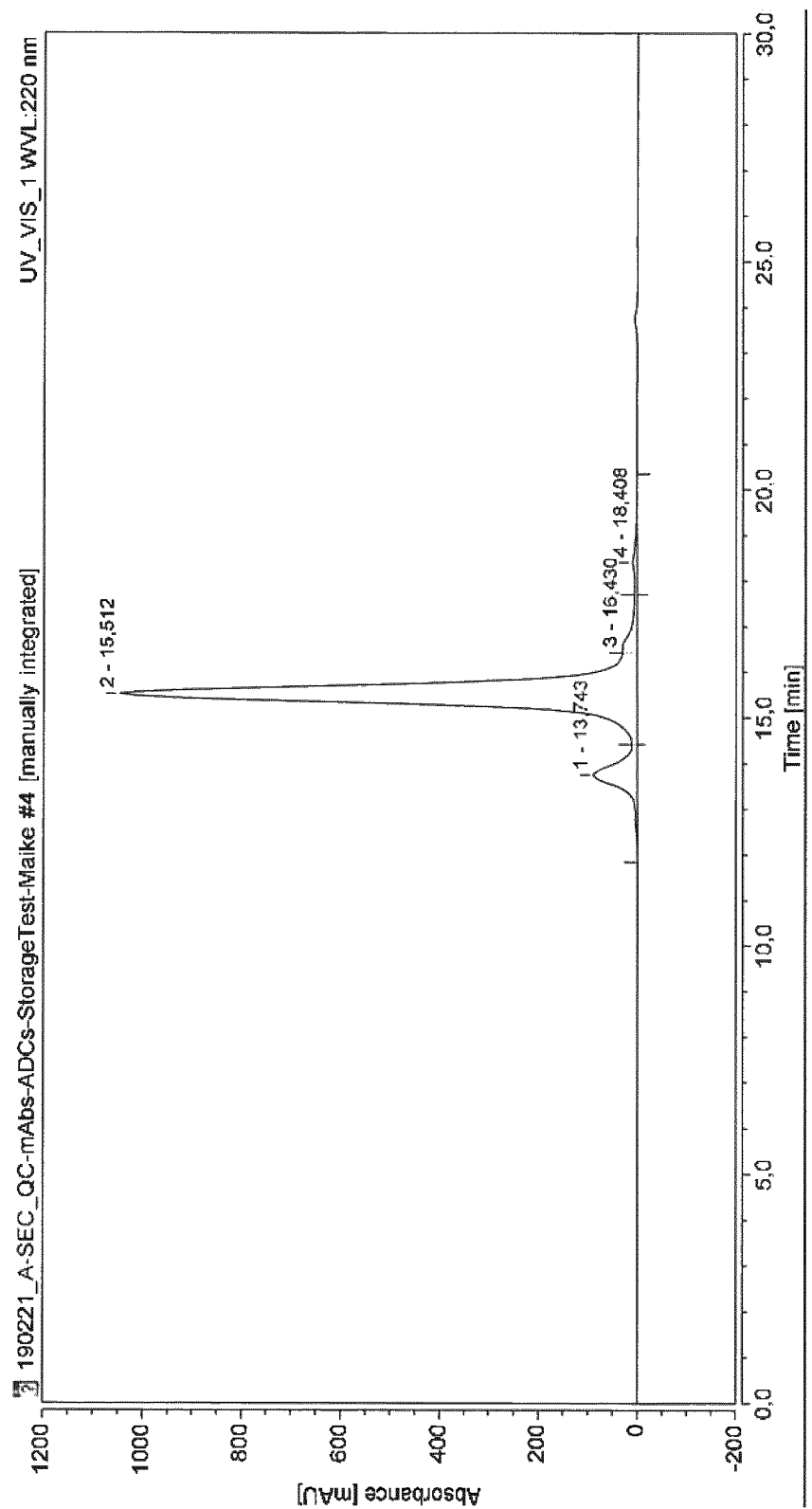
FIG. 21 shows the size-exclusion chromatogram of Brentuximab-NA3 ADC.

The inventors further characterized an ADC with a DAR=3.15 by size exclusion chromatography (SEC) (see FIG. 21). This ADC was then evaluated in a standard resazurin assay where using a CD30-overexpressing cell line Karpas 299 (see FIG. 18A). The Brentuximab-NA3 ADC showed strong growth inhibition (blue curve) and is as potent as the clinically used ADC Adcetris® (red curve) at a slightly lower DAR (3.15 vs. 4.0 for Adcetris®). Brentuximab alone (green curve) does not show growth inhibition. As a control to proof CD30 selectivity the non-CD30-overexpressing cell line HL 60 was used (FIG. 18B). No inhibition of cell proliferation was observed in this case for all the constructs. Taken together, these results demonstrate that alkynephosphonothiolates are suitable linkers to generate active ADCs that selectively kill antigen-positive cell-lines.

Figure 18:
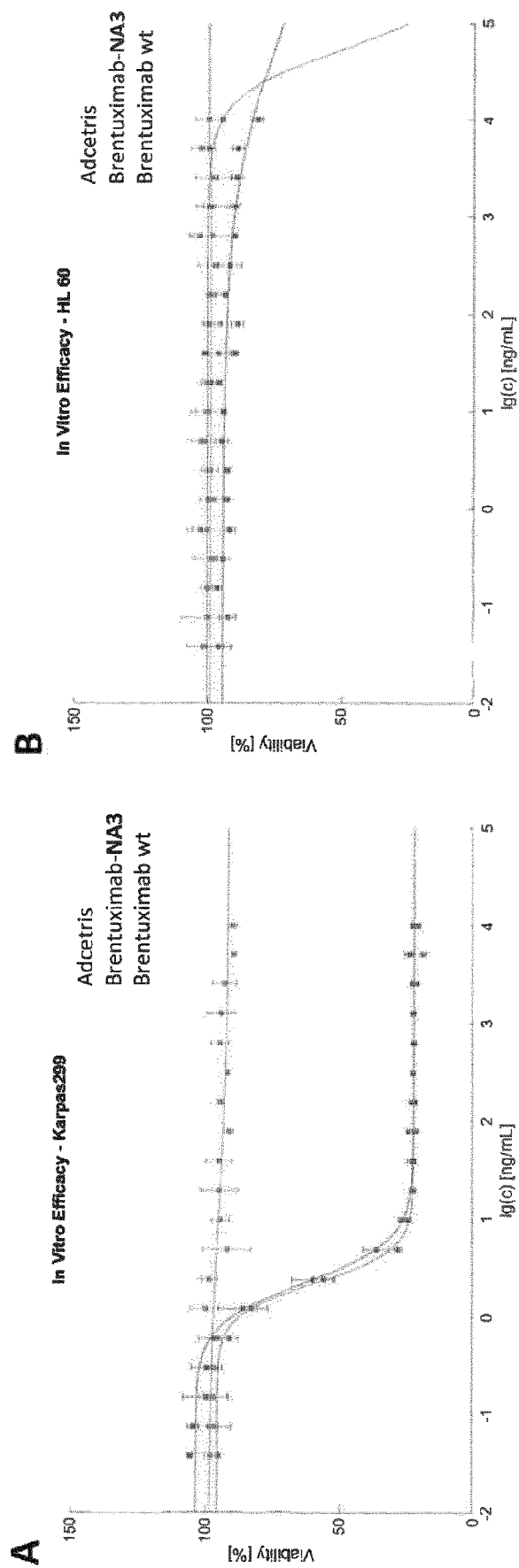
FIG. 18 shows: A) Increased growth inhibition of MMAE linked Brentuximab ADCs selectively on a CD30-overexpressing cell line Karpas 299. Plots depict cell viability after 96 hours of treatment in dependency of the antibody concentration. Brentuximab alone (green). Brentuximab-NA3 (blue) and Adcetris® (red). Karpas 299; CD30-overexpressing cell line. B) Control. Brentuximab alone (green). Brentuximab-NA3 (blue) and Adcetris® (red). HL 60: cell line with low CD30 expression levels.

FIG. 18 shows: A) Increased growth inhibition of MMAE linked Brentuximab ADCs selectively on a CD30-overexpressing cell line Karpas 299. Plots depict cell viability after 96 hours of treatment in dependency of the antibody concentration. Brentuximab alone (green), Brentuximab-NA3 (blue) and Adcetris® (red). Karpas 299: CD30-overexpressing cell line. B) Control. Brentuximab alone (green), Brentuximab-NA3 (blue) and Adcetris® (red). HL 60: cell line with low CD30 expression levels.

Phosphonothiolate-thiol conjugates are more stable compared to maleimide-thiol conjugates, particularly in the presence of excess free thiols. Especially for ADCs, where premature release of the toxin due to thiol exchange can lead to increased off-target toxicity, this is an important advantage of the method and compounds described herein.

In the modification of antibodies, as another advantage, the inventors have observed better cysteine-selectivity for phosphonothiolates compared to maleimides, using the same number of equivalents at physiological pH, see also Example 7B herein above.

Example 23: Introduction of Phosphonothiolates on Peptide on Resin

The inventors have observed that the phosphonothiolates described herein are highly stable under acidic conditions. Therefore, the phosphonothiolates were incorporated into peptides via solid phase peptide synthesis (SPPS) on a resin. This allows introducing an electrophile in a straightforward manner into a peptide during SPPS, and subsequent cleavage from the resin under acidic conditions.

A model peptide was coupled to carboxylic acid NA2 via the free N-terminus. After cleavage with 95% TFA for 2 hours, the product could be isolated by semipreparative HPLC. Hence, this method allows for the incorporation of an electrophile on resin during SPPS. As an advantage, the phosphonothiolate did not hydrolyze under the strongly acidic conditions during cleavage from the resin. Accordingly, phosphonothiolates are highly stable under acidic conditions (e.g. at >90% trifluoroacetic acid (TFA) during cleavage from resin).

The alkynephosphonothiolate-peptide was analysed by UV-LC-MS and by $^{31}$P-NMR. Notably the peptide is present in its linear form as depicted in Scheme 13 and did not cyclize by intramolecular thiol addition via the cysteine residue.

Scheme 13: Solid phase peptide synthesis using alkyne phosphonothiolate.

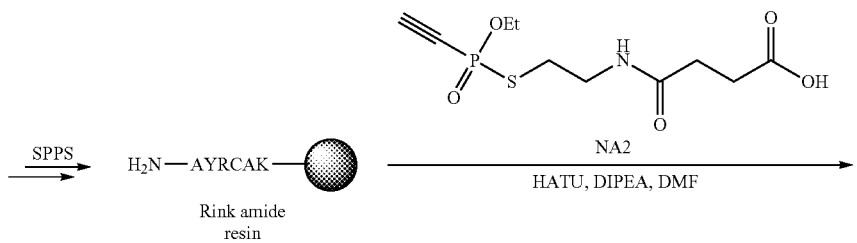

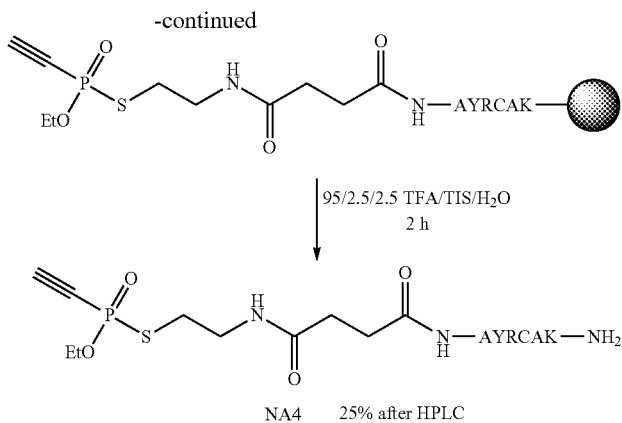

NA4   25% after HPLC

Example 24: Procedures for the Modification of eGFP with Alkynephosphonothiolate NA1

For this experiment an eGFP mutant was used (eGFP C70MS174C). The protein has been expressed as His-tagged variant with a protease cleavage site. After cleavage, the full sequence is:

RGSHMGSIQMVSKGEELFTGVVPILVELDGDVNGHKFSVSGEGEGDATYG

KLTLKFICTTGKLPVPWPTLVTTLTYGVQMFSRYPDHMKQHDFFKSAMPE

GYVQERTIFFKDDGNYKTRAEVKFEGDTLVNRIELKGIDFKEDGNILGHK

LEYNYNCHNVYIMADKQKNGIKVNFKIRHNIEDGSVQLADHYQQNTPIGD

GPVLLPDNHYLSTQSALSKDPNEKRDHMVLLEFVTAAGITLGMDELYK

Figure 19:
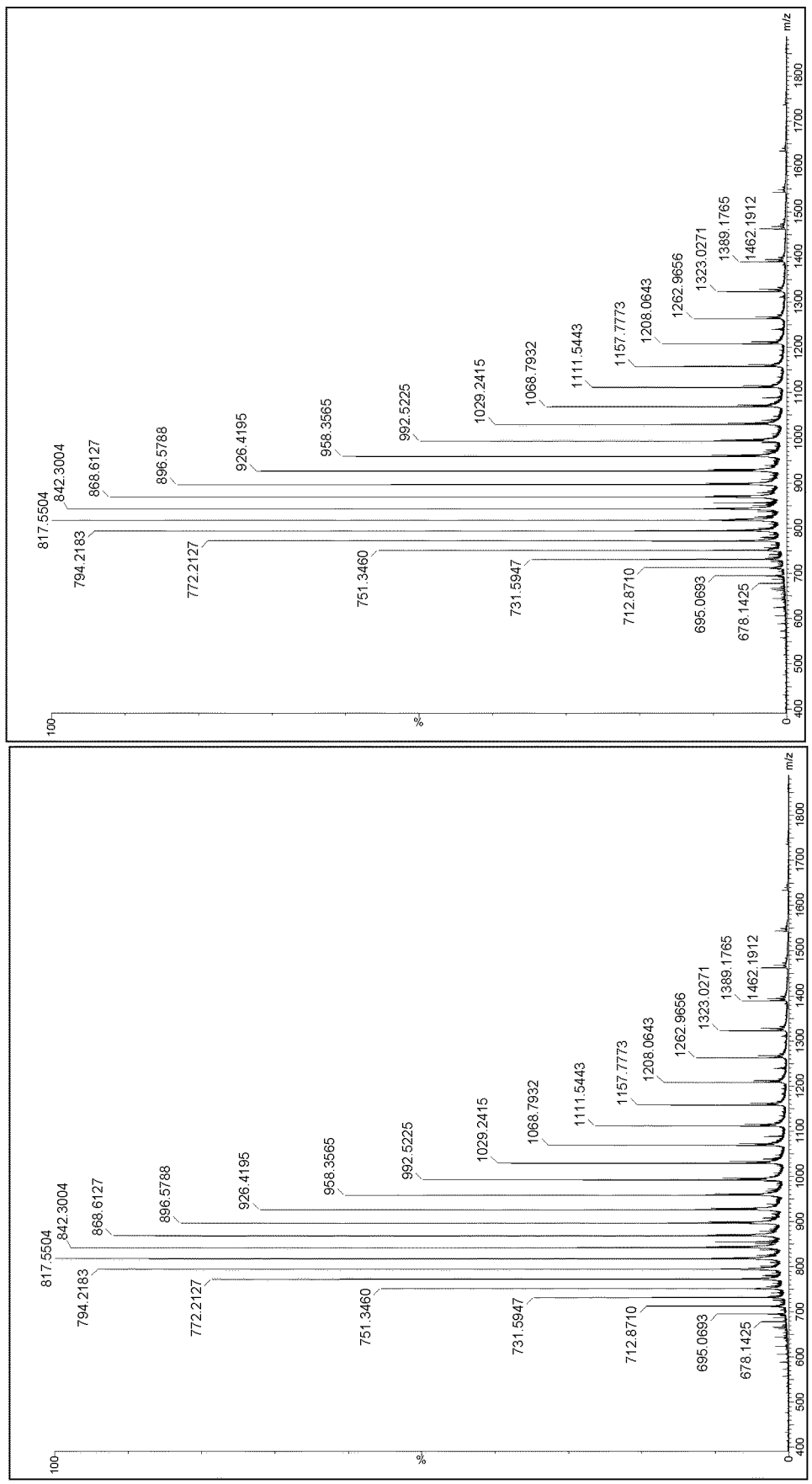
FIG. 19 shows the ESI-MS spectrum of eGFP C70MS174C, which was used as starting material for the conjugation with NA1.

FIG. 19 shows the ESI-MS spectrum of eGFP C70MS174C, which was used as starting material for the conjugation with NA1.

Procedure for Modification of eGFP with NA1:

To a solution of eGFP in PBS pH 7.4 (50 μl, 1 mg/ml) in a low-binding Eppendorf tube was added alkynephosphonothiolate NA1 (0.72 μl of a 25 mM stock solution in DMSO, 10 eq.) and the mixture was kept on a thermoshaker at 14° C. and 800 rpm for 14 h. Full conversion was achieved as judged by ESI-MS.

Example 25: Procedures for the Generation of Antibody Drug Conjugates (ADCs) with Alkyne-Phosphonothiolates Synthesis of 4-((2-((ethoxy(ethynyl)phosphoryl)thio)ethyl)amino)-4-oxobutanoic acid (Compound NA2)

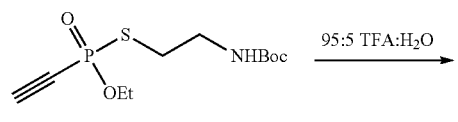

9*
*compound number from initial application

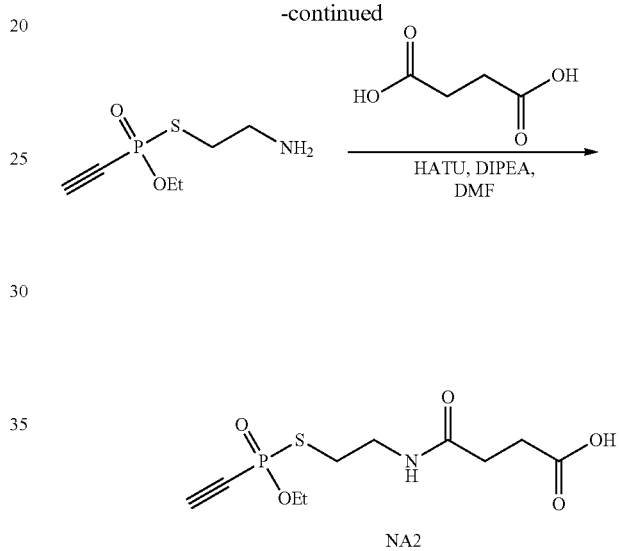

Compound NA2 was generated in two steps from the Boc-protected precursor (compound number 9 described under above Example 11). 9 (94 mg, 0.321 mmol) was dissolved in a round bottom flask in TFA/H$_2$O 95:5 (3 ml) and stirred at r.t. for 5 min. The reaction mixture was then diluted with H$_2$O (10 ml) and freeze-dried. The dry crude product was dissolved in DMF (1 ml) and added to a mixture of succinic acid (38 mg, 0.321 mmol), HATU (122 mg, 0.321) and DIPEA (167 ml, 0.962 mmol) in DMF (1 ml). The resulting mixture was stirred at r.t. for 30 min. The solvents were then removed under reduced pressure and the residue dissolved in a mixture of MeCN/H$_2$O 1:4 containing 0.1% TFA and purified by semipreparative HPLC (20-60% MeCN in 60 min, flow=10 ml/min). Freeze-drying of the product-containing fractions compound gave NA2 as a lyophilized powder (34 mg, 0.116 mmol, 36%) of approximately 90% purity based on $^1$H-NMR. The compound was used for the subsequent reaction without further purification.

HR-MS for C$_{10}$H$_{17}$NO$_5$PS$^{1+}$ [M+1H]$^{1+}$ calcd: 294.0560, found 294.0614.

$^1$H-NMR (300 MHz, CDCl$_3$) $\delta_H$=7.22-7.13 (m, 1H), 4.25 (dq, J=9.8, 7.1 Hz, 2H), 3.76-3.74 (m, 2H), 3.29 (d, J=12.6 Hz, 1H), 3.25-2.98 (m, 2H), 2.72-2.51 (m, 4H), 1.50-1.36 (m, 3H) ppm.

$^{31}$P-NMR (122 MHz, CDCl$_3$) $\delta_P$=17.1 ppm.

Synthesis of
Alkyne-phosphonothiolate-Val-Cit-Pab-MMAE
(Compound NA3)

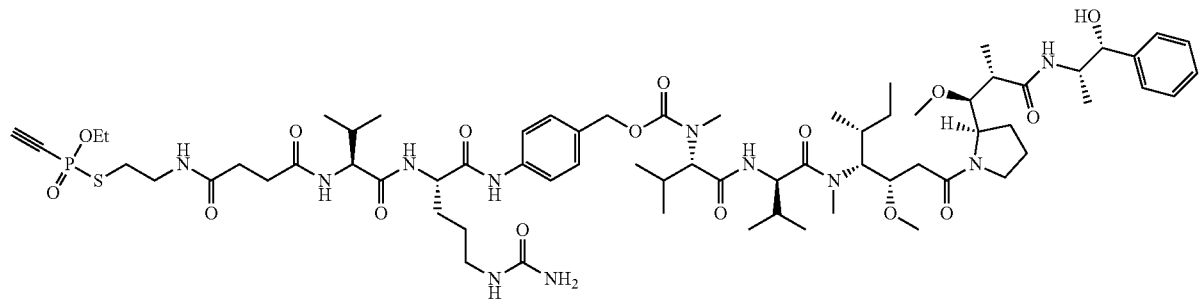 [SMILES: C#CP(=O)(OCC)SCCNC(=O)CCC(=O)N[C@H](C(=O)N[C@@H](CCCNC(N)=O)C(=O)Nc1ccc(COC(=O)N(C)[C@H](C(=O)N[C@@H](C(=O)N(C)[C@H]([C@H](C)CC)[C@H](CC(=O)N2CCC[C@@H]2[C@@H](OC)[C@H](C)C(=O)N[C@@H](C)[C@H](O)c2ccccc2)OC)C(C)C)C(C)C)cc1)C(C)C]

Compound NA2 (1.88 mg, 6.41 mmol), HATU (2.44 mg, 6.41 mmol) and DIPEA (4.7 ml, 26.7 mmol) were dissolved in DMF (100 ml) and added to a solution of $H_2N$-Val-Cit-Pab-MMAE (6 mg, 5.34 mmol) in DMF (150 ml) in an Eppendorf tube. After 30 min, the reaction mixture was diluted with $H_2O$ (4.5 ml), filtered and purified by semi-preparative HPLC (30-99% MeCN in 50 min, flow=5 ml/min). After lyophilization, the described product NA3 was obtained as white powder (3 mg, 2.14 mmol, 40%).

HR-MS for $C_{68}H_{109}N_{11}O_{16}PS^{1+}$ $[M+1H]^{1+}$ calcd: 1398.7507, found 1398.7201.

Figure 20:
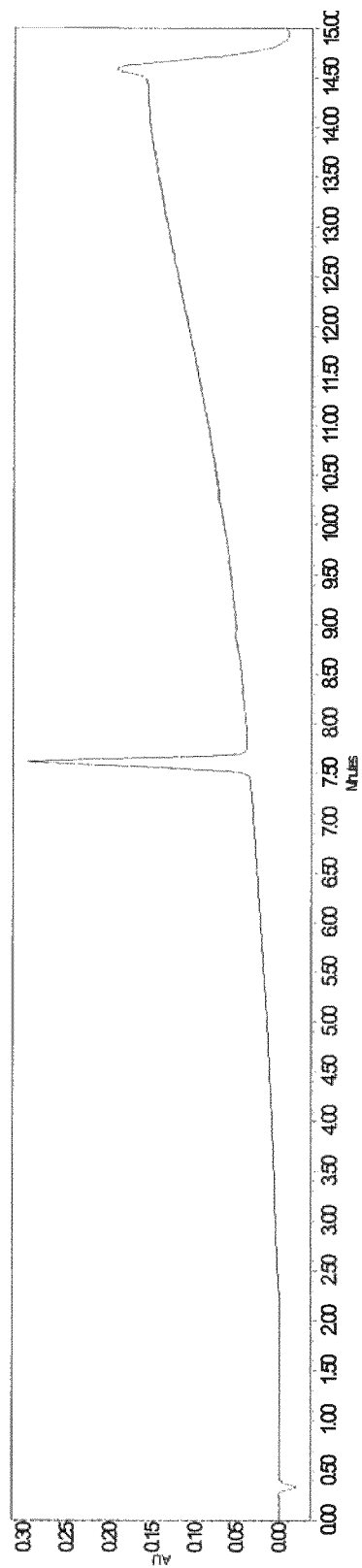
FIG. 20 shows the UPLC-UV purity of Phosphonothiolate-Val-Cit-Pab-MMAE NA3.

FIG. 20 shows the UPLC-UV purity of Phosphonothiolate-Val-Cit-Pab-MMAE NA3.

Brentuximab Production

Brentuximab expression and purification was executed as previously published (A. Stengl, D. Hörl, H. Leonhardt, J. Helma, SLAS Discov 2017, 22, 309-315.) with an additional final purification by gel filtration on a Superdex 200 Increase 10/300 from GE (GE life sciences, USA) with PBS and flow rate of 0.75 ml/min.

Procedure for the Modification of Brentuximab Via the Reduction/Alkylation Protocol

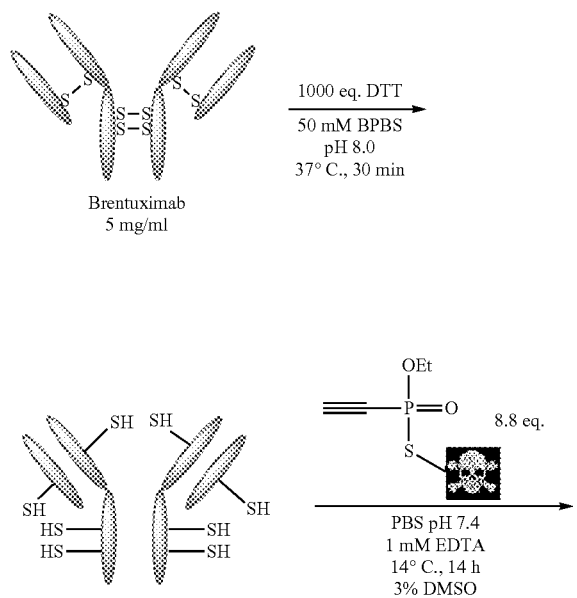

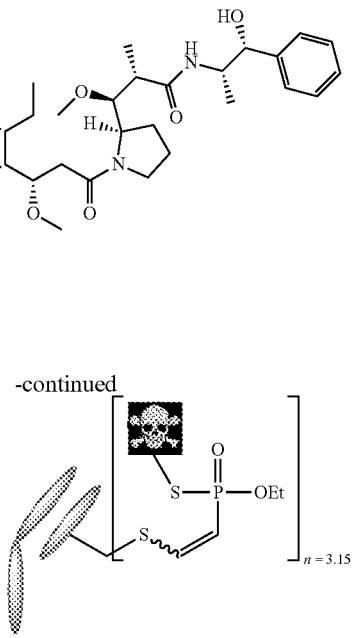

Brentuximab modification was carried out by incubating Brentuximab (c=5 mg/ml, 33.4 mM) in a buffer containing 50 mM sodium borate and 34 mM DTT in PBS (pH=8.0) with a total volume of 300 µl at 37° C. for 30 min in a low-binding Eppendorf tube. Excess DTT removal and buffer exchange to PBS containing 1 mM EDTA (pH 7.4) was conducted afterwards using 2 mL Zeba™ Spin Desalting Columns with 7K MWCO (Thermo Fisher Scientific, Waltham, United States). Next, 2.45 µl of a solution containing 36 mM phosphonothiolate NA3 in DMSO was added quickly and the mixture was shaken at 800 rpm and 14° C. for 16 hours. Excess phosphonothiolate was removed by size exclusion chromatography (Äkta FPLC, Superose 6 Increase 10/300 GL column, with PBS, 0.8 ml/min). The product containing fractions were pooled and sterile filtered. For analysis of the ADC, 12 µl of a 1 mg/ml solution were incubated with 1 µl RapiGest for 30 min at 60° C. on a thermoshaker. Then 1 µl of PNGaseF was added and incubated for another 2 h at 37° C. Finally, 1 µl of a 10 mM solution of DTT in PBS (pH 7.4) was added and the mixture shaken for 30 min at 37° C. Of this mixture 10 µl were diluted with 30 µl $H_2O$ and subjected to ESI-MS (result see FIG. 2C).

SEC of ADC

Analytical size-exclusion chromatography (A-SEC) was conducted on a Vanquish Flex UHPLC System with a DAD detector, Split Sampler FT (4° C.), Column Compartment H (25° C.) and binary pump F (Thermo Fisher Scientific, USA) using a MAbPac SEC-1 300 Å, 4×300 mm column (Thermo Fisher Scientific, USA) with a flow rate of 0.15 mL/min. Separation of different ADC/mAb populations have been achieved during a 30 minute isocratic gradient using a phosphate buffer at pH 7 (20 mM $Na_2HPO_4$/$NaH_2PO_4$, 300 mM NaCl, 5% v/v isopropyl alcohol as a mobile phase. 8 µg ADC/mAb where loaded onto the column for A-SEC analysis. UV chromatograms were recorded at 220 and 280 nm.

Quantification of monomer and HMWS was achieved after integration of the peak area at 220 nm.

FIG. 21 shows the size-exclusion chromatogram of Brentuximab-NA3 ADC.

Cell Based Antiproliferation Assays

HL60 and Karpas cell lines were cultured in RPMI-1640 supplemented with 10% FCS and 0.5% Penicillin-Streptomycin. SKBR3 and MDAMB468 cell lines were cultured in DMEM/F12 supplemented with 10% FCS and 0.5% Penicillin-Streptomycin. Cells were seeded at a density of 5*10^3 cells/well (SKBR3, HL60 and Karpas) or 1*10^3 cells/well (MDAMB468) in 96-well cell culture microplate. 1:4 serial dilutions of ADCs or antibodies were performed in cell culture medium starting at 3 µg/mL final concentration and transferred in duplicates to respective wells on the microplate. Plates were incubated for 96 h at 37° C. 5% $CO_2$. Subsequently, resazurin was added to a final concentration of 50 µM followed by incubation for 3-4 h at 37° C., 5% $CO_2$. Metabolic conversion of resazurin to resorufin is quantified by the fluorescent signal of resorufin ($\lambda_{EX}$=560 nm and $\lambda_{EM}$=590 nm) on a Tecan Infinite M1000 micro plate reader. Mean and standard deviation was calculated from duplicates, normalized to untreated control and plotted against antibody concentration. Data analysis was performed with MatLab R2016 software.

Example 26: Procedures for the Introduction of Phosphonothiolate on Peptide on Resin

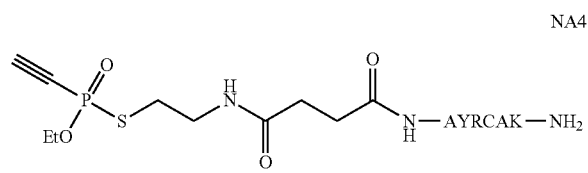

NA4

The peptide with the sequence AYRCAK was synthesized manually on a TentaGel S Rink amide resin with a loading of 0.22 g/mol. Couplings were performed with 5 eq. amino acid, 5 eq. HCTU, 5 eq. Oxyma and 10 eq. DIPEA for 1 h in DMF (concentration: 0.1 M based on 5 eq. amino acid). After each coupling, residual free amine groups were capped with $Ac_2O$. Fmoc-deprotection was accomplished with 20% piperidine in DMF.

The amount of resin corresponding to 10 µM AYRCAK peptide with free N-terminus was used for further modification with the phosphonothiolate building block. The peptide was therefore swollen in DMF (1 ml) in a peptide reactor for 2 hours, before adding a mixture of compound NA2 (120 µl of a 250 mM stock solution DMF, 30 µmol, 3 eq.), HATU (11.4 mg, 30 µmol, 3 eq.) and DIPEA (10.4 µl, 60 µmol, 6 eq.). This mixture was shaken at r.t. for 1 h. Cleavage from the resin was performed using TFA/$H_2O$/TIS (95:2.5:2.5; v:v:v, 2 ml) for 2 h. Precipitation was carried out in cold and dry ether. The crude was purified by preparative reverse phase C18 HPLC (10-60% MeCN in $H_2O$+0.1% TFA, flow: 10 ml/min). After lyophilization the product NA4 was gained as white powder (2.44 mg, 2.48 µmol, 25%) and was analyzed by $^{31}$P-NMR, analytical UPLC (5 to 95% MeCN in $H_2O$ containing 0.1% TFA in 15 min on a RP-C18 column.) and ESI-MS.

HR-MS for $C40H_{66}N_{12}O_{11}PS_2^{1+}$ $[M+1H]^{1+}$ calcd: 985.4148, found 985.4152.

$^{31}$P-NMR (243 MHz, DMSO-$d_6$) $\delta_P$=14.6 (d, J=6.5 Hz) ppm.

Figure 22:
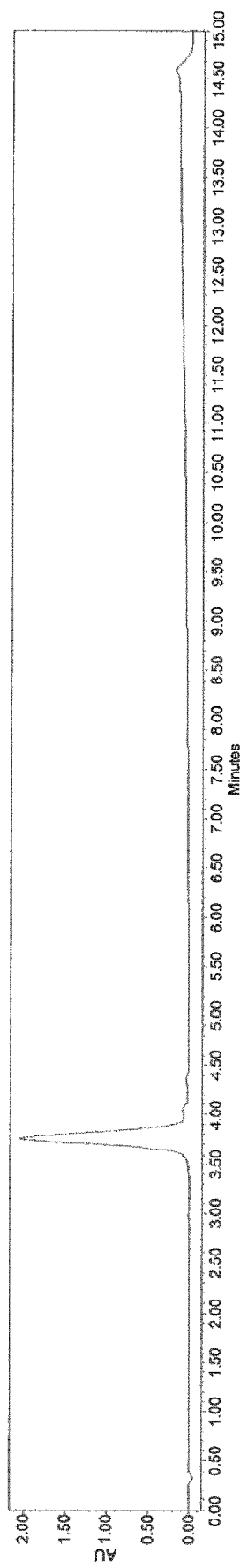
FIG. 22 shows the UPLC-UV purity of phosphonothiolate peptide NA4.

FIG. 22 shows the UPLC-UV purity of phosphonothiolate peptide NA4.

CONCLUSION

The inventors demonstrated herein that unsaturated phosphonothiolates and phosphonates (alkene- and alkyne-phosphonothiolates as well as alkene- and alkyne-phosphonates) are suitable handles for cysteine-selective bioconjugation reactions. The thiol addition is fast under aqueous conditions and the formed conjugates are stable under physiologically relevant conditions. The inventors showed that this method allows, for example, for the cysteine-selective modification of proteins (e.g. BSA) and antibodies (e.g. Cetuximab, Brentuximab). The results provided herein show that the method according to the invention which uses phosphonothiolates or phosphonates is superior over current cysteine bioconjugation strategies, as for example maleimide chemistry, as the reaction is more selective for thiols and the formed conjugates exhibit better stability.

It must be noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

All publications and patents cited in this disclosure are incorporated by reference in their entirety. To the extent the material incorporated by reference contradicts or is inconsistent with this specification, the specification will supersede any such material.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or sometimes when used herein with the term "having".

When used herein "consisting of" excludes any element, step, or ingredient not specified in the claim element. When used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

The invention claimed is:

1. A compound of formula (III)

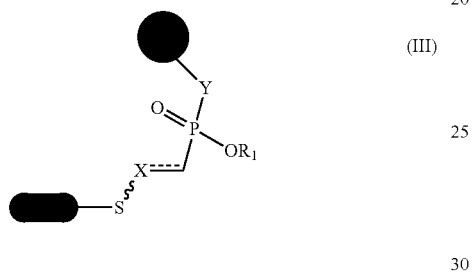

(III)

wherein

⫽ represents a bond and X represents $(R_3 R_4)C$, wherein $R_3$ and $R_4$ independently represent H or $C_1$-$C_8$-alkyl; or ⫽ represents a double bond and X represents $R_3C$, wherein $R_3$ represents H or $C_1$-$C_8$-alkyl; and Y represents S;

$R_1$ represents an optionally substituted aliphatic or aromatic residue;

● represents an aliphatic or aromatic residue; and

▬ represents an amino acid, a peptide, a protein, an antibody, or a nucleotide.

2. The compound according claim 1, wherein $R_1$ represents $C_1$-$C_8$-alkyl optionally substituted with at least one of $(C_1$-$C_8$-alkoxy$)_n$ wherein n is 1, 2, 3, 4, 5 or 6, F, Cl, Br, I, —$NO_2$, —$N(C_1$-$C_8$-alkyl)H, —$NH_2$, —$N_3$, —$N(C_1$-$C_8$-alkyl$)_2$, =O, $C_3$-$C_8$-cycloalkyl, —S—S—($C_1$-$C_8$-alkyl), hydroxy-($C_1$-$C_8$-alkoxy)n wherein n is 1, 2, 3, 4, 5 or 6, $C_2$-$C_8$-alkenyl, or $C_2$-$C_8$-alkynyl; or $R_1$ represents phenyl optionally independently substituted with at least one of $C_1$-$C_8$-alkyl, ($C_1$-$C_8$-alkoxy)n wherein n is 1, 2, 3, 4, 5 or 6, F, Cl, I, Br, —$NO_2$, —$N(C_1$-$C_8$-alkyl)H, —$NH_2$, or —$N(C_1$-$C_8$-alkyl$)_2$; or $R_1$ represents a 5- or 6-membered heteroaromatic system; or $R_1$ represents $C_1$-$C_8$-alkyl, $C_1$-$C_8$-alkyl substituted with —S—S—($C_1$-$C_8$-alkyl), $C_1$-$C_8$-alkyl substituted with ($C_1$-$C_8$-alkoxy$)_n$ wherein n is 1, 2, 3, 4, 5 or 6, $C_1$-$C_8$-alkyl substituted with optionally substituted phenyl; or phenyl; or phenyl substituted with —$NO_2$.

3. The compound according to claim 1, wherein $R_1$ represents methyl, ethyl, propyl or butyl.

4. The compound according to claim 1, wherein $R_1$ represents

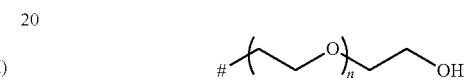

with n=0, 1, 2, 3, 4, 5, 6, 7, 8, 9 or 10;

with n=0, 1, 2, 3, 4, 5, 6, 7, 8, 9 or 10, wherein # represents the position of O.

5. The compound according to claim 1, wherein ▬ represents an antibody, a protein, or a tripeptide.

6. The compound according to claim 2, wherein the 5- or 6-membered heteroaromatic system is pyridyl.

7. The compound according to claim 3, wherein $R_1$ represents methyl or ethyl.

8. The compound according to claim 5, wherein when ▬ represents an antibody, the antibody is an IgG-antibody.

9. The compound according to claim 8, wherein the IgG-antibody is Cetuximab, Trastuzumab or Brentuximab.

10. The compound of claim 5, wherein the tripeptide is a peptide of formula (VIII)

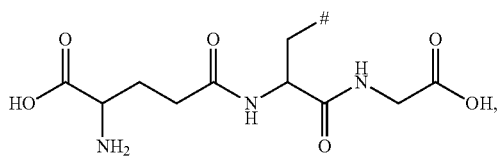

(VIII)

or of formula (IX)
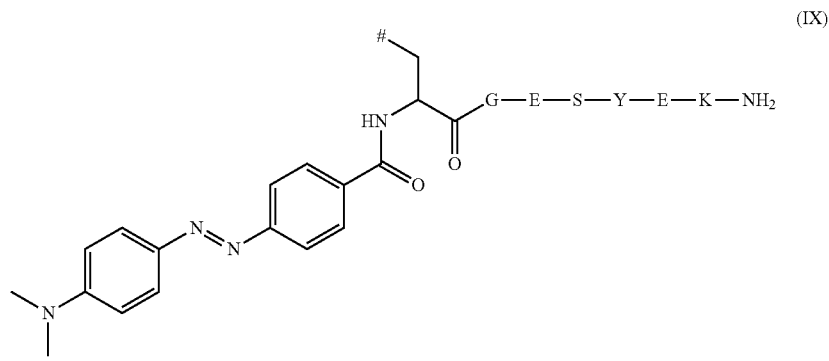
wherein # represents the position of S.
11. The compound of claim 1, wherein the aliphatic or aromatic residue comprises a linker-drug conjugate.

SEQUENCE LISTING

<160> NUMBER OF SEQ ID NOS: 26

<210> SEQ ID NO 1
<211> LENGTH: 15
<212> TYPE: PRT
<213> ORGANISM: Artificial
<220> FEATURE:
<223> OTHER INFORMATION: AviTag

<400> SEQUENCE: 1

Gly Leu Asn Asp Ile Phe Glu Ala Gln Lys Ile Glu Trp His Glu
1               5                   10                  15

<210> SEQ ID NO 2
<211> LENGTH: 26
<212> TYPE: PRT
<213> ORGANISM: Artificial
<220> FEATURE:
<223> OTHER INFORMATION: Calmodulin-tag

<400> SEQUENCE: 2

Lys Arg Arg Trp Lys Lys Asn Phe Ile Ala Val Ser Ala Ala Asn Arg
1               5                   10                  15

Phe Lys Lys Ile Ser Ser Ser Gly Ala Leu
            20                  25

<210> SEQ ID NO 3
<211> LENGTH: 6
<212> TYPE: PRT
<213> ORGANISM: Artificial
<220> FEATURE:
<223> OTHER INFORMATION: polyglutamate tag

<400> SEQUENCE: 3

Glu Glu Glu Glu Glu Glu
1               5

<210> SEQ ID NO 4
<211> LENGTH: 13
<212> TYPE: PRT
<213> ORGANISM: Artificial
<220> FEATURE:
<223> OTHER INFORMATION: E-tag

<400> SEQUENCE: 4

Gly Ala Pro Val Pro Tyr Pro Asp Pro Leu Glu Pro Arg
1               5                   10

<210> SEQ ID NO 5
<211> LENGTH: 8
<212> TYPE: PRT
<213> ORGANISM: Artificial
<220> FEATURE:
<223> OTHER INFORMATION: FLAG-tag

<400> SEQUENCE: 5

Asp Tyr Lys Asp Asp Asp Asp Lys
1               5

<210> SEQ ID NO 6
<211> LENGTH: 9
<212> TYPE: PRT
<213> ORGANISM: Artificial
<220> FEATURE:
<223> OTHER INFORMATION: HA-tag

<400> SEQUENCE: 6

```
Tyr Pro Tyr Asp Val Pro Asp Tyr Ala
1               5

<210> SEQ ID NO 7
<211> LENGTH: 6
<212> TYPE: PRT
<213> ORGANISM: Artificial
<220> FEATURE:
<223> OTHER INFORMATION: His-tag

<400> SEQUENCE: 7

His His His His His His
1               5

<210> SEQ ID NO 8
<211> LENGTH: 10
<212> TYPE: PRT
<213> ORGANISM: Artificial
<220> FEATURE:
<223> OTHER INFORMATION: Myc-tag

<400> SEQUENCE: 8

Glu Gln Lys Leu Ile Ser Glu Glu Asp Leu
1               5                   10

<210> SEQ ID NO 9
<211> LENGTH: 18
<212> TYPE: PRT
<213> ORGANISM: Artificial
<220> FEATURE:
<223> OTHER INFORMATION: NE-tag

<400> SEQUENCE: 9

Thr Lys Glu Asn Pro Arg Ser Asn Gln Glu Glu Ser Tyr Asp Asp Asn
1               5                   10                  15

Glu Ser

<210> SEQ ID NO 10
<211> LENGTH: 15
<212> TYPE: PRT
<213> ORGANISM: Artificial
<220> FEATURE:
<223> OTHER INFORMATION: S-tag

<400> SEQUENCE: 10

Lys Glu Thr Ala Ala Ala Lys Phe Glu Arg Gln His Met Asp Ser
1               5                   10                  15

<210> SEQ ID NO 11
<211> LENGTH: 38
<212> TYPE: PRT
<213> ORGANISM: Artificial
<220> FEATURE:
<223> OTHER INFORMATION: SBP-tag

<400> SEQUENCE: 11

Met Asp Glu Lys Thr Thr Gly Trp Arg Gly Gly His Val Val Glu Gly
1               5                   10                  15

Leu Ala Gly Glu Leu Glu Gln Leu Arg Ala Arg Leu Glu His His Pro
            20                  25                  30

Gln Gly Gln Arg Glu Pro
        35

<210> SEQ ID NO 12
```

```
<211> LENGTH: 13
<212> TYPE: PRT
<213> ORGANISM: Artificial
<220> FEATURE:
<223> OTHER INFORMATION: Softag 1

<400> SEQUENCE: 12

Ser Leu Ala Glu Leu Leu Asn Ala Gly Leu Gly Gly Ser
1               5                   10

<210> SEQ ID NO 13
<211> LENGTH: 8
<212> TYPE: PRT
<213> ORGANISM: Artificial
<220> FEATURE:
<223> OTHER INFORMATION: Softag 3

<400> SEQUENCE: 13

Thr Gln Asp Pro Ser Arg Val Gly
1               5

<210> SEQ ID NO 14
<211> LENGTH: 8
<212> TYPE: PRT
<213> ORGANISM: Artificial
<220> FEATURE:
<223> OTHER INFORMATION: Strep-tag II

<400> SEQUENCE: 14

Trp Ser His Pro Gln Phe Glu Lys
1               5

<210> SEQ ID NO 15
<211> LENGTH: 6
<212> TYPE: PRT
<213> ORGANISM: Artificial
<220> FEATURE:
<223> OTHER INFORMATION: TC tag

<400> SEQUENCE: 15

Cys Cys Pro Gly Cys Cys
1               5

<210> SEQ ID NO 16
<211> LENGTH: 14
<212> TYPE: PRT
<213> ORGANISM: Artificial
<220> FEATURE:
<223> OTHER INFORMATION: V5 tag

<400> SEQUENCE: 16

Gly Lys Pro Ile Pro Asn Pro Leu Leu Gly Leu Asp Ser Thr
1               5                   10

<210> SEQ ID NO 17
<211> LENGTH: 11
<212> TYPE: PRT
<213> ORGANISM: Artificial
<220> FEATURE:
<223> OTHER INFORMATION: VSV-tag

<400> SEQUENCE: 17

Tyr Thr Asp Ile Glu Met Asn Arg Leu Gly Lys
1               5                   10

<210> SEQ ID NO 18
<211> LENGTH: 8
```

<212> TYPE: PRT
<213> ORGANISM: Artificial
<220> FEATURE:
<223> OTHER INFORMATION: Xpress tag

<400> SEQUENCE: 18

Asp Leu Tyr Asp Asp Asp Asp Lys
1               5

<210> SEQ ID NO 19
<211> LENGTH: 16
<212> TYPE: PRT
<213> ORGANISM: Artificial
<220> FEATURE:
<223> OTHER INFORMATION: Isopeptag

<400> SEQUENCE: 19

Thr Asp Lys Asp Met Thr Ile Thr Phe Thr Asn Lys Lys Asp Ala Glu
1               5                   10                  15

<210> SEQ ID NO 20
<211> LENGTH: 13
<212> TYPE: PRT
<213> ORGANISM: Artificial
<220> FEATURE:
<223> OTHER INFORMATION: SpyTag

<400> SEQUENCE: 20

Ala His Ile Val Met Val Asp Ala Tyr Lys Pro Thr Lys
1               5                   10

<210> SEQ ID NO 21
<211> LENGTH: 12
<212> TYPE: PRT
<213> ORGANISM: Artificial
<220> FEATURE:
<223> OTHER INFORMATION: SnoopTag

<400> SEQUENCE: 21

Lys Leu Gly Asp Ile Glu Phe Ile Lys Val Asn Lys
1               5                   10

<210> SEQ ID NO 22
<211> LENGTH: 12
<212> TYPE: PRT
<213> ORGANISM: Artificial
<220> FEATURE:
<223> OTHER INFORMATION: C58-containing peptide

<400> SEQUENCE: 22

Leu Gln Gln Cys Pro Phe Asp Glu His Val Lys Leu
1               5                   10

<210> SEQ ID NO 23
<211> LENGTH: 19
<212> TYPE: PRT
<213> ORGANISM: Artificial
<220> FEATURE:
<223> OTHER INFORMATION: C58-containing peptide

<400> SEQUENCE: 23

Leu Gln Gln Cys Pro Phe Asp Glu His Val Lys Leu Val Asn Glu Leu
1               5                   10                  15

Thr Glu Phe

<210> SEQ ID NO 24

```
<211> LENGTH: 11
<212> TYPE: PRT
<213> ORGANISM: Artificial
<220> FEATURE:
<223> OTHER INFORMATION: C58-containing peptide

<400> SEQUENCE: 24

Gln Gln Cys Pro Phe Asp Glu His Val Lys Leu
1               5                   10

<210> SEQ ID NO 25
<211> LENGTH: 18
<212> TYPE: PRT
<213> ORGANISM: Artificial
<220> FEATURE:
<223> OTHER INFORMATION: C58-containing peptide

<400> SEQUENCE: 25

Gln Gln Cys Pro Phe Asp Glu His Val Lys Leu Val Asn Glu Leu Thr
1               5                   10                  15

Glu Phe

<210> SEQ ID NO 26
<211> LENGTH: 248
<212> TYPE: PRT
<213> ORGANISM: Artificial
<220> FEATURE:
<223> OTHER INFORMATION: eGFP mutant C70MS174C

<400> SEQUENCE: 26

Arg Gly Ser His Met Gly Ser Ile Gln Met Val Ser Lys Gly Glu Glu
1               5                   10                  15

Leu Phe Thr Gly Val Val Pro Ile Leu Val Glu Leu Asp Gly Asp Val
                20                  25                  30

Asn Gly His Lys Phe Ser Val Ser Gly Glu Gly Glu Gly Asp Ala Thr
            35                  40                  45

Tyr Gly Lys Leu Thr Leu Lys Phe Ile Cys Thr Thr Gly Lys Leu Pro
        50                  55                  60

Val Pro Trp Pro Thr Leu Val Thr Thr Leu Thr Tyr Gly Val Gln Met
65                  70                  75                  80

Phe Ser Arg Tyr Pro Asp His Met Lys Gln His Asp Phe Phe Lys Ser
                85                  90                  95

Ala Met Pro Glu Gly Tyr Val Gln Glu Arg Thr Ile Phe Phe Lys Asp
            100                 105                 110

Asp Gly Asn Tyr Lys Thr Arg Ala Glu Val Lys Phe Glu Gly Asp Thr
        115                 120                 125

Leu Val Asn Arg Ile Glu Leu Lys Gly Ile Asp Phe Lys Glu Asp Gly
    130                 135                 140

Asn Ile Leu Gly His Lys Leu Glu Tyr Asn Tyr Asn Cys His Asn Val
145                 150                 155                 160

Tyr Ile Met Ala Asp Lys Gln Lys Asn Gly Ile Lys Val Asn Phe Lys
                165                 170                 175
```

-continued

```
Ile Arg His Asn Ile Glu Asp Gly Ser Val Gln Leu Ala Asp His Tyr
            180                 185                 190

Gln Gln Asn Thr Pro Ile Gly Asp Gly Pro Val Leu Leu Pro Asp Asn
        195                 200                 205

His Tyr Leu Ser Thr Gln Ser Ala Leu Ser Lys Asp Pro Asn Glu Lys
        210                 215                 220

Arg Asp His Met Val Leu Leu Glu Phe Val Thr Ala Ala Gly Ile Thr
225                 230                 235                 240

Leu Gly Met Asp Glu Leu Tyr Lys
                245
```